US010360593B2

(12) United States Patent
Hunter et al.

(10) Patent No.: US 10,360,593 B2
(45) Date of Patent: Jul. 23, 2019

(54) RETAIL PROXIMITY MARKETING

(71) Applicant: QUALCOMM Incorporated, San Diego, CA (US)

(72) Inventors: Kevin E Hunter, La Jolla, CA (US); Stephen A Sprigg, Poway, CA (US); Neville J Meijers, San Diego, CA (US); Charles S Wurster, San Diego, CA (US); Paul E Jacobs, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 646 days.

(21) Appl. No.: 13/833,110

(22) Filed: Mar. 15, 2013

(65) Prior Publication Data

US 2013/0297422 A1 Nov. 7, 2013

Related U.S. Application Data

(63) Continuation-in-part of application No. 13/773,379, filed on Feb. 21, 2013, now Pat. No. 9,544,075, and
(Continued)

(51) Int. Cl.
*G06Q 30/02* (2012.01)
*H04W 4/02* (2018.01)
(Continued)

(52) U.S. Cl.
CPC ......... *G06Q 30/0261* (2013.01); *H04H 20/61* (2013.01); *H04H 60/51* (2013.01);
(Continued)

(58) Field of Classification Search
None
See application file for complete search history.

(56) References Cited

U.S. PATENT DOCUMENTS 5,241,598 A 8/1993 Raith
5,784,028 A 7/1998 Corman et al.
(Continued)

FOREIGN PATENT DOCUMENTS

CN 1589580 A 3/2005
CN 101127684 A 2/2008
(Continued)

OTHER PUBLICATIONS

International Search Report and Written Opinion—PCT/US2013/38048—ISA/EPO—dated Sep. 19, 2014.
(Continued)

*Primary Examiner* — Marie P Brady
(74) *Attorney, Agent, or Firm* — The Marbury Law Group, PLLC

(57) ABSTRACT

Methods, systems and devices for presenting marketing information to a customer based on proximity to marketing areas. A wireless identity transmitter associated with the customer may periodically transmit wireless broadcast messages that include obscured identifiers. A proximity broadcast receiver within a retail store, such as near a product display or aisle, may receive and relay the broadcast messages to a server which may process the included information. Based on proximity information and other conditions, the server may transmit marketing information relevant to the customer and a proximate marketing area, such as coupons and offers. In an embodiment, the server may store data based on broadcast messages that may indicate foot traffic and other information valuable to merchants. The server may also transmit messages based on stored permissions that indicate whether the customer desires to receive marketing information and whether the server is authorized to provide the customer's identity to merchants.

74 Claims, 51 Drawing Sheets

Related U.S. Application Data a continuation-in-part of application No. 13/773,336, filed on Feb. 21, 2013, now abandoned.

(60) Provisional application No. 61/693,169, filed on Aug. 24, 2012, provisional application No. 61/637,834, filed on Apr. 24, 2012, provisional application No. 61/670,226, filed on Jul. 11, 2012, provisional application No. 61/701,457, filed on Sep. 14, 2012, provisional application No. 61/713,239, filed on Oct. 12, 2012, provisional application No. 61/716,373, filed on Oct. 19, 2012, provisional application No. 61/717,964, filed on Oct. 24, 2012, provisional application No. 61/728,677, filed on Nov. 20, 2012, provisional application No. 61/745,395, filed on Dec. 21, 2012, provisional application No. 61/745,308, filed on Dec. 21, 2012.

(51) Int. Cl.
*H04H 20/61* (2008.01)
*H04H 60/51* (2008.01)
*H04H 60/63* (2008.01)
*H04W 4/06* (2009.01)

(52) U.S. Cl.
CPC ............ *H04H 60/63* (2013.01); *H04W 4/023* (2013.01); *H04W 4/06* (2013.01)

(56) References Cited

U.S. PATENT DOCUMENTS

| | | |
|---|---|---|
| 5,812,086 A | 9/1998 | Bertiger et al. |
| 6,052,786 A | 4/2000 | Tsuchida |
| 6,513,015 B2 | 1/2003 | Ogasawara |
| 6,536,658 B1 | 3/2003 | Rantze |
| 6,970,092 B2 | 11/2005 | Hum et al. |
| 7,260,835 B2 | 8/2007 | Bajikar |
| 7,376,583 B1 | 5/2008 | Rolf |
| 7,413,121 B2 | 8/2008 | Goel et al. |
| 7,616,942 B2 | 11/2009 | Karl et al. |
| 7,649,440 B2 | 1/2010 | Kang et al. |
| 7,658,327 B2 | 2/2010 | Tuchman et al. |
| 7,729,709 B1* | 6/2010 | Loeb ............... H04L 67/18 455/2.01 |
| 7,737,861 B2 | 6/2010 | Lea et al. |
| 7,752,329 B1 | 7/2010 | Meenan et al. |
| 7,791,455 B1 | 9/2010 | MacLean, III |
| 7,849,318 B2 | 12/2010 | Zhang et al. |
| 7,880,616 B2 | 2/2011 | Kanagala et al. |
| 7,936,736 B2 | 5/2011 | Proctor, Jr. et al. |
| RE42,435 E | 6/2011 | Katz |
| 7,962,361 B2 | 6/2011 | Ramchandani et al. |
| 8,023,895 B2 | 9/2011 | Smith |
| 8,050,984 B2 | 11/2011 | Bonner et al. |
| 8,090,399 B2 | 1/2012 | Howarter et al. |
| 8,145,125 B2 | 3/2012 | Masoian et al. |
| 8,160,577 B2 | 4/2012 | Bailin et al. |
| 8,224,248 B2* | 7/2012 | Demirbasa ......... G08B 13/1427 340/540 |
| 8,253,567 B2 | 8/2012 | Butler et al. |
| 8,285,211 B2 | 10/2012 | Wang et al. |
| 8,332,272 B2 | 12/2012 | Fisher |
| 9,014,963 B1 | 4/2015 | Kolton et al. |
| 9,213,675 B1 | 12/2015 | Kolton et al. |
| 9,374,751 B1 | 6/2016 | Mauer et al. |
| 2002/0062251 A1 | 5/2002 | Anandan et al. |
| 2003/0100315 A1 | 5/2003 | Rankin |
| 2003/0143978 A1 | 7/2003 | Cooper et al. |
| 2004/0002897 A1 | 1/2004 | Vishik |
| 2004/0082343 A1 | 4/2004 | Kim et al. |
| 2004/0136527 A1 | 7/2004 | Struik |
| 2004/0198221 A1 | 10/2004 | Bin et al. |
| 2005/0122210 A1* | 6/2005 | Huseth ............... G07C 9/00087 340/5.53 |
| 2005/0143092 A1 | 6/2005 | Tamaki et al. |
| 2006/0006876 A1 | 1/2006 | Bertness |
| 2006/0010321 A1 | 1/2006 | Nakamura et al. |
| 2006/0032901 A1* | 2/2006 | Sugiyama .......... G07C 9/00103 235/375 |
| 2006/0036485 A1 | 2/2006 | Duri et al. |
| 2006/0041345 A1 | 2/2006 | Metcalf |
| 2006/0056368 A1 | 3/2006 | Ratiu et al. |
| 2006/0080732 A1 | 4/2006 | Ohkubo et al. |
| 2006/0178986 A1 | 8/2006 | Giordano et al. |
| 2007/0011555 A1 | 1/2007 | Kim et al. |
| 2007/0087682 A1 | 4/2007 | DaCosta |
| 2007/0220545 A1 | 9/2007 | Awano |
| 2007/0268360 A1 | 11/2007 | Ahlgren et al. |
| 2007/0281689 A1 | 12/2007 | Altman et al. |
| 2007/0281690 A1 | 12/2007 | Altman et al. |
| 2007/0283141 A1* | 12/2007 | Pollutro ............ H04L 63/0428 713/155 |
| 2008/0055158 A1 | 3/2008 | Smith et al. |
| 2008/0107274 A1* | 5/2008 | Worthy .............. G06F 21/602 380/278 |
| 2008/0123683 A1 | 5/2008 | Cheng et al. |
| 2008/0187137 A1 | 8/2008 | Nikander et al. |
| 2008/0281940 A1* | 11/2008 | Coxhill ............. G06Q 30/02 709/217 |
| 2009/0052380 A1 | 2/2009 | Espelien |
| 2009/0103722 A1 | 4/2009 | Anderson et al. |
| 2009/0150194 A1 | 6/2009 | Keohane et al. |
| 2009/0185677 A1 | 7/2009 | Bugbee |
| 2009/0195370 A1* | 8/2009 | Huffman ............ B60R 25/04 340/426.13 |
| 2009/0210932 A1 | 8/2009 | Balakrishnan et al. |
| 2009/0240946 A1* | 9/2009 | Yeap ................ G06F 21/43 713/176 |
| 2009/0254416 A1 | 10/2009 | Nomula |
| 2009/0315672 A1 | 12/2009 | Nantz et al. |
| 2009/0315704 A1 | 12/2009 | Rosing et al. |
| 2010/0027783 A1 | 2/2010 | Yup |
| 2010/0033299 A1 | 2/2010 | Davis |
| 2010/0070369 A1 | 3/2010 | Fenton et al. |
| 2010/0088510 A1 | 4/2010 | Shon et al. |
| 2010/0132049 A1* | 5/2010 | Vernal ............... G06F 21/6245 726/27 |
| 2010/0174596 A1 | 7/2010 | Gilman et al. |
| 2010/0174598 A1 | 7/2010 | Khan et al. |
| 2010/0203833 A1 | 8/2010 | Dorsey |
| 2010/0223120 A1 | 9/2010 | Dragt |
| 2010/0267375 A1 | 10/2010 | Lemmon et al. |
| 2010/0274859 A1 | 10/2010 | Bucuk |
| 2010/0287250 A1 | 11/2010 | Carlson et al. |
| 2011/0032916 A1 | 2/2011 | Lee |
| 2011/0035284 A1 | 2/2011 | Moshfeghi |
| 2011/0065375 A1 | 3/2011 | Bradley |
| 2011/0138192 A1 | 6/2011 | Kocher et al. |
| 2011/0151898 A1 | 6/2011 | Chandra et al. |
| 2011/0153412 A1* | 6/2011 | Novikov ............ G06Q 30/02 705/14.42 |
| 2011/0159850 A1 | 6/2011 | Faith et al. |
| 2011/0176465 A1 | 7/2011 | Panta et al. |
| 2011/0178863 A1 | 7/2011 | Daigle |
| 2011/0179064 A1 | 7/2011 | Russo |
| 2011/0314539 A1 | 12/2011 | Horton |
| 2012/0011566 A1 | 1/2012 | Youm et al. |
| 2012/0029691 A1 | 2/2012 | Mockus et al. |
| 2012/0047011 A1 | 2/2012 | Rippetoe et al. |
| 2012/0077457 A1 | 3/2012 | Howarter et al. |
| 2012/0088487 A1 | 4/2012 | Khan |
| 2012/0123858 A1* | 5/2012 | Rosenthal ........ G06Q 30/0251 705/14.49 |
| 2012/0201383 A1 | 8/2012 | Matsuo |
| 2012/0207302 A1 | 8/2012 | Alexander et al. |
| 2012/0209744 A1 | 8/2012 | Mullen et al. |
| 2012/0220314 A1* | 8/2012 | Altman ............. G06Q 30/0207 455/456.3 |
| 2012/0226537 A1 | 9/2012 | Subbarao et al. |
| 2012/0239504 A1 | 9/2012 | Curlander et al. |

(56) References Cited

U.S. PATENT DOCUMENTS

| | | |
|---|---|---|
| 2012/0260311 A1 | 10/2012 | Kang |
| 2012/0278172 A1 | 11/2012 | Mercuri et al. |
| 2012/0306622 A1 | 12/2012 | Trinh et al. |
| 2013/0091270 A1* | 4/2013 | Zhang ............ H04L 41/22 709/224 |
| 2013/0136046 A1 | 5/2013 | Wurm et al. |
| 2013/0159086 A1 | 6/2013 | Richard |
| 2013/0178163 A1 | 7/2013 | Wang |
| 2013/0179513 A1* | 7/2013 | Furukawa ........ H04L 67/22 709/204 |
| 2013/0185133 A1 | 7/2013 | Tong et al. |
| 2013/0214909 A1 | 8/2013 | Meijers et al. |
| 2013/0217332 A1 | 8/2013 | Altman et al. |
| 2013/0217333 A1 | 8/2013 | Sprigg et al. |
| 2013/0281110 A1 | 10/2013 | Zelinka et al. |
| 2013/0282438 A1 | 10/2013 | Hunter et al. |
| 2013/0308493 A1 | 11/2013 | Viswanathan et al. |
| 2014/0039990 A1 | 2/2014 | Georgi |
| 2014/0133656 A1 | 5/2014 | Wurster et al. |
| 2014/0146727 A1 | 5/2014 | Segev et al. |
| 2014/0162685 A1 | 6/2014 | Edge |
| 2014/0188592 A1 | 7/2014 | Herberger et al. |
| 2014/0254466 A1 | 9/2014 | Wurster et al. |
| 2014/0256251 A1 | 9/2014 | Caceres et al. |
| 2014/0258113 A1 | 9/2014 | Gauthier et al. |
| 2014/0258858 A1* | 9/2014 | Hwang ............ G09B 5/062 715/716 |
| 2014/0274150 A1 | 9/2014 | Marti et al. |
| 2014/0291395 A1 | 10/2014 | Wankmueller et al. |
| 2014/0341132 A1 | 11/2014 | Kim et al. |
| 2014/0370879 A1 | 12/2014 | Redding et al. |
| 2015/0254662 A1 | 9/2015 | Radu |
| 2015/0332258 A1 | 11/2015 | Kurabi et al. |
| 2015/0356289 A1 | 12/2015 | Brown et al. |
| 2017/0070847 A1 | 3/2017 | Altman et al. |

FOREIGN PATENT DOCUMENTS

| | | |
|---|---|---|
| CN | 101371241 A | 2/2009 |
| CN | 101609602 A | 12/2009 |
| CN | 101894171 A | 11/2010 |
| CN | 102379510 A | 3/2012 |
| CN | 103199899 A | 7/2013 |
| EP | 1626363 A1 | 2/2006 |
| EP | 2200218 A1 | 6/2010 |
| EP | 2521082 A2 | 11/2012 |
| EP | 2693360 A2 | 2/2014 |
| JP | H1066136 A | 3/1998 |
| JP | 2000142925 A | 5/2000 |
| JP | 2001095060 A | 4/2001 |
| JP | 2001359147 A | 12/2001 |
| JP | 2005051348 A | 2/2005 |
| JP | 2005078267 A | 3/2005 |
| JP | 2005167670 A | 6/2005 |
| JP | 2005174106 A | 6/2005 |
| JP | 2005233812 A | 9/2005 |
| JP | 2006032997 A | 2/2006 |
| JP | 2006050466 A | 2/2006 |
| JP | 2006053800 A | 2/2006 |
| JP | 2006157790 A | 6/2006 |
| JP | 2006304157 A | 11/2006 |
| JP | 2007011539 A | 1/2007 |
| JP | 2007172399 A | 7/2007 |
| JP | 2007536841 A | 12/2007 |
| JP | 2009005118 A | 1/2009 |
| JP | 2009251959 A | 10/2009 |
| JP | 2010041410 A | 2/2010 |
| JP | 2010114740 A | 5/2010 |
| JP | 2011248562 A | 12/2011 |
| JP | 2012520514 A | 9/2012 |
| JP | 2013519335 A | 5/2013 |
| KR | 20090095869 A | 9/2009 |
| WO | 02073864 A2 | 9/2002 |
| WO | 2005025127 A1 | 3/2005 |
| WO | 2005031579 A1 | 4/2005 |
| WO | 2005109779 A1 | 11/2005 |
| WO | 2007059558 A1 | 5/2007 |
| WO | WO-2009130796 A1 | 10/2009 |
| WO | 2010104932 A1 | 9/2010 |
| WO | 2010117364 A1 | 10/2010 |
| WO | 2011001615 A1 | 1/2011 |
| WO | 2011100147 A1 | 8/2011 |
| WO | 2012035149 A1 | 3/2012 |
| WO | 2013009776 A2 | 1/2013 |
| WO | WO-2013034924 A1 | 3/2013 |
| WO | 2013109300 A1 | 7/2013 |
| WO | 2013126759 A2 | 8/2013 |
| WO | WO-2013163333 A2 | 10/2013 |
| WO | 2014015730 A1 | 1/2014 |

OTHER PUBLICATIONS

System and method of secure and convenient user authentication using associated mobile devices, IP.com Disclosure No. IPCOM000232532D, Nov. 15, 2013, 3 pages.

Huang et al., "Fast Authenticated Key Establishment Protocols for Self-Organizing Sensor Networks," NTR-2003-102 Feb. 2004, MERL-A Mitsubishi Electric Research Laboratory, pp. 1-13.

Agarwal A "Edit Hosts File with VB Script (VBS)" Tech Guides, Nov. 30, 2010, XP055191874, 2 Pages. Retrieved from the Internet: URL:http://www.labnol.org/tech/edit-hosts-with-vbs/18258/ [retrieved on May 28, 2015].

Supplementary European Search Report—EP13722898—Search Authority—The Hague—Jun. 10, 2015.

Weis S.A., et al., "Security and Privacy in Radio-frequency Identification Devices," Masters Thesis, MIT[online], Mar. 2003, [retrieved on Jul. 10, 2008]. Retrieved from the Internet, http://groups.csail.mit.edu/cis/theses/weis-masters.pdf, 79 pages.

Anonymous: "Stream cipher", Feb. 6, 2012 (Feb. 6, 2012), XP55068934, [retrieved on Jul. 1, 2013].

Chaudhry M A, R., et al., "Protocols Stack and Connection Establishment in Bluetooth, radio", Students Conference, 2002. ISC0N '02, 102-104,Proceedings, IEEE Aug. 2002, Piscataway, NJ, USA,IEEE, vol. 1, Aug. 16, 2002 (Aug. 16, 2002), pp. 48-55, XP010647264, ISBN: 978-0-7803-7505-5.

Kim, H.W., et al., "Symmetric Encryption in RFID Authentication Protocol for Strong Location Privacy and Forward-Security", Hybrid Information Technology, 2006. ICHIT '06, IEEE, Piscataway, NJ, USA, Nov. 9, 2006 (Nov. 9, 2006), pp. 718-723, XP032070247, DOI: 10.1109/ICHIT.2006.253688, ISBN: 978-0-7695-2674-4, the whole document.

Schneider M A., et al., "Efficient Commerce Protocols based on One-time Pads", Computer Security Applications, 2000 ACSAC '00. 16th Annual Conference E New Orleans, LA, USA Dec. 11-15, 2000, Los Alamitos, CA, USA, IEEE Comput. Soc, US, Dec. 11, 2000 (Dec. 11, 2000), pp. 317-326, XP010529829.

Tsudik G., "A Family of Dunces: Trivial RFID Identification and Authentication Protocols", Jun. 20, 2007 (Jun. 20, 2007), Privacy Enhancing Technologies; [Lecture Notes in Computer Science], Springer Berlin Heidelberg, Berlin, Heidelberg, p. 45-61, XP019073083, ISBN: 978-3-540-75550-0.

Zuo, Y., "Secure and private search protocols for RFID systems", Information Systems Frontiers; A Journal of Research and Innovation, Kluwer Academic Publishers, BO, vol. 12, No. 5, Aug. 28, 2009 (Aug. 28, 2009), pp. 507-519, XP019863478, ISSN: 1572-9419, DOI: 10.1007/S10796-009-9208-6.

Carman D.W., et al., "Constraints and Approaches for Distributed Sensor Network Security (FINAL)," NAI Labs Technical Report #00-010, Sep. 1, 2000, 139 pages.

Barahim, M.Z. "Low-Cost Bluetooth Mobile Positioning for Location-based Application," 3rd IEEE/IFIP International Conference in Central Asia on Internet, 2007. ICI 2007. pp. 1-4, Sep. 26-28, 2007, doi: 10.1109/CANET.2007.4401707.

(56) References Cited

OTHER PUBLICATIONS

Shorey R., Mobile, Wireless, and Sensor Networks Technology, Applications, and Future Directions, Translated by Lingfang Wang et al., China Wang et al., China Machine Press, Jan. 2010, pp. 308-311.

* cited by examiner

RETAIL PROXIMITY MARKETING

RELATED APPLICATIONS

The present application is a continuation-in-part of and claims priority to U.S. patent application Ser. No. 13/773, 379, titled "Platform for Wireless Identity Transmitter and System Using Short-Range Wireless Broadcasts," filed Feb. 21, 2013 and U.S. patent application Ser. No. 13/773,336, titled "Preserving Security By Synchronizing a Nonce or Counter Between Systems," filed Feb. 21, 2013, each of which claims the benefit of priority to U.S. Provisional Application No. 61/601,620, filed Feb. 22, 2012, U.S. Provisional Application No. 61/637,834, filed Apr. 24, 2012, U.S. Provisional Application No. 61/693,169, filed Aug. 24, 2012, U.S. Provisional Application No. 61/670,226, filed Jul. 11, 2012, U.S. Provisional Application No. 61/701,457, filed Sep. 14, 2012, U.S. Provisional Application No. 61/713,239, filed Oct. 12, 2012, U.S. Provisional Application No. 61/716,373, filed Oct. 19, 2012, U.S. Provisional Application No. 61/717,964, filed Oct. 24, 2012, U.S. Provisional Application No. 61/728,677, filed Nov. 20, 2012, and U.S. Provisional Application No. 61/745,395, filed Dec. 21, 2012, U.S. Provisional Application No. 61/745,308, filed Dec. 21, 2012, the entire contents of all of which are hereby incorporated by reference.

BACKGROUND

Retailers and merchants are generally interested in finding better ways to present real-time proximate marketing to customers. In order to achieve this goal, a retailer may install a system to identify a customer and understand when the customer is near an appropriate area to present marketing offers. For example, if a retailer can detect when a customer is near an "end-cap" of a product aisle (i.e., the end of an aisle where special product promotions may be offered and/or displayed), the retailer may display a marketing message to that customer that is proximally relevant. Additionally, if a retailer can accurately—and in near real-time—identify a customer who is next to a proximal marketing area (e.g., end-cap), the retail store can tailor the offer to that specific customer. For example, such a tailored offer may include incentives that are related to the customer's prior purchase history at the retail store. To date, systems and mechanisms for presenting marketing information to customers based on proximity determinations have been less than ideal, especially in indoor settings. Granular proximity determinations, cost effectiveness (for both the retailer and customer), minimal drain on the battery of a customer's mobile device, and a good customer experience is needed to offer such relevant proximal offers.

In particular, existing systems may detect when a customer breaches a proximity or geo-fence and may contact the customer directly based on the customer's identity and granted permissions. For example, when a customer triggers a proximity trigger within a merchant's coffee shop, that merchant may send the customer a coupon based on previously provided personal information and/or opting-in authorization for receiving marketing information from the merchant. However, this level of identification and authorizations may be unrealistic, as customers may resist allowing a retailer to know their identity in order to receive coupons. Additionally, if numerous retailers or merchants utilize similar systems to present coupons, authorizing each of these retailers may be inefficient. Further, retailers may benefit from knowing when customers are in each section of their stores so they can target customers with offers based on a customer's foot traffic as well as improve store design.

SUMMARY

The various embodiments provide systems, devices, and methods for presenting marketing information to customers based on their proximity to marketing areas defined by the reception range of wireless identity transmitters or receivers, and as authorized by user-defined privacy settings stored in a central server. In general, a compact wireless identity transmitter associated with a customer may be configured to broadcast messages that include a unique and secure identification code via a short-range wireless radio, such as a Bluetooth® Low Energy (LE) transceiver. The identification broadcast packets ("broadcast messages") may be received by physically proximate proximity broadcast receivers (PBR), which may be dedicated receivers, smartphones configured with a PBR application, tablet computers configured with a PBR application, and stationary receivers, to name just a few examples. The broadcast messages may be received by proximity broadcast receivers when the wireless identity transmitter is within reception range (e.g., within 0 to 25 feet). Proximity broadcast receivers may relay received broadcast messages, along with other information (e.g., timestamp data, proximity information, etc.), to a central server in the form of sighting messages. Such a central server may use the information received in sighting messages to track the wireless identity transmitter, and thus a user associated with that device. Proximity broadcast receivers may be mobile (e.g., smartphones configured with a PBR application) or stationary. Stationary proximity broadcast receivers may be positioned in an area of marketing interest, such as a movie theater, a mall, an amusement park, or a retail store. Because the wireless identity transmitter broadcasts short-range wireless signals, the proximity of the wireless identity transmitter to a marketing area may be recognized by a central server when it receives a sighting message from a proximity broadcast receiver located in the marketing area. As the customer travels through the area of marketing interest (e.g., a retail store), different proximity broadcast receivers positioned throughout the area may receive broadcast messages from the customer's wireless identity transmitter, with the customer's locations tracked by the central server.

The central server may maintain a database of relayed information that may represent both historical and actively updated information for the customer's wireless identity transmitter, such as proximities to proximity broadcast receivers and/or marketing areas over a period. The central server may use the identification code within the relayed messages to identify the wireless identity transmitter, and thus the customer owner of the device.

In some embodiments a merchant deploys proximity broadcast receivers that listen for and relay sighting messages reporting signals received from wireless identity transmitters in the possession of consumers. In such embodiments, the central server may transmit selected advertisements to customer mobile devices using address information (e.g., phone number or email address) linked in a database to the customer's wireless identity transmitter. In other embodiments the system may be reversed with the merchant deploying wireless identity transmitters to designate marketing areas, and customers configuring their mobile devices with proximity broadcast receiver applications to transmit sighting reports to the central database when a wireless identity signal is received. In such embodiments, the central server may transmit selected advertisements to customer mobile devices sending the sighting messages (i.e., reply to the messages) based on customer permissions stored on the server.

Based on permission settings predefined by the customer, such as privacy settings or permissions indicated during a registration procedure and stored within profiles, the central server may identify marketing information appropriate for the marketing area and the customer (e.g., personalized coupons, relevant advertisements, etc.), and transmit messages to the customer's mobile device that include the marketing information in response to receiving a sighting message from a broadcast identity receiver associated with the marketing area or receive a sighting message from the customer's mobile device including the wireless identity transmitter identifier associated with the marketing area. Such messages may be transmitted to the customer's mobile device without identifying the customer to the associated retail store, merchant, or other third party registered with the central server. In this way, customers may receive location-specific marketing information when within proximity (i.e., near) of a marketing area without compromising their privacy since the information is selected and sent directly to the customer's mobile device without involvement by the merchant. Yet merchants have control over the advertising that is delivered since they may provide the information to the server and control the placement of particular wireless identity transmitters within their establishment. In an embodiment, in response to receiving sighting messages from proximity broadcast receivers over time, the central server may store data that indicates foot traffic of customers within the area of marketing interest while customer identities are protected by the central server.

Embodiments also include systems and methods for tracking costs and allocating funds associated with proximity-based advertising and marketing materials. Embodiment systems enable revenue and/or cost sharing among organizations implementing the various wireless identity transmitters or proximity broadcast receivers to enable the delivery and management of such marketing materials.

Further embodiments include systems that may adjust the behavior of customer mobile devices that are configured with proximity-based receiver applications and registered with the central server by the user to permit such adjustments. Customers implementing proximity-based receiver applications and registering to receive special discounts or advertising materials may permit a trusted central server to send executable scripts to their mobile devices along with advertising or marketing materials in exchange for special discounts. Retailers and other businesses may register with the trusted central server and submit scripts and marketing information for delivery to registered customer mobile devices in response to sighting messages. Such scripts may include, for example, special types of coupons, special notifications (e.g., ring tones), temporary changes to browser functionality (e.g., blocking access to competitor websites), and temporary changes to device settings (e.g., silencing ringers), all in response to the mobile device being in proximity of a wireless identity transmitter.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
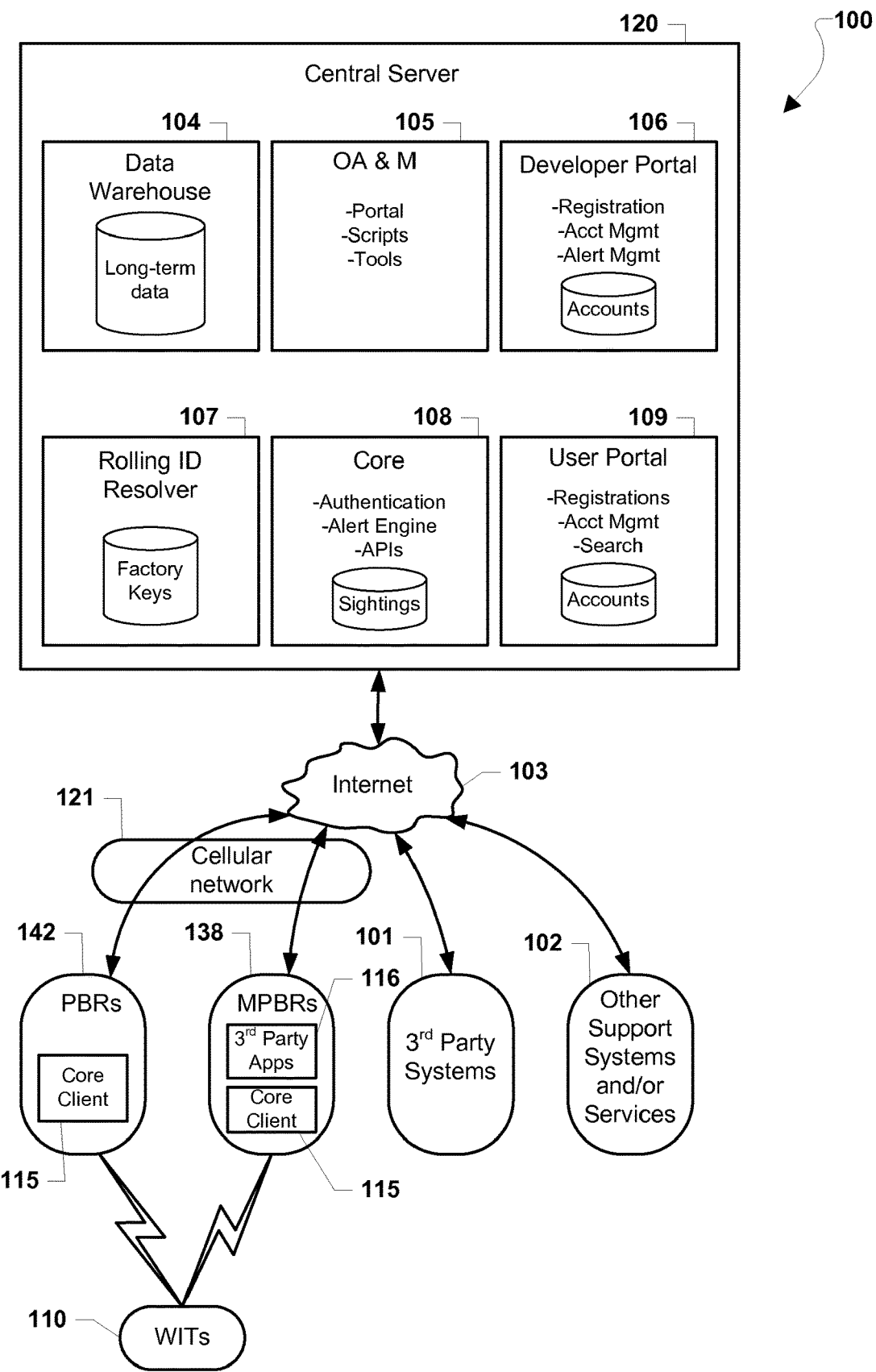
FIG. 1 is a system diagram illustrating network components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of cellular telephones, smart-phones (e.g., iPhone®), web-pads, tablet computers, Internet enabled cellular telephones, WiFi enabled electronic devices, personal data assistants (PDA's), laptop computers, personal computers, and similar electronic devices equipped with a short-range radio (e.g., a Bluetooth® radio, a Peanut® radio, a WiFi radio, etc.) and a wide area network connection (e.g., an LTE, 3G or 4G wireless wide area network transceiver or a wired connection to the Internet). Reference to a particular type of computing device as being a mobile device is not intended to limit the scope of the claims unless a particular type of mobile device is recited in the claims.

The term "broadcast message" is used herein to refer to short-range wireless broadcast signals broadcast by wireless identity transmitters (defined below) that may include identification information (i.e., identifiers) associated with the wireless identity transmitters and/or their users. Such identifiers may be periodically changed and encrypted, encoded, or otherwise obscured (i.e., rolling identifiers). In various embodiments, broadcast messages may include other identifying information, such as Bluetooth® MAC addresses and nonces or counters, which may also be encrypted. Additionally, broadcast messages may include metadata and other data, such as characteristics of the transmitting wireless identity transmitter (e.g., device type), sensor data, and/or commands or other instructions. In various embodiments, broadcast messages may be transmitted via a wireless communication protocol, such as Bluetooth® Low Energy, WiFi, WiFi Direct, Zigbee®, Peanut®, and other RF protocol. In various embodiments, because of the high unreliability of certain short-range transmission channels, broadcast messages may be single packet transmissions limited to a certain size (e.g., 80 bits, 10 bytes, 20 bytes, etc.). For example, the payload of an embodiment broadcast message may be 80 total bits, including 4 bits that indicate battery status information and 76 bits that indicate a rolling identifier. As another example, an embodiment broadcast message may include 20 bits representing a counter and 60 bits representing a rolling identifier, such as generated with a pseudo-random function or encryption algorithm.

The term "wireless identity transmitter" is used herein to refer to a compact device configured to periodically transmit broadcast messages via short-range wireless transmitters. Wireless identity transmitters may be mobile, such as when carried or affixed to mobile persons or items, or alternatively may be stationary, such as when installed within buildings. Wireless identity transmitters may store and be associated with a unique device identifier (i.e., a "deviceID"), such as a factory ID. In an embodiment, the unique device identifier may be a code 56-bits in length. In various embodiments, for security purposes, this unique device identifier, along with other data (e.g., counter values), may be encoded, encrypted, or otherwise obfuscated when included within broadcast messages as a "rolling identifier." Wireless identity transmitters may be configured to maintain inaccurate time (e.g., UTC) information, such as by using a 30 ppm 16 kHz crystal oscillator as a clock. In an embodiment, the wireless identity transmitter may be within or a mobile device, or alternatively, operations may be performed by a mobile device that are similar to the operations of the wireless identity transmitter. For example, a smartphone may execute software that configures that smartphone to utilize its Bluetooth® radio to transmit broadcast messages that include a secured, unique identifier. Wireless identity transmitters are described in more detail below with reference to FIGS. 35A-35B. In various figures and diagrams of this disclosure, wireless identity transmitters may be referred to as "WIT" or "WITs".

The term "proximity broadcast receiver" is used herein to refer to devices that are configured to receive broadcast messages, such as transmitted by wireless identity transmitters. In various embodiments, proximity broadcast receivers may be stationary devices (or "stationary proximity broadcast receivers") permanently positioned throughout places (e.g., buildings, retail stores, etc.) or alternatively may be mobile devices configured to operate as proximity broadcast receivers (or "mobile proximity broadcast receivers"). For example, a smartphone may be configured to receive broadcast messages and operate as a mobile proximity broadcast receiver. Reference to a particular type of computing device as being a proximity broadcast receiver is not intended to limit the scope of the claims unless a particular type of device is recited in the claims. Further, unless otherwise indicated, references to proximity broadcast receivers throughout this disclosure are not intended to limit any method or system to a particular type of proximity broadcast receiver device (e.g., wireless or stationary). Proximity broadcast receivers are described in more detail below with reference to FIGS. 36A-36B. In various figures and diagrams of this disclosure, proximity broadcast receivers may be referred to as "PBR" or "PBRs," and mobile proximity broadcast receivers are referred to in the figures as "MPBR" or "MPBRs."

The terms "identity transceiver" and "wireless identity transceiver" are used herein to refer to devices that are configured to receive and transmit broadcast messages. In other words, an identity transceiver may function as both a proximity broadcast receiver and an identity transmitter. For example, a smartphone may be configured to broadcast short-range signals that include its unique identifier as well as receive broadcast messages from wireless identity transmitters within proximity. Throughout this disclosure, various operations may be described as being distinctly performed by either a wireless identity transmitter or a proximity broadcast receiver, however, those skilled in the art should appreciate that a device configured to operate as an identity transceiver may be configured to perform any or all of the same operations and thus may be interchangeable with references to either a wireless identity transmitter or a proximity broadcast receiver.

The term "sighting message" is used herein to refer to reports, signals, and/or messages sent by proximity broadcast receivers to a central server in response to receiving broadcast messages from wireless identity transmitters. Sighting messages may be transmissions that include part or all of the information encoded in received broadcast messages, including any obscured or encrypted information, such as identifiers of wireless identity transmitters. Additionally, sighting messages may include metadata and other information (or "associated data"), such as the sending proximity broadcast receivers' identification information (e.g., device ID, third-party affiliations, etc.), whether the proximity broadcast receiver paired with a wireless identity transmitter, transmissions context information (e.g., a code indicating the sighting message is related to an alert or a registered service), information regarding software or applications executing on proximity broadcast receivers (e.g., app IDs), location information, proximity information with respect to known areas within a place, and timestamp data. In an embodiment, sighting messages may also include authentication information (e.g., secret keys, passes, special codes, digital certificates, etc.) that may be used by a central server to confirm the identification (or identification information) of proximity broadcast receivers transmitting the sighting messages. For example, a sighting message may include a code from a hash function that can be decoded by the central server to ensure the sending proximity broadcast receiver is associated with a particular registered service. In various embodiments, sighting messages may be sent immediately after receipt of broadcasts (e.g., when related to an alert), buffered, or scheduled along with other scheduled transmissions.

The term "marketing area" is used herein to refer to an area that corresponds to places that an advertiser and/or business (e.g., a retailer, merchant, marketing service, etc.) may desire to know when customers are within proximity. The term "area of marketing interest" is used herein to refer generally to a merchant's facility, establishment or region in which there may be a number of marketing areas. Examples of area of marketing interest include retail stores (e.g., large retailers and local shops), shopping malls, amusement parks, and similar establishments where a merchant may be desire to track customers and/or award marketing materials. An example of a marketing area may be the area surrounding a product display at the end of an aisle within a retail store (the area of marketing interest). Other examples of marketing areas include end caps of product aisles, various sections of a products aisle (e.g., beginning, middle, end, etc.), departments within a retail store, lines in front of cash registers, and doorways. As examples, a marketing area may be the product display beside a cash register, a billboard, an outdoor signage, and kiosks.

The term "marketing information" is used herein to refer to any information that an advertiser, retail store, merchant, or other registered service may utilize to encourage a purchase, provide information, draw attention, and otherwise drive customer traffic towards a marketing area and its associated products. For example, marketing information may include coupons, promotional offers, customer greetings, messages, information about deals nearby, and other advertisements or advertising materials. For example, marketing information may include a message rendered on a customer's mobile device that indicates a list of sales within proximity of the customer. In an embodiment, marketing information may also include vague information about incentives within an area. For example, in response to entering a geofence or coming within proximity of a certain proximity broadcast receiver, a customer may receive marketing information indicating unspecified deals, prizes, or other customer benefits may be available somewhere within a general area. For example, marketing information may include messages or indicators of how close a customer is to nearby deals (e.g., "hot" or "cold" to nearby deals). In an embodiment, marketing information may include executable scripts, software instructions, actions lists, commands, and special notifications (e.g., ring tones) that may be configured to change the behavior or functionality of a customer's mobile device. For example, marketing information from a particular merchant may include coupons along with a script that disables a smartphone's browser application from accessing websites of competitors.

The various embodiments provide methods, devices, and systems for providing marketing information to customers based on the customers' proximity to a marketing area as recognized by the reception of signals from a wireless identity transmitter associated with customers. In the various embodiments, the wireless identity transmitter may be a compact device configured to transmit a packet with an identification code in a format that can be received by any proximity broadcast receiver within range of the short-range wireless broadcast. Since the wireless identity transmitter relies on relatively short-range wireless signaling (e.g., short-range radio signals, Peanut®, Zigbee®, RF, Wi-Fi, Bluetooth® Low Energy signals, light signals, sound signals, etc.) to transmit broadcast messages that include its identifier, only proximity broadcast receivers within proximity of the transmitter may receive such broadcast messages. Thus, a proximity broadcast receiver's own location may provide an approximate location for the wireless identity transmitter at the time of receipt of a broadcast message. Wireless identity transmitters may be deployed by various parties registered with the central server, such as government agencies, merchants, retailers, and stores. In an embodiment, the broadcast range of wireless identity transmitters may be from three or less to one hundred feet while within a retail store.

Proximity broadcast receivers, in particular mobile proximity broadcast receivers (e.g., smartphones, etc.), may be configured with processor-executable instructions, such as an application that users may download or that may be incorporated in the device by the manufacturer. By configuring many mobile devices with such an application, a wide spread network of proximity broadcast receivers may be deployed for little or no cost, taking advantage of the popularity of smartphones. Stationary proximity broadcast receivers may be deployed in strategic places, such as throughout retail stores, to supplement the network of smartphones. Proximity broadcast receivers may be located coincident to, within, or otherwise within proximity of marketing areas within a place, such as merchandise displays in a movie theater or an entrance to a retail store. For example, a proximity broadcast receiver may be on top of, next to, or within a product display arranged within a product aisle. Marketing areas may coincide with either stationary proximity broadcast receivers or wireless identity transmitters deployed within retail stores to detect nearby customers. For example, a billboard marketing area next to a highway may coincide with a wireless identity transmitter that broadcasts messages related to a merchant. In various embodiments, marketing areas may or may not include devices configured to communicate with customers, such as displays, monitors, or speakers. In other embodiments, marketing areas may include proximity broadcast receivers and/or wireless identity transmitters.

Each proximity broadcast receiver receiving a broadcast message from the wireless identity transmitter may pass information to a central server for processing, such as by transmitting sighting messages including the rolling identifier of the wireless identity transmitter. Sighting messages transmitted by proximity broadcast receivers to the central server may include part or all of the information encoded in received broadcast messages from proximate wireless identity transmitters, including any rolling, obscured, or encrypted information related to the wireless identity transmitters. In various embodiments, sighting messages may be sent immediately after receipt of broadcast message (e.g., when related to an alert), buffered, scheduled along with other scheduled transmissions, or otherwise based on characteristics of broadcast message. Sighting messages may include metadata, header information, or other encodings to indicate various reported data. For example, a sighting message may contain metadata that includes a code for a particular merchant, and may therefore indicate that the sighting message was transmitted by a proximity broadcast receiver within the merchant's store. As another example, a sighting message may contain metadata that includes a code indicating a user's smartphone and therefore the proximity broadcast receiver may be a mobile proximity broadcast receiver belonging to the user. In an alternative embodiment, a local computing device, such as a retail store server or router, may receive sighting messages from proximity broadcast receivers and may in turn pass each sighting message to the central server.

Upon receipt of sighting messages, the central server may decode, decrypt, or otherwise access obscured information (e.g., rolling identifiers) within the sighting messages. For example, the central server may decode a broadcast message within a sighting message and determine the customer associated with the broadcast message using data stored within a registration database. Based on the location of a proximity broadcast receiver that transmitted a sighting message, the central server may determine the proximity of the related broadcast message, or the approximate proximity. For example, since a stationary proximity broadcast receiver that transmits a sighting message is within proximity of a customer's wireless identity transmitter at the time of receiving a broadcast message, the central server may determine the customer's wireless identity transmitter is within several feet of the GPS coordinates indicated in the proximity broadcast receiver's sighting message or known to the central server in the case of fixed proximity broadcast receivers. Further, the central server may be configured to transmit messages in response to receiving and processing sighting messages. For example, the central server may transmit return messages to devices associated with a merchant/retailer/store, such as a store server, a point-of-sale device (e.g., a cash register device), a mobile device or other computing device used by an employee of the merchant (e.g., a tablet device used by a waiter/hostess/customer service rep, etc.), and/or a proximity broadcast receiver associated with the merchant (e.g., a stationary proximity broadcast receiver that relayed the broadcast signal from the customer's wireless identity transmitter).

The central server may also determine whether the customer is within proximity of a defined area, such as a marketing area within a retail store. For example, the central server may compare the location of a proximity broadcast receiver, as indicated within a received sighting message or known to the central server based on the proximity broadcast receiver's identifier, to the locations of all known product displays within a retail store. When a broadcast message from the customer's wireless identity transmitter is received within a certain proximity threshold of such a marketing area, the customer associated with the wireless identity transmitter may be assumed to be near that marketing area (e.g., standing near a product display, walking within the retail store entrance, etc.). In an embodiment, the central server may use a proximity threshold representing a rather small proximity to ensure data is not transmitted when customers are merely within the retail store and not within a tight proximity of marketing areas. In another embodiment, the proximity threshold may be three feet or less to twenty-five feet or more.

When a customer is determined to be within proximity of a marketing area, the central server may transmit relevant marketing information to a related retail store and/or to the customer. For example, advertising materials may be transmitted to a proximity broadcast receiver within a retail store for display on a monitor within proximity of the customer or alternatively to the customer's smartphone for display.

In the various embodiments, the operations to determine whether a wireless identity transmitter is within proximity of a marketing area may be performed by a central server as described above, a local computing device, such as a retail store server, and/or proximity broadcast receivers. For example, a local computing device within the retail store may compare the location of a proximity broadcast receiver receiving a broadcast message to the locations of all marketing areas within the retail store to detect whether a wireless identity transmitter is within a proximity threshold.

In an embodiment, "invisible billboards" or digital signage may be enabled by transmitting marketing information to a customer's mobile device in response to wireless signals received from a wireless identity transmitter by a proximity broadcast receiver. For example, customers driving in a car and carrying wireless identity transmitters may receive advertisements on their mobile devices after passing by a merchant's stationary proximity broadcast receiver located on the side of the road or highway. Alternatively, merchants may place higher-powered identity transmitters (or transceivers) near a road or throughway that broadcast messages received and relayed by customers' mobile proximity broadcast receivers.

In another embodiment, the central server may transmit messages that instruct store employees to approach, assist, or otherwise interface with customers. For example, a message may be received by a local computing device within the retail store that directs the retail store manager to find a customer near a marketing area. In an embodiment, the central server may send identification information (e.g., photos) of customers to assist store employees, such as customer service representatives, managers, cashiers, and salesmen, approach customers.

In another embodiment, marketing information may include vague or leading information that may encourage desired activities by customers. For example, marketing information may include instructions on how customers may participate in a treasure hunt within a retail store or other area associated with a merchant, retailer, or other service registered with the central server. For example, when a customer is determined to be within proximity of a retail store's front door, the central server may transmit a message that indicates that a discount or other deal is somewhere nearby, thus providing incentive for the customer to walk around the retail store. Further, marketing information may include successively more detailed directions, instructions, or other information as customers move towards certain marketing areas. For example, the central server may transmit a message to a customer's mobile device executing a retail store app that causes the app to display an indicator of how close to a nearby deal the customer currently is (e.g., "You are getting COLD," "You are getting HOT!").

In another embodiment, the marketing information may include coupons, promotions, or other information that cannot be accessed until the customer is within proximity of a particular marketing area. For example, the marketing information may include an obscured or locked coupon or graphical user interface that can only be unlocked when a customer walks within proximity of a specified department within a retail store. A mobile device may display marketing information as a digital scratch-off ticket that is configured to reveal a deal, code, coupon, or other attractive information only when the customer goes into a certain retail store.

In various embodiments, the central server may serve as a "middle-man" that delivers relevant marketing information, such as coupons, promotions, and advertisements, to a customer's mobile device without providing the customer's identity to hosts that deploy wireless identity transmitters or proximity broadcast receivers in order to establish marketing areas (e.g., retailers, merchants, marketing services, etc.). In other words, the central server may act as an indirection mechanism that keeps customer users' personal information anonymous. In an embodiment, the central server may store marketing information provided by merchants, retailers, or particular retail stores that have registered with the central server and may be configured to identify and transmit relevant marketing information for a customer. For example, merchants may provide coupons and advertisements to the central server for distribution without the merchant being aware of the recipient customers. Further, the central server may store marketing conditions that correspond to various marketing information provided by merchants. Such marketing conditions may be scenarios, events, triggers, or other circumstances that may cause particular marketing information to be transmitted to customers. For example, the central server may store a data table that relates a particular coupon to a particular marketing area in a retail store. As another example, the data table may relate an advertisement message to certain general attributes of a customer within the retail store (e.g., age, weight, height, number of times visiting the store, etc.). Without providing the identity of customers to merchants, the central server may identify relevant marketing information based on the stored marketing conditions. For example, the central server may match a customer's current proximity to a marketing area to a value indicated within stored marketing conditions, and transmit marketing information that corresponds to that marketing area.

In another embodiment, the central server may transmit requests to third-parties (e.g., merchants) to identify relevant marketing information based on stored customer permissions. For example, a customer may indicate to the central server that he/she authorizes the central server to transmit marketing information from merchants without any identification information provided to those merchants. The central server may transmit requests to merchants that indicate proximity information (e.g., proximity of a customer's wireless identity transmitter to a retail store stationary proximity broadcast receiver, etc.), generic customer data (e.g., age, height, etc.), or even personal identities of customers based on stored permissions. In response, the central server may receive relevant marketing information from the merchants.

In an embodiment, the central server may identify relevant marketing information to transmit based on previous behaviors of customers (e.g., previous walking routes through the retail store, average time dwelling in a particular department, repeat visits, previous purchases, etc.), and may involve loyalty or rewards programs. For example, the central server may identify relevant marketing information that includes a coupon for a product that the customer has purchased before. As another example, the marketing information may be a promotional offer that encourages the customer to purchase a product by which he/she has walked numerous times.

In an embodiment, the relevant marketing information that is transmitted in response to a detected proximity event may depend upon customer permission settings stored in the central server. The terms "permissions" and "permissions settings" are used herein to refer to information that indicates whether customers authorize to have their identity provided to third-parties, advertisers, merchants, retailers, and other organizations that have registered with a central server. Permissions may be set, provided, or otherwise indicated by customers when they register a wireless identity transmitter and/or mobile proximity broadcast receiver with the central server. Permissions may have several values that indicate various privacy levels or authorizations regarding the disclosure of customer identification information to registered services. For the purposes of this disclosure, a permissions value of a "participant" may indicate that a customer desires to receive marketing information from the central server, and a permissions value of a "non-participant" may indicate that the customer does not want to receive marketing information. A customer's permissions having a "participant" value may also include a value of "anonymous" that indicates that the customer does not want his/her identity provided to merchants. For example, a customer willing to receive marketing information but only without providing identification information to merchants may have permissions set to both "participant" and "anonymous." As an alternative, a customer willing to receive marketing information and who does not mind providing identification information to merchants may set permissions only to "participant." A customer's permissions having a "generic" value may indicate that the customer does not want identifying information provided to registered services or third-parties, but also does not mind sharing more general information, such as age, sex, and education.

Such permissions may be used by customers to enable or prohibit the central server from providing personal information to third-parties, such as third-party applications executing on a user's smartphone and/or third-party devices (e.g., merchant proximity broadcast receivers). Permissions may also inform the central server regarding the marketing information that is relevant or authorized for particular customers.

In an embodiment, anonymous personalization of equipment connected to proximity broadcast receivers may be enabled based on sighting messages from proximity broadcast receivers. Proximity broadcast receivers may relay broadcast messages as sighting messages to the central server, which may identify wireless identity transmitters and return data or other information to the proximity broadcast receivers without disclosing the identities of the wireless identity transmitters. With this anonymous data, proximity broadcast receivers may personalize equipment or services to suit users of wireless identity transmitters. Alternatively, the central server may return the identification information to the proximity broadcast receivers based on stored permissions. In another embodiment, the central server may store and manage configuration data, software instructions, and other proprietary information for facilities associated with the proximity broadcast receivers.

In various embodiments, proximity information of wireless identity transmitters may be estimated by proximity broadcast receivers and/or a server (e.g., a local computing device, a central server, etc.). Based on signal strength of received broadcast messages or concurrent sighting messages from more than one proximity broadcast receiver, a server may determine the proximity broadcast receiver closest to the wireless identity transmitter. In other words, a central server may determine the proximity broadcast receiver among a plurality of proximity broadcast receivers that is closest to a wireless identity transmitter. When the proximity broadcast receivers are placed in strategic places, such as on a cash register or embedded within aisles of a retail store, determining the proximity broadcast receiver that is closest to a transmitter possessed by a user may enable a server to determine the merchandise the customer is interested in or that the customer is waiting in line to check out.

In another embodiment, data within received sighting messages may be useful to merchants, retailers, or a retail store in generating statistical information and customer trending data (i.e., foot traffic information). For example, even when broadcast messages are received outside of the proximity threshold for any marketing area within a retail store (e.g., the wireless identity transmitter is twenty-five to one hundred feet from a marketing area), data within the sighting message may be stored by the central server. The central server may store data from sighting messages in relation to customers and collect valuable information about the customer's habits while within the retail store. Over time, the central server may receive and store proximity information of a particular customer's wireless identity transmitter to various marketing areas within the retail store, and may determine paths the customer repeatedly made throughout the retail store. For example, the data may describe the customer as walking from the entry of the retail store to a particular department numerous times over a period of time. As another example, the data from sighting messages may show that the customer went to a check-out area after visiting a particular department, indicating a completed transaction. The various statistical information and trending data may be used by the retail store to create profit equations and understand customer behaviors.

In an embodiment, the central server may be configured to transmit such stored data to merchants based upon customers' permissions or specific authorization. For example, if a customer does not indicate within stored permissions that he/she desires to be anonymous, the central server may transmit data back to merchants that indicates the customer's behaviors within a retail store. In another embodiment, the central server may transmit generic or anonymous customer data that does not identify customers but that still provides valuable information to merchants. For example, the central server may transmit statistics describing the number and average age of unique visitors to a merchant's retail store.

In an embodiment, the central server may transmit messages to devices (e.g., local servers, proximity broadcast receivers, etc.) associated with registered services that include customer behavior information indicating customer foot traffic throughout a store (e.g., how many customers walked through certain areas for a period of time, etc.), the duration of time customers dwelled within certain areas of the store, whether particular customers equipped with wireless identity transmitters moved to check-out areas, redeemed loyalty points for a purchase, and/or redeemed a coupon.

In various embodiments, an area of marketing interest, such as a retail store, building, or location associated with a registered service, may utilize stationary proximity broadcast receivers to receive and relay broadcast messages from customers' wireless identity transmitters. Alternatively, the area may deploy stationary wireless identity transmitters and customers' mobile proximity broadcast receivers may receive and relay broadcast messages. In further embodiments, the area may employ both proximity broadcast receivers and wireless identity transmitters to receive, relay, and process data from both users carrying wireless identity transmitters and/or mobile proximity broadcast receivers. Regardless of the source of broadcast messages, the central server (or a local computing device) may determine approximate proximities between a proximity broadcast receiver and a wireless identity transmitter based on received sighting messages.

Additionally, based on identification of the proximity broadcast receiver and the wireless identity transmitter related to a received sighting message, the central server may be configured to determine which device is related to a registered service or host (e.g., a retail store) and which is related to a user (e.g., a customer). The term "registered service" may be used herein to refer to a party or service that is registered, authenticated, valid, or otherwise known to a central server and that may be related with sighting messages. Registered services may include merchants, retailers, service providers, stores (e.g., big-box retailers, local coffee shops, etc.), buildings, and various other organizations that are registered with the central server, including organizations that host a marketing area by deploying one or more wireless identity transmitters or proximity broadcast receivers. Registered services may also include known routines, actions, or services managed by the central server, such as particular searches or active alerts, or alternatively applications that may be executing on a mobile device (e.g., a third-party app). In an embodiment, registered services may further include any third-parties that have registered as developers with the central server. For example, a registered service may correspond to a merchant that has registered proximity broadcast receivers with the central server. In an embodiment, registered users (e.g., customers) employing mobile proximity broadcast receivers that transmit sighting messages in response to receiving broadcast messages from others' wireless identity transmitters (e.g., a merchant's stationary identity transmitter positioned within a retail store) may also be considered registered services by the central server.

For illustration purposes, a mobile proximity broadcast receiver (e.g., a smartphone configured to operate as a proximity broadcast receiver) carried by the user waiting in the check-out line may receive a broadcast message from a wireless identity transmitter positioned on top of the cash register point-of-sale device within the retail store and may transmit a sighting message to the central server. Upon receive of the sighting message, the central server may determine that the wireless identity transmitter belongs to the retail store based on the profile that corresponds to a rolling identifier and that the mobile proximity broadcast receiver is associated with a customer profile based on an identifier of the proximity broadcast receiver included within metadata in the sighting message. From this information, the central server may transmit marketing information to the customer.

In various embodiments, a wireless identity transmitter may be configured to periodically generate new identification data (referred to as a rolling identifier) that may be decoded by a central server to reveal the unique device identifier and other identifying information of the wireless identity transmitter. For example, a wireless identity transmitter may be configured to periodically broadcast a Bluetooth® packet including an encoded version of the wireless identity transmitter's device identifier (i.e., deviceID). Such encryption of identifiers indicated in broadcast messages may be required to enable the central server to reliably identify the wireless identity transmitter that sent the broadcast message while forcing a third-party (e.g., passive attacker) to determine the origin of the broadcast message by guessing. For example, if the identifier was static, the third party could sniff the identifier, such as by impersonating a proximity broadcast receiver, and then use the identifier to track the wireless identity transmitter. Rolling identifiers may make such an attack impossible if the third party lacks the means of generating the encrypted identifiers.

Since a single packet broadcast message may not support a payload that can fit a cipher text of a conventional asymmetric key encryption, standard private/public key pair encryption may not be useable in the various embodiments. Additionally, wireless identity transmitters are generally broadcast-only devices, so there is no back channel that is typically required in conventional encryption schemes. Therefore, the central server in various embodiments may process encrypted message payloads by pre-provisioning a shared secret key unique to each wireless identity transmitter. Such secret keys may be associated with each wireless identity transmitter's unique device identifier at the central server and may be used to decode data (e.g., identifiers) encoded by the each wireless identity transmitter.

Performing an embodiment method, a wireless identity transmitter may use a streaming-like encryption algorithm (e.g., AES-CTR) to encrypt its device identifier, shared secret key, and a nonce or counter, broadcasting a payload that includes the encrypted data with and the nonce or counter in the clear. Performing another embodiment method, a wireless identity transmitter may use a pseudo-random function to encrypt the device identifier, shared secret key, and a nonce or counter, broadcasting a payload that includes the encrypted data without the nonce or counter in the clear. Performing another embodiment method, a wireless identity transmitter may use a combination of a streaming-like encryption and pseudo-random function encryption to generate a payload to broadcast. In an embodiment, the wireless identity transmitter and the central server may each have a cryptographically secure pseudo-random number generator or algorithm that is used to generate identifiers on a common time scale so that any given moment, the central server can calculate the identifier being transmitted by a particular wireless identity transmitter.

In various embodiments, the wireless identity transmitter may maintain a nonce or counter (or clock data) that periodically increments to represent the passage of time and that may be used in various encryption methods. When the wireless identity transmitter is powered on (or the battery is replaced), the nonce or counter may be set to a known initial value, such as 0. As the wireless identity transmitter functions, the nonce or counter may increase periodically (e.g., increment by one every several seconds/minutes/hours). If the wireless identity transmitter encounters inconsistent power (e.g., the battery is taken out or replaced), the nonce or counter may reset. Using such a nonce or counter, a wireless identity transmitter may be configured to periodically broadcast messages with encrypted payloads that include changing and encrypted device identification. In an embodiment, an encrypted payload may contain a concatenation of the device's unique identifier (i.e., the deviceID) and a current nonce or counter value for that wireless identity transmitter. In an embodiment, the wireless identity transmitter may encrypt the concatenated data using a secret key. Payloads may be broadcast at varying frequencies and may be received by proximity broadcast receivers or a central server for processing.

In an embodiment, the central server may be configured to identify wireless identity transmitters by matching received encrypted payloads with pre-generated payloads (or model payloads) corresponding to registered wireless identity transmitters. Based on information obtained during registration operations between the central server and wireless identity transmitters, the central server may store unique information about each wireless identity transmitter. For example, the central server may know the secret key, device identifier (or deviceID), and initial nonce or counter value of a wireless identity transmitter based on registration communications. Using such stored information, the central server may generate a series of model payloads that the wireless identity transmitter is expected (or likely) to broadcast within a time period, such as a 24-hour period. If the central server receives a payload that matches any of these model payloads, the central server may determine the identity of the originating wireless identity transmitter, as well as a loosely-accurate nonce or counter value within the wireless identity transmitter. Model payloads may be generated based off of a current, synched nonce or counter for each registered wireless identity transmitter (i.e., current model payloads). In an embodiment, the central server may also adjust for wireless identity transmitter clock skew by keeping a window of model payloads. For example, the central server may generate payloads using nonce or counter values representing times before and after an expected nonce or counter. The central server may also determine the period of the wireless identity transmitter clock by monitoring the change in the received payloads over time. In an embodiment, the central server may track changes of the reported nonce or counter values of a wireless identity transmitter and may report how inaccurate a device clock is for a particular period of time.

Model payloads may also be generated based off of initial nonce or counter values reported by each registered wireless identity transmitter during registration operations (i.e., initial model payloads). When a wireless identity transmitter is powered off and on again (e.g., rest, battery replaced, etc.), the wireless identity transmitter may reset to the original or initial nonce or counter value. If an encrypted payload received at the central server does not match any current model payload, the central server may compare the received encrypted payload to stored initial model payloads. When the central server finds an initial model payload matches the received encrypted payload (e.g., the wireless identity transmitter was reset), the central server may update a database to indicate the corresponding wireless identity transmitter's nonce or counter was reset, thus resynchronizing with the reset wireless identity transmitter's clock.

In a situation in which a wireless identity transmitter pauses for a period of time but does not reset its nonce or counter used for generating encrypted payloads, payloads subsequently generated by the wireless identity transmitter may not match expected payloads stored in the central server (e.g., current model payloads and initial model payloads). To address this situation, the central server may determine that a pause occurred when model payloads and/or nonce or counter values do not match a received encrypted payload. The central server may identify the wireless identity transmitter by performing a brute-force search of all known and/or registered wireless identity transmitters represented in a database and decode the received encrypted payload based on recorded secret keys and device identifications. In an embodiment, the brute-force search may include only wireless identity transmitters that have not broadcast payloads recently received by the central server.

For the purposes of this disclosure, the various embodiment methods for decoding, decrypting, and otherwise accessing obscured identification information (e.g., rolling identifiers) are described as being performed by a central server to associate such information with registered users and/or registered devices. However, those skilled in the art should appreciate that any computing device with authorization may be configured to perform such operations to decipher obscured identification information broadcast by wireless identity transmitters. For example, a mobile proximity broadcast receiver (e.g., a smartphone) employed by a user may utilize the various methods for decrypting, decoding, and otherwise accessing rolling identifiers that are associated with wireless identity transmitters also owned by that user.

Additional precautions may be important to protect against security breaches, such as hacker attacks against databases associated with a central server, as well as to provide registered users (e.g., merchants, parents, children, etc.) peace of mind and confidence their privacy may be fully protected. Such privacy safeguards may be provided to parties registered with embodiment systems by storing identifying information (e.g., names, addresses, financial information, medical information, etc.) separately from other information related to tracking devices and/or proximity information of users. In particular, to avoid unintended leaking of personal information of registered merchants, customers, children, or individuals, embodiment systems may utilize "double-blind" architectures. For example, such a double-blind architecture may use a first unit (e.g., a server, database, or other computing hub) that stores and has access to information related to the proximity information or other location-based data of registered users' devices (e.g., wireless identity transmitters, proximity broadcast receivers, identity transceivers, mobile devices, etc.). In other words, the first unit may access information associated with sighting messages that indicate approximate locations/proximities of various users' devices. However, the first unit may not store uniquely identifying personal information, such as user names, addresses, and/or social security numbers. Instead, a second unit may store the identifying personal information without being configured to access any location/ proximity information as used by the first unit. The first and second units may use anonymous identifiers that connect data stored within the two units without indicating the protected information stored in either unit. In an embodiment, the first and second units may be maintained by separate entities (e.g., service providers), and further, at least one of such entities may be trusted by registered users who provide identifying information.

The various embodiments may leverage a large infrastructure of mobile devices already in place. Many modern mobile devices, such as smartphones, are already equipped with multiple radios, including short-range radios such as Bluetooth® radios, and therefore may be configured to perform as mobile proximity broadcast receivers and receive identification codes from a proximate wireless identity transmitter. For example, a customer carrying a smartphone configured to operate as a mobile proximity broadcast receiver (or mobile identity transceiver) may receive broadcast messages from wireless identity transmitters within a retail store. Mobile devices are also often equipped with a clock that may provide a current time and a GPS receiver that may provide a current location whenever a wireless identity transmitter identifier is received. The mobile devices may communicate these identification codes, times, and locations via sighting messages to central servers through longer range network connections, such as a cellular radio connection. Thus, many of the large number of mobile devices already in use or soon to be in use may be incorporated as mobile proximity broadcast receivers to extend the reach of various embodiment systems.

By relying on the long range radios and other services of proximity broadcast receivers to report the location and time of received broadcast message (or "sightings") to a central server, wireless identity transmitters can be relatively small, inexpensive, and simple devices, including little more than a short-range radio, such as a Bluetooth® LE transceiver, and a battery. In various embodiments, wireless identity transmitters may also include additional short-range radios, such as Peanut® radios. In various embodiments, the wireless identity transmitters may not include a user interface, multiple radios, global positioning system (GPS) receiver, or other features common on mobile devices. Embodiment wireless identity transmitters may also consume very little power allowing them to be deployed without needing to be frequently recharged or replaced. These characteristics make them ideal for a wide variety of uses and implementation in a variety of physical configurations. For example, wireless identity transmitters may be easily hidden or incorporated into many different personal objects, such as buttons, watches, shoes, briefcases, backpacks, ID badges, clothing, product packaging, etc.

In further embodiments, wireless identity transmitters and proximity broadcast receivers may be configured to exchange transmissions using various wireless technologies, such as LTE-D, peer-to-peer LTE-D, WiFi, and WiFi Direct. In an embodiment, wireless identity transmitters may be configured to broadcast messages via a WiFi radio such that proximity broadcast receivers with WiFi transceivers may receive the broadcast messages. In such embodiments, wireless identity transmitters may utilize WiFi transmissions to broadcast identification information similar to WiFi access point broadcasts advertisements. For example, a wireless identity transmitter including a WiFi radio may be configured to transmit broadcast messages via WiFi transmissions with low power so that the reception range is limited, thereby providing a short-range radio signal with a range similar to that of Bluetooth® LE transmissions. In utilizing various wireless broadcast technologies and communication protocols with wireless identity transmitters, proximity broadcast receivers with limited capabilities may still be capable of receiving and processing broadcast messages from wireless identity transmitters. For example, a smartphone configured to operate as a mobile proximity broadcast receiver and including a WiFi transceiver but not a Bluetooth® LE radio may receive and process broadcast messages from a wireless identity transmitter configured to broadcast short-range signals with a WiFi radio. In an embodiment, wireless identity transmitters may broadcast over multiple radios, such as a Bluetooth® LE transceiver and a low-power WiFi transceiver, in order to enable more models of proximity broadcast receivers (e.g., more types of smartphones) to receive and relay sightings.

Wireless identity transmitters and proximity broadcast receivers are described throughout this disclosure as exchanging short-range wireless signals that include short-range RF signals, such as Bluetooth®, Bluetooth® Low Energy, Peanut, Zigbee, etc. However, such short-range wireless signals are not limited to short-range RF signals, and wireless identity transmitters may broadcast messages using other forms of wireless signaling, such as infrared light, visible light, vibration, heat, inaudible sound, and audible sound, as well as combinations of radio frequency (RF) signals and non-RF signals. For example, wireless identity transmitters may emit heat signals, such as infrared light, using infrared light-emitting diodes or other components capable of emitting infrared radiation. Additionally, wireless identity transmitters may emit vibration signals using vibration motors and other mechanical components capable of generating controlled vibrations. Wireless identity transmitters may also emit light signals from a number of common emitters, such as light emitting diodes, incandescent lights and projectors. Light signals may be received by light sensors (e.g., cameras) on proximity broadcast receivers, and may include visuals, such as lights, colors, and imagery (e.g., photos, projections, videos, symbols, etc.). Wireless identity transmitters may also or alternatively emit audible or inaudible (i.e., infrasonic or ultrasonic) sound signals from a speaker (e.g., a piezoelectric speaker). Sound signals may be received by a microphone of the proximity broadcast receivers, and may include a variety of sounds, such as beeps, voices, noise, clicks, ultrasounds, tones, and musical notes.

Wireless identity transmitters may be configured to broadcast the various short-range wireless signals in particular sequences, patterns, manners, durations, or manifestations such that proximity broadcast receivers may convert the signals into data in a manner similar to how RF signals (e.g., Bluetooth® LE signals) are interpreted in embodiments described herein. For example, a wireless identity transmitter may broadcast particular sequences of modulating visible or sound signals, such as strings of differing musical notes, changing images, or flashing lights that a proximity broadcast receiver may receive and convert into data that includes an identity of the wireless identity transmitter. In an embodiment, proximity broadcast receivers may convert such wireless signals into data (and vice versa) based on matching sequences of signals with patterns within predefined protocols. As an illustrative example, a wireless identity transmitter affixed to the outside of a child's clothing may periodically emit a sequence of flashes using an embedded light source (e.g., an LED bulb) that may be received, converted to data, and relayed by a proximity broadcast receiver to a central server for determining identification information related to the child. As another example, a wireless identity transmitter within a business establishment may be mounted on the ceiling and may periodically emit a sequence of flashes using an embedded light source that may be received, converted to data, and relayed by a proximity broadcast receiver to a central server to obtain coupons, announcements or customer-incentives tied to the customer being on the premises.

The various embodiments are described within this disclosure as including communication systems for providing intermediary communications between wireless identity transmitters, proximity broadcast receivers (e.g., mobile proximity broadcast receivers and stationary proximity broadcast receivers) and a central server that utilize short-range messaging (such as with Bluetooth® LE signaling) that enables proximity detection based simply on signal reception. However, the various embodiments are not limited to the described communication systems and methods, and other communication systems, protocols, devices, methods and messaging protocols may be used to convey information to a central server to enable identifying when customers are within proximity of marketing areas to enable the central server to distribute relevant marketing information without disclosing identities of customers. For example, transceivers in a retail store may be configured to monitor for WiFi, Zigbee®, Bluetooth®, Peanut®, and/or other radio frequency signaling from customers' mobile devices or wireless broadcasting devices within proximity of marketing areas, and relay proximity information to a central server that delivers coupons to customers. Further, embodiments may not require determining exact locations for wireless identity transmitters and/or proximity broadcast receivers but instead may determine approximate and/or relative locations of devices between each other. Accordingly, references to determining location and/or distance throughout the disclosure may be for the purpose of determining proximity between signaling devices.

FIG. 1 illustrates an exemplary system 100 that may be used in various embodiments. In general, a central server 120 may be configured to receive, store, and distribute process data corresponding to wireless identity transmitters 110. The central server 120 may be configured to exchange communications with various devices via the Internet 103, such as proximity broadcast receivers 142, mobile proximity broadcast receivers 138, third-party systems 101, and other support systems and/or services 102. The wireless identity transmitters 110 may broadcast messages that may be received by nearby proximity broadcast receivers 142 and/or the mobile proximity broadcast receivers 138 via short-range wireless signals. The proximity broadcast receivers 142, 138 may utilize long-range communications to relay received broadcast messages as sighting messages to the central server 120 via the Internet 103. For example, the proximity broadcast receivers 142 and mobile proximity broadcast receivers may utilize a cellular network 121 to transmit sighting messages to the central server 120. The third-party systems 101 may include merchant servers, retail store computing devices, computing devices associated with emergency services. The other support systems and/or services 102 may include computing devices associated with various technologies, such as computing devices utilized by users to provide registration information, systems that deliver user-relevant content (e.g., Qualcomm Gimbal™), and services that provide location-specific information (e.g., Qualcomm IZat™).

The central server 120 may include several components 104-109 to perform various operations to process data, such as received from proximity broadcast receivers 142, 138, third-party systems 101, or other support systems and/or services 102. In particular, the central server 120 may include a data warehouse component 104 that may store long-term data (e.g., archived user data, past location information, etc.). The central server 120 may also include an operations, administration and management (or OA&M) component 105 that may manage, process and/or store software associated with user portal accesses, scripts, tools (e.g., software utilities, routines, etc.), and any other elements for administering the central server 120. The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The central server 120 may also include a user portal component 109 that may store user account data and perform registration, account management, and search routines associated with users, such as persons associated with wireless identity transmitters 110. The central server 120 may also include a core component 108 that may process sighting messages, execute an alert or notice engine module, handle application programming interface (API) commands, and exchange data with other components within the central server 120. The core component 108 is described below with reference to FIG. 12. In various embodiments, the various system components 104-109 may be computing devices, servers, software, and/or circuitry that is included within, connected to, or otherwise associated with the central server 120. For example, the core component 108 may be a server blade or computing unit included within the central server 120. As another example, the data warehouse component 104 may be a remote cloud storage device that the central server 120 communicates with via Internet protocols.

In an embodiment, the proximity broadcast receivers 142 and mobile proximity broadcast receivers 138 may be configured to execute a core client module 115 that may be software, instructions, routines, applications, operations, or other circuitry that enable the proximity broadcast receivers 142, 138 to process received broadcast messages from proximate wireless identity transmitters 110. The core client module 115 may also handle communications between the proximity broadcast receivers 142, 138 and the central server 120, such as transmitting sighting messages and receiving return messages from the central server 120. Further, the mobile proximity broadcast receivers 138 may be configured to execute third-party applications module 116 that may related to performing software instructions, routines, applications, or other operations provided by various third-parties (e.g., merchant apps). In an embodiment, when configured as registered services with the central server 120, the third-party applications module 116 may receive various data from the core client module 115. For example, a third-party application that is registered with the central server 120 may be configured to receive notifications from the core client module 115 when the user of the mobile proximity broadcast receiver 138 enters, remains, and/or leaves a particular place (e.g., a geofence, a retail store, etc.).

In another embodiment, the mobile proximity broadcast receivers 138 may be configured to receive and transmit broadcast messages and may also be referred to as "wireless identity transceivers." For example, a user may employ a smartphone that is configured to receive broadcast messages from nearby wireless identity transmitters 110 as well as broadcast signals that include identifying information associated with the user.

Figure 2:
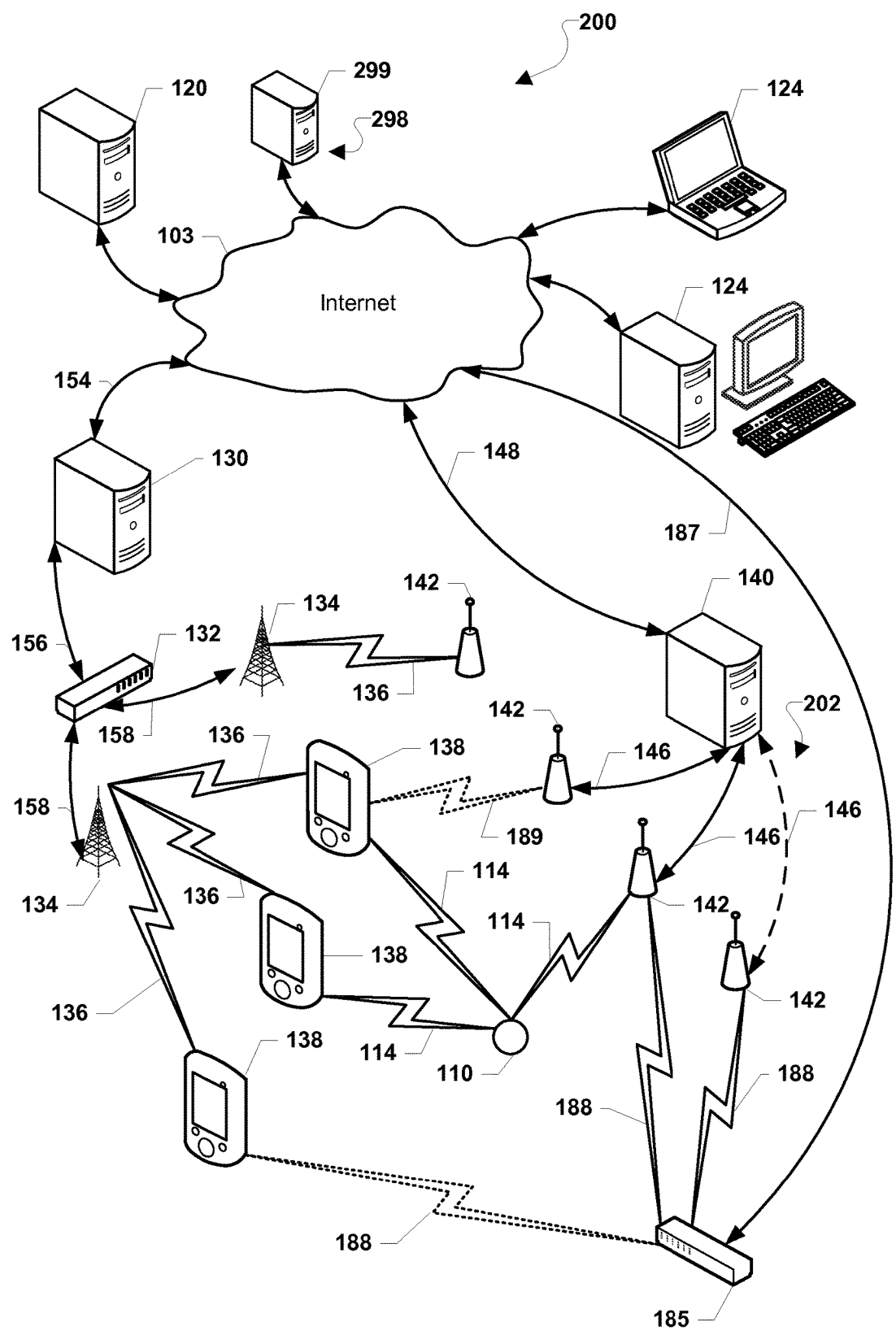
FIG. 2 is a communication system diagram illustrating network components of embodiment architectures suitable for use in various embodiments.

FIG. 2 illustrates an exemplary communication system 200 that may be used in various embodiments. The communication system 200 effectively enables wireless identity transmitters 110 (e.g., Bluetooth® LE transmitters) to transmit broadcast messages that include identification information to the central server 120 via a plurality of mobile proximity broadcast receivers 138 and/or stationary proximity broadcast receivers 142, without the need to negotiate a direct communication link. Such broadcast messages may be collected automatically by any proximity broadcast receiver within proximity (or broadcast range) of wireless identity transmitters. For example, a mobile proximity broadcast receiver 138 within a certain proximity may receive a broadcast message transmitted by a Bluetooth® radio within the wireless identity transmitter 110.

The communication system 200 may include a wireless identity transmitter 110. The wireless identity transmitter 110 may be coupled with various objects. For example, it may be embedded in a bracelet. The wireless identity transmitter 110 may transmit a short-range wireless signal 114, such as a broadcast message as described above. For example, this short-range wireless signal 114 may be a periodic broadcast of a packet, which includes the wireless identity transmitter's identification code. Alternately, the short-range wireless signal 114 may be an attempt to establish a wireless communication link with any of a plurality of mobile devices 138 that may be acting as proximity broadcast receivers. The short-range wireless signal 114 may be received by proximate proximity broadcast receivers, such as stationary proximity broadcast receivers 142 and/or mobile proximity broadcast receivers 138.

The short-range wireless signal 114 may be according to any of a variety of communication protocols, such as Bluetooth®, Bluetooth® LE®, Wi-Fi, infrared wireless, induction wireless, ultra-wideband (UWB), wireless universal serial bus (USB), Zigbee®, Peanut®, or other short-range wireless technologies or protocols which have or which can be modified (e.g., by restricting transmit power) to limit their effective communication range to relatively short range (e.g., within about 100 meters). In some embodiments, the wireless identity transmitter 110 may use the low energy technology standardized in the Bluetooth® 4.0 protocol (or later versions). For example, in some embodiment systems a wireless identity transmitter 110 may periodically broadcast identification packets configured as an advertiser as described in the Bluetooth® 4.0 protocol, and proximate proximity broadcast receivers 142, 138 may be configured to act as scanners according to that protocol.

The Bluetooth® protocol and Bluetooth® devices (e.g., Bluetooth® LE devices) have a relatively short effective communication range, are widely used in deployed communication and computing devices, have standard advertising or pairing procedures that meets the discovery and reporting needs of various embodiments, and exhibit low power consumption, which make the protocol ideal for many applications of the various embodiments. For this reason, Bluetooth® and Bluetooth® LE protocols and devices are referred to in many of the examples herein for illustrative purposes. However, the scope of the claims should not be limited to Bluetooth® or Bluetooth® LE devices and protocol unless specifically recited in the claims. For example, Peanut® transceivers may be included within wireless identity transmitters 110 and may be used to transmit two-way communications with proximity broadcast receivers 142, 138 also configured to utilize Peanut® short-range radio transmissions.

The communication system 200 may include a plurality of stationary proximity broadcast receivers 142, which may be deployed by authorities, merchants, or various third-parties throughout a region, building, or place. Such stationary proximity broadcast receivers 142 may be designed specifically for wireless identity transmitters 110 (or include such tracking functions in addition to other primary functionality, such as traffic lights, utility transformers, etc.). Stationary proximity broadcast receivers 142 may be located in strategic locations within a locality, such as forming a perimeter about a community and/or being located in high traffic areas (e.g., major intersections and highway on-ramps). The stationary proximity broadcast receivers 142 may be in communication with a local area network 202, such as a WiFi network, that may include an Internet access server 140 that provides a connection 148 to the Internet 103. Stationary proximity broadcast receivers 142 may be connected to the local area network 202 by a wired or wireless link 146. In various embodiments, the stationary proximity broadcast receivers 142 may be contained within or located nearby the Internet access server 140. For example, the stationary proximity broadcast receivers 142 may be components within the Internet access server 140 or alternatively, may be placed on top of or to the sides of the Internet access server 140. In an embodiment, stationary proximity broadcast receivers 142 may be located in strategic places within a locality, such as forming a perimeter about a community and/or being located in high traffic areas (e.g., along aisles of a retail store, at entry ways to buildings, etc.). In an embodiment, stationary proximity broadcast receivers 142 may have additional functionality. For example, stationary proximity broadcast receivers 142 may also function as or be included within cash registers, point-of-sale devices, and/or display units within a retail store.

The communication system 200 may also include one or more mobile devices configured to act as mobile proximity broadcast receivers 138. The mobile proximity broadcast receivers 138 may be typical mobile devices or smartphones communicating with a cellular network 121 via long range wireless links 136 to one or more base stations 134 coupled to one or more network operations centers 132 by a wired or wireless connection 158. Such cellular network 121 may utilize various technologies, such as 3G, 4G, and LTE. The network operations centers 132 may manage voice calls and data traffic through the cellular network 121, and typically may include or may be connected to one or more servers 130 by a wired or wireless connection 156. The servers 130 may provide a connection 154 to the Internet 103. In the various embodiments, the mobile proximity broadcast receivers 138 may be mobile devices configured by an application or other software module to act as proximity broadcast receivers to relay reports of received broadcast messages from wireless identity transmitters 110 (i.e., sighting messages) to the central server 120 by way of the Internet 103. In an embodiment, stationary proximity broadcast receivers 142 may also communicate with the cellular network 121 via long range wireless links 136 to a base station 134.

Proximity broadcast receivers 138, 142 may be configured to report contacts (or sightings) with a wireless identity transmitter 110 to a central server 120 via the Internet 103. For example, the proximity broadcast receivers 142 may transmit a sighting message to the central server 120 that includes a rolling identifier corresponding to the identity of a user of the wireless identity transmitter 110. Each time a proximity broadcast receiver 138, 142 receives an identifier from a wireless identity transmitter 110, the identifier may be associated with the time of the connection and the location of the proximity broadcast receiver 138, 142, and this information may be transmitted to the central server 120, such as within a sighting message. In some embodiments, the identifier, the time, and the location of the contact may be stored in the memory of the proximity broadcast receiver 138, 142 (or an intermediary server 130, 140) for later reporting, such as in response to a query message broadcast or multicast by the central server 120. Also, the central server 120 may store location information reported by sighting messages in a database, which may be used for locating, tracking or otherwise monitoring movements of the wireless identity transmitter 110.

In an embodiment, mobile proximity broadcast receivers 138 may be configured to exchange short-range wireless signals 189 with stationary proximity broadcast receivers 142. In other words, a mobile proximity broadcast receiver 138 may be configured to operate as a wireless identity transceiver that is capable of receiving short-range wireless signals 114 (i.e., broadcast messages) from the wireless identity transmitter 110 as well as transmitting short-range wireless signals 189 for receipt by proximity broadcast receivers 142.

In an embodiment, proximity broadcast receivers 138, 142 may transmit wireless signals 188 to a wireless router 185, such as part of the local area network 202, which may provide a connection 187 to the Internet 103. For example, the stationary proximity broadcast receivers 142 may transmit sighting messages that include data from broadcast messages transmitted by the wireless identity transmitter 110 to a WiFi wireless router 185.

The central server 120 may also be connected to the Internet 103, thereby allowing communication between proximity broadcast receivers 142, 138 and the central server 120. As described above, the central server 120 may include a plurality of components, blades, or other modules to process sighting messages and data received from proximity broadcast receivers 142, 138. Further embodiments may provide a direct connection (not shown) between the central servers 120 and any of the mobile device network components, such as the network operations centers 132, to more directly connect the proximity broadcast receivers 142, 138 and the central servers 120.

The communication system 200 may also include computing terminals 124, such as personal computers at home or work, through which users may communicate via the Internet 103 with the central server 120. Such terminals 124 may allow users, such as parents, police, fire, medical attendants, and other authorized authorities to register devices (e.g., wireless identity transmitters 110), access tracking records on the central servers 120, and/or to request that the central server 120 initiate a search for a particular wireless identity transmitter 110. In an embodiment, users may use such terminals 124 to register wireless identity transmitters 110, proximity broadcast receivers 142, 138 (e.g., smartphones configured to execute client software associated with the central server), and/or identity transceivers (not shown), such as by accessing web portals and/or user accounts associated with the central server 120. Similarly, third-parties, such as merchants, may use terminals 124 to register wireless identity transmitters 110, proximity broadcast receivers 142, 138 (e.g., stationary receivers configured to execute client software and relay broadcast to the central server), and/or identity transceivers (not shown).

Based on the location of the proximity broadcast receivers 138, 142 within a place, multiple proximity broadcast receivers 138, 142 may be within the broadcast area of the wireless identity transmitter 110 and may concurrently receive broadcast messages. The central server 120 may detect when proximity broadcast receivers 138, 142 concurrently (or within a certain time period) transmit sighting messages that indicate receipt of broadcast messages from the wireless identity transmitter. Such concurrent sighting messages may be used to determine more precise proximity information relating to the wireless identity transmitter at the time of broadcasting.

The communication system 200 may operate in a passive information gathering mode and/or an active search mode. In the passive information gathering mode, proximity broadcast receivers 138, 142 may continuously listen for broadcasts from any wireless identity transmitters 110, and report all identifier reception events via sighting messages (e.g., transmissions including identifiers, time and location) to the central server 120. When no active search is underway (i.e., no one is looking for a particular wireless identity transmitter 110), sightings of wireless identity transmitters 110 or received broadcast messages from wireless identity transmitters 110 may be stored in memory of the proximity broadcast receivers 138, 142 or the central server 120 for access at a later time. In order to protect privacy, such stored data may be stored for a limited period of time, such as a day, a week or a month, depending upon the person or asset being tracked. Then, if a person or asset is discovered to be missing, the stored data may be instantly accessed to locate and track the associated wireless identity transmitter 110, or at least determine its last reported location.

In a modification of the passive tracking mode, each proximity broadcast receiver 138, 142 may store IDs, times and locations corresponding to received broadcast messages (or contacts) from wireless identity transmitters 110 for a limited period of time. Alternatively, such information may be stored in servers 130, 140 connected to such proximity broadcast receivers 138, 142. Then, if a person or asset associated with a wireless identity transmitter 110 is discovered missing, a search can be initiated by the central server 120 querying the proximity broadcast receivers 138, 142 (or servers 130, 140) to download their stored data (e.g., databases indicating contacts with wireless identity transmitters 110) for analysis and storage in a database of the central server 120.

In an embodiment, in order to limit the demands on civilian mobile devices configured to operate as mobile proximity broadcast receivers 138, the passive tracking mode may only be implemented on the stationary proximity broadcast receivers 142. While the fewer number of such devices means the tracking of wireless identity transmitters 110 may be less effective, this embodiment may nevertheless enable receiving broadcast messages and thus the tracking of wireless identity transmitters 110 through high-traffic zones, such as intersections, highway on/off ramps, bus stations, airports, etc.

In the passive information gathering mode/embodiment, a user may use the communication system 200 to request the location of a particular wireless identity transmitter 110, such as by sending a request from a terminal 124 to the central server 120. For example, a mother may log in on her home computer terminal 124 and request the location of the wireless identity transmitter 110 in her child's backpack. The request may include a serial number, code, or other identifier corresponding to the wireless identity transmitter 110. The central server 120 may search the stored identification messages for the serial number, code, or other identifier and return any reported locations matching entered information, along with the times of such locations were reported via sighting messages. In further embodiments, the serial number or code entered by the parent may be cross-referenced with the identifier that the requested wireless identity transmitter 110 communicates in broadcast messages and that are relayed to the central server 120 in sighting messages submitted by proximity broadcast receivers 138, 142. In this manner only an authorized user (i.e., someone who knows the access code, password, or other secret code associated with a particular wireless identity transmitter 110) can obtain information regarding a given wireless identity transmitter 110 even though data is being gathered continuously.

In the active search mode/embodiment, the central server 120 may instruct proximity broadcast receivers 138, 142 to actively search for a particular wireless identity transmitter 110 (i.e., a "targeted" wireless identity transmitter). An active search may be initiated in response to a request received from a terminal 124. Such a request may include the identifier for the particular wireless identity transmitter 110, or an account number/name that is or can be cross-linked to the identifier of the wireless identity transmitter 110. The central server 120 may transmit activation messages, such as via broadcast or multicast, to proximity broadcast receivers 138, 142 that may instruct proximity broadcast receivers 138, 142 to search for a particular wireless identity transmitter 110 and that may include an identifier of the targeted wireless identity transmitter 110 (i.e., target device ID). For example, an activation message corresponding to an active search for a targeted wireless identity transmitter 110 may include a rolling identifier that the wireless identity transmitter 110 changes periodically in an unpredictable manner and that is known to the central server 120. In an embodiment, activation messages transmitted, broadcast or multicast by the central server 120 may be sent only to proximity broadcast receivers 138, 142 within particular sectors or within a given distance of a particular location. Alternatively, the activation messages may identify particular sectors or a distance from a particular location to enable the proximity broadcast receivers 138, 142 to determine whether the activation message is applicable to them based on their own known location. In this manner the search can be focused on a given area, such as a sector encompassing the last known location of the wireless identity transmitter 110 or an eye witness sighting. By focusing the search in this manner, proximity broadcast receivers 138, 142 not within the sector of search need not be activated.

In the active search mode/embodiment, in response to receiving activation messages from the central server 120 that include target device IDs and determining that they are within the identified sector of search, proximity broadcast receivers 138, 142 may configure their short-range radios (e.g., Bluetooth® radio) to listen for broadcast messages having the identifiers. In other words, the proximity broadcast receivers 138, 142 may be considered activated for a search and may or pairing attempts with an identifier look for the identifiers included in the activation message (i.e., target device IDs). In embodiments that do not rely on pairing with the wireless identity transmitter, proximity broadcast receivers 138, 142 matching an identifier within a received broadcast message to a target device ID within an activation message may promptly report the event to the central server 120 via sighting messages transmitted via links 146 or long-range wireless links 136. In embodiments that rely on pairing or an exchange of messages between the wireless identity transmitter and proximity broadcast receivers, proximity broadcast receivers 138, 142 may listen for and only complete communication handshaking or pairing with a device that broadcasts the target device ID, and ignore other pairing attempts. In this alternative embodiment, proximity broadcast receivers 138, 142 may be protected from pairing with unauthorized devices while in the active search mode. Also, proximity broadcast receivers 138, 142 may modify the pairing process in the active search mode to terminate the communication link as soon as the device ID is received, further protecting against pairing with unauthorized devices in the active search mode. In the active search mode/embodiment, proximity broadcast receivers 138, 142 receiving the target device ID may promptly report that event to the central server 120 via a wired or wireless link to the Internet 103. As mentioned above, such a report may include the location of the proximity broadcast receiver 138, 142 and the time when the identifier was received if the report is not transmitted immediately. In the active search mode/embodiment, each sighting message received by the central server 120 may be reported to an interested person or authority, such as in the form of a webpage showing an update location indicator on a map.

Further, in the active search mode/embodiment, an authorized user, such as a police, FBI, fire/rescue or other person of authority may use the communication system 200 to activate a search for a particular wireless identity transmitter 110, such as by using a terminal 124 to provide the central server 120 with the target device ID and search location or sectors to be searched. For example, a mother discovering that her child is missing may call the police and provide them with an identifier of the wireless identity transmitter 110 concealed in her child's clothing. With the search activated, the central server 120 may transmit an alert (or message that indicates a search for a wireless identity transmitter has been activated) to proximity broadcast receivers 138, 142 within the initial targeted search sector. The central server 120 may then activate a webpage that presents a map of the search area and that may be maintained in near-real time so, that as relevant sighting messages are received, reported location information is displayed on the map. Authorized users may then access the website (or other information provided by the server) to coordinate in-person search efforts.

Of course, information gathered and stored in proximity broadcast receivers 138, 142 or in a database of the central server in the passive mode may be used upon initiation of an active search, such as to identify an initial search location or sector, track recent locations and movements, and to provide/display a history of locations reported by sighting messages that may be combined with near-real time search reports.

In another embodiment, the communication system 200 may further include a plurality of wireless identity transmitters (not shown in FIG. 2) that are placed throughout a building. In such a situation, the plurality's broadcast areas may cover a large portion of the enclosed area of such a building. For example, the building may be a retail store and the plurality of wireless identity transmitters may be permanently stationed throughout the sales floor of the building. As a mobile proximity broadcast receiver 138, such as a smartphone carried by a customer, moves throughout the building and within the broadcast areas of the plurality of wireless identity transmitters, the mobile proximity broadcast receiver 138 may receive broadcast messages associated with the building. In another embodiment, the Internet access server 140 may be configured to store, receive, and otherwise process information relevant to the building. For example, the Internet access server 140 may be configured to perform as a local server for a retail store or alternatively a point-of-sale device that is configured to perform software and operations for conducting transaction with customers. For example, the Internet access server 140 may be configured to perform operations related to a customer purchase within a retail store building.

In an embodiment, the communication system 200 may also include an advertising server 299 that may be coupled to the communication system 200 by a local area network 298 or the Internet 103. The central server 120 may be configured to exchange transmissions with the advertising server 299, such as by exchanging messages that include customer data and/or marketing information using Internet protocols. For example, the central server 120 may be configured to transmit location information data, generic demographics information, and other data related to a customer to the advertising server 299. As another example, the advertising server 299 may be configured to transmit to the central server 120 data that indicates advertisements relevant to certain GPS coordinates or the marketing location around a particular proximity broadcast receiver 142 known to the central server 120. In various embodiments, the central server 120 may or may not transmit identifying information about registered users to the advertising server 299 based on privacy permissions, preferences, or any other authorizing data or settings stored in profiles associated with the registered users. For example, based on settings within a registered user's profile stored on the central server 120, the central serve 120 may transmit the user's name, age, and past location information (e.g., travel behaviors, routes within a retail store, average dwell time in front of particular proximity broadcast receivers 142 within the retail store, etc.) to the advertising server 299 for generating contextual marketing information for that user. Alternatively, when the registered user's profile stores permissions information that forbids sharing personal data, the central server 120 may only transmit data to the advertising server 299 that indicates a generic person is within proximity of a proximity broadcast receiver 142 within the retail store.

In an embodiment, the advertising server 299 may receive and store various data from third-parties, such as manufacturers, content generators, merchants, and other parties that may desire to share marketing information, advertisements, coupons, and other information with customers. For example, a product manufacturer may transmit to the advertising server 299 a set of coupons along with conditions or rules sets for distributing the coupons. The advertising server 299 may be configured to transmit such data to the central server 120 for storage and use. In an embodiment, the advertising server 299 may transmit marketing information to mobile devices of customers, such as the mobile proximity broadcast receiver 138. For example, the advertising server 299 may transmit an SMS message, email, or other message including coupons through the Internet 103 for delivery via a cellular network to the mobile proximity broadcast receiver 138 carried by a customer within a retail store. In an embodiment, the advertising server 299 may also receive data related to transactions, such as sales reports from a product manufacturer (e.g., a manufacturer's in-house server). In another embodiment, the advertising server 299 may also be configured to store accounts that are associated with parties registered with the central server (i.e., registered services), the central server, and third-parties (e.g., product manufacturers that have provided marketing information for delivery to customers). Accounts may be stored by the advertising server 299 in a relational database or other similar data structure. Accounts may include identification information of the associate entity, device, or party (e.g., identifiers), associated marketing information and/or marketing conditions, and corresponding location information (e.g., GPS coordinates associated with particular marketing information of an advertiser, etc.). In another embodiment, the advertising server 299 may also store financial information, such as billing data, balances, debits, and credits, in association with such accounts.

Figure 3:
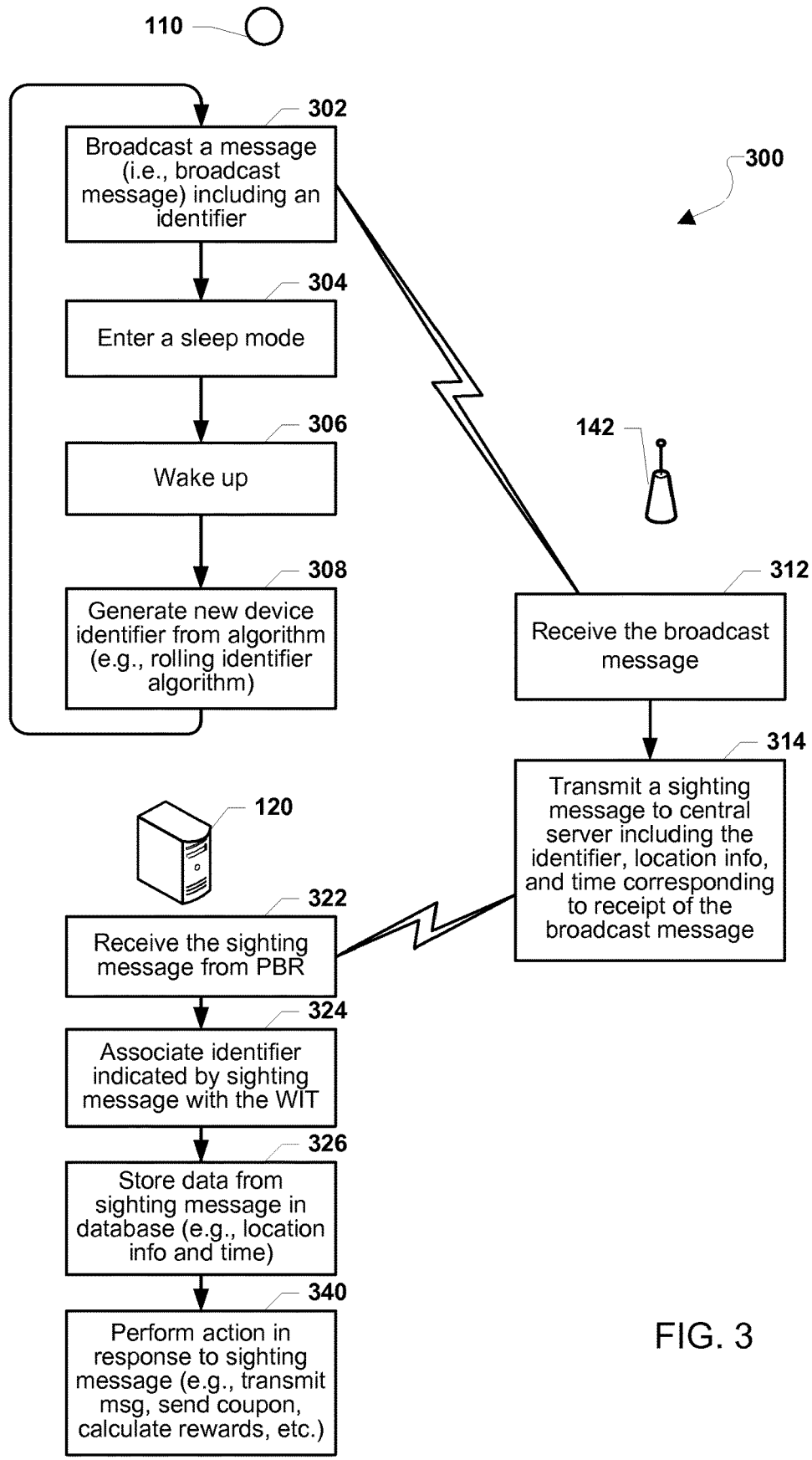
FIG. 3 is a process flow diagram illustrating an embodiment method for broadcasting an identifier from a wireless identity transmitter.

FIG. 3 illustrates an embodiment method 300 for implementation in a wireless identity transmitter 110 (referred to as "WIT" in FIG. 3), a proximity broadcast receiver 142, and a central server 120. In block 302, a wireless identity transmitter 110 may broadcast a message that includes an identifier, such as a broadcast message as described above. For example, the wireless identity transmitter 110 may broadcast a Bluetooth® LE advertising packet that includes a rolling identifier as described herein. This may be accomplished in block 302 by a microcontroller within the wireless identity transmitter 110 determining that it is time to broadcast its identifier, configuring a suitable broadcast message (e.g., an advertisement packet as specified for Bluetooth® LE devices in the Bluetooth®4.0 protocol), and transmitting that packet via a short-range radio.

In various embodiments, the message broadcast by the wireless identity transmitter (i.e., the broadcast message) may include an identifier segment, such as a rolling identifier. In various embodiments, the broadcast message may also include additional segments, such as a type segment. The type segment may indicate the type of wireless identity transmitter. For example, wireless identity transmitters may be marketed for various purposes, such as child safety devices, dog collars, or security tags for stores. The wireless identity transmitters may have a different type segment based on the intended purpose (e.g., one code for child safety devices, a second code for dog collars, etc.). Type segments may be static and set by manufacturers, while the remaining portion of the identifier may be unique to each device, and may roll as described below. The type segment may also be changed by a user, such as when a wireless identity transmitter is reset for a different purpose or application.

In other embodiments, a broadcast message may also include one or more static or dynamic segments with instructions or commands to be implemented by a proximity broadcast receiver. Such command segments may also be passed along to instruct a central server or other network device. Command segments may be set or static, similar to type segments, or may vary over time based on various conditions, such as pairings or data from one or more proximity broadcast receivers. Such command settings may also be configured by a user of the wireless identity transmitter. Second or additional segments may also indicate the status of the wireless identity transmitter. For example, a second segment may indicate the remaining power or estimated time left before the battery dies. Proximity broadcast receivers or a central server may interpret this status and respond accordingly.

Returning to FIG. 3, in block 304, the wireless identity transmitter 110 may enter a sleep mode. For example, after broadcasting the broadcast message having the identifier, the wireless identity transmitter 110 may be configured to enter a power conservation state that may continue for a predetermined period of time. In various embodiments, the wireless identity transmitter 110 may sleep for a predetermined time, never sleep, or sleep for varying times determined based on various inputs. In block 306, the wireless identity transmitter 110 may wake up from the sleep mode, such as after the predetermined duration expires. In block 308, the wireless identity transmitter 110 may generate a new device identifier from an algorithm, such as a rolling identifier algorithm. For example, the wireless identity transmitter 110 may generate a rolling identifier using a pseudo-random function or a streaming-like encryption algorithm (e.g., AES-CTR), as described below. The wireless identity transmitter 110 may then return to block 302 to broadcast again.

In an embodiment, the broadcast message may contain timing, counter, count-down, or scheduling information indicating the availability of the wireless identity transmitter for receiving messages. For example, the broadcast message may indicate that the wireless identity transmitter will accept incoming configuration messages within a specified time window. In various embodiments, the operations in blocks 302-308 may be performed by an identity transceiver (e.g., a smartphone configured to operate as both an identity transmitter and a proximity broadcast receiver).

As mentioned above, the algorithm (or rolling identifier algorithm) used in block 308 may generate a rolling identifier which is very difficult to predict or recognize by a device or system that does not know either an identity of the wireless identity transmitter 110 (e.g., a MAC or Bluetooth® ID), a decode key, and/or the algorithm used to generate the rolling identifier. As discussed below with reference to FIG. 19, the central server 120, configured with the algorithm (or a decoding algorithm) or a decode key, and in possession of the wireless identity transmitter 110 identities, can use the rolling identifier to determine a corresponding account or device identity. While method 300 shows the rolling identifier changing with every wake and broadcast cycle as one example, in other embodiments the identifier may be changed less frequently, such as once per minute, once per hour, etc. In such embodiments, the operation of generating a new identifier in block 308 may be performed only at the designated interval, so at other times upon waking (i.e., block 306) the wireless identity transmitter 110 may return to block 302 to broadcast the identifier. Various algorithms for generating rolling identifiers or other encoded identifiers, as well as other decoding algorithms, are discussed below as well as in related application U.S. patent application Ser. No. 13/773,336, entitled "Preserving Security By Synchronizing a Nonce or Counter Between Systems, the entire contents of which are hereby incorporated by reference for purposes of algorithms for generating, transmitting and decoding rolling identifiers and other data.

The method 300 also illustrates operations that may be implemented in the proximity broadcast receiver 142. In block 312, the proximity broadcast receiver 142 may receive the broadcast message from the wireless identity transmitter 110. The proximity broadcast receiver 142 may receive the broadcast message when within proximity of the wireless identity transmitter 110 (i.e., within communication range). When the broadcasted message with included identifier is received, the proximity broadcast receiver 142 may analyze header or metadata within the received broadcast message, as well as parse and evaluate various data within the broadcast message. In an embodiment, the broadcast message may contain encrypted and non-encrypted data that the proximity broadcast receiver 142 may or may not be configured to decrypt or otherwise access. In block 314, the proximity broadcast receiver 142 may transmit a sighting message to the central server 120 including the identifier, location information, and time corresponding to the receipt of the broadcast message. This transmission may be accomplished via a wireless wide area network, such as a cellular data network coupled to the Internet. In various embodiments, the operations in blocks 312 and 314 may be performed by a stationary proximity broadcast receiver, a mobile proximity broadcast receiver, or alternatively, an identity transceiver (e.g., a smartphone configured to operate as both a transmitter and a receiver).

In general, sighting messages may include metadata or header information that may describe received broadcast messages (e.g., message size, indicators of subject matter, etc.), the proximity broadcast receiver 142, such as the proximity broadcast receiver identification (e.g., a code, username, etc.), indications of services with which the proximity broadcast receiver 142 is affiliated regarding the server (e.g., the proximity broadcast receiver 142 participates in a tracking program for a particular vendor, merchant, area, etc.), as well as the conditions at the time of receipt of the broadcast message. For example, the sighting message may include signal strength information of the received broadcast message. In an embodiment, sighting messages may each include codes, flags, or other indicators that describe the general topic, subject matter, or reason for the sighting message. For example, the sighting message may contain a flag that indicates a relation to an active alert.

Additionally, sighting messages may include location information of the proximity broadcast receiver 142. In particular, sighting messages may indicate network-specific information that relates to a location. For example, a sighting message may indicate the cell site (e.g., cell site ID), cellular network tower (e.g., cell tower ID), or other wireless network with which a mobile proximity broadcast receiver was in communication at the time of receipt of the broadcast message. Further, sighting messages may include more refined location information based on data from global positioning systems (GPS) or chips included within the proximity broadcast receiver 142. For example, the proximity broadcast receiver 142 may determine GPS information (i.e., GPS coordinates) of the proximity broadcast receiver 142 at the time of receipt of a broadcast message, including the coordinates in the corresponding sighting message. In an embodiment, sighting messages may also include sensor data from various sensors within the proximity broadcast receiver 142, such as accelerometers, gyroscopes, and magnetometers. Further, sighting messages may include authentication information that may confirm the legitimacy of the sighting message as coming from a known, registered, or otherwise valid proximity broadcast receiver 142. For example, authentication information included in a sighting message may include secret codes, certificates, or hash data that is shared between the proximity broadcast receiver and the central server 120.

In various embodiments, the proximity broadcast receiver 142 may generate sighting messages by appending data and various information to broadcast messages received from the wireless identity transmitter 110. In an embodiment, sighting messages may include the entirety of received broadcast messages or, alternatively, only portions of the received broadcast messages that the proximity broadcast receiver 142 determines to be of significance. For example, the proximity broadcast receiver 142 may extract particular header or metadata information from a broadcast message before generating a corresponding sighting message. As another example, the proximity broadcast receiver 142 may compress, abbreviate, truncate and/or summarize data within the broadcast message. In another embodiment, the proximity broadcast receiver 142 may simply redirect, relay, or retransmit received broadcast messages to the central server.

Sighting messages may be transmitted via a wireless or wired communication link, such as a wireless cellular network, a local area network configured to communicate via Internet protocols, a long-range radio communication link, or a short-range radio. For example, the proximity broadcast receiver 142 may transmit sighting messages over a cellular network via the Internet to the central server. As another example, the proximity broadcast receiver 142 may transmit sighting messages via a wired Ethernet connection.

Returning to FIG. 3, the method 300 also illustrates operations that may be implemented in the central server 120. In block 322, the central server 120 may receive the sighting message from the proximity broadcast receiver 142. In block 324, the central server 120 may associate an identifier indicated by the sighting message with the wireless identity transmitter 110. The central server 120 may associate the identifier within the sighting message with an account registered/created by a user. Associating the identifier with a particular wireless identity transmitter 110 or user account may be accomplished by comparing the identifier with a database of codes corresponding to the wireless identity transmitter 110 or user accounts to determine the database record in which information from the sighting message (e.g., location info) should be stored. Since in some embodiments the wireless identity transmitter 110 identifier changes (rolls) frequently, this process may involve comparing the identifier received in the sighting message to several possible serial codes generated by a pseudo-random number generator algorithm, or applying a reverse algorithm which uses the received identifier as an input and outputs the corresponding account number. In block 326, the central server 120 may store data from the sighting message in a database, such as location information and time data. For example, the central server 120 may determine the location of the proximity broadcast receiver 142 when the broadcast message was received based evaluating the received sighting message, and may store that data in a database linked to the wireless identity transmitter 110 or its user/owner.

In block 340, the central server 120 may perform an action in response to the sighting message, such as transmit a message to a recipient, send a coupon, and/or calculate rewards. In an embodiment, the central server 120 may transmit a return message to a recipient, such as the proximity broadcast receiver 142, that includes instructions, software, or codes indicating how the proximity broadcast receiver 142 may respond to the received broadcast message. For example, the return message may direct the proximity broadcast receiver 142 to transmit a link advertisement message. Recipients of such messages from the central server may include various devices and parties, including computing devices of registered services (e.g., merchants, emergency personnel), mobile devices of users, and proximity broadcast receivers (e.g., the proximity broadcast receiver 142 that received the broadcast message). In another embodiment, the central server 120 may use the stored data to identify when the wireless identity transmitter 110 enters, is within, and/or leaves a designated area. In other words, the central server 120 may identify when the wireless identity transmitter 110 comes within proximity, stays within proximity, or leaves proximity of a proximity broadcast receiver 142.

Figure 4:
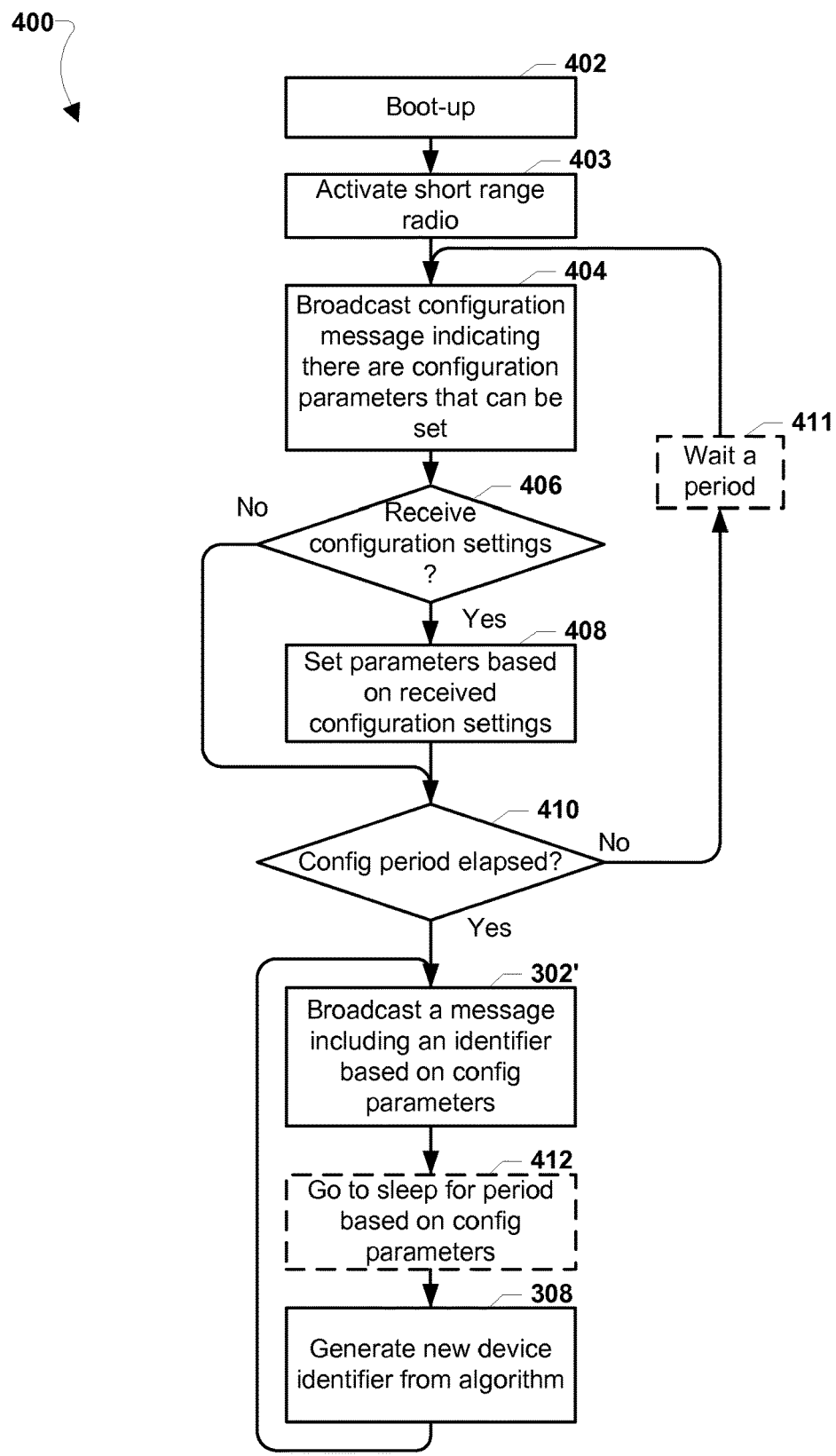
FIG. 4 is a process flow diagram illustrating an embodiment method for a wireless identity transmitter receiving configuration settings after performing boot-up operations.

FIG. 4 illustrates an embodiment method 400 for a wireless identity transmitter (referred to as "WIT" in FIG. 4) receiving configuration settings after performing boot-up operations. Typically, wireless identity transmitters may only perform one-way communications, broadcasting signals for receipt by proximity broadcast receivers. However, wireless identity transmitters may be configured to selectively engage in two-way communications with other devices with similar short-range wireless signaling capabilities (e.g., Bluetooth® LE transceivers). In particular, upon initialization operations (or "booting-up"), a wireless identity transmitter may be configured to receive incoming short-range wireless communications from proximity broadcast receivers. For example, when a battery is replaced or inserted for the first time, the wireless identity transmitter may accept incoming Bluetooth® packets for a predefined period of time, such as sixty seconds. Alternatively, the wireless identity transmitter may receive incoming messages as part of power-cycling (e.g., receive for the sixty seconds after a reboot of the wireless identity transmitter).

Such incoming short-range wireless communications may include instructions, software, firmware, commands, or other code for setting values for configuration parameters utilized by the wireless identity transmitter for performing various functions. In particular, the incoming communications may include configuration settings (or values) the wireless identity transmitter may use to set or modify established configuration parameters associated with transmitting broadcast messages that include identification information of the wireless identity transmitter. In an embodiment, incoming communications that include configuration settings may be Bluetooth® signals (e.g., setters or getters) that may not require pairing operations between the sender and receiver (i.e., the wireless identity transmitter). In other words, the incoming communications may be non-pairing Bluetooth® advertisements.

Configuration parameters may include the transmit interval for transmitting broadcast messages (i.e., how often the wireless identity transmitter should broadcast packets that include its identity) and the transmit power for transmitting broadcast messages (i.e., what signal strength to use when broadcasting). For example, received configuration settings may vary the intervals (i.e., broadcasting frequency) at which the wireless identity transmitter broadcasts its identifier in a manner configured to facilitate accurate tracking of the wireless identity transmitter while conserving battery power. This may be important as setting transmit power configuration parameters may affect the battery service life of the wireless identity transmitter (e.g., a longer interval may include a longer sleep mode and thus decreased power consumption). In an embodiment, configuration parameters may also include a debug parameter that may be set or modified by a manufacturer or administrative party (e.g., a central server). The debug parameter may be utilized by software or algorithms executed by the wireless identity transmitter and may indicate when the wireless identity transmitter should generate new identifiers to broadcast (e.g., an interval for generating a new rolling identifier or Bluetooth® MAC address identifier). In another embodiment, incoming communications with configuration settings may include commands that instruct the wireless identity transmitter to change the data represented within broadcast messages, such as by entering/exiting an encoded mode. Alternatively, incoming communications may include instructions for the wireless identity transmitter to shorten its broadcast signal range to emulate near field communications (NFC).

In block 402, the wireless identity transmitter may boot-up. In other words, the wireless identity transmitter may be energized, initialized, and otherwise configured to operate from a hibernating, sleep, dormant, or otherwise deactivated state. In various embodiments, the boot-up operations may be performed in response to a user input (e.g., a button press), the insertion of a battery in the wireless identity transmitter, or receiving a short-range wireless signal (e.g., an activation signal). In block 403, the wireless identity transmitter's short-range radio may be activated. This activation may be accomplished by a timer or by the microcontroller determining that a duration has expired since the boot-up operations were performed or concurrently with the boot-up operations. In an embodiment, the activation of the short-range radio may be a routine within the boot-up operations in block 402.

In block 404, the wireless identity transmitter may broadcast a configuration message indicating there are configuration parameters that can be set in the wireless identity transmitter. For example, the configuration message may include the wireless identity transmitter's identity (or identifier) as well as an indication that a certain number or type of configuration parameters can be set, modified, or initialized by subsequent short-range wireless signals. In an embodiment, the configuration message may include a list of configuration parameters available to be set, such as the transmit interval.

In an alternative embodiment, the configuration message may include an indicator that the wireless identity transmitter is available to receive configuration settings. In such an embodiment, any responding devices, such as proximate proximity broadcast receivers, may transmit responses (e.g., Bluetooth® LE signals) that request the list of configuration parameters. In response to receiving such a request, the mobile proximity broadcast receiver may transmit a second message that includes the list of configuration parameters.

In determination block 406, the wireless identity transmitter may determine whether configuration settings are received, such as in a short-range wireless signal from a proximate proximity broadcast receiver or identity transceiver. The wireless identity transmitter may monitor the short-range radio to determine whether a response is received from a proximate device. A response may be in the form of a simple response packet or pulse that the wireless identity transmitter microcontroller can recognize, or alternatively, an advertisement according to the Bluetooth® LE protocol. If configuration settings are received (i.e., determination block 406="Yes"), in block 408 the wireless identity transmitter may set parameters based on the received configuration settings. For example, the wireless identity transmitter may set a value that indicates how often it transmits broadcast messages. If no configuration settings are received (i.e., determination block 406="No"), or if the wireless identity transmitter performs the operations in block 408, in determination block 410 the wireless identity transmitter may determine whether a configuration period has elapsed. For example, the wireless identity transmitter may evaluate a counter or timer to determine whether a predefined number of seconds (e.g., 60 seconds) have elapsed since the boot-up operations were performed. If the configuration period has not elapsed (i.e., determination block 410="No"), in optional block 411 the wireless identity transmitter may wait a period, such as a number of milliseconds, seconds, etc., and then may continue with the operations in block 404.

However, if the configuration period has elapsed (i.e., determination block 410="Yes"), in block 302' the wireless identity transmitter may broadcast a message including an identifier based on the configuration parameters. For example, the wireless identity transmitter may transmit a broadcast message at a signal strength indicated by configuration parameters set in response to receiving configuration settings (or values) from a nearby proximity broadcast receiver. In optional block 412, the wireless identity transmitter may go to sleep for a period based on the configuration parameters, such as a transmit interval configuration parameter. In block 308, the wireless identity transmitter may generate a new device identifier (e.g., rolling identifier) from an algorithm, and may continue with the operations in block 302'.

In alternate embodiments, the wireless identity transmitter may be configured to receive incoming messages from proximity broadcast receivers based on clock timing (or clock signals), detected inputs from a user (e.g., a detected button press), or information within a previously received signal (e.g., a received message from a proximity broadcast receiver may instruct the wireless identity transmitter to become available for subsequent messages at a particular future time).

Figure 5:
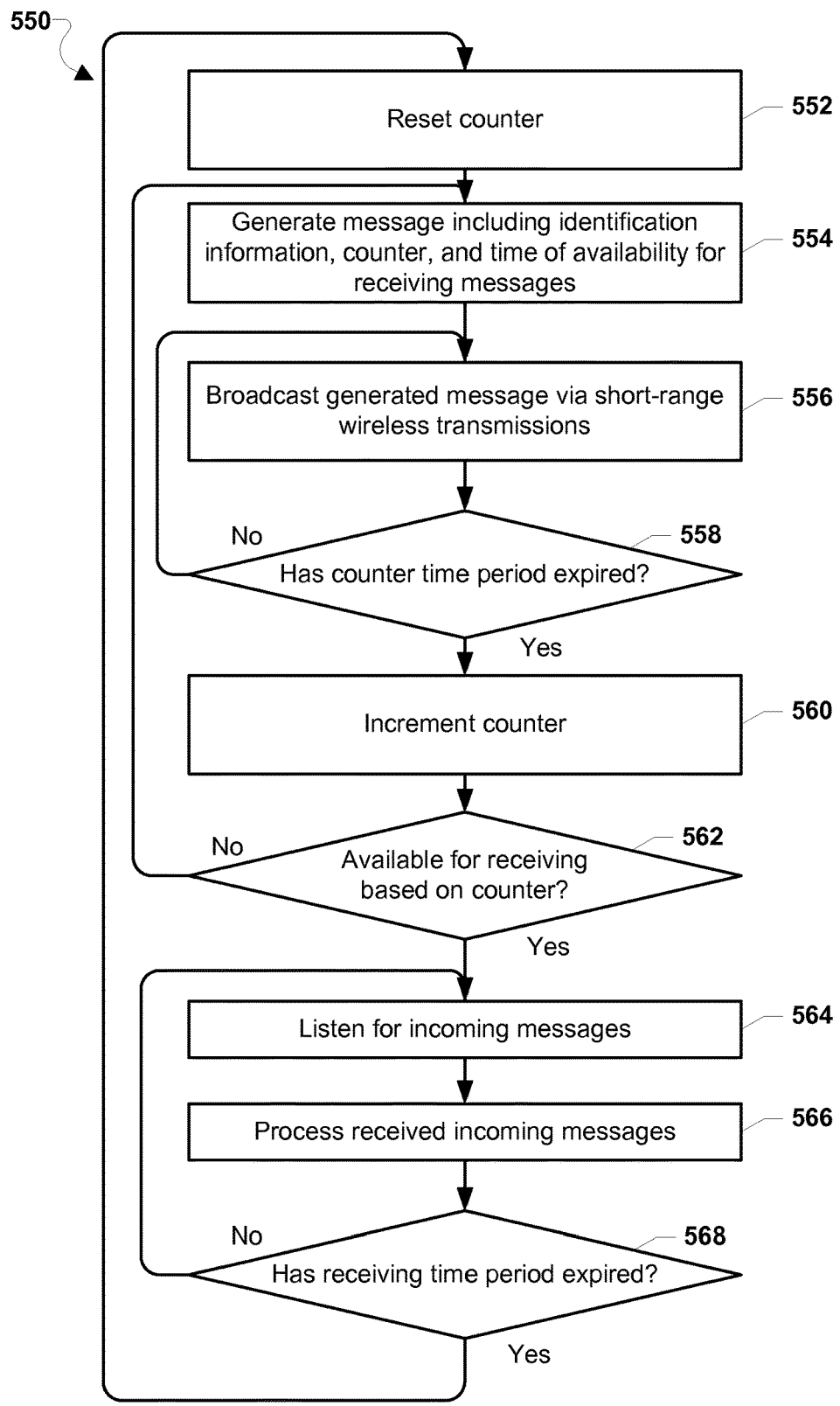
FIG. 5 is a process flow diagram of an embodiment method for a wireless identity transmitter performing two-way wireless communications with a proximity broadcast receiver.

FIG. 5 illustrates an embodiment method 550 for a wireless identity transmitter performing two-way wireless communications with a proximity broadcast receiver. As described above, wireless identity transmitters may typically be used for one-way signaling, such as transmitting broadcast messages for receipt, use, and relay by proximity broadcast receivers. However, wireless identity transmitters may be configured to conduct two-way communications in order to receive firmware, software instructions or trigger signals directing the transmitter to perform certain operations (e.g., activate sensors), configuration data, and other information the wireless identity transmitter may use to transmit broadcast messages. Such two-way communications may be available to wireless identity transmitters that include short-range radio transceivers, such as Bluetooth® radios. However, wireless identity transmitters may be configured to selectively engage in two-way communications with proximity broadcast receivers to minimize power consumption and maximize battery service life. In an embodiment, the wireless identity transmitter may broadcast messages indicating to proximity broadcast receivers a period of time when the wireless identity transmitter may be available for receiving messages from proximity broadcast receivers, and may receive messages for a limited or predefined period of time.

In block 552, the wireless identity transmitter may reset a counter, such as a counter variable to indicate the beginning (or initialization) of a period during which the wireless identity transmitter may not receive messages. The counter may be reset to a zero value and may be incremented up to a predefined number during the operations of the method 550. Alternatively, the counter may be reset or initialized at a predefined number and decremented down to a zero value. The use of a counter variable is merely a non-limiting example technique for the wireless identity transmitter determining when to configure itself for receiving messages. In alternate embodiments, the wireless identity transmitter may instead determine when to be available for receiving incoming messages based on clock timing (or clock signals), detected inputs from a user (e.g., a detected button press), information within a previously received signal (e.g., a received message from a proximity broadcast receiver may instruct the wireless identity transmitter to become available for subsequent messages at a particular future time), or power-cycling (e.g., one such time might be for the sixty seconds after initial boot-up or reboot of the wireless identity transmitter).

In an embodiment, the wireless identity transmitter may be roughly in clock synchronization with or maintain a nonce or counter variable that it is known and roughly tracked by various proximity broadcast receivers (e.g., smartphones, listening radios throughout a place, etc.) and/or a central server. For example, when the wireless identity transmitter is activated (e.g., turned on, initialized by inserting a battery, etc.), a user may register the wireless identity transmitter with a central server that stores the wireless identity transmitter identification along with information that enables the central server to estimate a nonce or counter value or clock timing within the wireless identity transmitter. In an embodiment, such a nonce or counter variable or clock synchronization may be used to disambiguate wireless identity transmitter identities and/or be used as a decryption key for obfuscated or encoded messages. Such registration and synchronization operations are described further below.

In block 554, the wireless identity transmitter may generate a message including identification information, counter, and time of availability for receiving messages. The generated message may include information about the wireless identity transmitter's identity (e.g., a serial code/number, a username, or a rolling identifier). In an embodiment, the generated message may be encrypted, encoded, or otherwise obscured to prevent proximity broadcast receivers from determining the identity of the wireless identity transmitter and/or the user thereof. For example, the generated message may employ a rolling identifier or code known only to the wireless identity transmitter and a central server but not proximity broadcast receivers.

The generated message may also include information indicating a time or condition when the wireless identity transmitter may be available for accepting communications for proximity broadcast receivers. For example, the message may describe the current value of the counter or indicate a count-down timer showing when the wireless identity transmitter may be available. In another embodiment, the generated message may include instructions for proximity broadcast receivers to enable successful transmissions to the wireless identity transmitter. For example, the generated message may contain specifications (e.g., required codes, content, delivery time, etc.) for any messages transmitted by proximity broadcast receivers to the wireless identity transmitter.

In block 556, the transmitter may broadcast the generated message via short-range wireless transmissions, such as Bluetooth® LE packets. If within the range of the short-range broadcasts, a proximity broadcast receiver may receive and process the broadcasts as described below.

The wireless identity transmitter may periodically broadcast the same generated message multiple times for each counter time period. In other words, the wireless identity transmitter may broadcast the generated message more than once before modifying the counter variable value. In determination block 558, the wireless identity transmitter may determine whether the predetermined counter time period has expired. If the counter time period has not expired (i.e., determination block 558="No"), the wireless identity transmitter may continue to broadcast the generated message periodically in block 556.

If the counter time period has expired (i.e., determination block 558="Yes"), in block 560 the wireless identity transmitter may increment the counter and, in determination block 562, determine whether the wireless identity transmitter has become available for receiving messages based on the counter value. For example, the wireless identity transmitter may compare the current counter variable value to a predefined maximum (or minimum) counter value. As stated above, in various other embodiments, the wireless identity transmitter may determine availability for receiving messages based on other evaluations of time or instructions stored within the wireless identity transmitter.

If it is not available to receive messages (i.e., determination block 562="No"), the wireless identity transmitter may continue with the operations in block 554 to generate a new message to broadcast. If the wireless identity transmitter is available to receive messages (i.e., determination block 562="Yes"), in block 564 the wireless identity transmitter may listen for incoming messages, such as by monitoring a receiver circuit for incoming short-range radio transmissions, and in block 566 the wireless identity transmitter may process any received incoming messages, such as with software or operations running on a processor or wireless modem within the wireless identity transmitter.

In determination block 568, the wireless identity transmitter may determine whether the receiving time period has expired. In other words, the wireless identity transmitter may determine whether incoming messages may still be received. The time period for receiving incoming messages may be based on a counter variable maintained by the wireless identity transmitter, a clock signal indication, or information within a received message. If the receiving time period has not expired (i.e., determination block 568="No"), the wireless identity transmitter may continue to listen for incoming messages in block 564. However, if the receiving time period has expired (i.e., determination block 568="Yes"), the wireless identity transmitter may repeat the process by returning to block 552.

Figure 6:
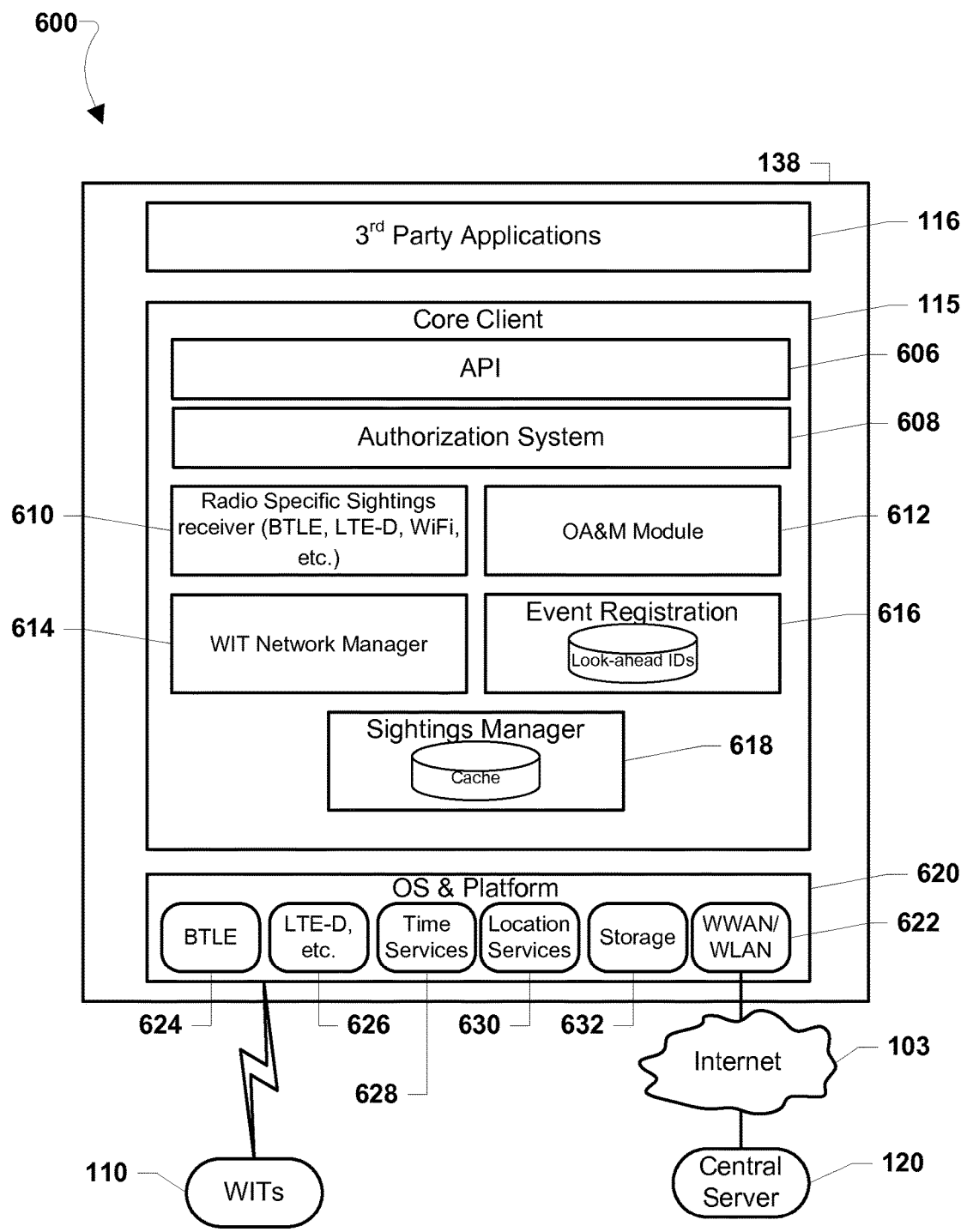
FIG. 6 is a component diagram illustrating various modules within a mobile proximity broadcast receiver suitable for use in various embodiments.

FIG. 6 illustrates various modules within a mobile proximity broadcast receiver 138. As described above, proximity broadcast receivers may include stationary proximity broadcast receivers, such as dedicated devices placed around a building, and mobile proximity broadcast receivers 138, such as mobile devices that are configured to perform operations to receive broadcast messages from wireless identity transmitters 110 and transmit sighting messages over the Internet 103 to a central server 120 via long-range communications (e.g., via WiFi or a cellular network). The various modules and components are described below in the context of elements within a mobile proximity broadcast receiver 138, however in various embodiments, any proximity broadcast receiver, such as a stationary proximity broadcast receiver, may include similar modules and/or components.

The mobile proximity broadcast receiver 138 may include a core client module 115 that may be software, instructions, routines, applications, operations, or other circuitry utilized to process received broadcast messages from proximate wireless identity transmitters 110. The core client module 115 may also handle communications between the proximity broadcast receivers 142, 138 and the central server 120, such as transmitting sighting messages and receiving return messages from the central server 120. For example, the core client module 115 may operate as a background service that performs operations, such as uploading or transmitting sighting messages, without interaction from a user.

The core client module 115 may include an API component 606 that corresponds to application programming interface data, code, or other commands related to broadcast messages and/or sighting messages. For example, the API component 606 may be utilized by a proximity broadcast receiver when listening for Bluetooth® LE advertising packets received from the wireless identity transmitter 110. As another example, the API component 606 may be utilized to register the mobile proximity broadcast receiver 138 to receive notifications, alerts, or other communications corresponding to wireless identity transmitters 110. The core client module 115 may also include an authorization system component 608 for processing received broadcast messages. For example, the mobile proximity broadcast receiver 138 may support oAuth for authorization requests and xAuth for approved communication partners. The core client module 115 may also include a radio specific sightings receiver component 610 (e.g., a component for handling Bluetooth® LE, LTE-D, WiFi, and other communications), an operations, administration, and management module 612, a wireless identity transmitter network manager component 614, an event registration component 616 that relates to stored look-ahead identifiers, and a sightings manager component 618. In an embodiment, the event registration component 616 may store numerous rolling identifiers downloaded from the central server 120 and corresponding to a particular wireless identity transmitter 110, such as a set of rolling identifiers that may match possible rolling identifiers broadcast by the wireless identity transmitter 110 during a certain time window.

Like many modern mobile devices, the mobile proximity broadcast receiver 138 may be configured to execute third-party applications (or "apps"), and thus may include a third-party applications module 116 that may execute, manage, and otherwise perform software instructions and routines related to applications provided by various third-parties (e.g., merchants). For example, the third-party applications module 116 may receive various data from the core client module 115 to be used by various third-party applications. For illustration purposes, a third-party application related to a department store that is registered with the central server 120 may be configured to receive notifications from the core client module 115 when the user of the mobile proximity broadcast receiver 138 enters, remains, and/or leaves the department store (e.g., a geofence of the store). In an embodiment, for optimization purposes, applications or apps executing via the third-party applications module 116 may register or otherwise be configured to received notifications from the core client module 115 when particular wireless identity transmitters are within proximity, or alternatively, leave proximity. For example, applications may register in advance with the core client module 115 to receive event notifications that indicate whether a particular wireless identity transmitter enters proximity, stays within proximity (e.g., standing nearby and not moving), or leaves proximity of a proximity broadcast receiver.

The mobile proximity broadcast receiver 138 may also include an operating system and platform module 620 for performing various operations and managing circuitry, such as short-range signal receiver circuitry. In particular, the operating system and platform module 620 may include a Bluetooth® Low Energy module 624 for processing communications utilizing Bluetooth® LE protocols, a cellular network module 626 for processing communications corresponding to various cellular and similar long-range wireless networks (e.g., LTE-D, etc.). The operating system and platform module 620 may also include a time services component 628 that may track time and generate timestamp data, a location services component 630 that may maintain low-precision location data or alternatively more precise GPS (or A-GPS) location data, a storage component 632, and a wireless wide area network/wireless local area network component 622 for enabling communications via WiFi or other wireless networks.

In an embodiment, the core client module 115 may request from the central server sets of wireless identity transmitter identifiers (e.g., rolling identifiers of all transmitters on an interested list, identifiers for all transmitters owned by a user, etc.). Such sets may correspond to wireless identity transmitters that are currently in use and are expected to be in use for some period of time.

Figure 7:
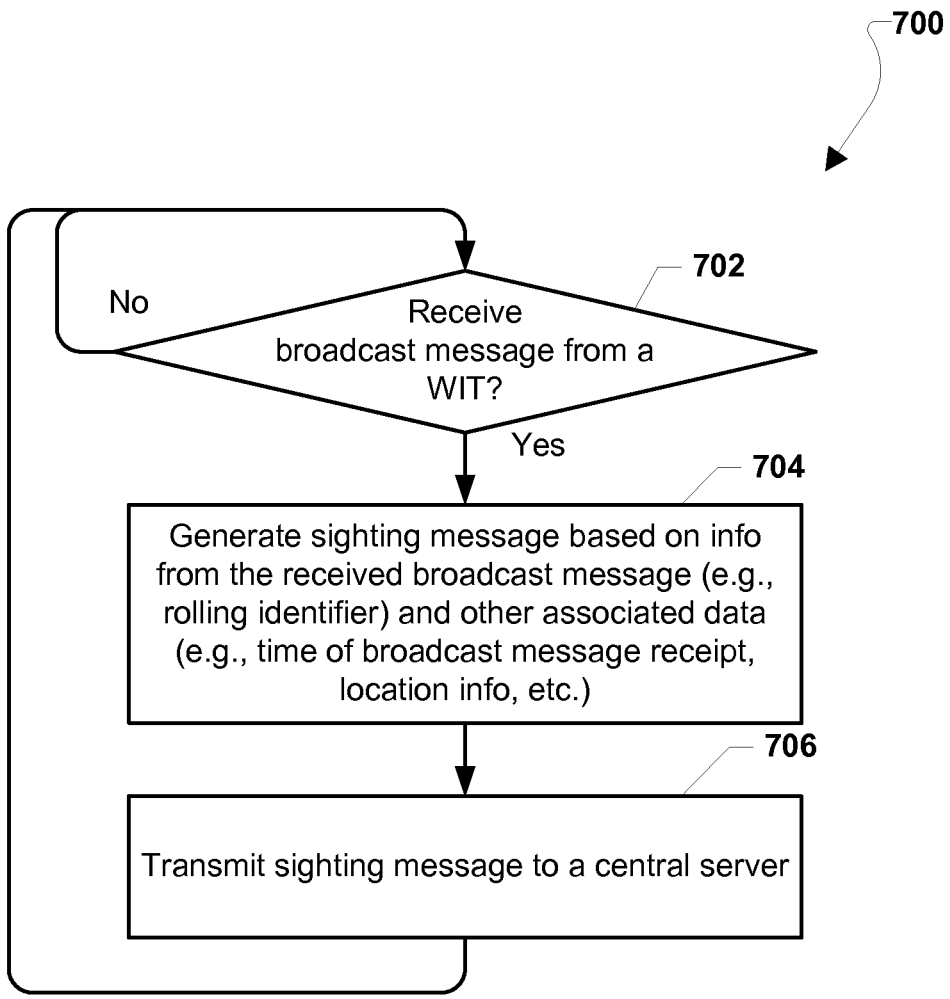
FIG. 7 is a process flow diagram illustrating an embodiment method of a mobile proximity broadcast receiver relaying a wireless identity transmitter's identifier along with other data such as a time or location.

FIG. 7 illustrates an embodiment method 700 that may be implemented on a proximity broadcast receiver, such as a stationary proximity broadcast receiver or a mobile proximity broadcast receiver. In determination block 702, the proximity broadcast receiver may determine whether a broadcast message is received. For example, the proximity broadcast receiver may begin listening for broadcast advertisement packets or pairing attempts by wireless identity transmitters. As discussed above, in the passive mode/embodiment, the proximity broadcast receiver may continuously be in a monitoring mode, or begin listening for particular identifiers in response to an alert (or search activation message) received from a central server. In embodiments in which pairing takes place, the pairing may be established automatically if the proximity broadcast receiver is set to pair with any wireless identity transmitter without using a key, by using a key saved from a previous pairing with the wireless identity transmitter, or by using a key received from a central server. If the proximity broadcast receiver does not receive a broadcast message (i.e., determination block 702="No"), the proximity broadcast receiver may continue with the operations in determination block 702.

If the proximity broadcast receiver receives a broadcast message (i.e., determination block 702="Yes"), in block 704 the proximity broadcast receiver may generate a sighting message based on information from the received broadcast message and other associated data. In particular, the sighting message may include an identifier specific to the wireless identity transmitter that transmitted the received broadcast message, such as a rolling identifier (i.e., an encoded device identifier), MAC address, or other unique code that may be used to identify the particular wireless identity transmitter. In alternate embodiments, the wireless identity transmitter's identifier may be received as part of a pairing process. The other associated data may include various information related to the receipt of the broadcast message, such as the time the proximity broadcast receiver received the broadcast message, location information, the proximity broadcast receiver's identification information, related services (e.g., associated merchants), and signal strength information. In other words, the proximity broadcast receiver may associate data about present conditions (e.g., a timestamp, GPS coordinates, Cell ID of the closest base station, etc.) with the broadcast message and/or the wireless identity transmitter's identifier. This data may be stored in any of various types of data structures, such as an array with one or more identifiers associated with timestamps and GPS coordinates from when the sighting corresponding to each identifier occurred. In an embodiment, the sighting message may include authentication data, such as a digital certificate or code, that may be used by a central server to confirm the identity of the proximity broadcast receiver. For example, within the metadata of the sighting message, the proximity broadcast receiver may include a special hash code known only to the proximity broadcast receiver and the central server.

In block 706, the proximity broadcast receiver may transmit the sighting message to a central server, such as via a cellular (e.g., an LTE, 3G, or 4G network) or other network and the Internet as discussed above with reference to FIGS. 2A-2B. Upon reporting a contact event by transmitting the sighting message, the proximity broadcast receiver may promptly return to perform the operations in determination block 702 and await further broadcasts from wireless identity transmitters. This enables the proximity broadcast receiver to continuously report contact events to the central server.

Figure 8:
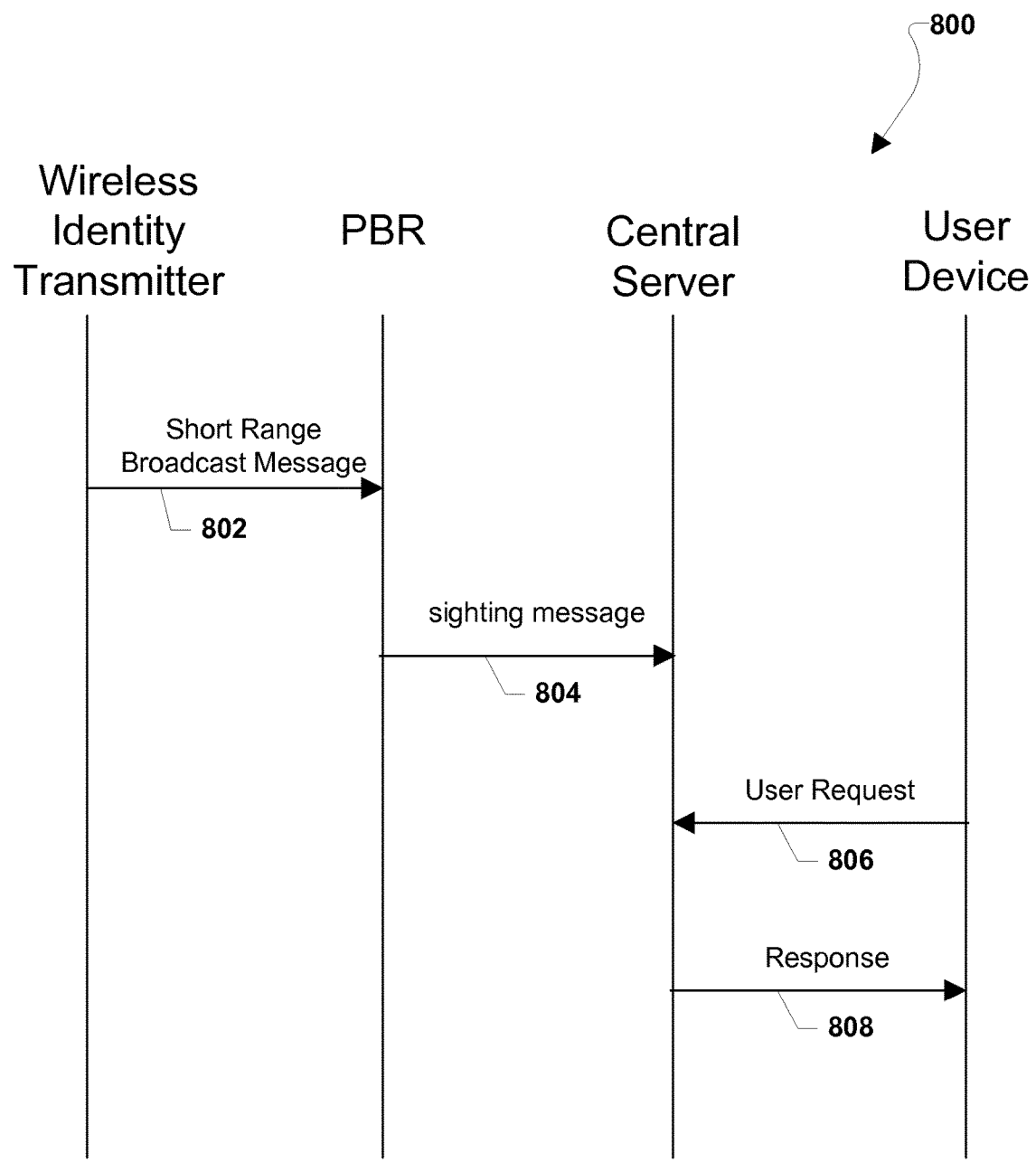
FIG. 8 is a call flow diagram for responding to a user request for a wireless identity transmitter's location in accordance with various embodiments.

FIG. 8 is a call flow diagram 800 illustrating communications during various embodiments. A wireless identity transmitter 110 may transmit a short range broadcast message 802 (e.g., a Bluetooth® LE signal) to a proximity broadcast receiver, such as a mobile proximity broadcast receiver (e.g., a mobile device, cellular phone, etc.) or various other proximity broadcast receivers as discussed above. The broadcast message 802 may contain an identifier for the wireless identity transmitter. The proximity broadcast receiver may transmit (or upload) the wireless identity transmitter's identifier along with any associated data (e.g., timestamp, GPS coordinates, Cell ID, etc.) as a sighting message 804 to a central server 120. The central server 120 may receive the sighting message 804 and store many different identifiers from one or more proximity broadcast receivers.

In some embodiments, identifiers and the associated data may be transmitted (or uploaded) to the central server without any of a user's personal data to protect privacy. In the various embodiments attempting to leverage personal mobile phones, the phone users may opt-in as mobile proximity broadcast receivers. However, these phone users may refuse to opt-in if they fear that personally identifiable data will also be transmitted to the central server. Therefore, an application for uploading received identifiers installed on these personal mobile devices (i.e., mobile proximity broadcast receivers) may prohibit transmission of personal data or other data that may identify the mobile proximity broadcast receivers.

The central server 120 may receive a user request 806 from a user device, such as a terminal 124 or a mobile device, requesting the location of a wireless identity transmitter. This request may be sent by a user after logging into an account associated with a particular wireless identity transmitter. For example, each wireless identity transmitter may be registered with an authenticated user such that a request 806 for the registered wireless identity transmitter's location can only be transmitted after the authenticated user logs into a secure account.

After receiving a user request 806, the central server 120 may search through the previously reported wireless identity transmitter identifiers that are received via sighting messages to find any matches with the identifier of the requested wireless identity transmitter. Any matches could be reported to the user in a response 808. The response 808 may also include associated data (e.g. timestamp, GPS coordinates, Cell ID) within the sighting message 804. A user may use this associated data to help locate or track the wireless identity transmitter (e.g., a mother could look for a lost child at the latest location reported for the child's wireless identity transmitter).

Figure 9:
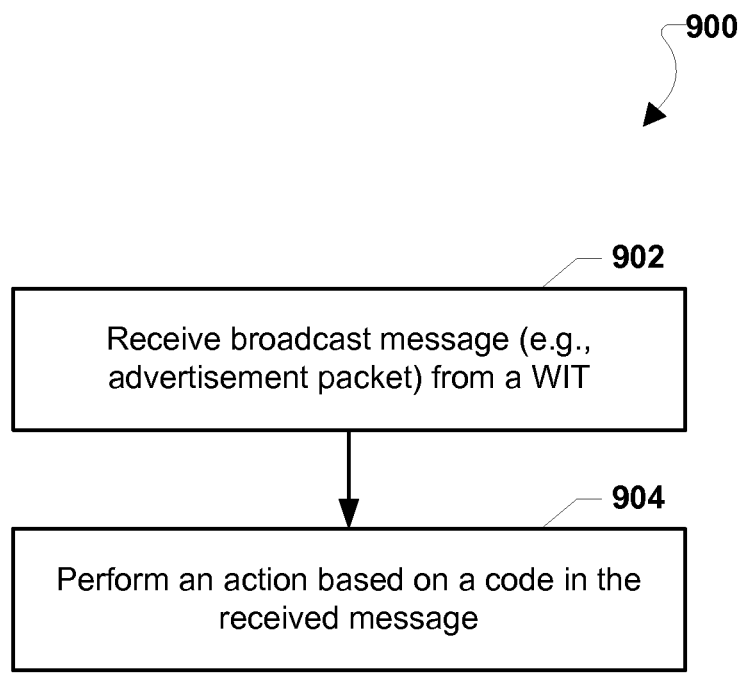
FIG. 9 is a process flow diagram illustrating an embodiment method of performing code within a received broadcast message.

FIG. 9 illustrates an embodiment method 900 for including a type or command segment. In block 902, a proximity broadcast receiver may receive a broadcast message, such as a broadcast advertising packet, from a wireless identity transmitter (referred to as "WIT" in FIG. 9). In alternate embodiments, this message may be sent over a connection established by pairing or as part of the pairing procedure. The broadcast message may contain an identifier segment, as well as an additional segment or code, such as a type segment or command segment. The proximity broadcast receiver may perform an action based on this code in the received broadcast message in block 904. In various embodiments, this action may include any operation the proximity broadcast receiver is capable of performing. For example, the proximity broadcast receiver may assign different levels of priority to messages or identifiers based on a type segment or command segment (e.g., child safety devices have higher priority than security tags from stores). Received messages or identifiers with higher priority may be transmitted to a central server first or deleted last from a proximity broadcast receiver's local log.

A proximity broadcast receiver may handle the broadcast message or identifier differently based on a type or command segment. For example, the message may be stored locally for a certain time (e.g., various times depending on the value of the segment) prior to being transmitted to a central server. Alternatively, the message or identifier, along with any associated data such as timestamps and GPS coordinates, may be transmitted to multiple locations.

As another example, a proximity broadcast receiver may initiate various communications based on the type and/or command segments. The proximity broadcast receiver may report to particular URLs, transmit an SMS message, initiate a phone call, or establish new network connections. In various embodiments, some of these actions may be optionally disabled to protect user privacy.

In further embodiments, the proximity broadcast receiver may be configured to transmit the additional segment or other message to another network device for the other network device to take some action. For example, the proximity broadcast receiver may forward the message along with associated data to the central server. The central server may perform an action based on the additional segment in the message, such as automatically sending a message to a user without waiting for a user request.

Figure 10:
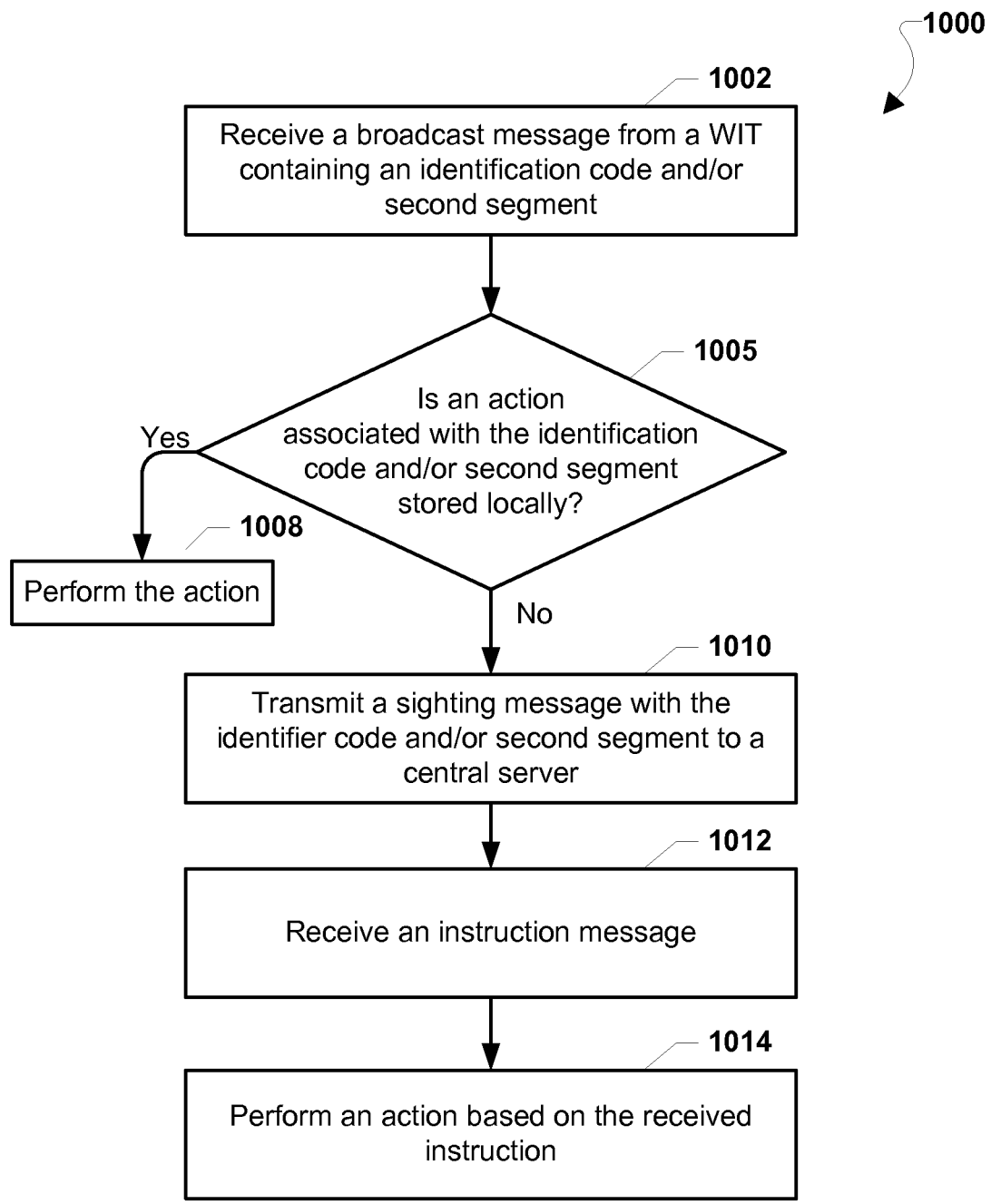
FIG. 10 is a process flow diagram illustrating an embodiment method of receiving an instruction from a central server in response to transmitting a sighting message based on proximity to a wireless identity transmitter.

FIG. 10 illustrates an embodiment method 1000 for providing content based on proximity to a wireless identity transmitter. A proximity broadcast receiver may receive a broadcast message from a wireless identity transmitter (referred to as "WIT" in FIG. 10) containing an identification code and/or second segment in block 1002. The proximity broadcast receiver may determine whether an action associated with the identification code and/or second segment is stored locally (e.g., in the proximity broadcast receiver's memory) in determination block 1005. If an associated action is found locally (i.e., determination block 1005=Yes), the action may be performed by the proximity broadcast receiver in block 1008.

If an associated action is not found locally (i.e., determination block 1005=No), the proximity broadcast receiver may transmit a sighting message with the identifier and/or second segment to a central server in block 1010. In an embodiment, the proximity broadcast receiver may transmit a message to another device, such as a user device. The proximity broadcast receiver may receive an instruction message in block 1012. This instruction may be sent by the central server or other device in response to the sighting message with the identifier and/or second segment. In block 1014, the proximity broadcast receiver may perform an action based on the received instruction message, such as access content by going to a web page or other online resource. In alternate embodiments, the proximity broadcast receiver may skip the determination block 1005 and automatically proceed to either transmit a sighting message in block 1010 or attempt to perform an action stored locally.

A proximity-based content publishing system may be used for a wide range of activities. For example, teens may carry a wireless identity transmitter with them that they point to their social networking pages (e.g., Facebook®). When they are proximate to friends, the pages can be quickly accessed on proximity broadcast receivers (i.e., mobile phones configured to operate as mobile proximity broadcast receivers). Realtors may setup a web page for a home and affix to the home's signpost a wireless identity transmitter pointing to the web page so that anyone driving by the home can access that information. Stores may include wireless identity transmitters with products to provide dynamic displays such as links to coupons, customer reports, or additional nutritional information. If a lost dog has a wireless identity transmitter on its collar, instead of trying to wrestle the dog for access to his collar, a proximity broadcast receiver may simply access the wireless identity transmitter and send a message or call the owner.

The various features and alternative actions may enable the system to have flexible and extensible functionality. The functionality could be added later as the actions taken are controlled by applications that may be updated in proximity broadcast receivers over time.

Figure 11:
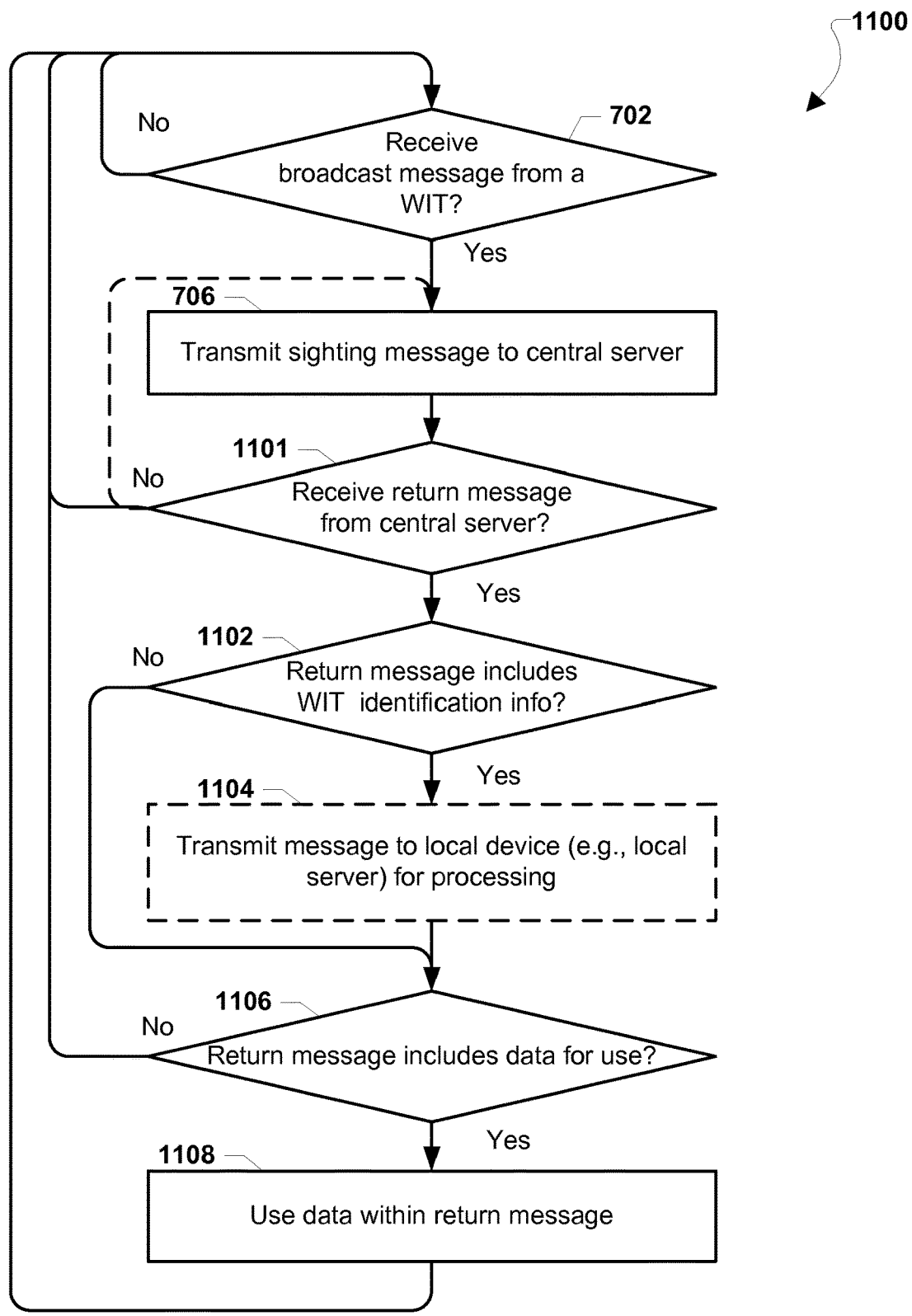
FIG. 11 is a process flow diagram illustrating an embodiment method for a proximity broadcast receiver relaying a received broadcast message to and receiving a return message from a central server.

FIG. 11 illustrates an embodiment method 1100 for a proximity broadcast receiver relaying a broadcast message to and receiving a return message from a central server. Proximity broadcast receivers may be connected to facilities, such as houses, stores, gyms, schools, etc., and may be configured to execute various operations relating to those facilities. For example, a proximity broadcast receiver may be contained within equipment that executes software routines. Such proximity broadcast receivers may be configured to execute particular routines in response to receiving broadcast messages from a wireless identity transmitter (referred to as "WIT" in FIG. 11). For example, the proximity broadcast receiver may modify the execution of operations to suit preferences of the user of the wireless identity transmitter.

However, as discussed above, the wireless identity transmitter may obscure, encode, or encrypt data within broadcast messages to protect the privacy and identity of the wireless identity transmitter user. For example, the broadcast messages may not transmit the user's identity in the clear. To determine the identity information related to received broadcast messages, the proximity broadcast receiver may relay the broadcast messages to the central server, which may identify the wireless identity transmitter and its user based on information in the messages (e.g., a disguised, rolled, or encrypted device ID). As discussed above, the central server may store a secret to decrypt messages transmitted by the wireless identity transmitter. In response to receiving a sighting message, the central server may transmit a return message to the proximity broadcast receiver including identification information of the wireless identity transmitter.

In an embodiment, the central server may also store additional information relevant to the operations of the facility associated with the proximity broadcast receiver. For example, the central server may be an information hub that stores proprietary information related to the operations of the facility the proximity broadcast receiver is within. As another example, the central server may contain instructions for the proximity broadcast receiver to perform based on the identity of the wireless identity transmitter. Accordingly, the central server may transmit a return message that may not identify the wireless identity transmitter (or its user) related to a sighting message, but may instead includes data relevant to the wireless identity transmitter. In various embodiments, return messages may include or not include either data or identification information based on the preferences of the user of the wireless identity transmitter and/or the services associated with the proximity broadcast receiver. For example, the proximity broadcast receiver may be registered as relating to a trusted service for the user of the wireless identity transmitter, and therefore the central server may transmit return messages that identify the user. As another example, the user of the wireless identity transmitter may have set privacy permissions (or settings) during a registration procedure with the central server that enable anonymous data to be distributed to proximity broadcast receivers. Privacy permissions are further discussed below.

In determination block 702, the proximity broadcast receiver may determine whether a broadcast message is received, such as from a wireless identity transmitter. If no broadcast message is received (i.e., determination block 702="No"), the proximity broadcast receiver may continue with the operations in determination block 702. If a broadcast message is received (i.e., determination block 702="Yes"), in block 706 the proximity broadcast receiver may transmit a sighting message to a central server. For example, the sighting message may include identification information of the wireless identity transmitter as well as associated data, such as the location of the proximity broadcast receiver and a timestamp. In determination block 1101, the proximity broadcast receiver may determine whether a return message from the central server is received. In an embodiment, the proximity broadcast receiver may record identification information about the sighting message and may compare that information to received messages to find a match. If no return message is received (i.e., determination block 1101="No"), the proximity broadcast receiver may continue with the operations in determination block 702. Alternatively, if no return message is received (i.e., determination block 1101="No"), the proximity broadcast receiver may optionally re-transmit the sighting message to the central server in block 706. In an embodiment, the proximity broadcast receiver may retransmit sighting messages a predefined number of times over a period of time when no return message is received.

When a return message is received (i.e., determination block 1101="Yes"), in determination block 1102 the proximity broadcast receiver may determine whether the return message includes wireless identity transmitter identification information. For example, identification information may include user names, addresses, sensitive information (e.g., social security number, banking information, passwords, etc.), and other data describing the wireless identity transmitter and/or the user of the wireless identity transmitter. If the return message does contain identification information (i.e., determination block 1102="Yes"), in optional block 1104 the proximity broadcast receiver may transmit a message to a local device, such as a local server, for processing. In other words, the proximity broadcast receiver may relay the identification information in the return message to a local device associated with proximity broadcast receiver and/or the facility in which the proximity broadcast receiver is located. For example, the proximity broadcast receiver may transmit the identification information of the wireless identity transmitter to a local computing device of a gym, retail store, a school, or other third-party that may in turn determine instructions for the proximity broadcast receiver based on the identification information. In an embodiment, the local device may store the identification information and/or relate the information to database data for further use with the various related devices of the facility.

If the return message does not include identification information (i.e., determination block 1102="No") or the proximity broadcast receiver transmits a message to the local device in optional block 1104, the proximity broadcast receiver may determine whether the return message includes other data for use, such as by the proximity broadcast receiver or other devices associated with the proximity broadcast receiver in determination block 1106. For example, the return message may include commands or instructions for the proximity broadcast receiver to perform. Additionally, the data may contain configuration data (or configuration information) that may be used by various devices to accommodate the wireless identity transmitter and/or the preferences of the wireless identity transmitter's user. For example, the return message may contain software instructions for the proximity broadcast receiver to use or transfer to the local device, the wireless identity transmitter, or various other associated devices. If the return message includes data for use (i.e., determination block 1106="Yes"), in block 1108 the proximity broadcast receiver may use the data within the return message. For example, the proximity broadcast receiver may execute operations to utilize configuration data from the return message (e.g., set equipment to suit the user's preferences). If the return message does not contain data for use by the proximity broadcast receiver (i.e., determination block 1106="No"), the proximity broadcast receiver may continue with the operations in determination block 702.

As a non-limiting, illustrative example: the proximity broadcast receiver may be connected to a piece of exercise equipment within a fitness facility that is registered with a central server (i.e., the facility relates to a registered service). When the proximity broadcast receiver receives a broadcast message from the wireless identity transmitter carried by a user intending to work-out on the exercise equipment, the proximity broadcast receiver may transmit a sighting message to the central server. The proximity broadcast receiver may receive a return message from the central server that includes data which may be used to configure the exercise equipment to suit the anatomical dimensions and preferences of the user of the wireless identity transmitter without necessarily sharing the user's identity. For example, the proximity broadcast receiver may use the data to adjust the height of the equipment's seat or pedals. As another example, the data may define a workout routine to be executed on the exercise equipment. Alternatively, the return message may include the user's fitness facility identification, which the proximity broadcast receiver may transmit to a local server (e.g., a gym administrative server). The local server may compare the user's fitness facility identification to a local database and in response to the comparison, may transmit personalized configuration instructions to the proximity broadcast receiver and exercise equipment. Other non-limiting but illustrative applications of return message data may include configuring rental cars (e.g., seat positions, settings, etc.) and computer components (e.g., mouse, keyboards, etc.) for personalized use by the user of the wireless identity transmitter.

In an embodiment, return messages may include identification information such as photographic imagery useful to identify the user of the wireless identity transmitter. For example, in response to receiving a return message identifying the user of the wireless identity transmitter, the proximity broadcast receiver may display an image of the user or a sample of the user's handwriting (e.g., a signature). This functionality may be used by emergency personnel, citizens on alert, or merchants when attempting to quickly verify the identity of a person (e.g., a missing child, customer, etc.) equipped with a wireless identity transmitter. In another embodiment, a merchant's proximity broadcast receiver engaged in a business transaction (e.g., a point-of-sale device with an embedded proximity broadcast receiver) may transmit a sighting message including information broadcast by a proximate user's wireless identity transmitter. The resulting return message may include confirmation that the identities of the registered user of the wireless identity transmitter and the user match (i.e., the in-store person matches the user indicated in the central server as relating to the wireless identity transmitter). Additionally, if the identities are the same, the return message may include additional information to assist in the transactions, such as payment information, credit card numbers, or contact information for follow-up communications.

In another embodiment, the return message from the central server may include software instructions and/or data that may cause the proximity broadcast receiver to modify, adjust, remove, activate, or disable components, sensors, features, software, and/or functions of the proximity broadcast receiver. For example, the return message may include software instructions that the proximity broadcast receiver executes upon receiving the return message, or triggers the proximity broadcast receiver to execute a pre-loaded routine or enter a particular operating mode. Such software instructions may define operations the proximity broadcast receiver may execute that configure the proximity broadcast receiver, such as activating (or de-activating) a camera component, a cellular network modem, speaker systems, WiFi transceivers, etc. As another example, the return message may instruct the proximity broadcast receiver, such as a smartphone configured to operate as a mobile proximity broadcast receiver, to execute an application, transmit a message (e.g., email, SMS, short-range radio signal, etc.), or turn itself off. Software instructions within such return messages may include timing information that indicates when affected components, sensors, features, software, and/or functions may be configured and/or re-configured. For example, the return message may include instructions that cause the proximity broadcast receiver to disable a microphone for a certain period of time. In an embodiment, the proximity broadcast receiver may be configured to reverse any modifications, adjustments, operating mode selections, or other configurations identified in return message software instructions after a period of time and/or when the proximity broadcast receiver no longer receives broadcast messages from wireless identity transmitters related to the return message. For example, the proximity broadcast receiver may disable the speakers on the proximity broadcast receiver so long as the proximity broadcast receiver receives broadcast messages from the wireless identity transmitter. In another embodiment, the proximity broadcast receiver may modify, adjust, remove, activate, or disable components, sensors, features, software, and/or functions of the proximity broadcast receiver based on information within received broadcast messages. For example, the proximity broadcast receiver may process a received broadcast message and execute detected software instructions that direct the proximity broadcast receiver to disable a sensor, such as a camera.

Figure 12:
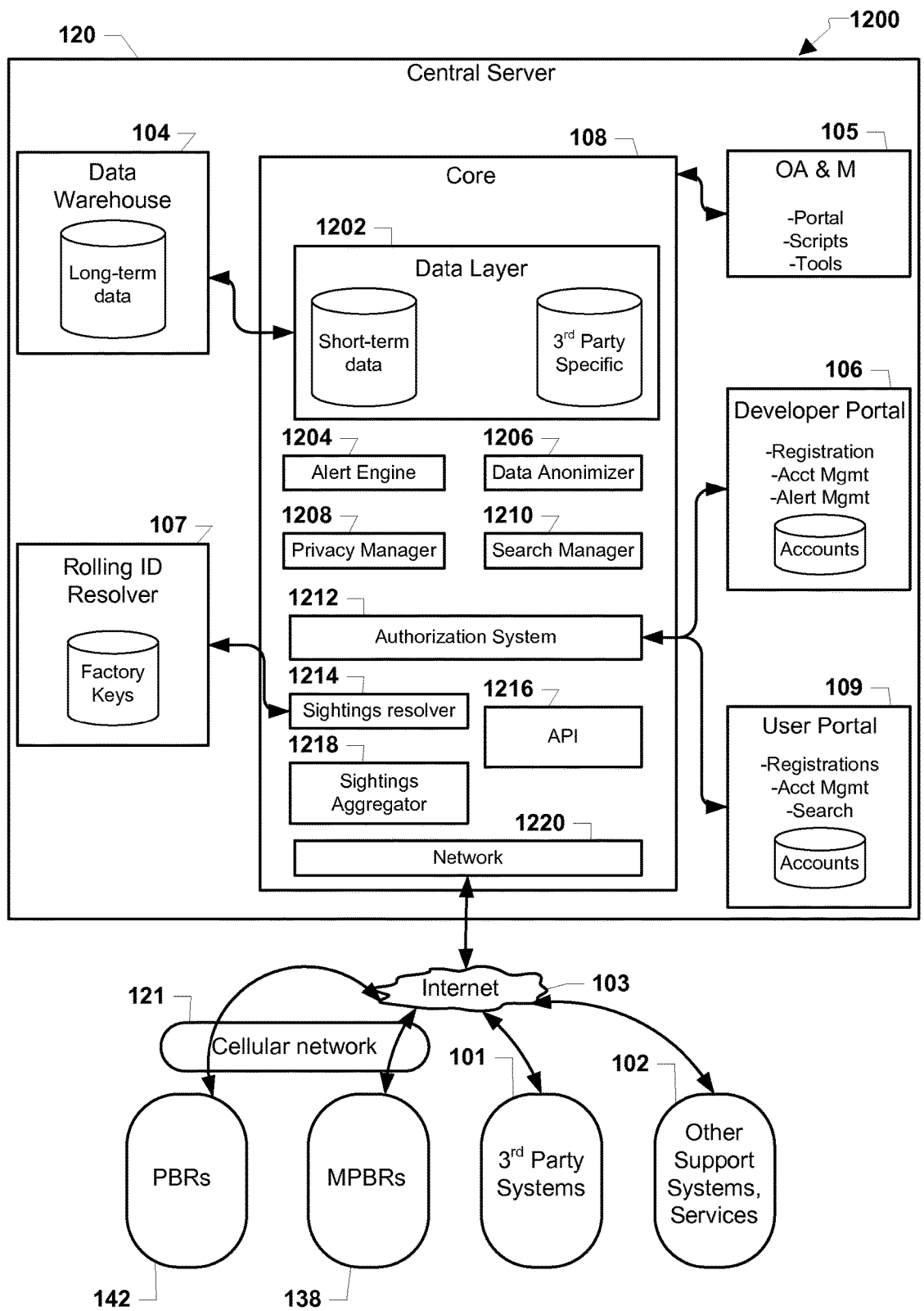
FIG. 12 is a component diagram illustrating various modules within a central server suitable for use in various embodiments.

FIG. 12 illustrates a diagram 1200 of various modules within a central server 120. The various modules and components are described below in the context of modules, components, and/or elements within a central server 120. However, in various embodiments, the central server 120 may include or be connected to individual computing devices, server blades, or other units that may perform the operations associated with the various modules and/or components described below.

As described above with reference to FIG. 1, the central server 120 may be configured to receive, store, and otherwise process data corresponding to wireless identity transmitters. For example, the central server 120 may be configured to exchange communications with various devices via the Internet 103, such as proximity broadcast receivers 142 and mobile proximity broadcast receivers 138 communicating via a cellular network 121, third-party systems 101, and other support systems and/or services 102.

The central server 120 may include several components 104-109 to perform various operations to process data, such as received from proximity broadcast receivers 142, 138, third-party systems 101, or other support systems and/or services 102. In particular, the central server 120 may include a core component 108 that may process sighting messages, execute an alert or notice engine module, handle application programming interface (API) commands, and exchange data with other components within the central server 120. The core component 108 may include a data layer module 1202 that may include units for storing short-term data and third-party specific data. The core component 108 may also include an alert engine module 1204 for generating alert messages for transmissions to proximity broadcast receivers and initiating searches of various target wireless identity transmitters. The core component 108 may further include a data anonimizer module 1206 that may generate generic, anonymous, or otherwise processed data based on privacy policies or profile preferences of users. For example, the data anonimizer module 1206 may strip personal information from return messages transmitted to a proximity broadcast receiver associated with a store so that a customer user of a wireless identity transmitter is not identified to the store, but the fact that the user is within the store is still reported to the store. The core component 108 may also include a privacy manager module 1208 that may maintain privacy permission information for various users. For example, the privacy manager module 1208 may include a database of privacy parameters provided by users at registration. In an embodiment, the data anonimizer module 1206 and/or the privacy manager module 1208 may utilize the permissions described below.

The core component 108 may also include a search manager module 1210 for assisting in organizing and administering searches and an authorization system module 1212. The core component 108 may further include a sightings resolver module 1214 that may be utilized by the central server 120 for identifying wireless identity transmitters associated with broadcast messages reported within received sighting messages from proximity broadcast receivers 142, 138. The core component 108 may include an API module 1216 that may include functions and interfaces for initiating operations, a sightings aggregator module 1218 for compounding various sighting messages over a period for transmissions in consolidated form to merchants, third-parties, and other services. The core component 108 may also include a network module 1220 for transmitting and receiving various communications with devices, such as proximity broadcast receivers 142, 138 and third-party systems 101 via the Internet.

The central server 120 may also include a data warehouse component 104 that may store long-term data (e.g., archived user data, past location information, etc.). The data warehouse component 104 may include various databases for storing information pertinent to users of wireless identity transmitters, such as profile information provided by users via registration websites. The data warehouse component 104 may be configured to exchange data with the data layer module 1202 of the core component 108. The central server 120 may also include an operations, administration, and management component 105 that may process and/or store software associated with user portal accesses, scripts, and tools (e.g., software utilities, routines, etc.). The operations, administration, and management component 105 may be configured to exchange data with the core component 108.

The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a user portal component 109 that may store user account data and perform registration, account management, and search routines associated with users, such as persons associated with wireless identity transmitters. The user portal component 109 and developer portal component 106 may be configured to exchange data with the authorization system module 1212 of the core component 108. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The rolling identifier (or ID) resolver component 107 may be configured to exchange data with the sightings resolver module 1214 of the core component 108.

In various embodiments, the modules and components described with reference to FIG. 12, such as the rolling ID resolver component 107, may be performed or otherwise enabled by software instructions, applications, routines, threads, circuitry, or hardware units.

Figure 13:
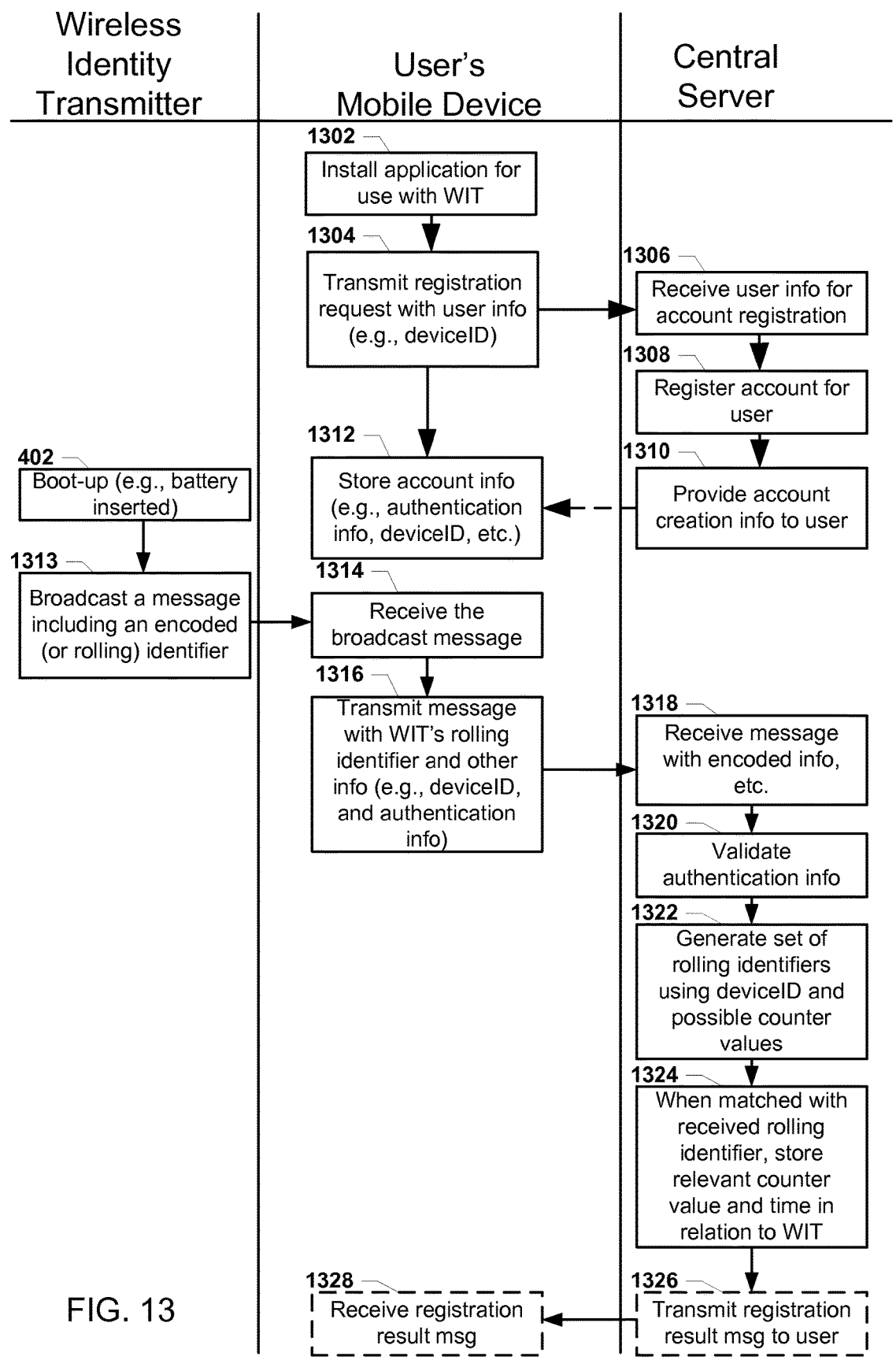
FIG. 13 is a diagram illustrating a wireless identity transmitter registration process for use in various embodiments.

FIG. 13 illustrates a wireless identity transmitter registration process for use in various embodiments. In general, before broadcast messages may be processed by a central server, the central server may require that wireless identity transmitters and their users be registered with the central server. For example, before any tracking, searching, or other location-based activities related to a wireless identity transmitter can be initiated, the central server must be able to determine the users associated with the various wireless identity transmitters circulating in the world. Registration may create links between identifiers transmitted by wireless identity transmitters in broadcast messages, the wireless identity transmitters, and their users. For example, in order to transmit a notification to a missing child's parents that the child has been found, relayed obfuscated (or encoded) identifiers must be matched to account information that indicates the parents' cell phone numbers as stored in relation to a registered user account.

In particular, through registration, a timing mechanism may be synchronized between each wireless identity transmitter and the central server (i.e., a counter). With such a counter, a wireless identity transmitter and the central server may encode (or roll) and decode identifiers respectively, keeping the identity associated with the wireless identity transmitter (and its users) concealed and private. The most appropriate time to synchronize such a timing mechanism or counter may be during a device registration and/or account creation process as described below. For the purpose of FIG. 13, a mobile device, such as a smartphone, is described as being used by a user to perform account creation and registration operations (e.g., the mobile device accesses a web portal to register with the central server, etc.). However, any computing device connected to the Internet and capable of exchanging communications with the central server via a registration web portal or website may be relevant.

In block 1302, a user's mobile device (e.g., an iPhone, Android, tablet device, etc.) may install an application for use with wireless identity transmitters. Such an application (or "app") may execute on the mobile device's processor as a background service or alternatively may be activated for selective use by the user. As described throughout this disclosure, such an application may enable the mobile device to process short-range broadcast messages from proximate wireless identity transmitters, such as by identifying received signals as broadcast messages and relaying sighting messages having location information to the central server in response. In block 1304, the mobile device may transmit a registration request with user information (e.g., a device identity or "deviceID"). The registration request may be sent to the central server via Internet communications with a web portal, web site, or web server controlled or otherwise accessible by the central server. In other words, the mobile device may invoke the registration process or by providing user information (e.g., device ID) through the installed app by providing the device ID (deviceID) and other information the central server may utilize to bind the registration request to an account. For example, the user's mobile device may access a registration website, receive inputs from the user, and transmit the user input as data to the registration website for use by the central server as described above with reference to FIG. 12. In an embodiment, the user information may include personal information about the user, such as name, address, contact information (e.g., social network sites, cell phone number, email address, telephone number, etc.) age, and other demographic information, as well as identifying information about wireless identity transmitters and/or proximity broadcast receivers that may be associated with the user's account. For example, the user information transmitted to the central server may include the serial number on a wireless identity transmitter and/or a confirmation code produced by the mobile device in response to installing the application with the operations in block 1302. The user information may also include preference information, such as the user's preferred retails stores, product lines, and areas to eat or consume. The user information may further include privacy permissions that indicate how personal information may be distributed or used by the central server, such as discussed below. In an embodiment, users may register as anonymous users, such that the central server does not store any identifying information about the users. For example, an account may be registered that is linked to a non-descript post office box, a disposable cellular telephone number, or other contact information that does not directly identify the user or the holder of the account. This may be important for those who may choose to utilize services provided by the central server, but who are concerned about leaked private or identifying information. In block 1312, the user's mobile device may store account information, such as authentication information (e.g., codes, messages) from the central server or device ID associated with an owned wireless identity transmitter.

In block 1306, the central server may receive the user information for account registration. In block 1308, the central server may register an account for the user. For example, the central server may store the user's information, including provided device identifications, in a database of all registered users. In block 1310 the central server may provide account creation information to the user. The account creation information may include an authentication code or other information the user's mobile device may store for future use. For example, the central server may display confirmation of account creation on a website accessible by the user's mobile device or alternatively may transmit a confirmation signal, text message, email, or other communication to the user's mobile device.

In block 402, the wireless identity transmitter boots-up, such as in response to the user inserting a battery. When the wireless identity transmitter boots up, a nonce or counter value may be initialized. For example, the wireless identity transmitter may begin to increment a value that represents the passage of time, starting from a zero value. In block 1313, the wireless identity transmitter may broadcast a message (i.e., a broadcast message) that includes an encoded (or rolling) identifier. For example, the wireless identity transmitter may begin transmitting broadcast messages every few seconds. The wireless identity transmitter may generate rolling identifiers with the embodiment methods described below. In general, the broadcast message may include a payload that includes data generated by performing a pseudo-random function. For example, the wireless identity transmitter may perform a pseudo-random function to generate encoded data based on input values of the wireless identity transmitter's device ID, a nonce or counter value, and a secret key, seed, or other value known only to the wireless identity transmitter and the central server. In an embodiment, the pseudo-random function may be a polynomial time computable function that may utilize a randomly selected seed value only known to the wireless identity transmitter and the central server, such that the pseudo-random function may be computationally indistinguishable from a random function defined on the same domain with output to the same range as the pseudo-random function. In an embodiment, the keyed-hash Message Authentication Code (HMAC) or the cipher-based Message authentication Code (CMAC) may be used as the pseudo-random function.

In an embodiment, the wireless identity transmitter may be required to be activated within a predefined number of seconds within the time the mobile device begins the registration process with the operations in block 1304. In other words, once the wireless identity transmitter begins incrementing its nonce or counter value, the user must register with the central server within a certain period. This enables the central server to try at only a certain number of values when trying to determine the nonce or counter value at the wireless identity transmitter during registration.

In an embodiment, the wireless identity transmitter may indicate an initial broadcast by adjusting data within a broadcast message's payload. For example, the wireless identity transmitter may change a bit within a broadcast message that the central server may recognize as indicating an initialization time period for the wireless identity transmitter. If there are initialization indicators within payloads, the central server may expedite comparisons between received payloads and stored payloads by avoiding comparisons to payloads corresponding to already registered (or recognized) wireless identity transmitters within a central server lookup data table.

In block 1314, the user's mobile device may receive the broadcast message. In other words, based on the installed application (or app), the mobile device may function as a mobile proximity broadcast receiver. An installed application may, such as the app installed with the operations in block 1302, may be waiting to receive such a broadcast message in response to initiating registration operations with the central server via the registration request. In block 1316, the mobile device may transmit the wireless identity transmitter's rolling identifier and other information, such as the stored device ID and authentication information. In an embodiment, the mobile device may extract encoded information from the received broadcast message, such as by using text comparison and/or parsing operations. For example, the mobile device may perform a most-significant bit operation.

In block 1318, the central server may receive the message with the encoded information, as well as the authentication information and the device ID. In block 1320, the central server may validate authentication information, such as in the received message from the mobile device. In particular, the central server may compare the authentication information to information generated in the operations in blocks 1308-1310. In block 1322, the central server may generate a set of rolling identifiers using the device ID and possible nonce or counter values. The central server may compare the encoded identifiers of the set with the rolling identifier received from the mobile device. In an embodiment, the central server may compute a set of encoded data by using a pseudo-random function, such as described above, along with the device ID and a number of nonce or counter values. For example, the central server may execute the pseudo-random function with a seed shared with wireless identity transmitters, the device ID indicated by the mobile device, and many nonce or counter values, starting with 0. In block 1324, when the central server matches the received rolling identifier to one of the rolling identifiers in the generated set, the central server may store relevant nonce or counter value and time in relation to the WIT. The central server may use the nonce or counter value used to generate the matching rolling identifier to sync with the nonce or counter running on the wireless identity transmitter. In an embodiment, the central server may store an indicator that describes the wireless identity transmitter as having been successfully registered and/or synced. In optional block 1326, the central server may then transmit a registration result message to the user, such as by transmitting a message to the mobile device. The registration result message may indicate whether or not the central server was able to match the received encoded identifier with a generated identifier. In optional block 1328, the mobile device may receive the registration result message. In an embodiment, the registration result message indicates that the registration process failed (e.g., the received broadcast message received by the mobile device did not correspond to the user's wireless identity transmitter), the mobile device may re-attempt the registration by receiving and relaying another broadcast message.

The operations described above, particularly within blocks 1313-1324, assume that message processing operations performed by the various devices, as well as any propagation delay, may be much smaller than the time required to increment (or update) the nonce or counter value at the wireless identity transmitter. This ensures that the nonce or counter values at the wireless identity transmitter and central server do not differ by more than 1.

Figure 14A:
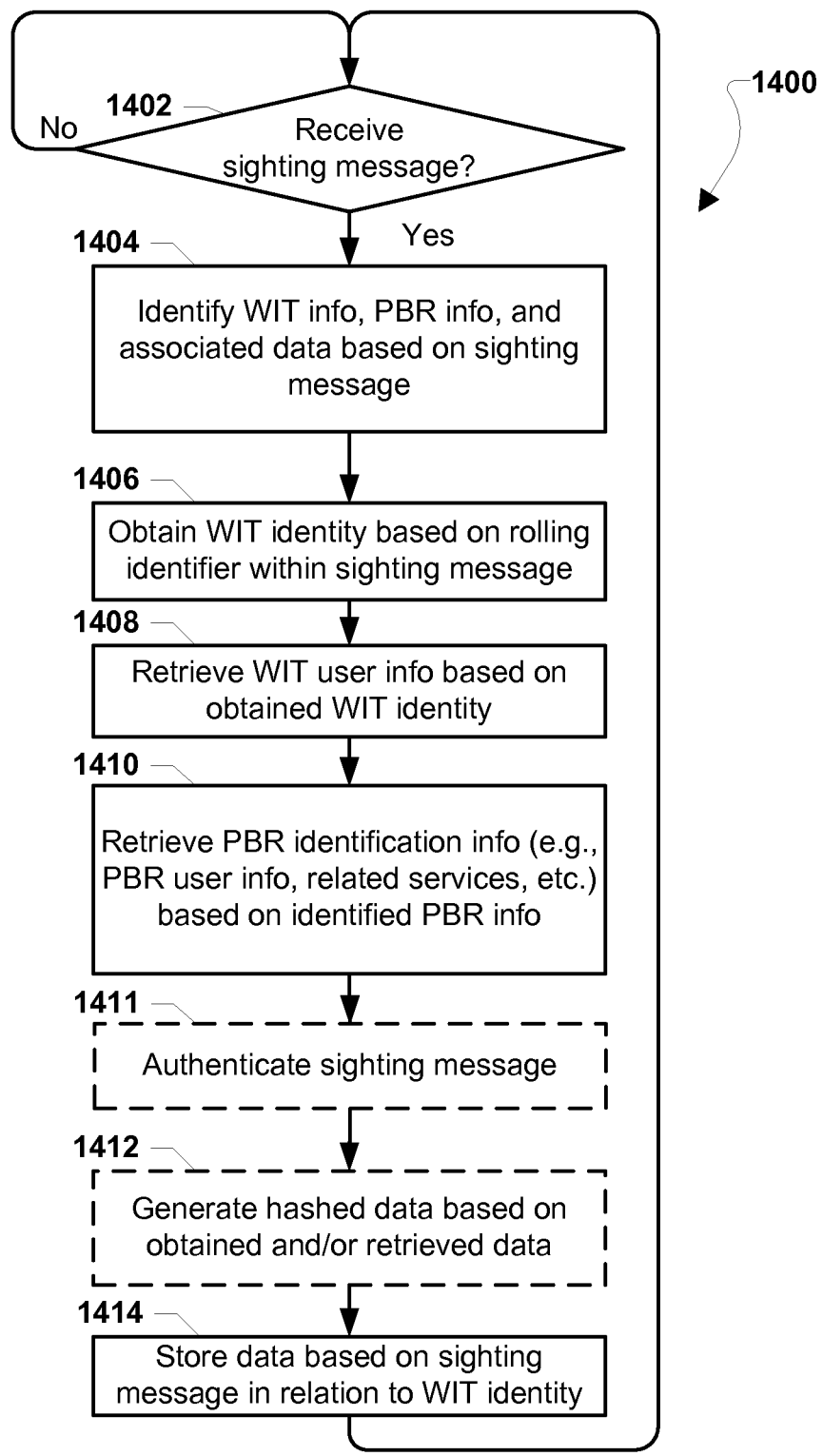
FIGS. 14A and 14B are process flow diagrams illustrating embodiment methods for a central server to process sighting messages received from proximity broadcast receivers.

FIG. 14A illustrates an embodiment method 1400 for a central server to process sighting messages received from proximity broadcast receivers. As described above, the central server may be configured to utilize various modules, components, circuitry, and software to process sighting messages. In determination block 1402, the central server may determine whether a sighting message is received. The central server may evaluate a receiving circuit, buffer, queue or other indicator to determine when messages are received from various devices, such as proximity broadcast receivers. In an embodiment, the central server may utilize a network module as described above to determine whether a sighting message is received. In general, sighting messages may be received via long-range communications, such as packets transmitted via a cellular network over the Internet. If the central server does not receive a sighting message (i.e., determination block 1402="No"), the central server may continue with the operations in determination block 1402.

If the central server receives a sighting message (i.e., determination block 1402="Yes"), in block 1404 the central server may identify wireless identity transmitter information, proximity broadcast receiver information, and associated data based on the sighting message. The central server may evaluate, parse, and otherwise make accessible various data and information segments within the received sighting message. For example, the central server may parse the sighting message to identify an included broadcast message from the wireless identity transmitter. As another example, the central server may identity encoded data corresponding to a wireless identity transmitter identity (i.e., rolling identifier), proximity broadcast receiver identification information (e.g., a receiver ID), location information, timestamp information, sensor data (e.g., accelerometer sensor data, etc.), identifiers of applications (or apps) associated with a proximity broadcast receiver (e.g., a list of installed applications, an identifier for a relevant app executing on the proximity broadcast receiver, etc.). In an embodiment, the central server may perform the operations of block 1404 with a sightings resolver module as described above.

In block 1406, the central server may obtain the wireless identity transmitter identity based on the rolling identifier within the sighting message. The central server may perform operations to decode, descramble, decrypt, or otherwise make accessible the rolling identifier. For example, the central server may perform operations to apply a secret key or decoding algorithm to obtain the identity of the wireless identity transmitter. In an embodiment, the operations of block 1406 may be performed by the central server by way of a rolling ID resolver component as described above. For example, the central server may cause a sightings resolver module to exchange data with the rolling ID resolver component to obtain a decoded wireless identity transmitter identifier. Embodiment operations to identity the wireless identity transmitter based on a sighting message that includes a rolling identifier are described below.

In block 1408, the central server may retrieve the wireless identity transmitter user information based on the obtained wireless identity transmitter identity. For example, the central server may retrieve user account information related to the wireless identity transmitter, such as demographics information, stored data indicating previous behaviors (e.g., travel paths, location history, etc.). In an embodiment, the operations of block 1408 may be performed by the central server by way of an authorization system module as described above. For example, the central server may cause the authorization system module to exchange wireless identity transmitter identity information with a user portal component to obtain user information as saved within user registration databases.

In block 1410, the central server may retrieve proximity broadcast receiver identification information, such as proximity broadcast receiver user information and related services, based on the identified proximity broadcast receiver information. For example, the central server may retrieve the merchant identity associated with the proximity broadcast receiver that transmitted the received sighting message, the tracking services the proximity broadcast receiver is registered to participate in, as well as any other relevant information to the proximity broadcast receiver. The central server may retrieve email addresses, MAC addresses, phone numbers, and other contact information related to a user of related proximity broadcast receiver based on the information within the sighting message. For example, the central server may determine the user contact information associated with a proximity broadcast receiver that may be used for subsequent transmissions from the central server, such as emails or SMS text messages that indicate proximity to an item of interest. In an embodiment, the central server may determine the identity of a user of a smartphone that is configured to perform operations of a mobile proximity broadcast receiver. In an embodiment, the operations of block 1410 may be performed by the central server by way of an authorization system module as described above. For example, the central server may cause the authorization system module to exchange proximity broadcast receiver information with a developer (or user) portal component to obtain information about related registered services (e.g., merchants, stores, vendors, services, etc.) as saved within developer registration databases.

In optional block 1411, the central server may authenticate the sighting message. Based on authentication information within the received sighting message, the central server may perform authentication operations that confirm the legitimacy of the sighting message as coming from a known or otherwise valid proximity broadcast receiver. As described above, sighting messages may include data, such as secret codes, certificates, or hash data, that can be used to confirm the identities of valid proximity broadcast receivers. As third-parties may attempt to spoof proximity broadcast receivers associated with registered services (e.g., a nefarious spammer may attempt to imitate a merchant's store proximity broadcast receiver by sending a fraudulent sighting message), the central server may check for authentication information that confirms the information within the sighting message is useful and related to a registered service (e.g., a registered merchant, a valid developer, or other party that deploys legitimate proximity broadcast receivers). For example, the central server may detect obscured header information within the sighting message that relates to a merchant established within the central server as a registered developer. When the sighting message does not include authentication information expected by the central server, such as a special code that all proximity broadcast receivers within a certain building possess, or does include authentication information that does not match information stored in the central server, the central server may disregard the sighting message and all included information. For example, a sighting message with out-of-date or incomplete authentication information may be disregarded by the central server, or alternatively stored in a list for potentially fraudulent proximity broadcast receivers.

In optional block 1412, the central server may generate hashed data based on the obtained and/or retrieve data. In an embodiment, the operations of optional block 1412 may be performed by the central server by way of a data anonimizer module as described above. In block 1414, the central server may store data based on the sighting message in relation to the wireless identity transmitter identity. For example, the central server may store identified associated data from the sighting message in a database in relation to the wireless identity transmitter's decoded identity. In an embodiment, the operations of block 1414 may be performed by the central server by way of a data layer module as described above.

Figure 14B:
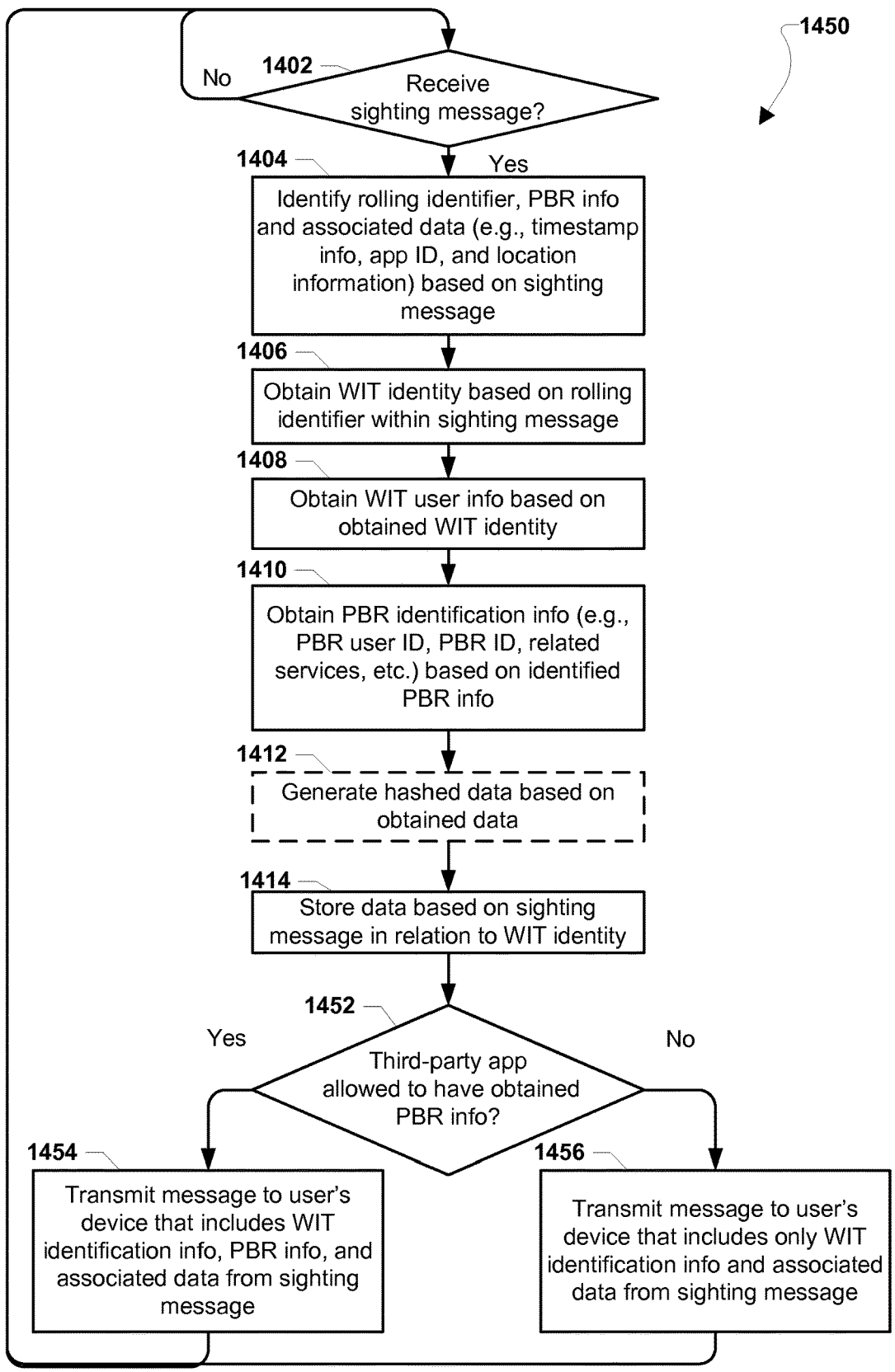

FIG. 14B illustrates an embodiment method 1450 for a central server to process sighting messages received from proximity broadcast receivers. The method 1450 is similar to the method 1400 described above, except that the central server may perform the method 1450 to transmit messages for use by a third-party application executing on mobile device carried by a user. As described above, various messages, such as return messages, alerts (or search activation messages), may be transmitted by the central server to various recipients, such as mobile devices associated with a user. For example, the central server may transmit messages to a user's tablet, smartphone, mobile proximity broadcast receiver, or other computing device. A recipient may also include an application or app executing on a mobile device. In an embodiment, the central server may also transmit messages to other third-party recipients or devices, such registered services that may include emergency medical technicians (EMTs), fire, local police, retail store, merchant computing devices, and ad servers.

Messages transmitted by the central server in response to receiving sighting messages may be transmitted to inform devices, such as a mobile phone or mobile proximity broadcast receiver carried by a user, of the location of proximity of known wireless identity transmitters. For example, when a proximity broadcast receiver, such as a stationary proximity broadcast receiver within a retail store, relays a broadcast message from a wireless identity transmitter associated with a user, the central server may respond by transmitting a message back to a mobile device of the user indicating the user is near the store's proximity broadcast receiver. Further, a third-party application running on the user's device may use information within the message. For example, a retail store app running on a user's smartphone may receive a notice that the user has moved within proximity of a display area within proximity of a retail store building. In various other embodiments, the third-party applications may be utilized to track owned items associated with wireless identity transmitters. For example, a particular third-party application may perform a ring tone when the user is within proximity of a searched for missing child.

In determination block 1402, the central server may determine whether a sighting message is received. If the central server does not receive a sighting message (i.e., determination block 1402="No"), the central server may continue with the operations in determination block 1402. If the central server receives a sighting message (i.e., determination block 1402="Yes"), in block 1404 the central server may identify wireless identity transmitter information, proximity broadcast receiver information, and associated data based on the sighting message. In block 1406, the central server may obtain the wireless identity transmitter identity based on the rolling identifier within the sighting message. In block 1408, the central server may retrieve the wireless identity transmitter user information based on the obtained wireless identity transmitter identity. In block 1410, the central server may retrieve proximity broadcast receiver identification information, such as proximity broadcast receiver user information and related services, based on the identified proximity broadcast receiver information. In optional block 1412, the central server may generate hashed data based on the obtained and/or retrieve data. In block 1414, the central server may store data based on the sighting message in relation to the wireless identity transmitter identity.

In determination block 1452, the central server may determine whether a third-party application (or app) is allowed to have obtained proximity broadcast receiver information. In other words, based on data stored in the central server that is associated with the user of the wireless identity transmitter, the central server may detect any registered services or third-party applications that are associated with the user's devices. For example, the central server may evaluate database information to identify the user has installed a third-party application on his/her smartphone that corresponds to a retail store. The proximity broadcast receiver information may include proximity broadcast receiver identification (e.g., an ID code or identifier) and the user identity of the proximity broadcast receiver. In an embodiment, the central server may identify whether third-party applications are allowed such information based on the third-party's developer rights, such as indicated when the third-party registered as a developer or registered service, or alternatively based on the user's permission settings, as described below. In an embodiment, the central server may use application identification information provided within the received sighting message to determine whether the third-party applications on the user's device may receive proximity broadcast receiver information. For example, the sighting message may contain indicators of applications (e.g., app IDs) that correspond to the sighting message and thus are allowed to receive any proximity broadcast receiver information from the central server.

If the third-party app is not allowed to have the obtained proximity broadcast receiver information (i.e., determination block 1452="No"), in block 1456 the central server may transmit a message to the user's device that includes only wireless identity transmitter identification information and associated data from the sighting message. For example, the message transmitted by the central server may include the obtained wireless identity transmitter identity, user information, timestamp data, and location information from the sighting message. If the third-party app is allowed to have the obtained proximity broadcast receiver information (i.e., determination block 1452="Yes"), in block 1454 the central server may transmit a message to the user's device that includes wireless identity transmitter identification information, proximity broadcast receiver information, and associated data from the sighting message. For example, the message transmitted by the central server to the user's smartphone may include indicators of the obtained proximity broadcast receiver identification (e.g., serial code, group affiliation, merchant category, etc.). The central server may then continue with the operations in determination block 1402. In an embodiment, the central server may utilize an alert engine module, such as described above with reference to FIG. 12, to transmit and/or generate messages for transmission to various devices.

Figure 15A:
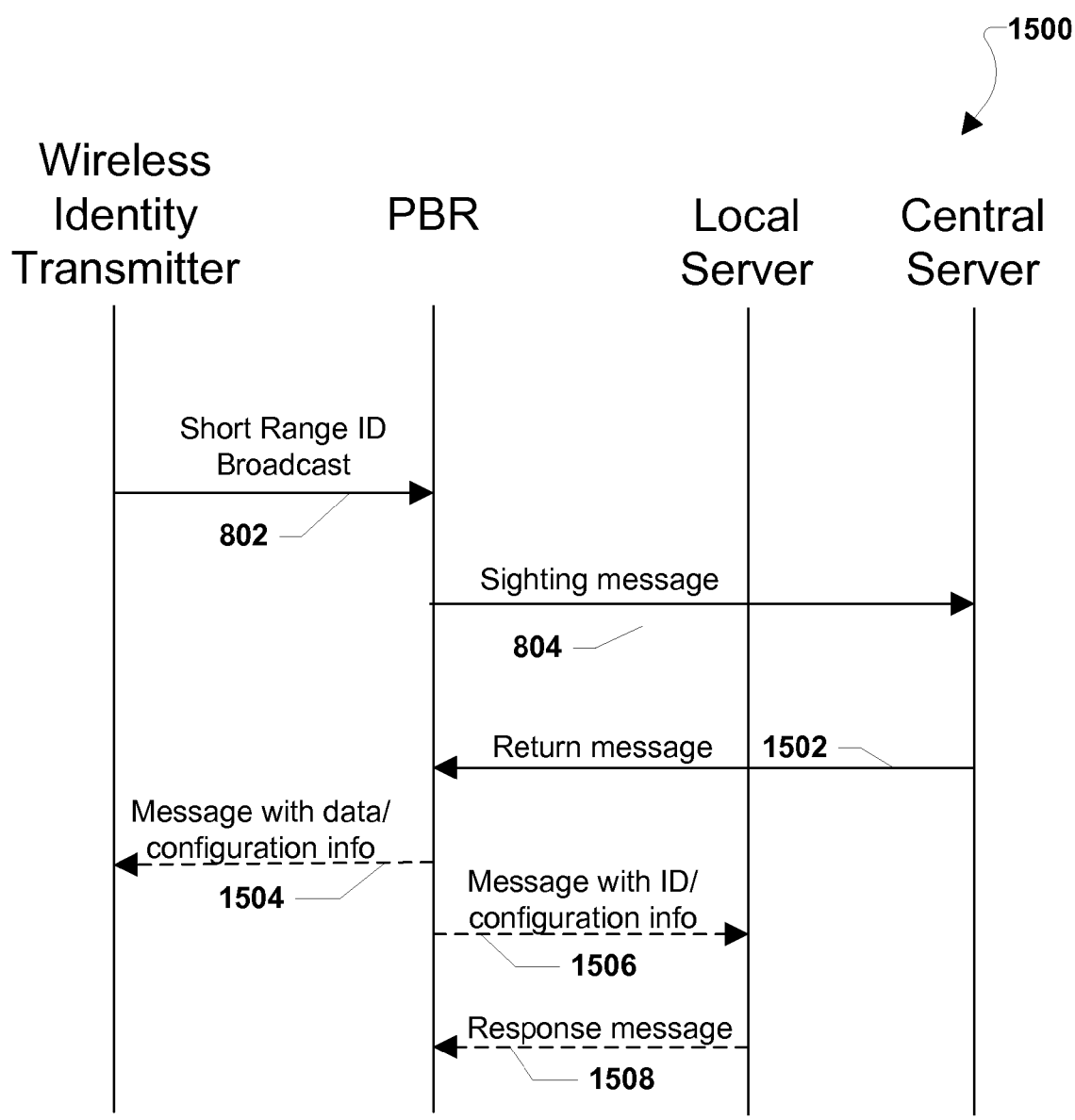
FIGS. 15A-B are call flow diagrams illustrating communications between a wireless identity transmitter, a proximity broadcast receiver, and a central server in accordance with various embodiments.

FIG. 15A illustrates an embodiment call flow diagram 1500 illustrating communications between a wireless identity transmitter, a proximity broadcast receiver, and a central server. As described above, the wireless identity transmitter may periodically transmit a short-range broadcast message 802 via a short-range radio. When within signal range of the broadcast message 802, the proximity broadcast receiver may receive the broadcast message 802 using a similar short-range radio. The broadcast message 802 may be processed by the proximity broadcast receiver and related data may be relayed to the central server as a sighting message 804. In an embodiment, the sighting message 804 may include the broadcast message, identification information of the proximity broadcast receiver and/or the wireless identity transmitter, encrypted information the proximity broadcast receiver is incapable of decoding, and other information related to the reception of the broadcast message 802. In an embodiment, the sighting message 804 may be transmitted over various wireless or wired networks that may be configured to communicate via Internet protocols.

The central server may receive and process the sighting message 804. When the central server determines that the sighting message 804 requires a response based on the information in the sighting messages (e.g., metadata requesting a response, the sighting message relates to a wireless identity transmitter that needs to receive upgraded firmware, etc.), the central server may generate and transmit a return message 1502 to the proximity broadcast receiver. In various embodiments, the return message 1502 may contain configuration information, identification information describing the wireless identity transmitter, or other data as described above. The proximity broadcast receiver may receive and process the return message 1502. Based on the data within the return message 1502, the proximity broadcast receiver may optionally transmit a message 1504 to the wireless identity transmitter that may contain configuration information and other data from the central server. The wireless identity transmitter may selectively accept transmissions such as the message 1504 using operations as described above with reference to FIG. 4.

As another option, the proximity broadcast receiver may transmit a message 1506 to a local server based on the return message 1502. The message 1506 may contain wireless identity transmitter identification information, configuration information, software routines, and various other data from the return message 1502 for storage, processing, and otherwise additional use by the local server. Based on the message 1506, the local server may in turn transmit an optional response message 1508 to the proximity broadcast receiver that may include software instructions, configuration data, or other data generated in response to receiving the message 1506.

In an embodiment, the central server may also transmit messages directly to the local server (not shown) that include configuration information and other data. For example, the sighting message 804 from the proximity broadcast receiver may provide the contact information for the local server which the central server may utilize for subsequent communications.

Figure 15B:
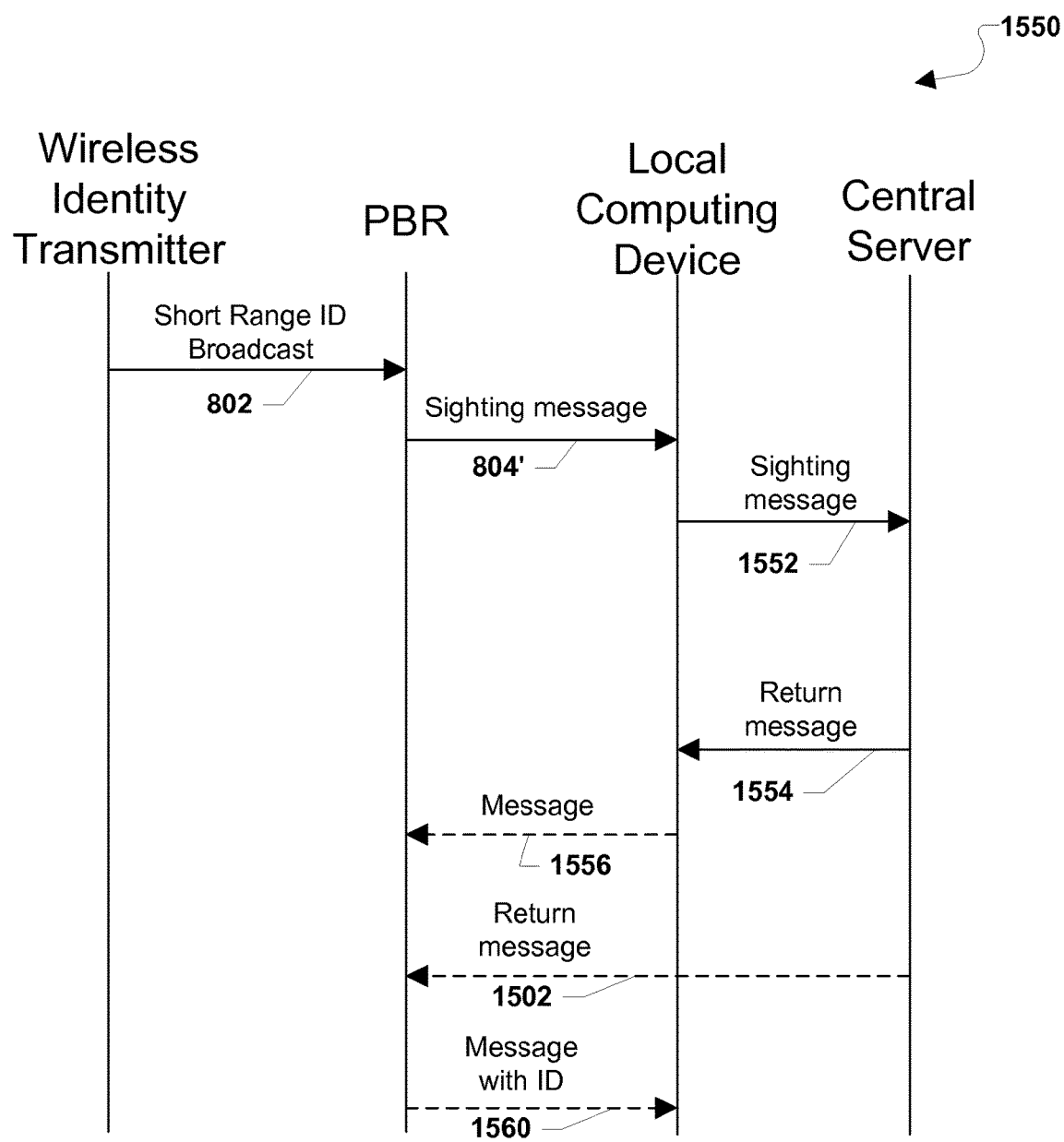

FIG. 15B illustrates an embodiment call flow diagram 1550 illustrating communications between a wireless identity transmitter, a proximity broadcast receiver, a local computing device, and a central server. The local computing device may be a local server, such as within a retail store, or alternatively, a device configured to perform operations of a point-of-sale device (e.g., a cash register). The proximity broadcast receiver may be a stationary receiver device associated with and communicates information to the local computing device. For example, the local computing device and the proximity broadcast receiver may both be associated with a merchant and/or both communicate over a common local area network, such as via a WiFi router. For example, the stationary proximity broadcast receiver may be placed at the cash register of the retail store and may receive transmissions from wireless identity transmitters when customers walk within proximity of the cash register.

As described above, the wireless identity transmitter 110 may periodically transmit a broadcast message 802 via short-range wireless signals (e.g., Bluetooth® LE radio signals). When within signal range of the broadcast message 802, the proximity broadcast receiver may receive the broadcast message 802 using a similar transceiver. The broadcast message 802 may be processed by the proximity broadcast receiver and transmitted to the local computing device as a first sighting message 804' for processing. The local computing device may in turn transmit a second sighting message 1552 to the central server. The second sighting message 1552 may be identical to the first sighting message 804' or alternatively a new or modified version of the first sighting message 840'. For example, the second sighting message 1552 may include identification information of the local computing device in addition to a representation of the broadcast message 802.

The central server may receive and process the second sighting message 1552, as described above, and may generate and transmit a return message 1554 to the local computing device. In an embodiment, the local computing device may be configured to act as a message router and may transmit a message 1556 to the proximity broadcast receiver. The message 1556 may be similar to the return message 1554 or alternatively may include only portions of the return message 1554. For example, the message 1556 may contain information (e.g., marketing information, payment authentication information, etc.) to be rendered or otherwise used by the proximity broadcast receiver. In an embodiment, the message 1556 may include instructions for presenting marketing information, such as software instructions for rendering an advertising video.

In an embodiment, the central server may transmit a return message 1502 to the proximity broadcast receiver, which may in turn transmit a message 1560 to the local computing device that reports various information (e.g., the identification information of the wireless identity transmitter). In an embodiment, the proximity broadcast receiver may process the return message 1502 and the message 1556 and may store, utilize, and/or evaluate data of the return message 1502. For example, the stationary proximity broadcast receiver may detect software instructions within the return message 1502 or the message 1556, such as an instruction to re-calibrate a radio within the proximity broadcast receiver, and may perform operations in response to detecting the software instructions. As another example, the proximity broadcast receiver may store a list of wireless identity transmitter identities based on the return message 1502 or the message 1556. In an embodiment, the return message 1502, 1554 may not include identification information of the wireless identity transmitter, but may instead include an indicator of whether the wireless identity transmitter is related to an authorized user.

Figure 16:
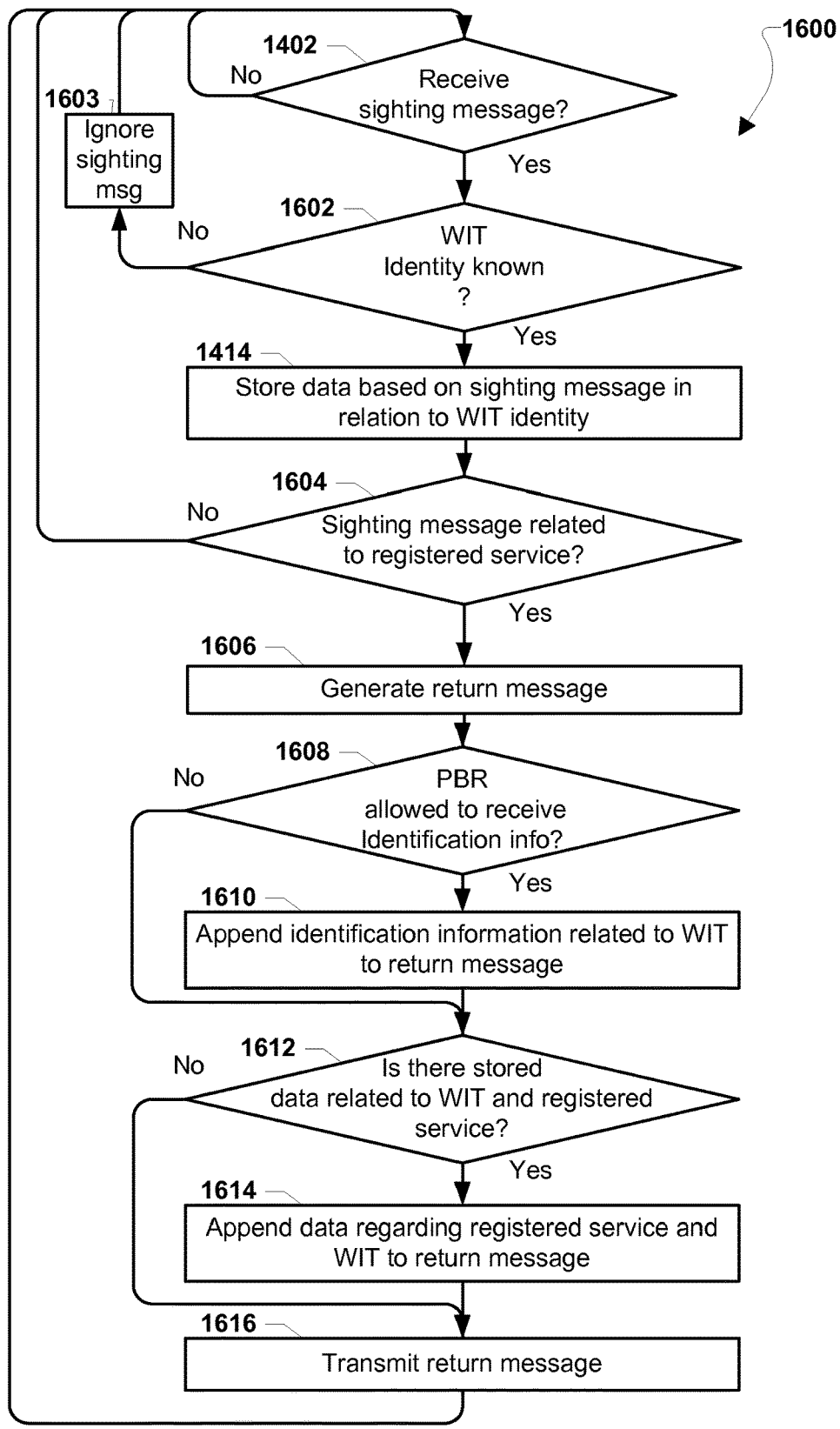
FIG. 16 is a process flow diagram illustrating an embodiment method for a central server receiving sighting messages from a proximity broadcast receiver and transmitting return messages including various data.

FIG. 16 illustrates an embodiment method 1600 for a central server to process sighting messages received from a proximity broadcast receiver. In general, based on the information within sighting messages, the central server may identify a wireless identity transmitter (and related user), determine whether there is a relationship between the proximity broadcast receiver and the wireless identity transmitter (i.e., related to a registered service), and transmit return messages with various data and/or information based on the sighting messages. Accordingly, return messages may be provided to proximity broadcast receivers such that no identifying information about the wireless identity transmitter is included. This may enable the proximity broadcast receiver to anonymously personalize equipment, devices, or other facilities, as described above, to benefit the user of the wireless identity transmitter without disclosing his/her identity. For example, a return message from the central server may include a user's configuration data for a piece of equipment but not the user's identity. In an embodiment, the method 1600 may be performed by the central server in connection with the proximity broadcast receiver performing the operations of the method 1100 as described above with reference to FIG. 11. In various embodiments, such return messages may be transmitted to any devices related to received sighting messages and/or the related wireless identity transmitter, such as third-parties (e.g., emergency services, retailers, etc.) or user devices associated with the sighting message.

In determination block 1402, the central server may determine whether a sighting message is received. If no sighting message is received (i.e., determination block 1402="No"), the central server may continue with the operations in determination block 1402. If a sighting message is received (i.e., determination block 1402="Yes"), in determination block 1602 the central server may determine whether the wireless identity transmitter identity is known. In other words, the central server may perform the operations in block 1404-1410 as described above with reference to FIG. 14A in order to evaluate, decode, decrypt, and otherwise access the data within the received sighting message to determine whether it includes a wireless identity transmitter identity (or identifier) that is associated with a user registered with the central server. For example, the central server may decrypt a rolling identifier within the received sighting message to identify a device identifier of a wireless identity transmitter and may match that identifier to stored information representing all registered users and/or devices. If the wireless identity transmitter is not known (i.e., determination block 1602="No"), in block 1603 the central server may ignore the sighting message and continue to perform the operations in determination block 1402. If the wireless identity transmitter is known (i.e., determination block 1602="Yes"), in block 1414 the central server may store data based on the sighting message in relation to the wireless identity transmitter identity, such as storing location data within the sighting message in a database in relation to the user of the wireless identity transmitter.

In determination block 1604, the central server may determine whether the received sighting message relates to a registered service. In other words, the central server may compare information obtained from the sighting message to lists of registered services to determine whether the sighting message is valid (or authenticated) and corresponding to a third-party, merchant, or other service registered with the central server. To make the determination, the central server may analyze the received sighting message and evaluate any metadata or header information that identifies the proximity broadcast receiver, the subject matter of the sighting message, or other descriptive information regarding the proximity broadcast receiver and/or the wireless identity transmitter that transmitted the broadcast message reported by the sighting message. For example, the sighting message may contain metadata that indicates the sighting message was sent by a proximity broadcast receiver in response to an active alert. Alternatively, the sighting message may contain header information that indicates relevance to a particular vendor facility or service. For example, the sighting message may contain metadata that indicates the proximity broadcast receiver is associated with a particular third-party application (e.g., a retail store app ID). As another example, the central server may evaluate metadata within the sighting message to detect a code that identifies a registered merchant or retail store that is associated with a marketing service or data collection scheme.

A sighting message may not relate to a registered service if the transmitting proximity broadcast receiver is not registered, authenticated, or otherwise known to the central server. If the sighting message is not related to a registered service (i.e., determination block 1604="No"), the central server may continue with the operations in determination block 1402. If the sighting message does relate to a registered service, such as a valid vendor service or an active alert (i.e., determination block 1604="Yes"), in block 1606 the central server may generate a return message. The return message may include information that indicates the sighting message, the proximity broadcast receiver, related services, time of receipt of the sighting message, and other informational data. In determination block 1608, the central server may determine whether the proximity broadcast receiver is allowed to receive identification info. In other words, the central server may determine whether the proximity broadcast receiver has permission or is authorized to receive identification information of the wireless identity transmitter. For example, based on metadata within the sighting message indicating that the proximity broadcast receiver is associated with a vendor or a registered service, the central server may determine that the identification of the wireless identity transmitter (or its user) may not be included within the return message. In an embodiment, the central server may evaluate a stored database that describes information permissions based on the identity of the proximity broadcast receiver and its associated services. For example, the database may indicate that the proximity broadcast receiver is associated with a service that is allowed to receive identification information about the wireless identity transmitter. Such permissions or privacy settings are described below with reference to FIGS. 31-32. For example, using user identification information obtained based on the sighting message, the central server may look-up user permissions to identify whether the user authorized user data to be shared with registered services.

If the proximity broadcast receiver is allowed to receive identification information (i.e., determination block 1608="Yes"), in block 1610 the central server may append identification information to the return message. For example, the return message may include the username, customer ID, address and/or name of the user of the wireless identity transmitter. If the proximity broadcast receiver is not allowed to receive identification information (i.e., determination block 1608="No") or if the central server appended identification information to the return message in block 1610, the central server may determine whether there is stored data related to the wireless identity transmitter and the registered service in determination block 1612. The central server may evaluate a database and identify whether the proximity broadcast receiver, its associated devices or services (e.g., a local server), and/or the wireless identity transmitter require data based on the sighting message. Examples of such data may include firmware, software instructions, configuration information, proprietary information (e.g., customer ID), activity information (e.g., information describing recent wireless identity transmitter activities related to the proximity broadcast receiver), or any other relevant information. The central server may query the database using the wireless identity transmitter identification information in combination with the proximity broadcast receiver identification information to detect data within the database that may be included in the return message. For example, the return message may contain personalization information for the user of the wireless identity transmitter to be used by the proximity broadcast receiver. In an embodiment, the database may indicate that the proximity broadcast receiver is associated with a service (e.g., vendor, merchant, etc.) that stores proprietary data within the central server database.

If there is stored data related to the wireless identity transmitter and the registered service (i.e., determination block 1612="Yes"), in block 1614 the central server may append the data regarding registered service and the wireless identity transmitter to the return message. If there is no stored data related to the wireless identity transmitter and the registered service (i.e., determination block 1612="No"), or if data is already appended, in block 1616 the central server may transmit the return message, such as to the proximity broadcast receiver. The central server may then continue to perform the operations in determination block 1402.

Figure 17:
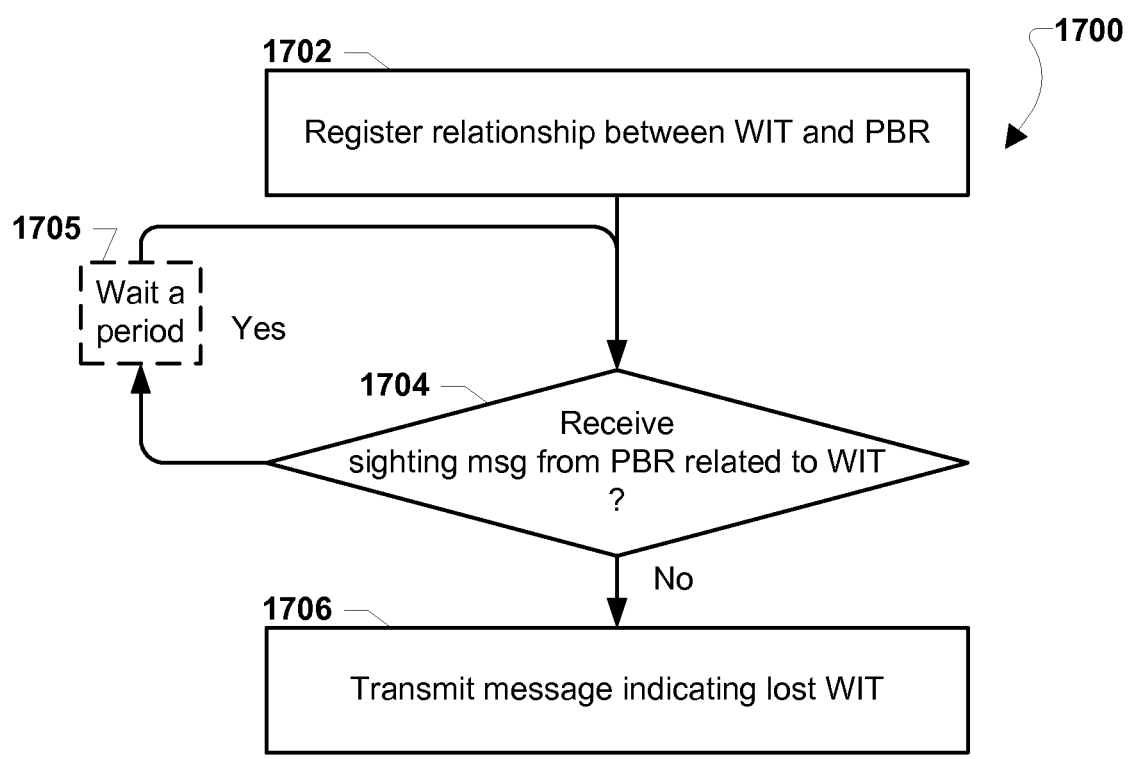
FIG. 17 is a process flow diagram illustrating an embodiment method for a central server determining whether a proximity broadcast receiver has lost a wireless identity transmitter.

FIG. 17 illustrates an embodiment method 1700 for a central server determining whether a proximity broadcast receiver has lost a wireless identity transmitter. In the central server, the proximity broadcast receiver may be associated with the wireless identity transmitter. For example, the proximity broadcast receiver may be a user's smartphone that is associated with the wireless identity transmitter within an asset (e.g., wallet, purse, luggage, medicine bag, clothing, etc.). In response to failing to receive sighting messages from a proximity broadcast receiver associated with a particular wireless identity transmitter, the central server may be configured to transmit messages, such as warnings, indicating that the wireless identity transmitter (and the object it is connected to) is lost, absent, forgotten, or otherwise non-proximate to the proximity broadcast receiver. This embodiment method 1700 may be useful for leashing certain assets, such as possessions, pets, and children. For example, when a child runs from a parent, broadcast messages from the child's wireless identity transmitter may no longer be received by the parent's proximity broadcast receiver. As a result, the parent's proximity broadcast receiver may not transmit sighting messages to the central server and the central server may determine the child has been lost or run away.

In block 1702, the central server may register a relationship between the proximity broadcast receiver and the wireless identity transmitter, such as by storing information within a database. In various embodiments, each proximity broadcast receiver and wireless identity transmitter may be involved in numerous relationships. Additionally, the relationship information may be stored based on user input data to the central server via a registration web portal (e.g., the user may access a website and indicate all of his/her wireless identity transmitters). During such a registration, the central server may prompt the user to provide conditions under which the central server should transmit messages when wireless identity transmitters are lost or otherwise outside of the proximity of the proximity broadcast receiver. For example, the user may enter configuration data stored by the central server that indicates that if the proximity broadcast receiver does not receive broadcast messages from the wireless identity transmitter between certain hours of the day, the central server should transmit a warning message.

In determination block 1704, the central server may determine whether a sighting message has been received from the proximity broadcast receiver related to the wireless identity transmitter. In other words, based on whether or not such a sighting message is received, the central server may detect if the wireless identity transmitter is close to the proximity broadcast receiver. The central server may also evaluate sighting messages received over a period to determine whether the wireless identity transmitter is (or has recently been) within proximity of the proximity broadcast receiver. In an embodiment, the central server may determine whether it receives a sighting message for each wireless identity transmitter registered in the relationship. For example, if the registered relationship includes multiple wireless identity transmitters, the central server may expect to receive sighting messages from the proximity broadcast receiver regarding all the wireless identity transmitters. If the central server receives a sighting message related to the wireless identity transmitter (i.e., determination block 1704="Yes"), in optional block 1705 the central server may wait a period and may continue with the operations in determination block 1704. In various embodiments, the central server may perform the operations in determination block 1704 periodically, such as every few seconds, minutes, or hours.

If the central server does not receive a sighting message related to the wireless identity transmitter (i.e., determination block 1704="No"), in block 1706 the central server may transmit a message indicating the wireless identity transmitter is lost. In various embodiments, the central server may transmit such a message to the proximity broadcast receiver, other devices associated with the user of the proximity broadcast receiver (e.g., a smartphone, tablet), and/or any other device relevant to the wireless identity transmitter. For example, the central server may transmit a warning message to a police server when the wireless identity transmitter is lost and associated with a child.

Figure 18A:
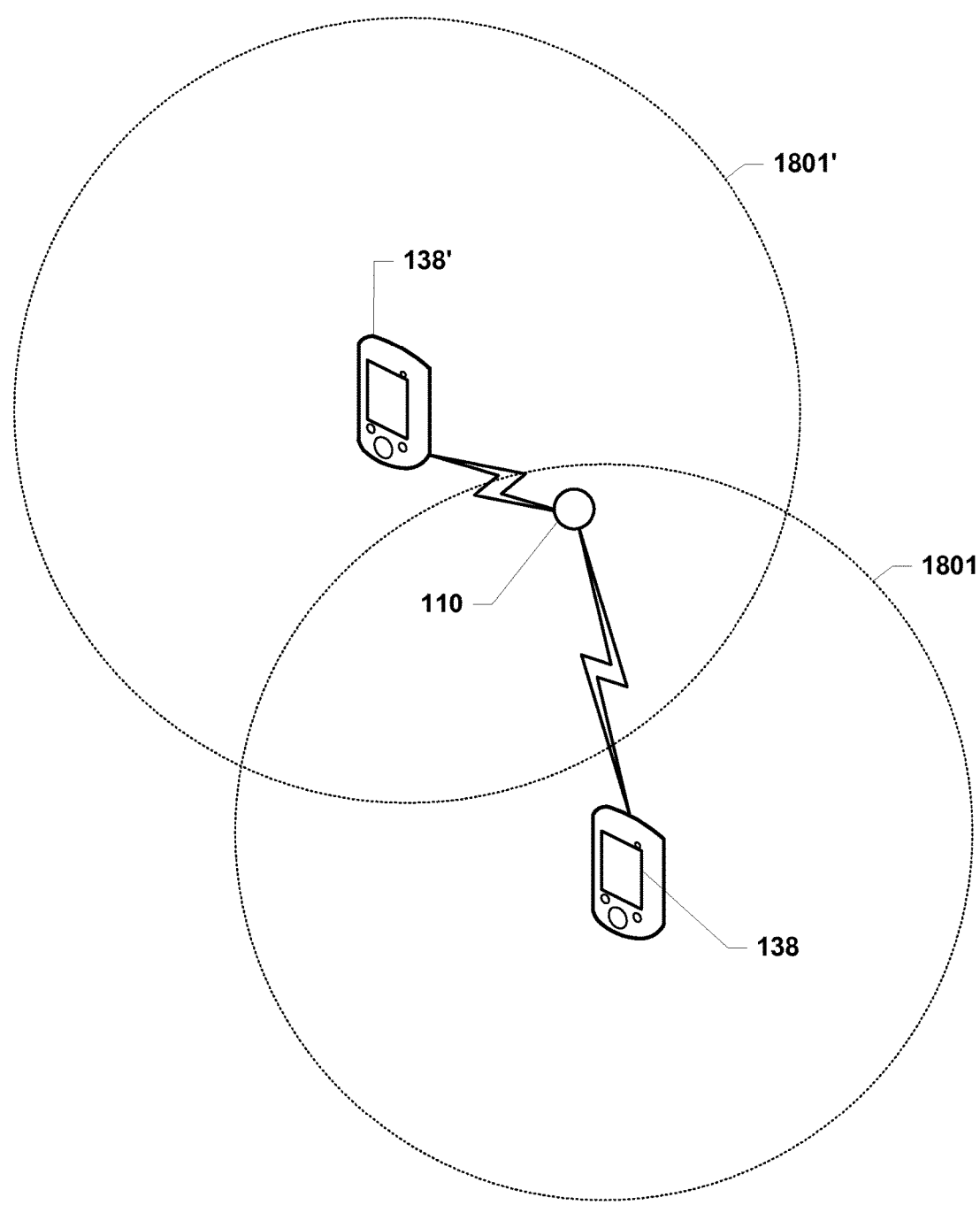
FIGS. 18A and 18C are communication system diagrams of mobile proximity broadcast receivers in communication with a wireless identity transmitter.

FIG. 18A illustrates two proximity broadcast receivers 138, 138' receiving short-range broadcast messages from a wireless identity transmitter 110. In various embodiments, the communication system may provide increased location or proximity granularity when multiple proximity broadcast receivers (e.g., mobile proximity broadcast receivers) are able to successfully communicate with a wireless identity transmitter. As previously discussed, since the wireless identity transmitter relies on a short-range radio to broadcast its identifier to proximity broadcast receivers, the location of a proximity broadcast receiver receiving such a short-range broadcast message provides an approximate location for the wireless identity transmitter (i.e., the proximity broadcast receiver and wireless identity transmitter are within proximity of each other when a broadcast message is received). However, if multiple proximity broadcast receivers receive the broadcast message from the wireless identity transmitter, the location of the wireless identity transmitter may be more precisely approximated.

In particular, two proximity broadcast receivers 138, 138' may receive broadcast messages from a wireless identity transmitter 110. Since the reception range of signals transmitted by wireless identity transmitters 110 is limited, proximity broadcast receivers 138, 138' may receive the broadcast messages only if the wireless identity transmitter 110 is within that reception range 1801, 1801'. Thus, if both proximity broadcast receivers 138, 138' receive the same broadcast message from the wireless identity transmitter 110, then the wireless identity transmitter 110 must be located in the overlapping region that is within the reception range 1801, 1801' of both of the two proximity broadcast receivers 138, 138'. Since the reception range 1801, 1801' will depend upon signal attenuators (e.g., structures and vegetation) along the transmission path and the sensitivity of proximity broadcast receivers 138, 138', this variability may be taken into account by a central server, such as by treating the reception range 1801, 1801' as a statistical parameter (e.g., average range with standard deviations, which may be determined through field testing). In such an embodiment, the central server may assign probabilities to different overlapping region sizes, which may help searchers focus initial search efforts.

Figure 18B:
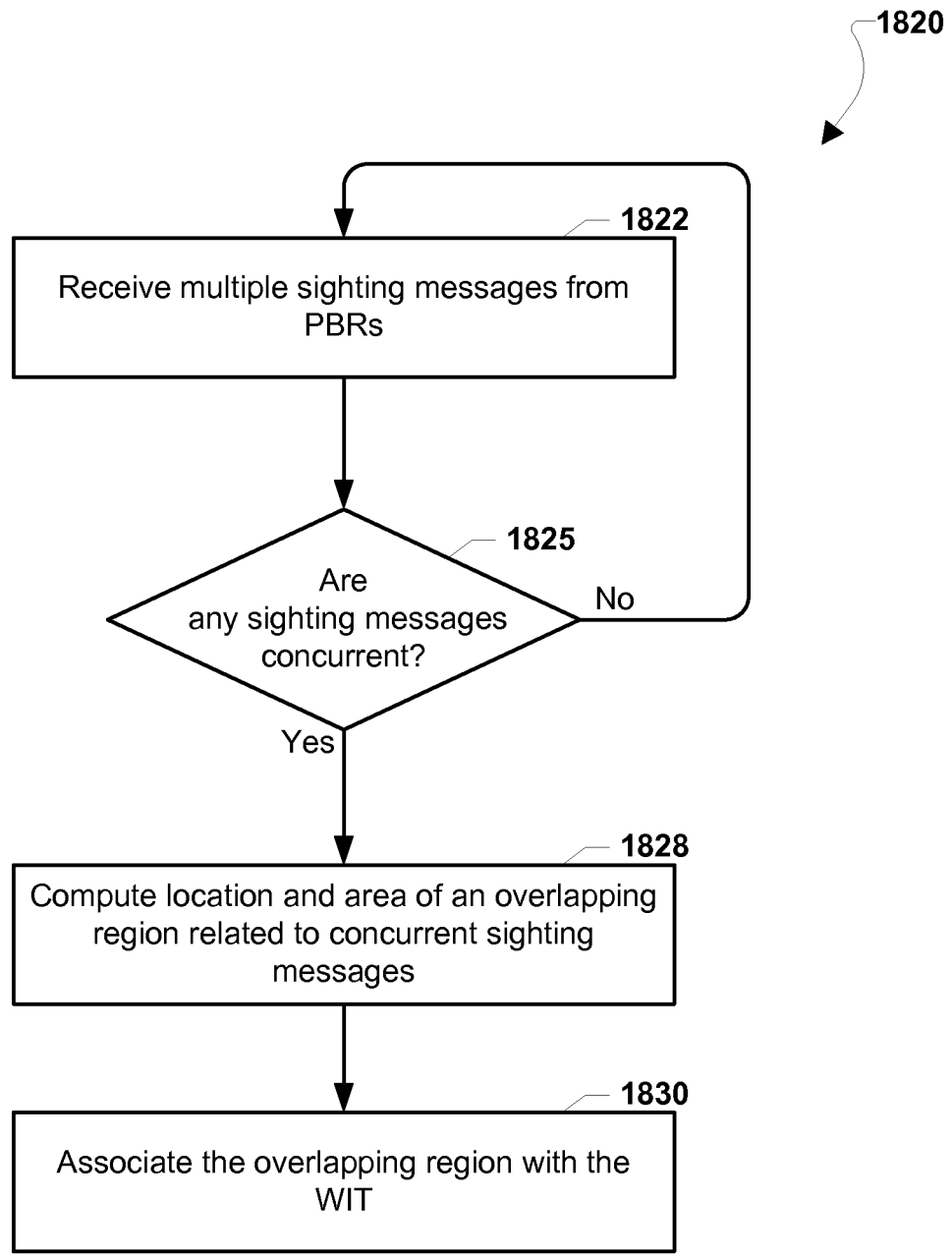
FIGS. 18B and 18D are process flow diagrams illustrating embodiment methods for determining the location of the wireless identity transmitter in the communication systems illustrated in FIGS. 18A and 18C, respectively.

FIG. 18B illustrates an embodiment method 1820 for a central server providing a finer grained location for a wireless identity transmitter. The central server may receive multiple sighting messages from proximity broadcast receivers in block 1822. The central server may determine whether any of the received sighting messages are concurrent in determination block 1825 (i.e., whether broadcast messages from the same wireless identity transmitter are reported as being received at approximately the same time from two different proximity broadcast receivers). The central server may not consider sighting messages concurrent unless they are associated with the same wireless identity transmitter (i.e., include the same identifier or corresponding rolling identifiers) and come from different proximity broadcast receivers. Further, the central server may determine whether sighting messages are concurrent based on the contents of the messages, such as by comparing and matching timestamps in the received sighting messages (i.e., the time the proximity broadcast receivers received broadcast messages from the same wireless identity transmitter). The timestamps may be matched without being exactly the same in order to accommodate differences due to unsynchronized clocks within the proximity broadcast receivers, transmission delays, etc. In some cases, such as if the wireless identity transmitter is assumed or determined to be stationary, received sighting messages may be matched for purposes of refining the position despite the messages being received at different times. The acceptable time range for matching may be adjustable. Alternately, if the wireless identity transmitter is using a rolling identifier that shifts with each broadcast message, the central server may match received sighting messages based on the rolling identifier rather than on timestamps. If none of the sighting messages are determined to be concurrent (i.e., determination block 1825="No"), the central server may continue with the operations in block 1822.

If the central server determines that two or more sighting messages are concurrent (i.e., determination block 1825="Yes"), the central server may compute the location and area of an overlapping region related to the concurrent sighting messages in block 1828. For example, based on the locations of each of the proximity broadcast receivers associated with the concurrent sighting messages and the known transmission range of the wireless identity transmitter, the central server may compute the reception radius of each proximity broadcast receiver to determine the overlapping region. The location of each proximity broadcast receiver may be included in sighting messages transmitted by each proximity broadcast receiver.

In block 1830, the central server may associate the overlapping region (i.e., the computed location and area of the overlapping region) with the wireless identity transmitter. In other words, the central server may associate a finer grained location of the wireless identity transmitter by calculating multiple reception radii for each of the proximity broadcast receivers and identifying an overlapping region that falls within the reception range of each proximity broadcast receiver. This finer grained location may also be associated with the contents of one or more of the proximity broadcast receiver sighting messages (e.g., timestamp, sensor data, etc.). Also as part of block 1830, the central server may identify a number of overlapping area boundaries and assign a probability value to each based on the average and variability of the transmission range.

Embodiment method 1820 may be applied to many concurrent sighting messages received from several proximity broadcast receivers, which may enable the overlapping area to be more narrowly defined. For example, the central server may compute the overlapping region between several proximity broadcast receiver listening ranges or refine a previously computed overlapping region based on another overlapping report (i.e., compute the overlapping region shared by a previous overlapping region and another proximity broadcast receiver listening area). For example, as searchers close in on the wireless identity transmitter, each of their respective mobile proximity broadcast receivers will begin to transmit sighting messages related to the wireless identity transmitter, which the central server may combine to further narrow the search area as searchers approach from different directions. This capability may be further leveraged by having some searchers move away from a suspected location of the wireless identity transmitter until their mobile proximity broadcast receivers are transmitting sighting messages only intermittently, indicating they are on the edge of the transmission range. With multiple proximity broadcast receivers positioned near the apparent maximum transmission range, the overlapping area computed by the central server can be minimized, thereby helping to further pinpoint the location of the wireless identity transmitter.

Figure 18C:
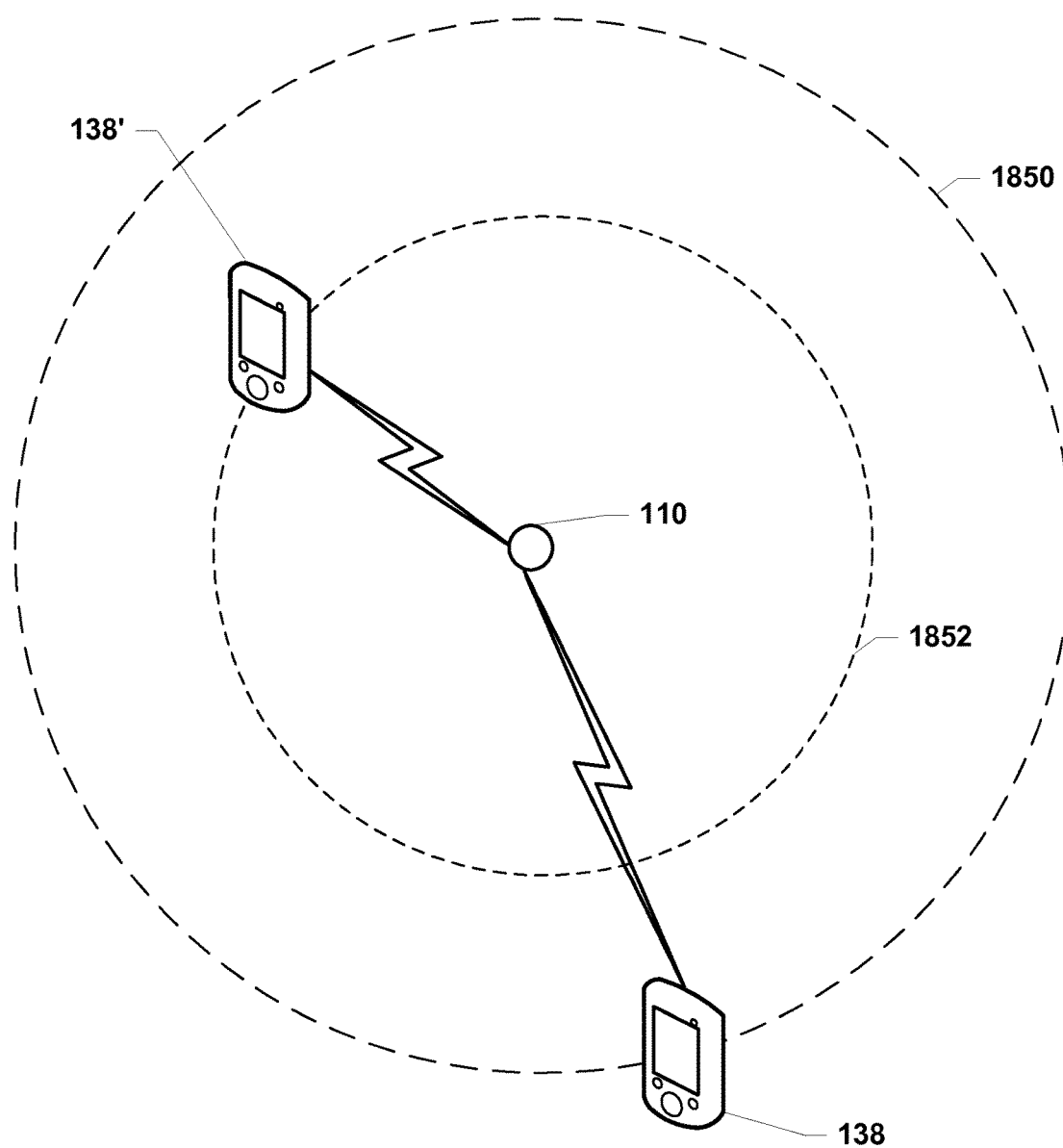

Further embodiments may provide increased location granularity by considering the power level of the broadcast messages received by multiple proximity broadcast receivers. As is well known, the signal strength of a radio transmission from a point transmitter decreases with distance by a factor proportional to the inverse of the square of the distance (i.e., $1/R^2$), with any intervening structure or vegetation causing further attenuation. Thus, proximity broadcast receivers located at different distances from a wireless identity transmitter will typically receive the broadcast messages with different signal strengths. For, example, FIG. 18C illustrates a wireless identity transmitter 110 whose transmissions (i.e., broadcast messages) are being received by two proximity broadcast receivers 138, 138' at different ranges. Due to the attenuation of radio signals with distance, the proximity broadcast receiver 138' at distance 1852 from the wireless identity transmitter 110 may typically receive the transmissions with a higher signal strength than a more distant proximity broadcast receiver, such as the proximity broadcast receiver 138 at distance 1850. Thus, by including the signal strength of received transmissions in sighting messages transmitted by proximity broadcast receivers 138, 138' to a central server, the central server may be able to further refine the location of a wireless identity transmitter 110.

A proximity broadcast receiver's distance to the wireless identity transmitter 110 may be estimated as inversely proportional to the power level. Distance estimations may also account for channel conditions such as intervening signal attenuators (e.g., vegetation, buildings, etc.), echoes (i.e., multipath reception) or other interferences. The distance may be estimated locally on the proximity broadcast receiver 138,138' or alternately by the central server if the proximity broadcast receiver 138, 138' includes the power level in a sighting message. Each proximity broadcast receiver's own location and estimated distance from the wireless identity transmitter 110 may be used to triangulate the approximate location of the wireless identity transmitter 110. For example, as searchers close in on the wireless identity transmitter, the signal strength of received broadcast messages from the wireless identity transmitter may increase, enabling the central server to further narrow the search area as searchers approach from different directions. Thus, when proximity broadcast receivers 138, 138' include signal strength data in sighting messages, the central server can reduce the overlap area for searching as multiple searchers approach the wireless identity transmitter 110 (which would not be the case in the circumstances similar to illustrated above with reference to FIGS. 18A and 18B as the overlap area was determined solely upon the maximum reception range).

Figure 18D:
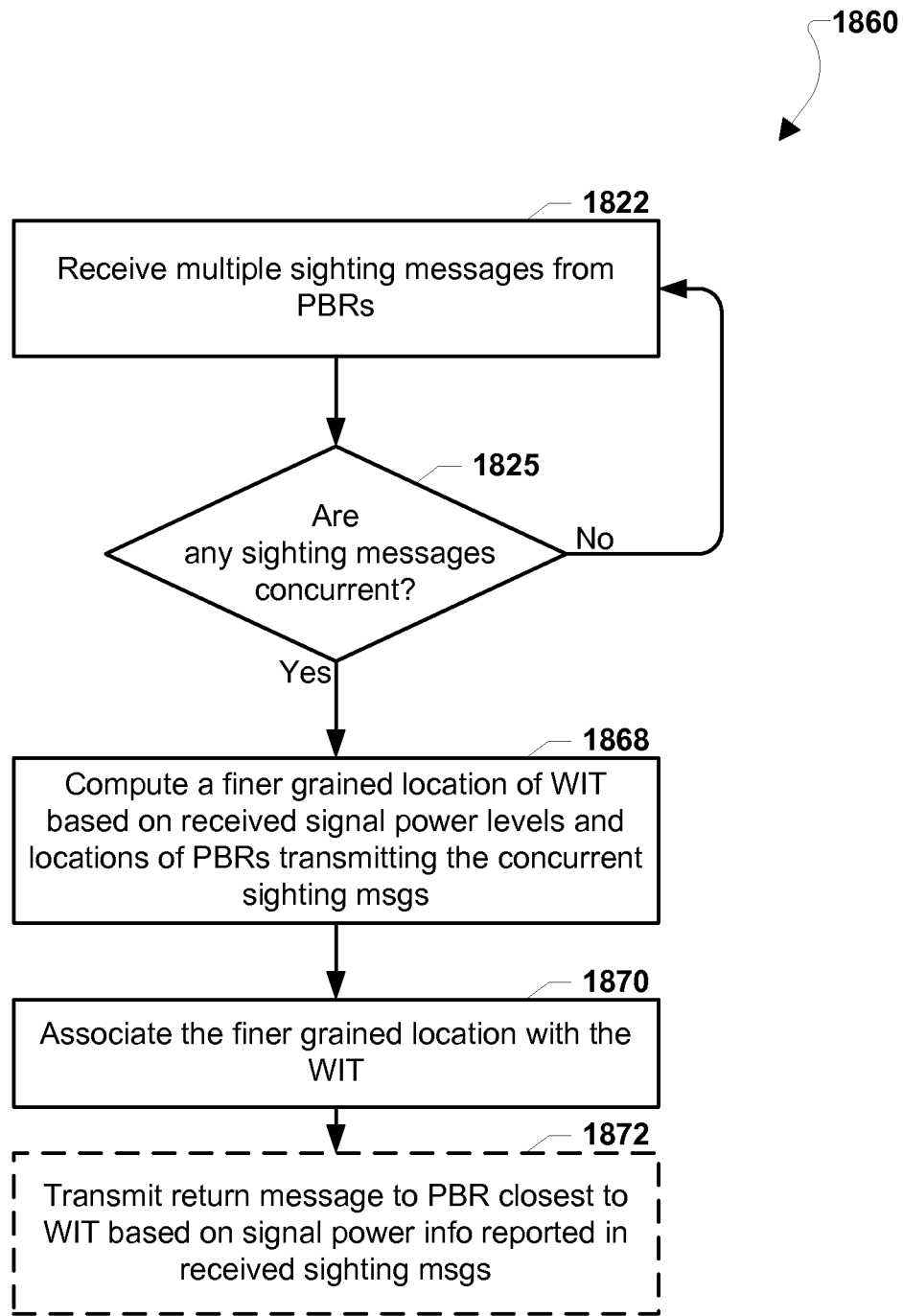

FIG. 18D illustrates an embodiment method 1860 for a central server providing a finer grained location for a wireless identity transmitter based on the power level of broadcast messages received by proximity broadcast receivers. The central server may receive multiple sighting messages from proximity broadcast receivers in block 1822. The sighting messages may include the power level of a broadcast messages received by the reporting proximity broadcast receivers, or an estimated distance from the proximity broadcast receiver to the wireless identity transmitter determined based on the received signal strength. The central server may determine whether any of the sighting messages are concurrent in determination block 1825. The central server may not consider sighting messages concurrent unless they are associated with the same wireless identity transmitter (i.e., include the same identifier or corresponding rolling identifiers) and are received from different proximity broadcast receivers. Further, the central server may determine whether sighting messages are concurrent based on the contents of the sighting messages as described above with reference to FIG. 18B. If none of the sighting messages are concurrent (i.e., determination block 1825="No"), the central server may continue with the operations in block 1822.

If the central server determines that two or more sighting messages are concurrent (i.e., determination block 1825="Yes"), the central server may compute a finer grained location of the wireless identity transmitter based on the received signal power levels and the locations of proximity broadcast receivers transmitting the concurrent sighting messages in block 1868. The central server may estimate the distance between the proximity broadcast receivers and the wireless identity transmitter or may receive an estimated distance in the sighting messages as discussed above. Each proximity broadcast receiver's location and estimated distance from the wireless identity transmitter may be used to triangulate the finer grained location. Triangulation based on information within sighting messages received from only two proximity broadcast receivers may result in two possible locations for the wireless identity transmitter. However, information in sighting messages from three or more proximity broadcast receivers may be used to better approximate the wireless identity transmitter's location. The central server may associate the finer grained location (i.e., the triangulated location) with the wireless identity transmitter in block 1870. This finer grained location may also be associated with the contents of one or more of the proximity broadcast receiver sighting messages (e.g., timestamp, sensor data, etc.).

In optional block 1872, the central server may transmit a return message to a proximity broadcast receiver that is closest to the wireless identity transmitter based on signal power information reported in received sighting messages. In other words, the central server may determine the closest proximity broadcast receiver to the wireless identity transmitter among the plurality of proximity broadcast receivers that transmitted the concurrent sighting messages. Often, a user of a wireless identity transmitter may intend to use a device associated with a single proximity broadcast receiver within a plurality of proximity broadcast receivers (e.g., a point-of-sale device in a line of point-of-sale devices each connected to proximity broadcast receivers). The central server may use signal strength or signal power indicators within concurrent sighting messages, as well as any other relevant data (e.g., location information, direction of the wireless identity transmitter based on previous sighting messages, etc.) to determine the single proximity broadcast receiver the user of the wireless identity transmitter likely intends to interface. The return message may indicate to the proximity broadcast receiver that the wireless identity transmitter is likely intending to interface with that proximity broadcast receiver, and may additionally include instructions, data, or other information for the proximity broadcast receiver. For example, the return message may include a message indicating the user of the wireless identity transmitter is near, or alternatively instructions on how to handle the user.

In an embodiment, the return message may indicate information describing the certainty of the determination that the recipient proximity broadcast receiver is the closest to the wireless identity transmitter. Additionally, the return message may request a confirmation of proximity to the wireless identity transmitter. For example, the closest proximity broadcast receiver may confirm that it is the closest proximity broadcast receiver based on subsequent input data related to the user of the wireless identity transmitter (e.g., the user of the wireless identity transmitter pressed a 'confirm' button on the proximity broadcast receiver). In another embodiment, the central server may transmit messages to the proximity broadcast receivers determined to not be the closest proximity broadcast receiver, indicating that these proximity broadcast receivers are not closest and/or the identity of the determined closest proximity broadcast receiver. In response, the proximity broadcast receivers that are not the closest may modify their subsequent transmission of sighting messages regarding the wireless identity transmitter. For example, the proximity broadcast receivers may adjust (i.e., increase or decrease) the frequency of transmitting sighting messages regarding the wireless identity transmitter (i.e., adjust receiver thresholds) or alternatively may ignore future broadcast messages from the wireless identity transmitter for a period of time.

Figure 19:
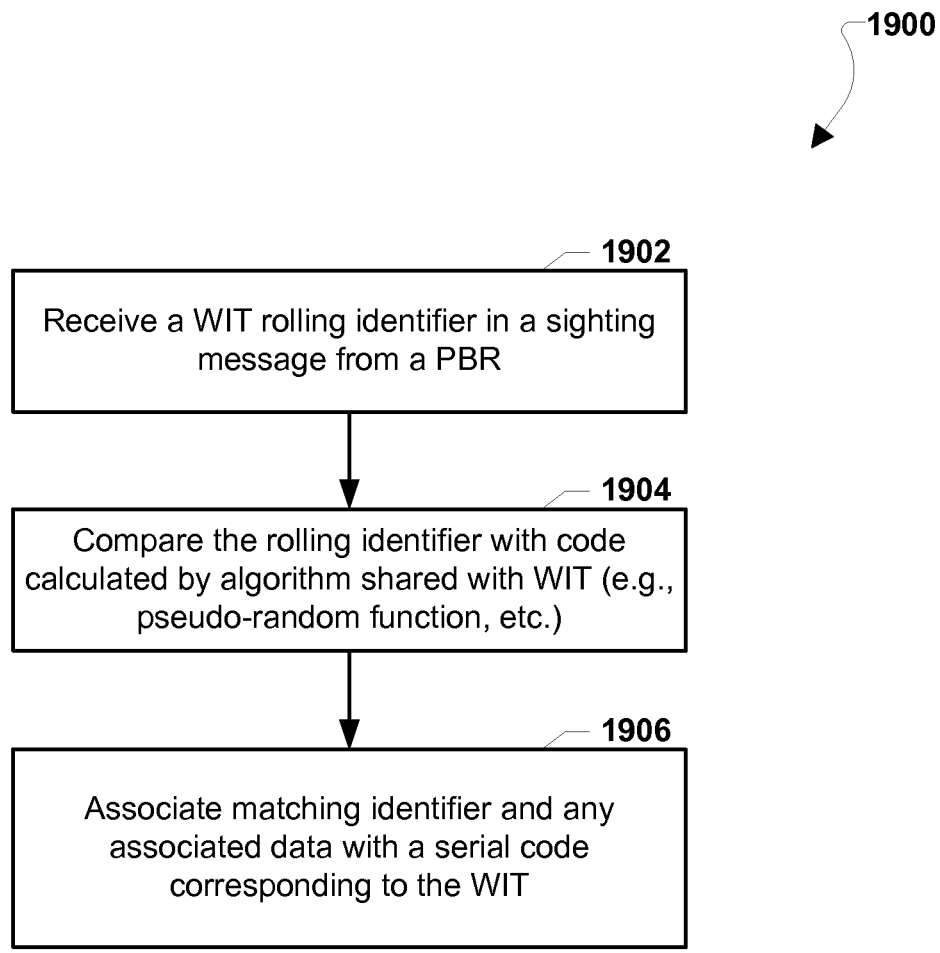
FIG. 19 is a process flow diagram illustrating an embodiment method for a server handling a rolling identifier.

FIG. 19 illustrates an embodiment method 1900 that may be implemented within a central server. The method 1900 may be performed by the central server in response to receiving a sighting message from a proximity broadcast receiver that includes encoded, rolling, or otherwise protected data originally broadcast by a wireless identity transmitter. Privacy of users of wireless identity transmitters may be protected by using a rolling or randomly varying identifier for each wireless identity transmitter so the identifier changes with time. New identifiers may be generated periodically or based on certain events, such when a wireless identity transmitter broadcasts an identifier a certain number of times or for a certain time period (e.g., an hour), or after one or more pairings. This rolling of identifiers may be coordinated with the central server so that the wireless identity transmitter may still be tracked. For example, the wireless identity transmitter and the central server may each have a cryptographically secure pseudo-random number generator algorithm that is used to generate identifiers on a common time scale so that any given moment, the central server can calculate the identifier being transmitted by a particular wireless identity transmitter.

Generating rolling identifiers, or other methods of obfuscating identifiers, is important in that it may prevent sniffing attacks from a third party. For example, if the identifier was static, a third party could sniff the identifier, such as by impersonating a proximity broadcast receiver, and then use the identifier to track the wireless identity transmitter. A rolling identifier may hinder such an attack impossible if the third party lacks the pseudo-random number generator or other means of generating the latest rolling identifiers.

In block 1902, the central server may receive a wireless identity transmitter's rolling identifier in a sighting message from a proximity broadcast receiver. In block 1904, the central server may compare the rolling identifier with code calculated by an algorithm shared with the wireless identity transmitter, such as a pseudo-random function or an encryption algorithm with shared secret keys. The algorithm may be software instructions, routines, algorithms, circuitry, or modules that are utilized by the central server to calculate codes that are expected to align with rolling identifiers generated and broadcast by the wireless identity transmitter over a period. In various embodiments, the central server may compare the received identifier with the next several codes in case some identifiers were missed. If the received identifier matches any codes generated or expected by the central server, in block 1906 the central server may associate the matching identifier and any associated data with a serial code corresponding to the wireless identity transmitter. This way, if the central server later receives a user request with the wireless identity transmitter's serial code, such as a request from a parent to locate the wireless identity transmitter carried by a child, then the central server can find all the prior matches and any associated data without having to search for every previous rolling identifier.

In an embodiment, when initiating a search for a target wireless identity transmitter, the central server may use the shared algorithm and information (e.g., key) to generate a target device ID that is transmitted in an alert message. In this embodiment, alert messages may be retransmitted with an updated target device ID whenever the target wireless identity transmitter is scheduled to roll its identifier. Various algorithms for generating rolling identifiers or other encoded identifiers, as well as other decoding algorithms, are discussed below.

FIGS. 20-24C illustrate various embodiment methods for synchronizing a nonce or counter between a wireless identity transmitter and a central server to enable transmitting and receiving obscured information. The wireless identity transmitter may perform various methods for broadcasting messages that include obscured identifiers and data (i.e., payloads) that identify the wireless identity transmitter to the central server and provide a relative reading on the wireless identity transmitter clock. Likewise, the central server may perform various methods for processing obscured information within received messages corresponding to the wireless identity transmitter. As described above, the broadcast messages from the wireless identity transmitter may be sent to the central server directly or through intermediary devices, such as proximity broadcast receivers transmitting sighting messages.

Due to privacy concerns regarding unintended tracking of devices described above, the wireless identity transmitter may obscure information within the transmitted messages through obfuscation measures (e.g., encryption or pseudo-random data generation) known only to the central server and wireless identity transmitter. In an embodiment, the wireless identity transmitter may maintain a clock or timer mechanism that is represented by a nonce or counter value and that may begin once the device is operational (e.g., activated through the insertion of a battery). The clock may be relatively low-quality and therefore may drift unlike more accurate clocks, such as in the central server (e.g., clocks calibrated by periodic atomic clock readings). The counter or nonce may be a non-repeating number generated by the wireless identity transmitter, and may be changed each time wireless identity transmitter encodes its identifier for broadcasting, such as once every hour or even once every broadcast message. In various embodiments, nonces or counters (or counter values) may be encrypted or encoded using pseudo-random functions or other encryptions algorithms (e.g., AES). For example, a wireless identity transmitter may encode a nonce or counter value with an AES-CTR block cipher to create a nonce for use in generating the payload including a rolling identifier of a broadcast message. As another example, a nonce may be generated by applying a linear feedback shift register (LFSR) to a nonce or counter value.

As described throughout the disclosure, the wireless identity transmitter may also store a unique device identification code or number (i.e., a device identifier or 'deviceID') and be pre-provisioned with a per-device shared secret key (or K) which is associated with the unique identifier at the central server. For example, the central server may store the unique device identifier and the secret key in a database and may maintain a table of deviceID and K pairs for all wireless identity transmitters registered with the central server. The central server may use the device identifier and secret key, along with other information such as reported nonce or counter values, to identify, decrypt and otherwise process obscured messages from the wireless identity transmitter. In an embodiment, the device identifier (or deviceID) may be generated sequentially or randomly.

Figure 20:
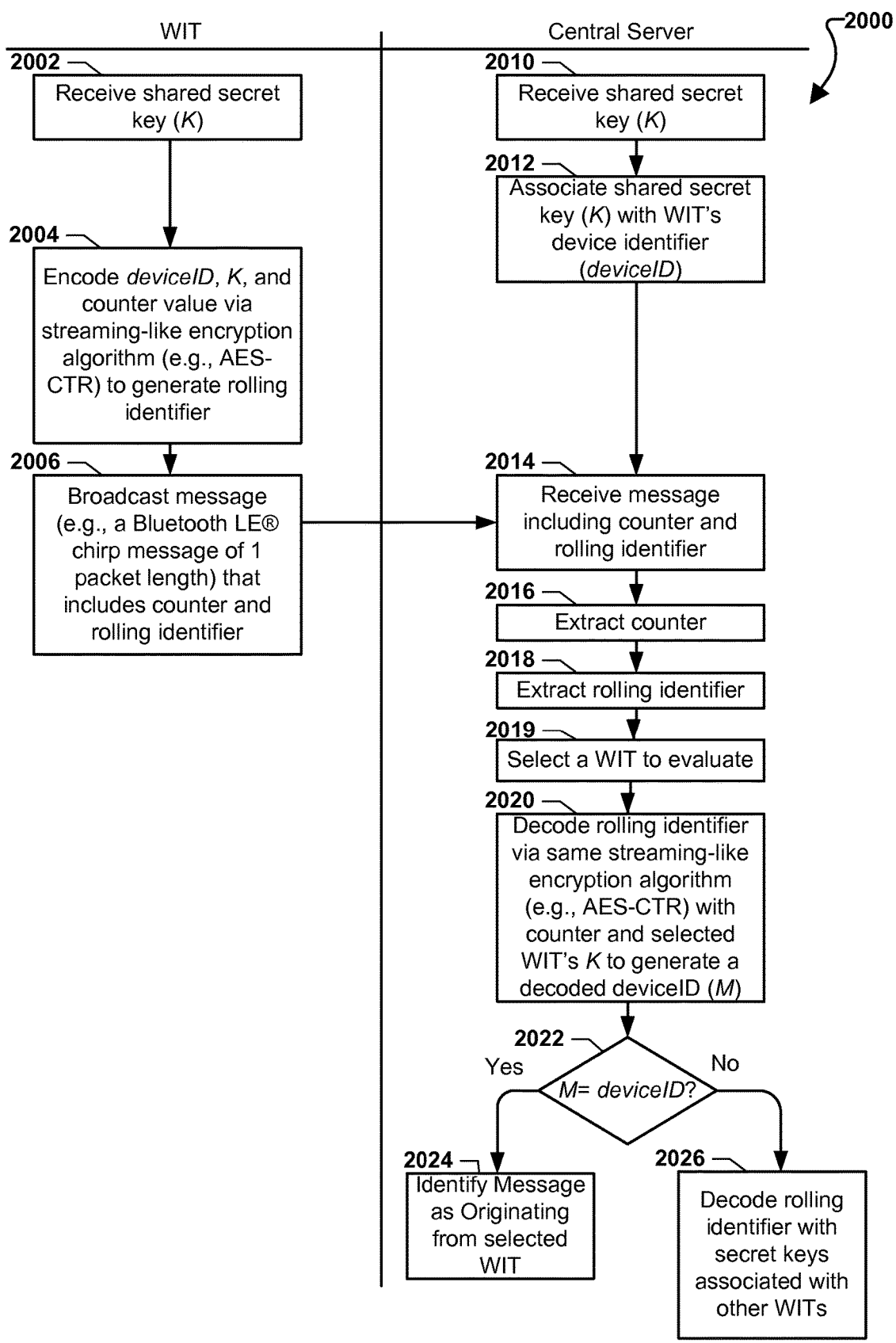
FIG. 20 is a process flow diagram illustrating embodiment operations by a wireless identity transmitter and a central server for transmitting and processing rolling identifiers encrypted with an encryption algorithm.

FIG. 20 illustrates an embodiment method 2000 for a central server to identify a wireless identity transmitter indicated by encrypted data within a message broadcast by the wireless identity transmitter. In block 2002, the wireless identity transmitter may receive a shared secret key (i.e., "K"). In other words, the wireless identity transmitter may be pre-provisioned with a per-device shared secret key (K), such as during manufacturing. In another embodiment, the wireless identity transmitter may receive the secret key in a messages broadcast from a proximate proximity broadcast receiver, such as described above with reference to FIG. 4A. The secret key may be associated with the wireless identity transmitter's unique device identifier (i.e., deviceID) at the central server. In an embodiment, the secret key may be a 128 bit secret key.

In block 2004, the wireless identity transmitter may encode the device identifier (deviceID), secret key (K), and a nonce or counter value via a streaming-like encryption algorithm (e.g., AES-CTR encryption) to generate a rolling identifier. "AES-CTR" is one of the confidentiality modes recommended by the National Institute of Standards and Technology for implementations of the Advanced Encryption Standard (AES). In an embodiment, the wireless identity transmitter may include an AES coprocessor that is configured to support the "CTR" mode. In an embodiment, the rolling identifier may be represented by the following equation:

Rolling identifier=
(deviceID∥data)XOR(MSB_$N$(AES_$K(t)$))

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits). This rolling identifier may then be included in the broadcast message that is regularly transmitted by the wireless transmitter device. In an embodiment, other device data (e.g., battery level, temperature, etc.) may be transmitted along with the rolling identifier in a broadcast packet.

In a further embodiment, other information may be included within the rolling identifier. Thus, in addition to providing an obscured identifier for the wireless identity transmitter, the rolling identifier field may include obscured data that only the central server can recover. One method for accomplishing this is to concatenate the additional information, such as a few bits to indicate the battery status (bat_stat) to the device identifier (deviceID) and applying the XOR function to the concatenation. The amount of additional information (i.e., number of bits of information) that can be included within (i.e., obscured within the same data field of) the rolling identifier is limited by the length N of significant bits within the rolling identifier field. Thus, if more bits are available in the data portion carrying the rolling identifier, more such data may be included within the encrypted rolling identifier. Since the data that is included within the rolling identifier is likely to change over time, this approach may further obscure the device's identity.

If more data is desired to be transmitted in broadcast messages, some of that data may be carried in the clear or encrypted with the data. There are a number of approaches for including data (e.g., battery state, temperature, etc.) within broadcast messages. In addition to including the data within the rolling identifier as described above, the data may be added by concatenating the data to the end of the rolling identifier as part of the manufacturer specific data payload, either before or after the rolling identifier, as sensor data in the clear. Thus, if there are more bits available in the manufacturer specific data payload they may be used to convey the data in the clear. Alternatively, the data may be encoded using the same key as used to generate the rolling identifier or an alternate key that is known to the server to be associated with the wireless identity transmitter or such data fields. In this alternative, the information in the rolling identifier enables the server to both determine the device's true identifier and the encryption key used to encrypt the other data included in the message. In yet a further embodiment, these options for carrying other data may be combined, such that some of it is included within the rolling identifier, some is carried in the clear and/or some data may be encrypted and included within the broadcast message.

In block 2006, the wireless identity transmitter may then broadcast a message that includes the nonce and the rolling identifier, or simply the rolling identifier (i.e., without a nonce). In an embodiment, the broadcast message may be a single packet length Bluetooth LE® chirp message. In various embodiments, the nonce included in the broadcast message may be 20 bits and the rolling identifier may be 60 bits, so that the entire broadcast message is 80 bits.

As an example embodiment in which the battery status is included within the rolling identifier, the broadcast message (or the payload of the broadcast message) may be represented by the following equation:

Payload=$t$∥(deviceID∥bat_stat)XOR(MSB_
$N$(AES_$K(t)$))

where t is the value of the wireless identity transmitter's nonce, which may just be the nonce or counter (e.g., a 20 bit value), 'bat_stat' is the battery status information of the device (e.g., a 4-bit code), '∥' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce in the clear (i.e., not encrypted) in addition to a rolling identifier that includes a battery level indicator. In another embodiment, the battery level indicator (i.e., bat_stat) may not be encrypted, and may be included in another field of the broadcast message, such as within the service universally unique identifier (UUID) portion of a message.

In another embodiment, the payload may not include a nonce t, in which case the payload may be represented by the following equation:

Payload=(deviceID∥bat_stat)XOR(MSB_
$N$(AES_$K(t)$)).

In block 2010, the central server may receive the shared secret key (K), such as during the account creation operations described above with reference to FIG. 14. For example, the central server may generate the secret key in response to receiving account registration information from the user of the wireless identity transmitter (e.g., deviceID and registration request information). In block 2012, the central server may associate the shared secret key (i.e., K) with the wireless identity transmitter's device identifier (i.e., deviceID). For example, the central server may store the deviceID and K in a data table of registered devices.

In block 2014, the central server may receive a message including the nonce or counter and the rolling identifier. For example, the received message may be a sighting message from a proximity broadcast receiver that includes the information broadcast by the wireless identity transmitter with the operations in block 2006. In block 2016, the central server may extract the nonce or counter from the received message, and in block 2018 may extract the rolling identifier. In block 2019, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 2020, the central server may decode the rolling identifier via the same streaming-like encryption algorithm (e.g., AES-CTR) with the nonce or counter and the selected wireless identity transmitter's secret key (K) to generate a decoded device identifier (or M). For example, the central server may perform a decoding operation based on the AES-CTR algorithm that uses the rolling identifier as input along with the selected wireless identity transmitter's secret key (K) and the nonce or counter indicated in the received message.

In an embodiment, the decoded device identifier (M) may be represented by the following equation:

$$M = (\text{rolling identifier}) \text{XOR}(\text{MSB}\_\{N-a\}(\text{AES}\_K(t))),$$

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_{N-a}' means the 'N-a' most significant bits (e.g., 56 bits when a is 4 bits and N is 60 bits).

In determination block 2022, the central server may determine whether the decoded device identifier (M) and the deviceID match. In other words, the central server may compare the decoded device identifier (M) to the deviceID for the selected wireless identity transmitter whose secret key (K) was used with the AES-CTR algorithm operations to obtain the decoded device identifier (M). If M and the deviceID do match (i.e., determination block 2022="Yes"), in block 2024, the central server may identify the broadcast message as originating from the selected wireless identity transmitter. If M and the deviceID do not match (i.e., determination block 2022="No"), in block 2026 the central server may decode the rolling identifier with secret keys associated with other wireless identity transmitters. For example, the central server may select the next registered wireless identity transmitter and use the corresponding stored pair of a secret key (K) and corresponding deviceID. In this manner, all K and deviceID pairs stored for all registered wireless identity transmitters and/or users of the system may be tried by the central server until a match is found that identifies the originator of the broadcast message.

Figure 21A:
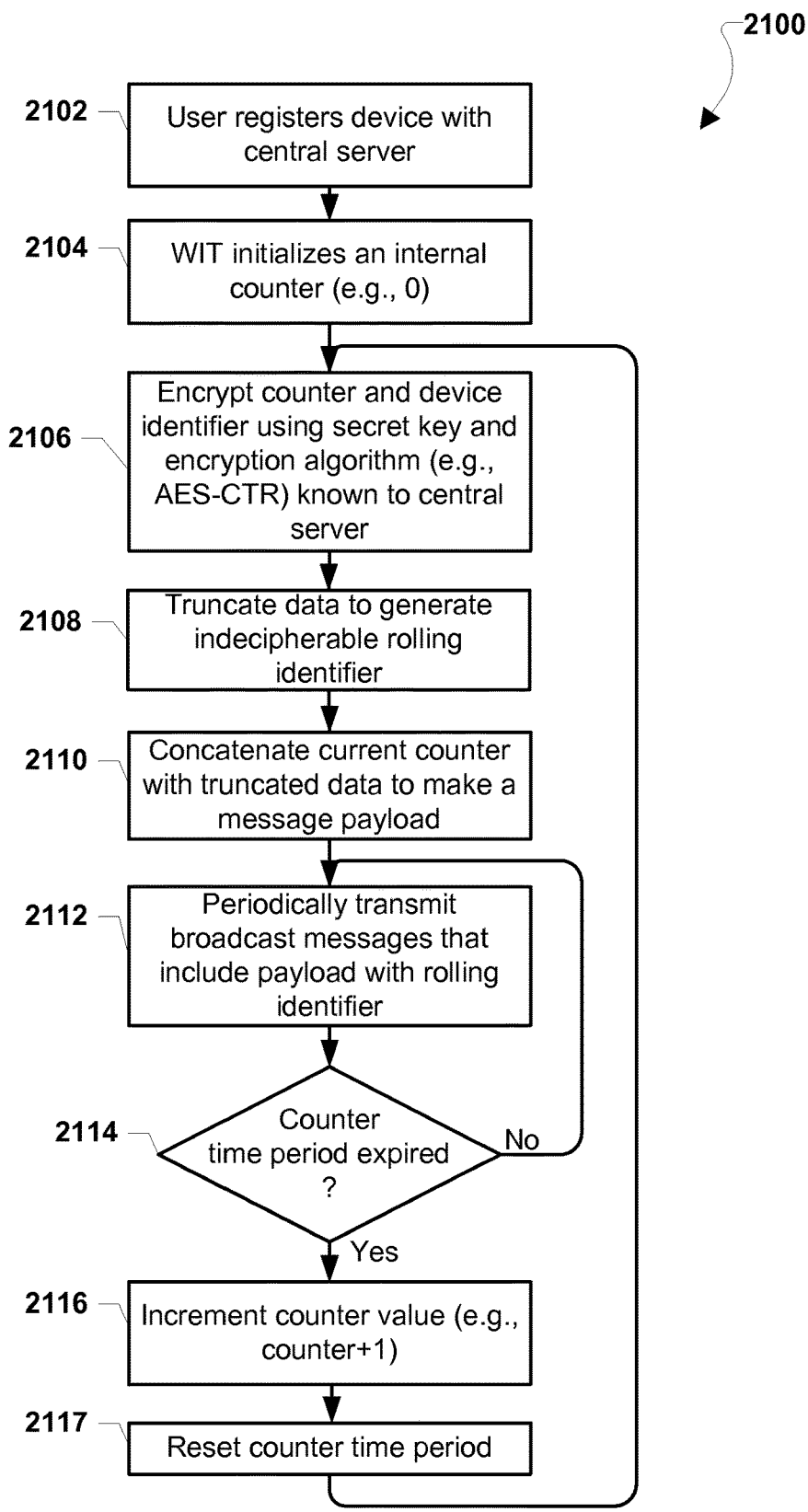
FIG. 21A is a process flow diagram illustrating an embodiment method for a wireless identity transmitter generating and broadcasting rolling identifier payloads using an encryption algorithm.

FIG. 21A illustrates the embodiment method 2100 for a wireless identity transmitter generating and broadcasting an encrypted message (i.e., a rolling identifier) for receipt/use by a central server.

In block 2102, a user of the wireless identity transmitter may register the device with the central server. The services the wireless identity transmitter utilizes may require registrations of all active devices employed by users (e.g., consumers, proprietors, etc.). The registration process may include an initial synchronization with the central server by the user of the wireless identity transmitter. For example, the user of the wireless identity transmitter may register the device with the central server through a Web application, in a mobile device or a PC able to receive wireless identity transmitter messages and operated by the user. The wireless identity transmitter may be required to be registered with the central server within a certain time period from activation of the device. For example, the wireless identity transmitter may be required to be registered within the first 24 hours after the device is initiated (e.g., a battery is placed within the wireless identity transmitter). Registration operations are further described above with reference to FIG. 14.

In block 2104, the wireless identity transmitter may initialize an internal nonce or counter, such as by setting the nonce or counter to a zero value. The nonce or counter initialization may occur due to a triggering event, such as the placement of a battery or power source within the wireless identity transmitter. For example, the nonce or counter may begin incrementing once the wireless identity transmitter is activated or powered on. Alternatively, the initialization may occur in response to registration operations described above. The nonce or counter may begin with '0' (or any other starting value, such as '1') and may be incremented periodically by the wireless identity transmitter. In an embodiment, when the battery of the wireless identity transmitter is replaced (e.g., due to battery failure) or the wireless identity transmitter is otherwise reset/restarted/rebooted, the nonce or counter may return to the initial value (e.g., '0'). The nonce or counter may not repeat the value it represents unless the wireless identity transmitter is reset/restarted/rebooted. In an alternative embodiment, during initialization of the nonce or counter, the wireless identity transmitter may read from flash memory a predefined initial nonce or counter value. For example, the wireless identity transmitter may initialize the nonce or counter with a value set at a factory or updated by an installed application.

In an embodiment, the counter or nonce may be initialized and adjusted in a random or pseudo-random fashion using methods well known in the art. The nonce or counter may be a pseudo-randomly generated value that can be replicated in both the wireless identity transmitter and the central server. In another embodiment, the nonce or counter may be generated by the wireless identity transmitter using a linear feedback shift register (LFSR) with a proper period configured to create nonce or counter values that do not repeat during the lifetime of the device. Such nonces or counters derived from the LFSR may also be pseudo-random.

In block 2106, the wireless identity transmitter may encrypt the concatenated data using a secret key and encryption algorithm known to the central server. For example, the wireless identity transmitter may encode the nonce or counter and/or the device identifier (i.e., deviceID) using an AES-CTR block cipher. The encryption algorithm may utilize the secret key for encryption and decryption purposes, as the secret key is known by both the central server and wireless identity transmitter. The encryption algorithm may result in encrypted (or encoded) data of a certain size.

For example, using the AES-CTR cipher, the wireless identity transmitter may generate encoded data of 128-bits. In an embodiment, the wireless identity transmitter may generate encrypted data represented by the following equation:

(deviceID∥bat_stat)XOR(MSB_$N$(AES_$K$($t$))), where t is the value of the wireless identity transmitter's nonce or counter (e.g., a 20 bit value), 'bat_stat' is the battery status information of the wireless identity transmitter (e.g., a 4-bit code), '∥' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce or counter in the clear (i.e., not encrypted) in addition to a rolling identifier that includes a battery level indicator. In another embodiment, the encrypted data may be represented by the following equation:

(deviceID)XOR(AES_$K$($t$)), where deviceID is a unique device identifier, t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits).

Due to the limited communication capabilities of the wireless identity transmitter, the payload of broadcast messages (e.g., the payloads supported by Bluetooth LE broadcast packets) may not be able to contain the entire encrypted message, but instead only include a portion of an encrypted piece of data. Accordingly, in block 2108, the wireless identity transmitter may truncate data to generate an indecipherable rolling identifier. In other words, by truncating the encrypted data, the wireless identity transmitter may create an identifier to be put in a broadcast message (or payload) such that the identifier's size may be supported by the utilized communication format, such as Bluetooth LE. For example, the wireless identity transmitter may truncate the encrypted data to fit within an 80-bit payload maximum size. When encrypted data is truncated, the decryption of that data within the central server may be impossible. However, the incomplete encrypted data may still be used by the central server as described below with reference to FIG. 21B. In an embodiment, truncation may be accomplished with a function, such as a most-significant-bit operation. In another embodiment, the truncated data may be represented by the following equation:

TRUNC(deviceID XOR AES_$K$($t$)), where t is the value of the wireless identity transmitter's nonce or counter (e.g., a 20 bit value), 'XOR' denotes the bitwise exclusive-or operation, 'AES_K( )' is the AES block cipher with key 'K', and 'TRUNC( )' denotes a truncation operations that may create a certain number of bits or bytes (e.g., 56 bits or 7 bytes).

In block 2110, the wireless identity transmitter may concatenate the current nonce or counter with the truncated data to make a message payload. For example, the wireless identity transmitter may combine the current wireless identity transmitter system clock value (e.g., 20 bits long) with the unique identification code of the wireless identity transmitter truncated to be 60 bits long. In an embodiment, the payload may include both encrypted data and unencrypted data (or "in the clear" data). For example, the payload may contain many bits representing the encrypted and/or truncated data and several other bits that represent the battery status of the wireless identity transmitter or a nonce or counter value.

In block 2112, the wireless identity transmitter may periodically transmit broadcast messages that include the payload with the rolling identifier, such as by broadcasting via short-range wireless communication techniques as described above. The frequency of transmissions of the broadcast messages may vary dependent upon system configurations, user settings, or any other source of scheduling and timing relevant for wireless identity transmitters communicating via radio signals. For example, the wireless identity transmitter may broadcast the rolling identifier every few seconds.

In determination block 2114, the wireless identity transmitter may determine whether a predefined nonce or counter time period has expired. This nonce or counter time period may be set in a similar manner as the broadcast frequency periodicity as described above. For example, the manufacturer or may establish the nonce or counter time period using various techniques, such as hard-coding variables within the wireless identity transmitter's processor circuitry.

If the nonce or counter time period has not expired (i.e., determination block 2114="No"), the wireless identity transmitter may continue with the operations in block 2112. For example, the wireless identity transmitter may broadcast the payload via short-range radio transmissions at a frequency of a few seconds for a time period of many minutes.

If the device determines the nonce or counter time period has expired (i.e., determination block 2114="Yes"), in block 2116 the wireless identity transmitter may increment the nonce or counter value, such as by adding 1. In block 2117, the wireless identity transmitter may reset the nonce or counter time period. For example, after a nonce or counter time period has expired, the wireless identity transmitter may increase the nonce or counter by a value of 1 and reset the nonce or counter time period to 0. The wireless identity transmitter may continue with the operations in block 2106 (e.g., the wireless identity transmitter may create a new payload and broadcast it for another nonce or counter time period).

Figure 21B:
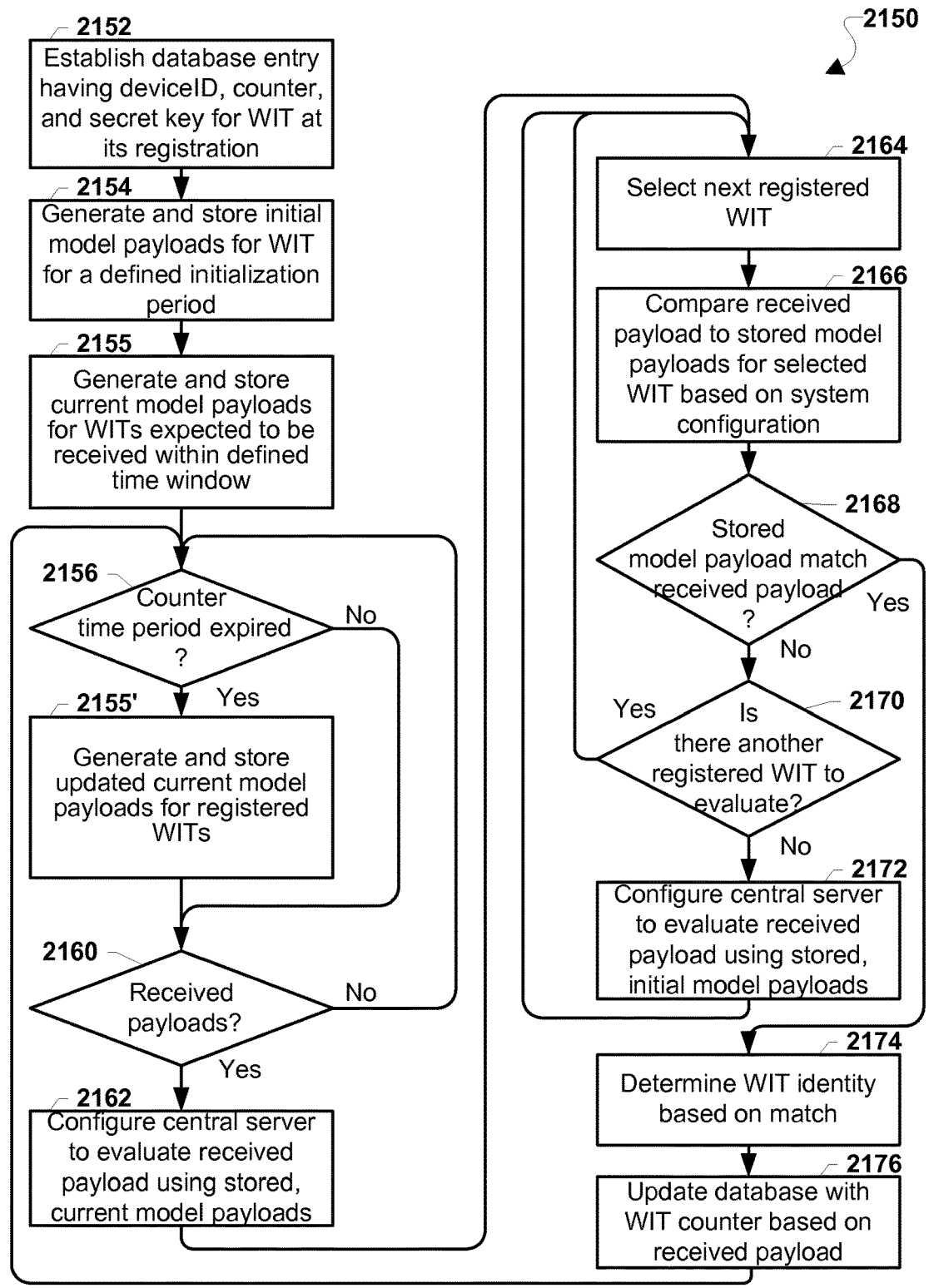
FIG. 21B a process flow diagram illustrating an embodiment method for a central server receiving and handling rolling identifier payloads using an encryption algorithm.

FIG. 21B illustrates an embodiment method 2150 for a central server receiving messages and syncing timing nonce or counters based on payload information. In block 2152, the central server may establish a database entry having the device identifier (i.e., deviceID), nonce or counter, and secret key data for the wireless identity transmitter at its registration. The central server may maintain a database containing data records for each wireless identity transmitter associated with the central server and/or the central server's affiliated services. The database may be populated with information obtained via registration operations described above. Thus, there may be a data record for each wireless identity transmitter associated with the central server, and each record may contain information that represents a particular device's identification, its current nonce or counter (e.g., clock value), and a secret key associated with the wireless identity transmitter. In an embodiment, the secret key may be unique to each wireless identity transmitter registered with the central server. In an embodiment, the central server may also store the initial nonce or counter value for each wireless identity transmitter registered with the central server.

In various embodiments, when a wireless identity transmitter is registered, the central server may store the initial nonce or counter value for the wireless identity transmitter. Dependent upon the time between the activation of the wireless identity transmitter (e.g., when the battery was inserted and the device became operational) and the registration of the device, the initial nonce or counter for the wireless identity transmitter may or may not be 0. For example, if the registration of the wireless identity transmitter with the central server occurred several hours after a user inserted a battery in the wireless identity transmitter, the initial nonce or counter may not be 0. In an embodiment, the central server may also indicate the registration status of the wireless identity transmitter by setting a registration flag or other indicator and may store information describing wireless identity transmitters that have yet to be registered in the database. In an embodiment, the central server may maintain a database with initial values provided for all known wireless identity transmitter whether or not they have been registered. For example, based on manufacturing records, the central server may contain a database having information about every wireless identity transmitter created.

The central server may generate and store model payloads using operations similar to those described above with reference to blocks 2106-2110. Model payloads may be payloads the central server expects to receive from the wireless identity transmitter based on stored secret key, device identifier (deviceID), and nonce or counter information. For example, for each registered wireless identity transmitter, the central server may create a model payload by concatenating the device's deviceID to a nonce or counter value, encrypting the concatenated data using an encryption protocol that employs the secret key for the wireless identity transmitter, and truncating the encrypted data. Each model payload may be stored in a central server data table (or lookup table) in relation to the corresponding deviceID and nonce or counter values used to generate the respective model payloads. For example, for each model payload for each wireless identity transmitter, the central server may store in the data table the model payload, a time offset value (e.g., −2, −1, 1, 2, etc.), and the nonce or counter, all in relation to the deviceID of the wireless identity transmitter.

In block 2154, the central server may generate and store initial model payloads for the wireless identity transmitter for a defined initialization period. For example, starting at the initial nonce or counter value (e.g., 0 or a pseudo-random value known to the device and the central server), the central server may generate model payloads using nonce or counter values that are the same, lower, and/or higher than the actual initial nonce or counter of a wireless identity transmitter such that these model nonces or counters cover the initialization period. In an embodiment, the initialization period may be an hour, several hours, days, etc.). The central server may store the initial model payloads for use in the event of a registration/reset/reboot of a wireless identity transmitter.

In block 2155, the central server may also generate and store current model payloads for wireless identity transmitters expected to be received within a defined time window. To account for possible clock drift in wireless identity transmitters, the central server may generate and store model payloads for the defined time window (or time period) by using multiple derivative nonce or counter values that represent a range of possible nonces or counters. In other words, derivative nonce or counter values may be offsets to the current nonce or counter value stored for a wireless identity transmitter. For example, the central server may generate model payloads for derivative nonce or counter values that are lower and higher than the currently stored nonce or counter value in the database. A derivative nonce or counter value may be the result of an offset value (e.g., −2, −1, 1, 2, etc.) added to the stored nonce or counter value for a wireless identity transmitter. The central server may generate model payloads to represent the stored nonce or counter value and derivative nonce or counter values that incrementally represent the window time period. For example, the model payloads may represent nonces or counters increasing by a small time value, such as an hour, and covering a large period of time, such as multiple hours. As another example, the central server may store a payload corresponding to the current nonce or counter value stored for a wireless identity transmitter, a payload corresponding to the previous nonce or counter value for the device, and a payload corresponding to the next nonce or counter value for the device.

In an embodiment, the first generated current model payloads for a given wireless identity transmitter may be identical to the initial model payloads for the wireless identity transmitter as both sets of payloads may be generated by the central server based on the same initial nonce or counter values. In an embodiment, the initialization period may coincide with the defined time window. For example, the initialization period may involve a similar number of days, hours, minutes, etc. as the defined time window.

In determination block 2156, the central server may determine whether a nonce or counter time period has expired. The central server may initialize the evaluation of a nonce or counter time period at an arbitrary time or, alternatively, upon the receipt of a wireless identity transmitter registration. The nonce or counter time period may be the same period of time used by the wireless identity transmitters as described above with reference to determination block 2114.

If the nonce or counter time period has expired (i.e., determination block 2156="Yes"), in block 2155' the central server may generate and store updated current model payloads for registered wireless identity transmitters. The updated current model payloads may replace the previous current model payloads and may be based on the stored nonce or counter value in each respective wireless identity transmitter's database record.

If the nonce or counter time period has not expired (i.e., determination block 2156="No") or if the nonce or counter time period has expired and the central server has generated updated current model payloads, in determination block 2160, the central server may determine whether any payloads have been received. In an embodiment, payloads may be delivered directly from wireless identity transmitters or alternatively indirectly from proximity broadcast receivers via sighting messages which include (or relay) rolling identifier payloads from proximate wireless identity transmitters to the central server. If no payloads have been received (i.e., determination block 2160="No"), the central server may continue with the operations in determination block 2156.

If a payload has been received (i.e., determination block 2160="Yes"), in block 2162, the central server may be configured to evaluate the received payload using stored, current model payloads, such as the current model payloads stored for each registered wireless identity transmitter. As described above, the central server may maintain two sets of stored model payloads for each registered wireless identity transmitter, an initial model payload set that may include model payloads based on the initial nonce or counter and derivative nonce or counter values that span the initialization period, and a current model payload set that is based on the current nonce or counter value stored within the database record for each wireless identity transmitter. In an embodiment, the central server may set a system variable indicating the central server should compare the received payload to stored, current model payloads. The system variable may be set to direct the central server to evaluate either the current or initial model payloads for wireless identity transmitters.

In blocks 2164-2172, the central server may perform an operational loop in which the central server compares the received payload (i.e., data broadcast by the wireless identity transmitter) to stored model payloads for all registered wireless identity transmitters until a match is found. In block 2164, the central server may select a next registered wireless identity transmitter. The central server may determine the next registered device based on the database of registered wireless identity transmitters and may sequentially iterate through each device during the operations in blocks 2164-2172. In block 2166, the central server may compare the received payload to the stored model payloads for the selected wireless identity transmitter based on the system configuration, such as the configuration set in the operations in block 2162. For example, based on the system variable set to 'current' with the operations in block 2162, the central server may compare the received payload to stored current model payloads for the selected wireless identity transmitter. Based on the form of the encrypted data of the received payload, the comparison may be a pattern-matching routine in which the central server compares the data of the model payloads against the received payload. For example, the central server may compare the bit values for the stored and received payloads.

In determination block 2168, the central server may determine whether any of the stored model payloads match the received payload. If none of the stored model payloads match the received payload (i.e., determination block 2168="No"), in determination block 2170, the central server may determine whether there is another registered wireless identity transmitter to evaluate. In other words, the central server may determine whether the stored model payloads of all registered wireless identity transmitters have been evaluated. If there is another registered wireless identity transmitter to evaluate (i.e., determination block 2170="Yes"), the central server may continue by selecting the next registered wireless identity transmitter with the operations in block 2164.

If the central server has evaluated the stored model payloads of all registered wireless identity transmitters (i.e., determination block 2170="No"), in block 2172, the central server may be configured to evaluate the received payload using stored, initial model payloads, such as the initial model payloads stored for each registered wireless identity transmitter at the time of the devices' registration. For example, the central server may set a system variable indicating the central server should compare the received payload to stored, initial model payloads for evaluated registered wireless identity transmitters (e.g., the system variable may be set to 'initial'). The operational loop may then continue with the operations in blocks 2164-2168 wherein the central server may select each registered wireless identity transmitter and compare the initial model payloads of that selected device to the received payload.

If the central server does find a match between the received payload and any of the stored model payloads (current or initial) of a registered wireless identity transmitter (i.e., determination block 2168="Yes"), in block 2174, the central server may determine a wireless identity transmitter identity based on the match. In other words, the central server may identify the wireless identity transmitter corresponding to the received payload based on the identification information (e.g., deviceID) stored in relation to the matching stored model payload. In block 2176, the central server may update the database with the identified wireless identity transmitter's nonce or counter based on the received payload. Based on the database record corresponding to the matching stored model payload, the central server may determine the derivative nonce or counter value corresponding to the received payload and may update the stored nonce or counter value to represent the derivative nonce or counter value, thus syncing the identified wireless identity transmitter's nonce or counter and the central server nonce or counter. In an embodiment, the central server may also store in the database the central server nonce or counter (or time) at which the central server received the received payload.

In an embodiment, the central server may maintain a list (or data table) of recently received messages and the corresponding wireless identity transmitter identification. For example, the central server may record within a data table the deviceID and payload information for messages received within a certain period. The central server may compare any subsequently received payload to the data table to determine whether the subsequently received payload is redundant based on recently received payloads from the same wireless identity transmitter. For example, a subsequently received payload may represent a certain nonce or counter value from a particular wireless identity transmitter that was already received and processed by the central server a few minutes ago. This may expedite the method 2150 process and decrease search times for the operations in blocks 2164-2172. In an embodiment, the central server may expunge (or clear) the data table of recently identified payloads and wireless identity transmitters and may schedule the clearing operations similarly as described in block 2176 (e.g., the recent data table may be cleaned every time the nonce or counter time period is determined to be expired).

Figure 22:
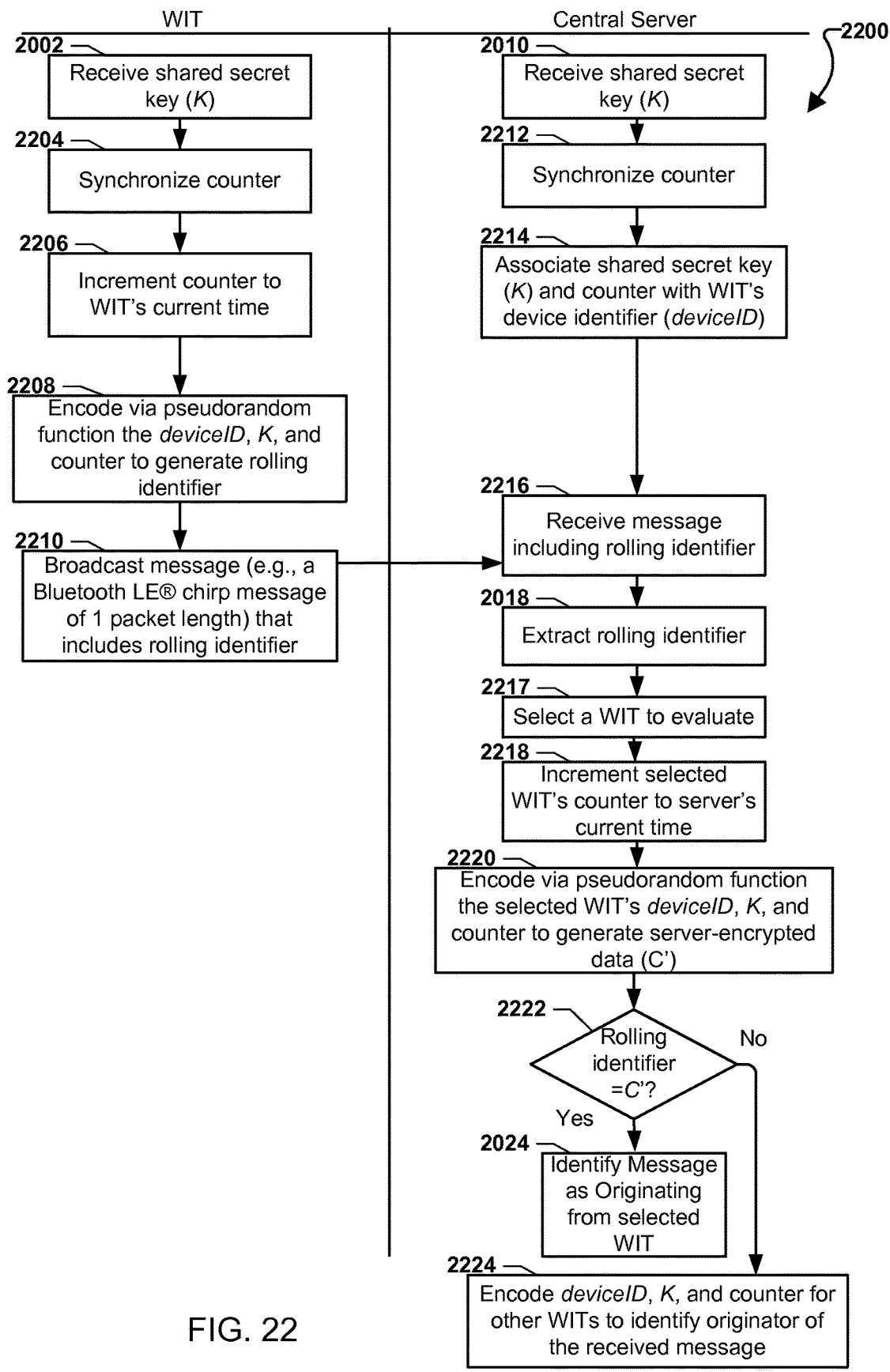
FIG. 22 is a process flow diagram illustrating embodiment operations by a wireless identity transmitter and a central server for transmitting and processing rolling identifiers using a pseudo-random function.

FIG. 22 illustrates another embodiment method 2200 for a central server to identify a wireless identity transmitter indicated by encrypted data within a message broadcast by the wireless identity transmitter. In the operations of the method 2200, nonce or counter values may never be included in broadcast messages to increase the security with which wireless identity transmitters transmit their identities. For example, as nonce or counter values may differ among different wireless identity transmitters, an attacker with the ability to capture a broadcast message may be able to easily predict values within future broadcast messages from the wireless identity transmitter. However, without nonce or counter data transmitted in the clear, nefarious snoopers may be better thwarted from following broadcasts from a particular wireless identity transmitter.

In block 2002, the wireless identity transmitter may receive a shared secret key (i.e., "K"). For example, each wireless identity transmitter may be pre-provisioned with a per-device shared secret key which is associated with the wireless identity transmitter's unique device identifier (or deviceID) at the central server. In block 2204, the wireless identity transmitter may synchronize a nonce or counter. The nonce or counter may be synchronized with the central server upon registration of the wireless identity transmitter at the central server. The synchronized nonce or counter value may also be associated with the deviceID and K in a data table stored in the central server (e.g., a table with stored pairs of IDs and K values).

In block 2206, the wireless identity transmitter may increment the nonce or counter to the wireless identity transmitter's current device time. For example, the nonce or counter may be incremented after a predefined number of seconds (e.g., one second, one hour, etc.). As another example, every 3600 seconds the wireless identity transmitter may increment the nonce or counter by one value. In this manner, the nonce or counter value may change to the current time as counted by the oscillator on the wireless identity transmitter. In block 2208, the wireless identity transmitter may encode via a pseudo-random function the device identifier (i.e., deviceID), the shared secret key (i.e., K), and the nonce or counter to generate a rolling identifier. In this manner, the rolling identifier may be generated as the nonce or counter value changes. In an embodiment, the pseudo-random function may be a polynomial time computable function with a seed ('s') and input variable ('x'), such that when the seed is randomly selected and not known to observers, the pseudo-random function (e.g., PRF(s, x)) may be computationally indistinguishable from a random function defined on the same domain with output to the same range. For example, the Keyed-Hash Message Authentication Code (HMAC) or the Cipher-Based Message Authentication Code (CMAC) may be used as the pseudo-random function.

In block 2210, the wireless identity transmitter may broadcast a message (e.g., a Bluetooth LE chrp message of 1 packet length) that includes the rolling identifier. In an embodiment, the broadcast message (or the payload of the broadcast message) may be represented by the following equation:

$$\text{Payload} = \text{MSB\_}N(\text{PRF}(K,(\text{deviceID}\|t)))$$

where t is the value of the wireless identity transmitter's nonce or counter, '||' means concatenation, 'PRF( )' is the pseudo-random function, and 'MSB_N( )' means the 'N' most significant bits (e.g., 80 bits). In other words, the wireless identity transmitter may intentionally obscure (or skew) the device identifier and the nonce or counter information, thus the broadcast message's payload may not include either the device identifier or the nonce or counter information in the clear.

In block 2010, the central server may receive the shared secret key (K). In block 2212, the central server may synchronize a nonce or counter. For example, the nonce or counter may be set to represent a value included in a previous message related to the wireless identity transmitter, such as a registration message. In block 2214, the central server may associate the shared secret key (i.e., K) and nonce or counter with the wireless identity transmitter's device identifier (i.e., deviceID). For example, the central server may store the deviceID, K, and nonce or counter in a data table of registered devices (e.g., in a tuple record of a database). In an embodiment, the central server may also store an indicator or flag indicating whether each wireless identity transmitter has been registered or activated.

In block 2216, the central server may receive a message including the rolling identifier. For example, the received message may be a sighting message from a proximity broadcast receiver that includes the rolling identifier broadcast by the wireless identity transmitter with the operations in block 2210. In block 2018, the central server may extract the rolling identifier, such as by parsing the received message to identify the payload of the rolling identifier.

In block 2019, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 2218, the central server may increment the selected wireless identity transmitter's nonce or counter to the server's current time. In an embodiment, the central server may then increment the stored nonce or counter value to account for the time that has elapsed since the stored nonce or counter value was synchronized. As an example, the central server may compare the time of receipt of the message with the operations in block 2216 to the central server's current time (e.g., via a central server clock or time mechanism). Based on a known periodicity that wireless identity transmitters may increment their individual nonces or counters (e.g., once every hour), the central server may increment the selected nonce or counter value to account for the time difference.

In an embodiment, the central server may only increment the selected nonce or counter an amount that represents the time between broadcasts by a wireless identity transmitter. In other words, the central server may not increment the selected nonce or counter to include the time between receiving the message within the operations in block 2216 and the time a proximity broadcast receiver received the broadcast message. For example, the proximity broadcast receiver may have buffered broadcast messages before relaying sighting messages to the central server. The central server may calculate this time difference based on metadata within the message received with the operations in block 2216. For example, a sighting message from a proximity broadcast receiver may indicate when a broadcast message was received. Thus, the amount the selected nonce or counter is incremented may be based on when the proximity broadcast receiver actually received the broadcast message and not when the message from the proximity broadcast receiver was received by the central server.

In block 2220, the central server may encode via a pseudo-random function the selected wireless identity transmitter's device identifier, secret key, and nonce or counter to generate a server-encrypted data (i.e., C'). The pseudo-random function may be the same pseudo-random function utilized in the operations in block 2208. In an embodiment, the generated server-encrypted data may be represented by the following equation:

$$C' = \text{MSB\_}N(\text{PRF}(\text{sel\_}K,(\text{sel\_deviceID}\|\text{sel\_}t)))),$$

where sel_K is the value of the selected wireless identity transmitter's secret key, sel_deviceID is the value of the selected wireless identity transmitter's unique device identifier, sel_t is the value of the selected wireless identity transmitter's nonce or counter, '||' means concatenation, 'PRF( )' is the pseudo-random function, and 'MSB_N( )' means the 'N' most significant bits (e.g., 60 bits, 74 bits, 80 bits, etc.).

In determination block 2222, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 2222="Yes"), in block 2024 the central server may identify the received message as originating from the selected wireless identity transmitter (e.g., corresponding to the selected wireless identity transmitter's unique identifier).

If the rolling identifier and the generated data do not match (i.e., determination block 2222="No"), in block 2224 the central server may encode device identifiers, secret keys, and nonces or counters for other wireless identity transmitters to identify the originator of the received message. In other words, the central server may select the next stored deviceID, nonce or counter, and K group from the database, increment that selected nonce or counter value, encode the selected deviceID, nonce or counter, and K, and compare the generated encoded data to the received rolling identifier until a match is found and the identity of the originator of the rolling identifier in the received message is known.

In an embodiment, when the wireless identity transmitter's battery has been removed and re-installed, the latest nonce or counter value may be persisted in the non-volatile memory of the wireless identity transmitter, so that the nonce or counter value can be read back from the non-volatile memory of the wireless identity transmitter when the battery is removed and then put back in. Alternatively, if no non-volatile memory is available or is not used, the wireless identity transmitter may fall back to the initial nonce or counter value after a battery re-installation. The central server may be required to be modified slightly to accommodate such a "counter synchronization". More specifically, in addition to trying values greater than the largest nonce or counter value for the pre-computed counter or nonce list, the central server may also try values, such as (counter+i) where i=0, . . . , n, when a "counter synchronization" is performed. In this case, a wireless identity transmitter user may need to be informed that the battery needs to be re-installed when "counter synchronization" fails multiple times.

Figure 23A:
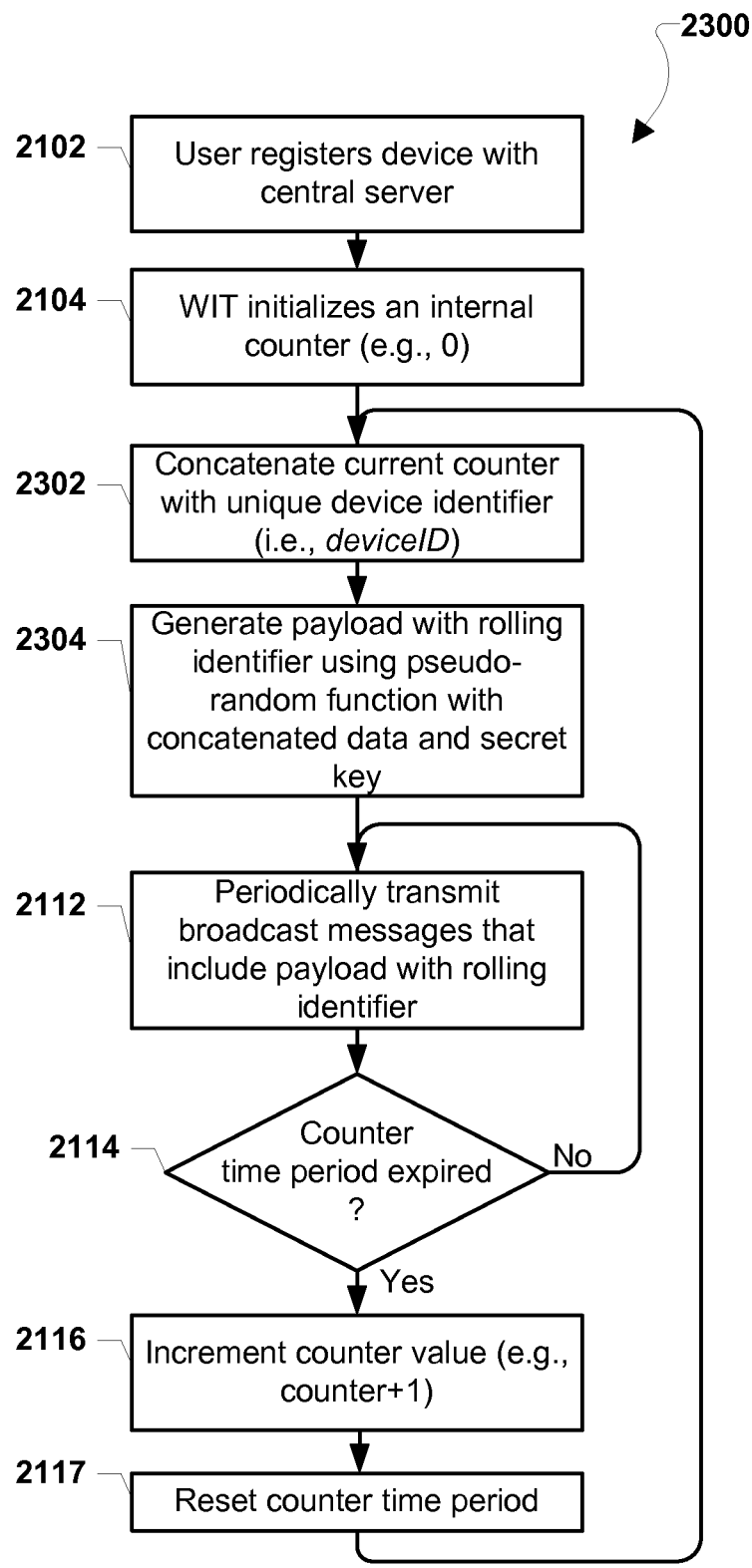
FIG. 23A is a process flow diagram illustrating an embodiment method for a wireless identity transmitter generating and broadcasting rolling identifier payloads using a pseudo-random function.

FIG. 23A illustrates an embodiment method 2300 for a wireless identity transmitter employing a pseudo-random function to generate a rolling identifier for broadcasting. The operations in the method 2300 may be similar to the embodiment method 2100 described above. However, instead of encrypting data, such as a nonce or counter value, with an AES-CTR encryption algorithm, the method 2300 may generate payloads based on the application of a pseudo-random function. As described above, the pseudo-random function and secret keys for each wireless identity transmitter may be known to both the corresponding wireless identity transmitter and a central server so that both may generate similar payloads based on similar data.

In block 2102, a user of the wireless identity transmitter may register the device with the central server. In block 2104, the wireless identity transmitter may initialize an internal nonce or counter, such as by setting the nonce or counter to a zero value. In block 2302, the wireless identity transmitter may concatenate the current nonce or counter with the wireless identity transmitter's unique device identifier (i.e., deviceID). In block 2304, the wireless identity transmitter may generate a payload with a rolling identifier using pseudo-random function with the concatenated data and the secret key. For example, the pseudo-random function may take as inputs the concatenated data (i.e., the deviceID+nonce/counter) and may use the secret key for the wireless identity transmitter as a randomness seed variable. The payload with the rolling identifier may include the output data from the pseudo-random function. In an embodiment, the payload with the rolling identifier may also include in-the-clear information regarding other aspects of the wireless identity transmitter. For example, the wireless identity transmitter may append to the payload several bits (e.g., 4 bits) of information which describe the battery status of the wireless identity transmitter. In an embodiment, the pseudo-random function may be a polynomial time computable function that is computationally indistinguishable from a random function defined on the same domain with output to the same range as the pseudo-random function. For example, the keyed hash Message Authentication Code (HMAC) or the Cipher-based Message Authentication Code (CMAC) may be used as the pseudo-random function. In an embodiment, the wireless identity transmitter may or may not perform a truncation operation to the generated rolling identifier payload. For example, the payload with the rolling identifier may be the result of performing a most-significant-bit operation on the results of the pseudo-random function.

In block 2112, the wireless identity transmitter may periodically transmit broadcast messages that include the payload with the rolling identifier, such as by broadcasting via short-range wireless communication techniques as described above. In determination block 2114, the wireless identity transmitter may determine whether a predefined nonce or counter time period has expired. If the nonce or counter time period has not expired (i.e., determination block 2114="No"), the wireless identity transmitter may continue with the operations in block 2112. If the device determines the nonce or counter time period has expired (i.e., determination block 2114="Yes"), in block 2116 the wireless identity transmitter may increment the nonce or counter value, such as by adding 1. In block 2117, the wireless identity transmitter may reset the nonce or counter time period, and may continue with the operations in block 2302.

Figure 23B:
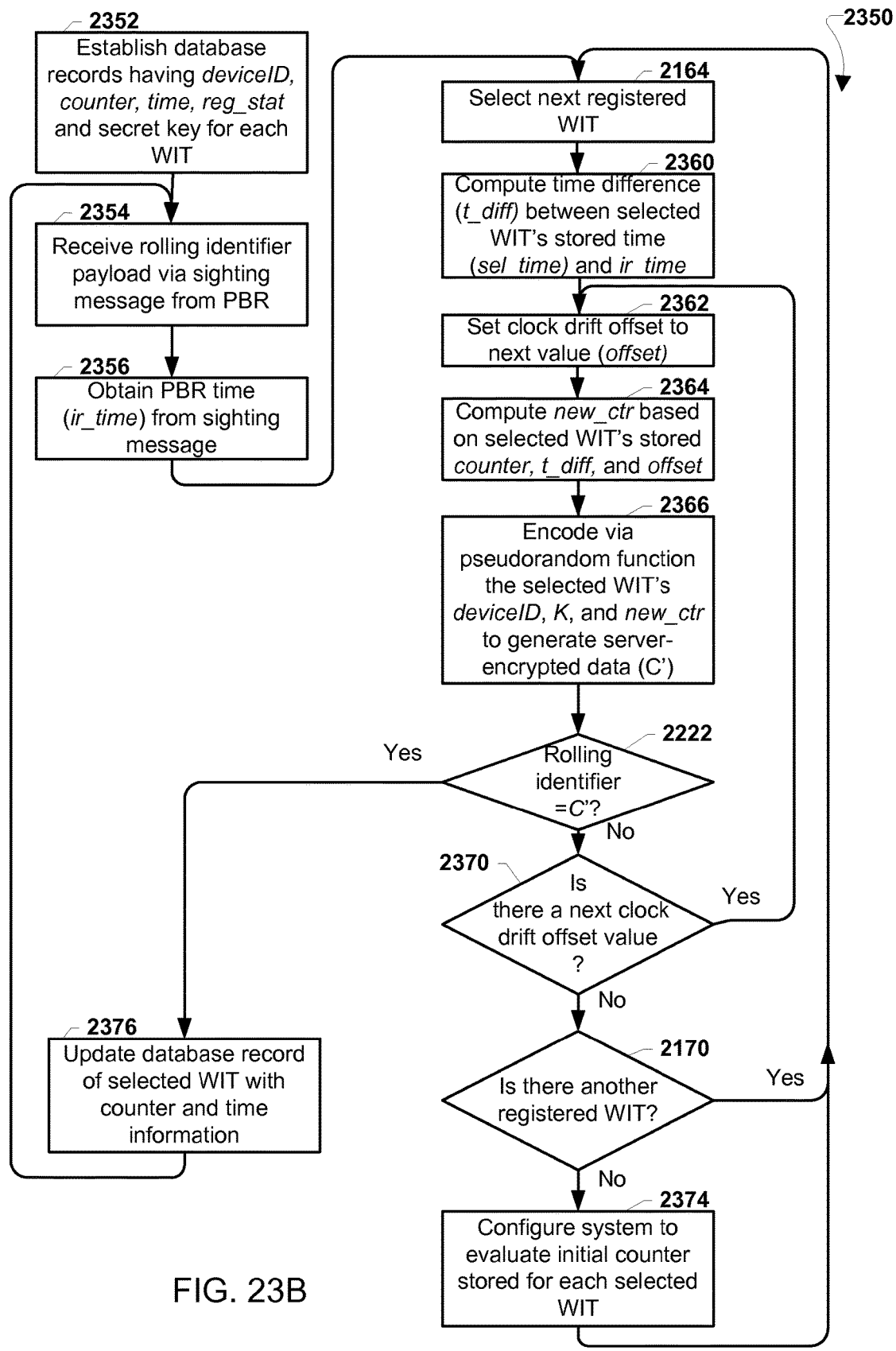
FIG. 23B a process flow diagram illustrating an embodiment method for a central server receiving and handling rolling identifier payloads using a pseudo-random function.

FIG. 23B illustrates an embodiment method 2350 for a central server responding to received messages containing pseudo-random function rolling identifiers. The embodiment method 2350 operations may be similar to the operations described above with reference to FIG. 21B, with the exception that the central server may compare outputs of a pseudo-random function with time-synchronized information stored in the central server to match payloads in messages received from wireless identity transmitters.

In block 2352, the central server may establish database records having device identifier (i.e., deviceID), nonce or counter, time, registration status (i.e., 'reg_stat'), and secret key (i.e., 'K') information for each wireless identity transmitter in a system. The time may indicate the last time the central server received a message corresponding to a particular wireless identity transmitter (e.g., a sighting message relaying a broadcast message), or in other words, the central server clock value at the moment when the nonce or counter value for a wireless identity transmitter was received/recorded in the database. It may be assumed that the period between when a wireless identity transmitter broadcasts a message with a rolling identifier (or rolling identifier payload) and when the central server receives the rolling identifier is very short. Thus, the stored nonce or counter and time values may be assumed to create a roughly accurate clock status of a wireless identity transmitter.

Additionally, once a wireless identity transmitter transmits registration information, the central server may indicate a valid registration by setting a registration flag in the database for the wireless identity transmitter (e.g. 'reg_stat'). The central server may query the database for all wireless identity transmitter records where the reg_stat indicates a valid registration has been conducted and may create data tables that include only registered wireless identity transmitters based on the reg_stat values.

In block 2354, the central server may receive a rolling identifier payload via a sighting message from a proximity broadcast receiver. The sighting message may have time information appended to the payload that describes the time at which the proximity broadcast receiver encountered the payload via a broadcast message from the respective wireless identity transmitter. For example, a payload may be received by a smartphone proximity broadcast receiver which in turn may append its own system clock reading to the payload information and transmit the data to the central server as a sighting message. The time measurement provided by the proximity broadcast receiver may be approximately synchronized with the central server system time. In an embodiment, the proximity broadcast receiver may append other additional information to the sighting message, such as location information (e.g., GPS coordinates) of the proximity broadcast receiver. In block 2356, the central server may obtain a proximity broadcast receiver time (i.e., 'ir_time') from the sighting message, such as indicated within the sighting message. For example, the central server may parse the sighting message and extract a time value indicating when the proximity broadcast receiver received a broadcast message that corresponds to the rolling identifier payload.

In blocks 2164-2374, the central server may perform an operational loop in which the central server may evaluate all registered wireless identity transmitters stored within the central server's database to find a device record that matches the received rolling identifier payload. In block 2164, the central server may select a next registered wireless identity transmitter. For example, the central server may iteratively select the next wireless identity transmitter represented in a data table of all wireless identity transmitters that have the reg_stat variable set to indicate registration occurred. The central server may sequentially iterate through such a data table or list for each device during the operations in blocks 2164-2374. In an embodiment, the central server may access a stored database record corresponding to the selected registered wireless identity transmitter that contains the current values for the information established with registration operations in block 2352.

In block 2360, the central server may compute the time difference (i.e., 't_diff') between the time indicated in the sighting message (ir_time) and the time stored within the database record of the selected registered wireless identity transmitter (i.e., 'sel_time'). For example, the t_diff value may be a non-zero or a zero value. This time difference may be a measure of the expected elapsed time between instances of the central server receiving payloads from the selected wireless identity transmitter.

In block 2362, the central server may set a clock drift offset (i.e., 'offset') to a next value. In general, the central server may account for possible wireless identity transmitter clock drift (e.g., inaccurate device system clock readings) by setting the clock drift offset value. The clock drift offset values may represent offsets that, when applied to nonce or counter values, may represent nonces or counters lower, the same, or higher than an expected nonce or counter value. In other words, the clock drift offsets may represent time before, during, or after the time represented by the current nonce or counter for the selected registered device. The clock drift offset value may be one of a sequence of clock drift offset values. In an embodiment, the clock drift offset value may be 0. In an embodiment, possible clock drift offset values may include numbers within a set {−N, . . . , −1, 0, 1, . . . , N}, where N is an arbitrary number.

In block 2364, the central server may compute an expected nonce or counter value (i.e., 'new_ctr') using the selected wireless identity transmitter's stored nonce or counter value, the computed time difference (i.e., t_diff) and the set offset value (i.e., offset). As described above, the nonce or counter may be stored within the selected registered wireless identity transmitter database record. For example, the central server may calculate new_ctr by adding the clock drift offset value to the sum of the t_diff value and the stored nonce or counter value.

In determination block 2366, the central server may encode via a pseudo-random function the selected wireless identity transmitter's device identifier, secret key, and computed nonce or counter (i.e., new_ctr) to generate a server-encrypted data (i.e., C'). The pseudo-random function may be the same pseudo-random function utilized by a wireless identity transmitter as described above with reference to FIG. 23A.

In determination block 2222, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 2222="Yes"), the central server may identify the received message as originating from the selected wireless identity transmitter (e.g., corresponding to the selected wireless identity transmitter's unique identifier). In an embodiment, the secret key (K) may be the seed value of the pseudo-random function. In an embodiment, the central server may concatenate the selected wireless identity transmitter's deviceID and the computed new_ctr value and provide that concatenated data to the pseudo-random function. The pseudo-random function may return (or output) encrypted data having a similar structure as received rolling identifier payload.

If the rolling identifier, such as received in the sighting message, and the generated server-encrypted data (i.e., C') match (i.e., determination block 2222="Yes"), in block 1276 the central server may update the database record of the selected wireless identity transmitter with the nonce or counter and time information, such as the new_ctr and the ir_time. For example, the central server may update the database record's time value to represent the time of receipt of the payload within the proximity broadcast receiver (e.g., ir_time) and may also update the stored nonce or counter value to represent the new_ctr value. The central server may continue with the operations in block 2354.

If the rolling identifier, such as received in the sighting message, and the generated server-encrypted data (i.e., C') do not match (i.e., determination block 2222="No"), the central server may determine whether there is a next clock drift offset value in determination block 2370. In other words, the central server may determine whether new_ctr values have been computed using all possible clock drift offset values (e.g., −1, 0, 1, etc.). If there is a next clock drift offset value (i.e., determination block 2370="Yes"), the central server may continue with the operations in block 2362. However, if there is not a next clock drift offset value (i.e., determination block 2370="No"), in determination block 2170, the central server may determine whether there is another registered wireless identity transmitter to evaluate. If there is another registered wireless identity transmitter to evaluate (i.e., determination block 2170="Yes"), the central server may continue with the operations in block 2164. However, if there is no other registered wireless identity transmitter (i.e., determination block 2170="No"), in block 2374 the central server may configure the system to evaluate initial nonce or counter values stored for each registered wireless identity transmitter. In an embodiment, the registration database described above may further include data that represents the initial nonce or counter value corresponding to each registered wireless identity transmitter. This initial nonce or counter value may be used if/when the various wireless identity transmitters are rebooted or otherwise reset their counters. For example, a wireless identity transmitter may operate and deliver payloads describing non-initial nonces or counters for a period of time before resetting its internal nonce or counter due to battery replacement. In such a scenario, the wireless identity transmitter may broadcast messages that include rolling identifier payloads based on reset nonce or counter information.

In another embodiment, the operations in block 2374 may be performed for individual registered selected devices during the operational loop in blocks 2362-2370, wherein the stored nonce or counter value in block 2364 may be replaced with the initial stored nonce or counter value. For example, once the central server determines a selected registered wireless identity transmitter's stored nonce or counter value with the various clock drift offset values cannot be used to generate encrypted data that matches the received rolling identifier payload, the central server may evaluate the initial stored nonce or counter value of the selected wireless identity transmitter before selecting the next registered wireless identity transmitter.

Figure 24A:
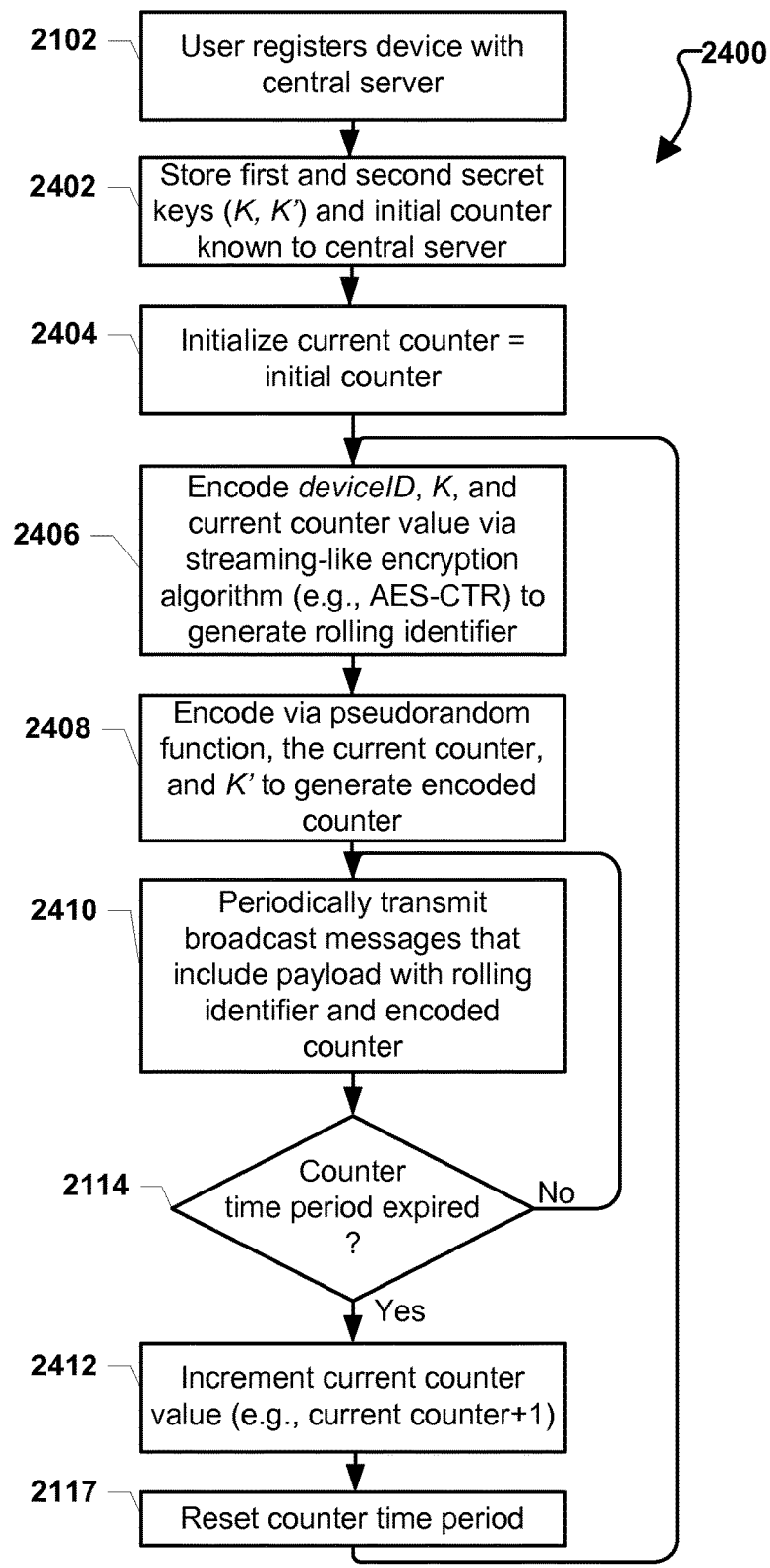
FIG. 24A is a process flow diagram illustrating an embodiment method for a wireless identity transmitter generating and broadcasting messages with rolling identifiers and encoded nonces or counters.

FIG. 24A illustrates an embodiment method 2400 for a wireless identity transmitter generating and broadcasting messages with rolling identifiers and encoded nonces or counters. The method 2400 may have operations performed by a wireless identity transmitter that are similar to those described above with reference to FIGS. 20, 21A, 22, and 23A. However, the method 2400 may involve broadcasting messages that include a rolling identifier (i.e., an encoded device identifier) as well as an encoded nonce or counter that may be evaluated separately by the central server with the operations described below with reference to FIG. 24B. In this manner, the wireless identity transmitter's nonce or counter value (or nonce) may not be sent in the clear in the payload of the broadcast message.

In block 2102, a user of the wireless identity transmitter may register the device with the central server. For example, the wireless identity transmitter may provide the unique device identifier (i.e., deviceID) to a central server for storage in a database of registered wireless identity transmitters. In block 2402, the wireless identity transmitter may store a first secret key (K) and a second secret key (K') and an initial nonce or counter that are known to the central server. For example, these values may be shared between the central server and the wireless identity transmitter during registration operations described in this disclosure. In block 2404, the wireless identity transmitter may initialize a current nonce or counter by setting it to the value of the initial nonce or counter value.

Similar to as described above with reference to FIG. 20, in block 2406, the wireless identity transmitter may encode the device identifier (deviceID), the first secret key (K), and the current nonce or counter via a streaming-like encryption algorithm (e.g., AES-CTR) to generate a rolling identifier. In block 2408, the wireless identity transmitter may encode via a pseudo-random function, the current nonce or counter, and the second secret key (K') to generate an encoded counter or nonce. In an embodiment, the encoded nonce or counter may be represented by the following equation:

Encoded nonce/counter=MSB_$M$(PRF($K',t$)), where 'K' is a per-device second secret key (usually different from the first per-device secret key K), 't' is the current nonce or counter, PRF( )' is the pseudo-random function, and 'MSB_M( )' means the 'M' most significant bits (e.g., 20 bits).

In block 2410, the wireless identity transmitter may periodically transmit broadcast messages that include the payload with the rolling identifier and the encoded nonce or counter. In determination block 2114, the wireless identity transmitter may determine whether a predefined nonce or counter time period has expired. If the nonce or counter time period has not expired (i.e., determination block 2114="No"), the wireless identity transmitter may continue with the operations in block 2410. If the device determines the nonce or counter time period has expired (i.e., determination block 2114="Yes"), in block 2412 the wireless identity transmitter may increment the current nonce or counter value, such as by adding 1. In block 2117, the wireless identity transmitter may reset the nonce or counter time period and may continue with the operations in block 2406.

Figure 24B:
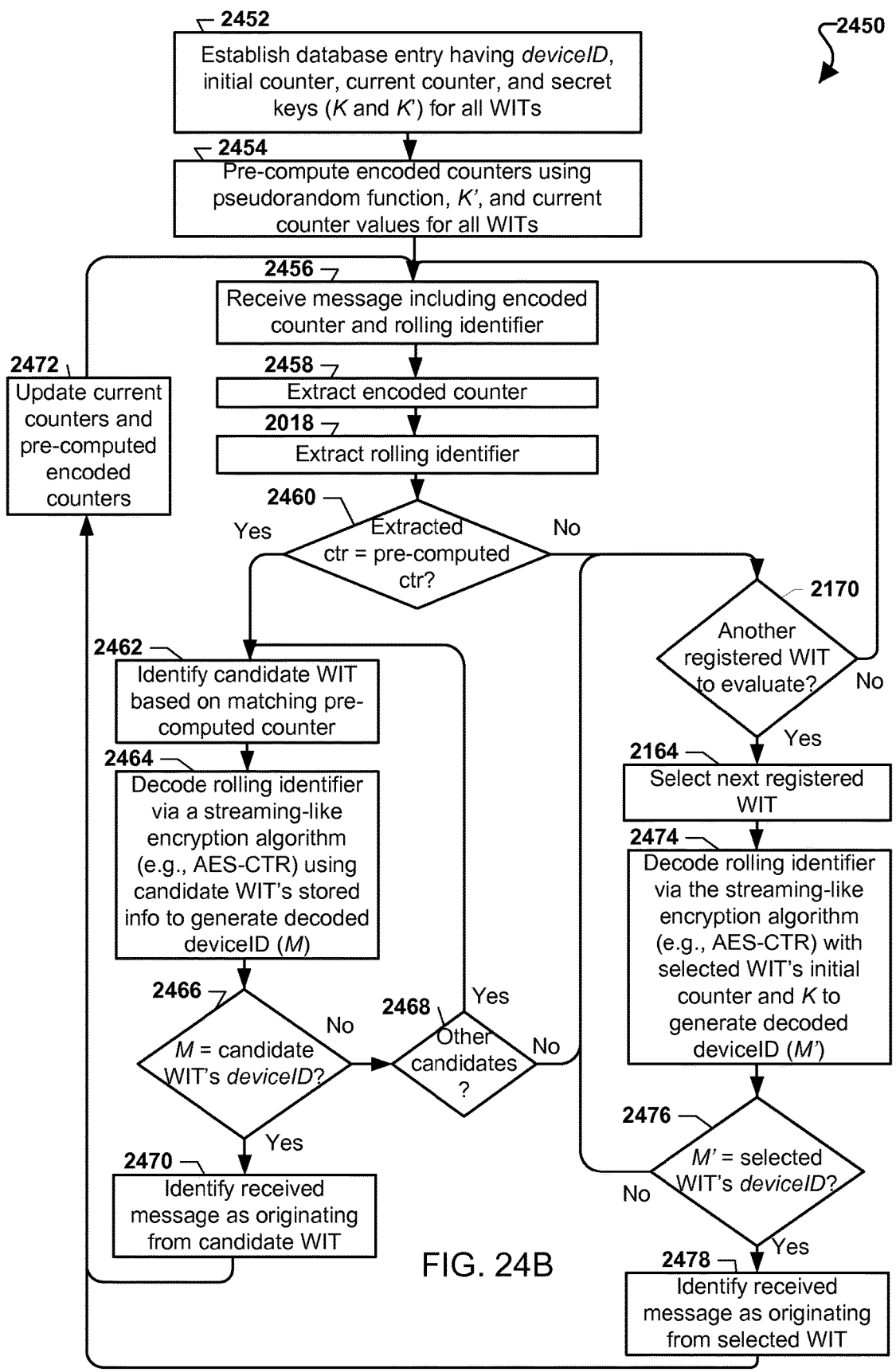
FIGS. 24B-24C are process flow diagrams illustrating embodiment methods for a central server receiving and handling messages including rolling identifiers and encoded nonces or counters.

FIG. 24B illustrates an embodiment method 2450 for a central server receiving and handling messages including rolling identifiers and encoded nonces or counters. The central server may perform the operations of method 2450 in combination or response to a wireless identity transmitter performing the method 2400 described above. The method may include two passes: a first pass wherein the central server attempts to identify a wireless identity transmitter based on an encoded nonce or counter within a received message (e.g., a sighting message), and a second pass wherein the central server attempts the identification based on a rolling identifier to within the received message In block 2452, the central server may establish a database entry having a device identifier (i.e., deviceID), initial nonce or counter, current nonce or counter, and secret keys (K and K') for all wireless identity transmitters in the system. The current nonce or counter values may be the same as the initial nonces or counters at the time of registration of wireless identity transmitters. In block 2454, the central server may pre-compute encoded nonces or counters using a pseudo-random function, the second secret key (K'), and current nonce or counter values for all wireless identity transmitters. For example, the central server may generate a plurality of encoded nonce or counter values for each registered wireless identity transmitter, such as one based on the current nonce or counter value, another based on a value one larger than the current counter value, etc. In an embodiment, the central server may pre-compute 24 encoded nonce or counters for each registered wireless identity transmitter. In an embodiment, the central server may store a separate list (or data table) of the pre-computed encoded nonces or counters for all registered wireless identity transmitters that also includes the device identifiers associated with each stored pre-computed encoded nonce or counter.

In block 2456, the central server may receive a message including an encoded nonce or counter and a rolling identifier, such as within a sighting message transmitted by a proximity broadcast receiver. In block 2458, the central server may extract an encoded nonce or counter from the received message, and in block 2018 may extract a rolling identifier from the received message. In determination block 2460, the central server may determine whether the extracted nonce or counter (or 'ctr') matches any of the pre-computed nonce or counters. For example, the central server may compare the encoded nonce or counter value extracted from the received message to the plurality of central server-encoded nonce or counter values for each registered wireless identity transmitter to identify any matches. If the extracted nonce or counter matches a pre-computed nonce or counter (i.e., determination block 2460="Yes"), in block 2462 the central server may identity a candidate wireless identity transmitter based on the matching pre-computed nonce or counter. In other words, the central server may identity the candidate as the deviceID stored in relation to the pre-computed nonce or counter in a data table in the central server. In block 2464, the central server may decode the rolling identifier via a streaming-like encryption algorithm (e.g., the same AES-CTR wireless identity transmitters use when performing the operations in FIG. 24A) using the candidate wireless identity transmitter's stored information (e.g., deviceID, secret key, etc.) to find a decoded device identifier (or M). In determination block 2466, the central server may determine whether the decoded device identifier (M) matches the candidate wireless identity transmitter's deviceID. Such a match may enable the central server to identify the wireless identity transmitter associated with that received rolling identifier without decoding the rolling identifier or the encoded nonce or counter value. If the deviceID and decoded identifier (M) match (i.e., determination block 2466="Yes"), in block 2470 the central server may identity the received message as originating from the candidate wireless identity transmitter. In block 2472, the central server may update current nonces or counters and pre-computed encoded nonces or counters. For example, the database entry for the wireless identity transmitter identified as the originator of the received message may be updated with new current nonce or counter information as well as new pre-computed encoded nonces or counters. Additionally, any stored lists of pre-computed encoded nonces or counters may have older pre-computed encoded nonces or counters removed at the same time newly computed encoded nonces or counters corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 2456.

If the deviceID and decoded identifier (M) do not match (i.e., determination block 2466="No"), in determination block 2468, the central server may determine whether there are other candidates, such as other registered wireless identity transmitters that have not been evaluated by the central server. If there are other candidates (i.e., determination block 2468="Yes"), the central server may continue with the operations in block 2462, such as by identifying the next wireless identity transmitter to evaluate regarding the rolling identifier.

If there are no other candidates (i.e., determination block 2468="No"), or if the extracted nonce or counter does not match the pre-computed nonce or counter (i.e., determination block 2460="No"), the central server may attempt to identify the originator of the received message by comparing the extracted rolling identifier to information associated with all registered wireless identity transmitters in the system. Thus, in determination block 2170 the central server may determine whether there is another registered wireless identity transmitter to evaluate. For example, the central server may iteratively use information of all registered wireless identity transmitters. If there is not another (i.e., determination block 2170="No"), the central server may continue with the operations in block 2456.

If there is another (i.e., determination block 2170="Yes"), in block 2164 the central server may select the next registered wireless identity transmitter. In block 2474, the central server may decode the rolling identifier via the streaming-like encryption algorithm (e.g., AES-CTR) with the selected wireless identity transmitter's initial nonce or counter and first secret key (K) to find a decoded device identifier (M'), similar to as described above with reference to FIG. 20. In determination block 2476, the central server may determine whether the decoded device identifier (M') matches the selected wireless identity transmitter's deviceID. If the identifiers do not match (i.e., determination block 2476="No"), the central server may continue with the operations in determination block 2170. However, if the identifiers match (i.e., determination block 2476="Yes"), in block 2478 the central server may identify the received messages as originating from the selected wireless identity transmitter, and may continue with the operations in block 2472.

Figure 24C:
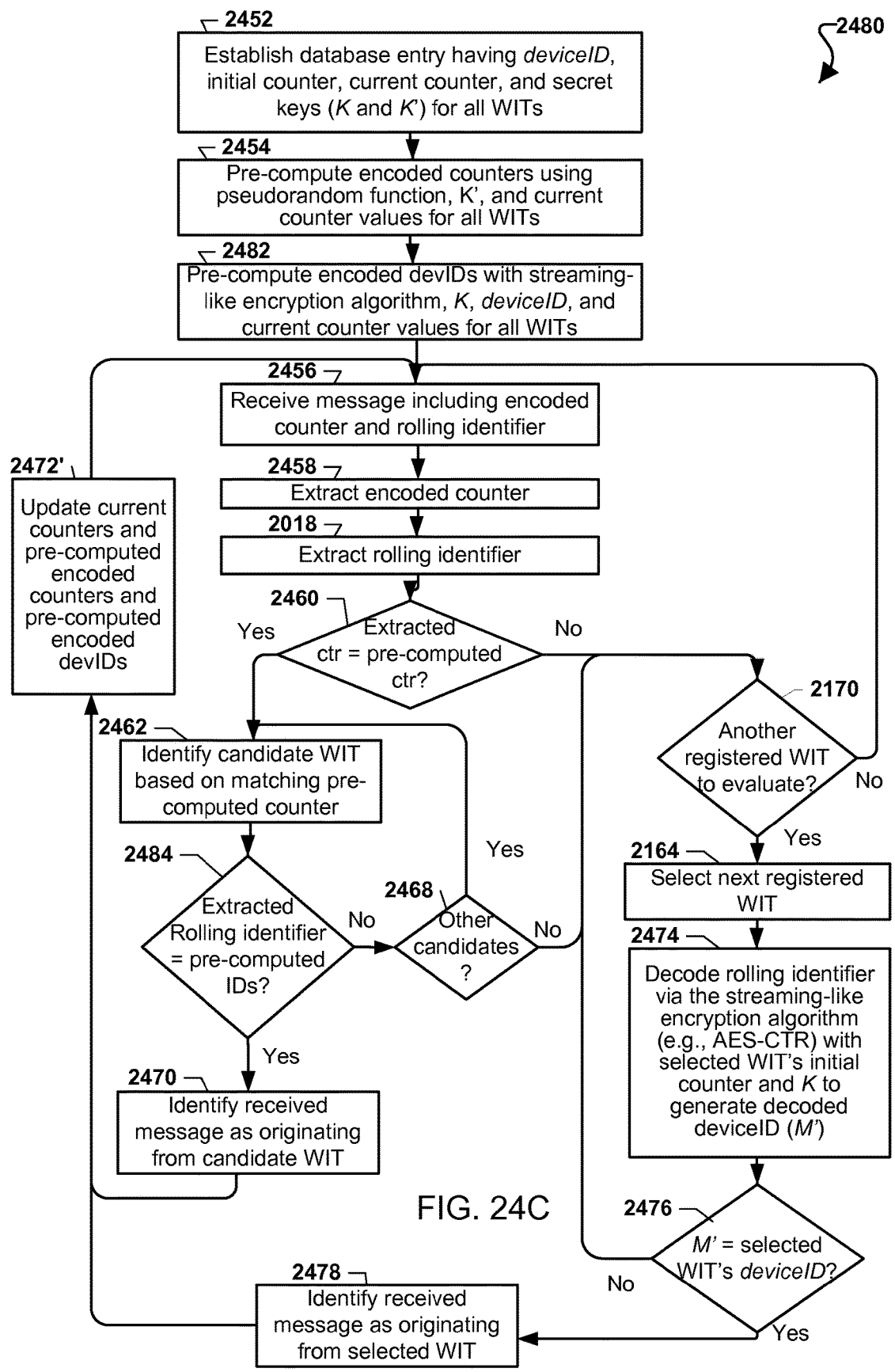

FIG. 24C illustrates an embodiment method 2480 for a central server receiving and handling messages including rolling identifiers and encoded nonces or counters. The operations of method 2480 are similar to the operations of method 2450, except that rather than perform a two pass process as discussed above in FIG. 24B, the central server may perform method 2480 as a one pass process. In particular, the central server may generate both a plurality of central server encrypted nonce or counter values for each registered wireless identity transmitter and a plurality of central server-encrypted device identifiers (i.e., deviceID). The central server may use the data stored in the database for each wireless identity transmitter (e.g., deviceID, K, K', initial nonce or counter, and current nonce or counter) and the plurality of pre-computed nonce or counter values for each device to encode a plurality of central server encrypted nonce or counter values and a plurality of server encrypted device IDs. When the central server receives the sighting message including the rolling identifier and encoded nonce or counter, the central server may compare the plurality of central server encrypted nonce or counter values and the plurality of central server encoded device IDs to the rolling identifier and encoded nonce or counters obtained from the received sighting message. The device identifier of the wireless identity transmitter that originated the rolling identifier may then be identified based entirely on matching the pre-computed nonce or counter values and device identifiers without requiring actual decoding of the rolling identifier itself.

In block 2452, the central server may establish a database entry having a device identifier (i.e., deviceID), initial nonce or counter, current nonce or counter, and secret keys (K and K') for all wireless identity transmitters in the system. In block 2454, the central server may pre-compute encoded nonces or counters using a pseudo-random function, the second secret key (K'), and current nonce or counter values for all wireless identity transmitters. In block 2482, the central server may pre-compute encoded device identifiers with a streaming-like encryption algorithm (e.g., AES-CTR block cipher), the device identifier, current nonce or counter, and the first secret key (K) for all wireless identity transmitters. In other words, the central server may generate a plurality of encoded device identifiers for each registered wireless identity transmitter, such as by using the current nonce or counter and predefined offset nonce or counter values, or alternatively, only a single encoded device identifier based only on the current nonce or counter stored within the central server.

In block 2456, the central server may receive a message including an encoded nonce or counter and a rolling identifier, such as within a sighting message transmitted by a proximity broadcast receiver. In block 2458, the central server may extract an encoded nonce or counter from the received message, and in block 2018 may extract a rolling identifier from the received message. In determination block 2460, the central server may determine whether the extracted nonce or counter (or 'ctr') matches any of the pre-computed nonces or counters. If the extracted nonce or counter matches a pre-computed nonce or counter (i.e., determination block 2460="Yes"), in block 2462 the central server may identity a candidate wireless identity transmitter based on the matching pre-computed nonce or counter. In determination block 2484, the central server may determine whether the extracted rolling identifier matches any of the pre-computed identifiers, such as the pre-computing device identifiers for the candidate wireless identity transmitter.

If the extracted rolling identifier does match any of the pre-computed identifiers for the candidate wireless identity transmitter (i.e., determination block 2484="Yes"), in block 2470 the central server may identity the received message as originating from the candidate wireless identity transmitter. In block 2472', the central server may update current nonces or counters and pre-computed encoded nonces or counters and pre-computed encoded device identifiers. For example, the database entry for the wireless identity transmitter identified as the originator of the received message may be updated with new current nonce or counter information as well as new pre-computed encoded nonces or counters and pre-computed encoded device identifiers. Additionally, any stored lists of pre-computed encoded nonces or counters may have older pre-computed encoded nonces or counters or encoded device identifiers removed at the same time newly computed encoded nonces or counters or device identifiers corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 2456.

If the extracted rolling identifier does not match any of the pre-computed identifiers for the candidate wireless identity transmitter (i.e., determination block 2484="No"), in determination block 2468, the central server may determine whether there are other candidates, such as other registered wireless identity transmitters that have not been evaluated by the central server. If there are other candidates (i.e., determination block 2468="Yes"), the central server may continue with the operations in block 2462, such as by identifying the next wireless identity transmitter to evaluate regarding the rolling identifier.

If there are no other candidates (i.e., determination block 2468="No"), or if the extracted nonce or counter does not match the pre-computed nonce or counter (i.e., determination block 2460="No"), the central server may attempt to identify the originator of the received message by comparing the extracted rolling identifier to information associated with all registered wireless identity transmitters in the system. Thus, in determination block 2170 the central server may determine whether there is another registered wireless identity transmitter to evaluate. For example, the central server may iteratively use information of all registered wireless identity transmitters. If there is not another (i.e., determination block 2170="No"), the central server may continue with the operations in block 2456.

If there is another (i.e., determination block 2170="Yes"), in block 2164 the central server may select the next registered wireless identity transmitter. In block 2474, the central server may decode the rolling identifier via the streaming-like encryption algorithm (e.g., AES-CTR) with the selected wireless identity transmitter's initial nonce or counter and first secret key (K) to find a decoded device identifier (M'). In determination block 2476, the central server may determine whether the decoded device identifier (M') matches the selected wireless identity transmitter's deviceID. If the identifiers do not match (i.e., determination block 2476="No"), the central server may continue with the operations in determination block 2170. However, if the identifiers match (i.e., determination block 2476="Yes"), in block 2478 the central server may identify the received messages as originating from the selected wireless identity transmitter, and may continue with the operations in block 2472'.

Figure 25A:
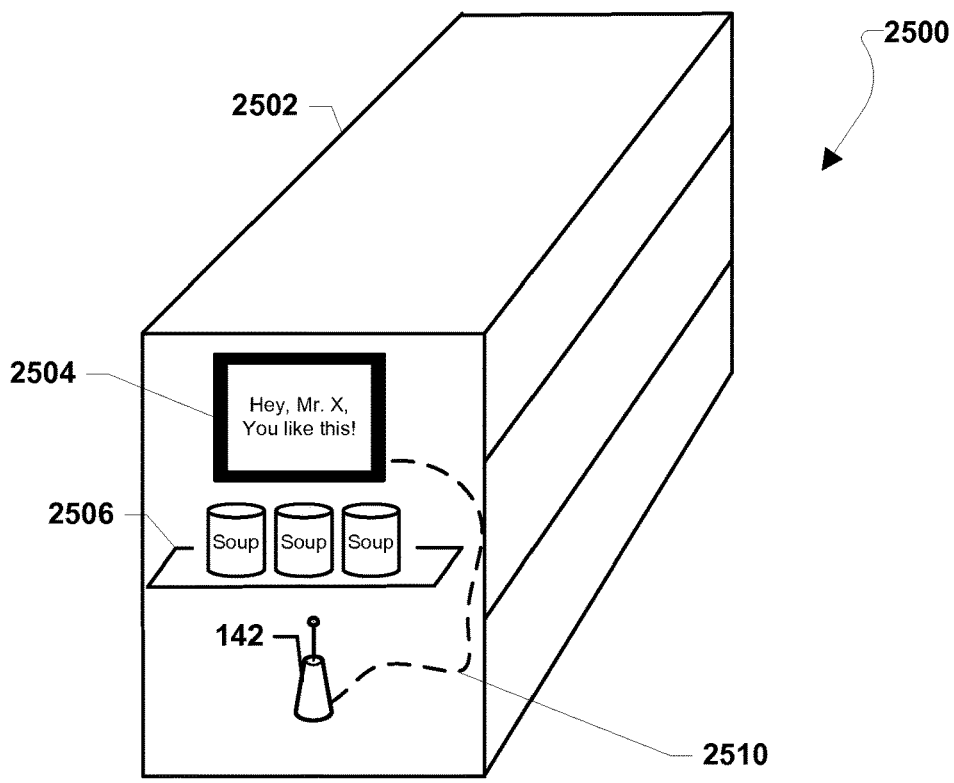
FIG. 25A is a diagram showing a retail store aisle with a proximity broadcast receiver located at an end cap.

FIG. 25A illustrates a diagram 2500 showing a retail store aisle 2502 with a proximity broadcast receiver 142 located at an end cap marketing area. Retail stores may include marketing areas that correspond to certain products. For example, a new product (e.g., a new detergent, cola, clothing item, etc.) may be placed by a retailer at a conspicuous place within the retail store. In particular, products that the retailer intends to highlight, emphasize, or advertise may be placed at the "end cap" of an aisle 2502 (i.e., the ends of an aisle 2502 of product shelves). End caps may include special shelving 2506 for the products displayed at the end cap. The proximity broadcast receiver 142 may be associated with the end cap and may be placed within or placed on the aisle 2502. For example, the proximity broadcast receiver 142 may be embedded within the aisle 2502. As described above, the proximity broadcast receiver 142 may be configured to receive broadcast messages from wireless identity transmitters. Further, the proximity broadcast receiver 142 may be positioned at the end cap so that received broadcast messages may be from customers carrying wireless identity transmitters and walking near the end cap. For example, the proximity broadcast receiver 142 may receive broadcast messages from a customer's wireless identity transmitter right before the customer walks in front of the end cap.

In an embodiment, the end cap may also include a display 2504 that may be configured to render visual and/or audible data. For example, the display 2504 may be an LCD monitor, a speaker unit, a horn, or a light bulb. In various embodiments, the display 2504 may be embedded within the aisle 2502 or may be a stand-alone device (e.g., a speaker setting on the shelving 2506. In an embodiment, the display 2504 may be connected to a local server (not shown) within the retail store via wired or wireless connections, and may receive data, software instructions, and other information from the local server. For example, the display 2504 may receive software instructions from a local server instructing the display 2504 to render a text message, an audio file, or a video. In various embodiments, the display 2504 may receive instructions to render advertisements and messages directed to passing by customers. For example, the display 2504 may present a personalized message to a passing by customer, requesting the customer to pay attention to products at the end cap. In another embodiment, the display 2504 may be connected to the Internet and may directly receive transmissions from a central server. For example, the display 2504 may receive data packets from the Internet via a WiFi transceiver.

In various embodiments, the proximity broadcast receiver 142 and the display 2504 may be located together and may exchange data via a communication link 2510. For example, the proximity broadcast receiver 142 may be configured to receive return messages from the central server and may transmit text and/or audio data to the display 2504 for rendering as images. Alternatively, the proximity broadcast receiver 142 and the display 2504 may be within a common (or same) device. For example, the display 2504 itself may contain a short-range wireless transceiver configured to receive short-range wireless signals from wireless identity transmitters.

Figure 25B:
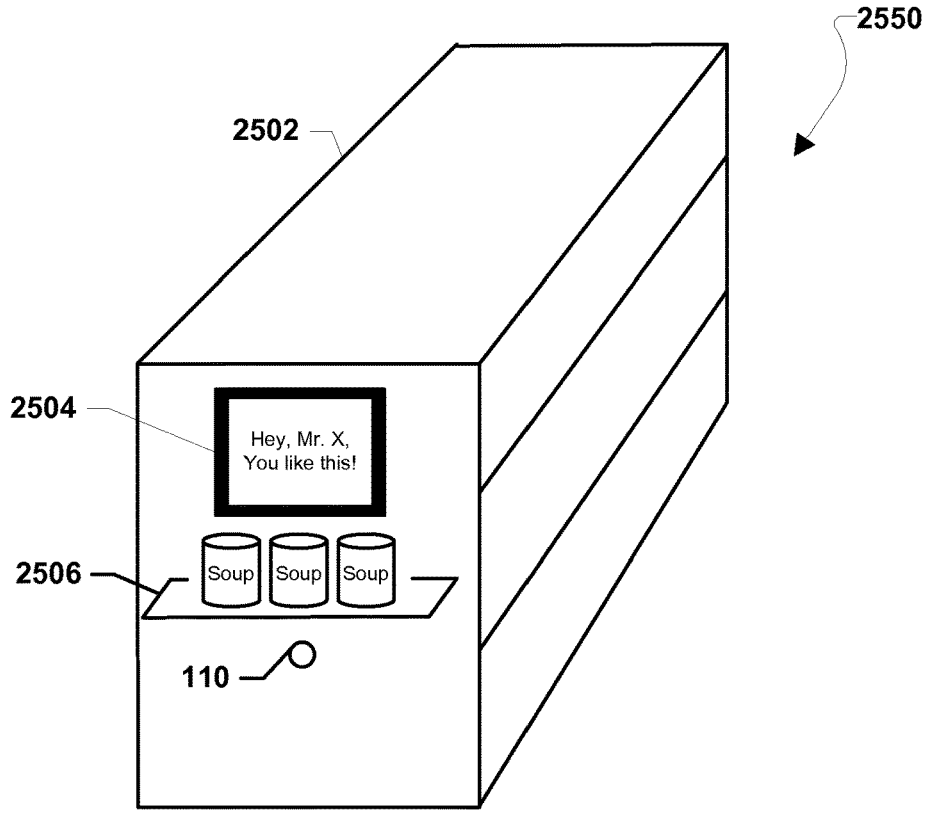
FIG. 25B is a diagram showing a retail store aisle with a wireless identity transmitter located at an end cap.

FIG. 25B illustrates a diagram 2550 showing a retail store aisle 2502 with a wireless identity transmitter 110 located at an end cap marketing area. The diagram 2550 is similar to the diagram 2500 described above, with the exception that instead of positioning a proximity broadcast receiver at the end cap, a retailer may position the wireless identity transmitter 110 coincident with the end cap marketing area.

In an embodiment, the end cap may include both a wireless identity transmitter 110 and a proximity broadcast receiver as described above with reference to FIG. 25A. For example, the retailer may desire to track those customers passing by who are carrying their own wireless identity transmitter, wireless identity transceiver, and/or a mobile proximity broadcast receiver (e.g., a smartphone executing an application enabling the smartphone to operate as a proximity broadcast receiver).

Figure 26A:
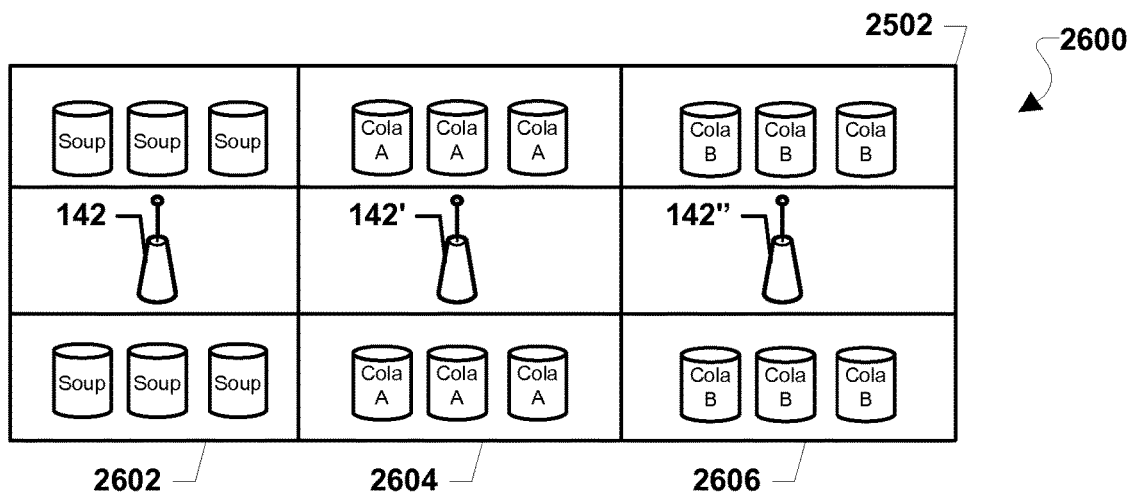
FIG. 26A is a diagram showing a retail store aisle with a plurality of proximity broadcast receivers located with various products.

FIG. 26A is a diagram 2600 illustrating a retail store aisle 2502 with a plurality of proximity broadcast receivers located with various products. As described above, retailers may desire to present marketing information to customers within proximity of certain marketing areas of the retail store. Finer granularity in determining customer proximity to various marketing areas within the retail store may be enabled with the plurality of proximity broadcast receivers. In particular, each of the plurality of proximity broadcast receivers may be located within marketing areas that correspond to particular sections 2602, 2604, 2606 of the aisle 2502, enabling a central server to receive sighting messages that may indicate when a wireless identity transmitter is in relative locations within the aisle 2502 (e.g., beginning, middle, end of an aisle).

For illustration purposes, a first proximity broadcast receiver 142 may be placed within or near the first section 2602 of the aisle 2502 that corresponds to a first product (e.g., soup as shown in the diagram 2600), a second proximity broadcast receiver 142' may be placed within or near the second section 2604 of the aisle 2502 that corresponds to a second product (e.g., "cola A" as shown in the diagram 2600), and a third proximity broadcast receiver 142" may be placed within or near the third section 2606 of the aisle 2502 that corresponds to a third product (e.g., "cola B" as shown in the diagram 2600). With the proximity broadcast receivers 142, 142', 142" placed incrementally throughout the aisle 2502, broadcast messages may be received by different proximity broadcast receivers as a customer carrying a wireless identity transmitter walks down the aisle 2502. In other words, sighting messages from the proximity broadcast receivers 142, 142', 142" may be used by a central server to determine more precise location information related to the customer. In an embodiment, the proximity broadcast receivers 142, 142', 142" may be positioned such that more than one may receive the same broadcast message concurrently. Alternatively, the proximity broadcast receivers 142, 142', 142" may be positioned such that only one proximity broadcast receiver may receive a particular broadcast message. In other words, the proximity broadcast receivers 142, 142', 142" may or may not have overlapping reception of broadcast messages.

In an embodiment, the sections 2602, 2604, 2606 may also include displays, such as described above with reference to FIG. 25A, that may be configured to render visual and/or audio information received from a central server. For example, the section 2602 may include a television unit that is wirelessly connected to a local server within the retail store and that receives video data to be rendered when a customer passes by. Such displays may receive software instructions or other data and may render messages related to the products within corresponding sections. For example, a display within the second section 2604 may receive instructions to render marketing information related to the second product (e.g., the display may render an advertisement for customers to buy "cola A").

Figure 26B:
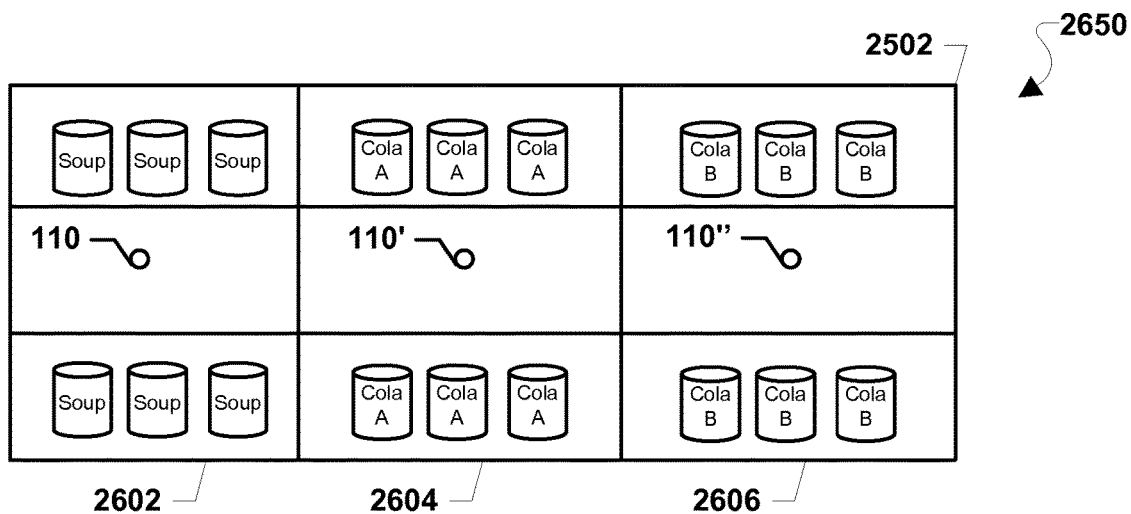
FIG. 26B is a diagram showing a retail store aisle with a plurality of wireless identity transmitters located with various products.

FIG. 26B is a diagram 2650 illustrating a retail store aisle 2502 with a plurality of wireless identity transmitters 110, 110', 110" located with various products. The diagram 2650 is similar to the diagram 2600 described above, except that the diagram 2650 includes wireless identity transmitters 110, 110', 110" instead of proximity broadcast receivers.

For illustration purposes, a first wireless identity transmitter 110 may be placed within or near the first section 2602 of the aisle 2502 that corresponds to a first product (e.g., soup as shown in the diagram 2650), a second wireless identity transmitter 110' may be placed within or near the second section 2604 of the aisle 2502 that corresponds to a second product (e.g., "cola A" as shown in the diagram 2650), and a third wireless identity transmitter 110" may be placed within or near the third section 2606 of the aisle 2502 that corresponds to a third product (e.g., "cola B" as shown in the diagram 2650). With the wireless identity transmitters 110, 110', 110" placed incrementally throughout the aisle 2502, mobile proximity broadcast receivers carried by customers may receive broadcast messages from the wireless identity transmitters 110, 110', 110" as the customers walk down the aisle 2502. In other words, sighting messages based on broadcast messages from the wireless identity transmitters 110, 110', 110" may be used by a central server to determine more precise location information related to customers. In an embodiment, the wireless identity transmitters 110, 110', 110" may be positioned such that a mobile proximity broadcast receiver (e.g., a smartphone configured to receive and relay broadcast messages) carried by a customer may receive broadcast messages from more than one wireless identity transmitter 110, 110', 110" at approximately the same time (or concurrently). Alternatively the wireless identity transmitters 110, 110', 110" may be positioned such that a mobile proximity broadcast receiver carried by a customer may receive broadcast messages from only one of the wireless identity transmitter 110, 110', 110" at a time. In other words, the wireless identity transmitters 110, 110', 110" may or may not have overlapping broadcast areas. In an embodiment, the sections 2602, 2604, 2606 may also include displays, such as described above with reference to FIG. 25A.

Figure 27:
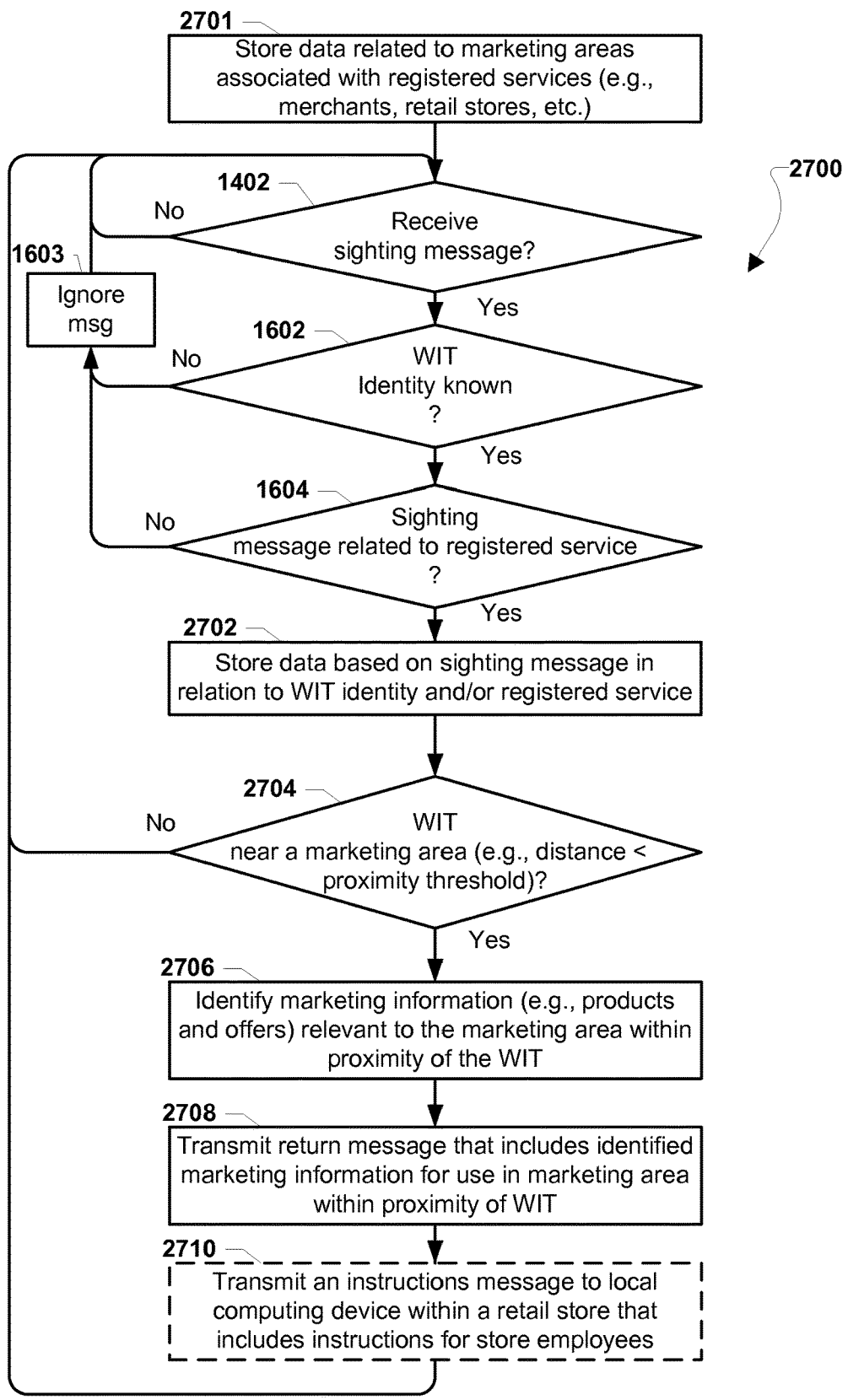
FIG. 27 is a process flow diagram of an embodiment method for a central server to transmit marketing information in response to receiving sighting messages proximate to a marketing area.
Figure 28:
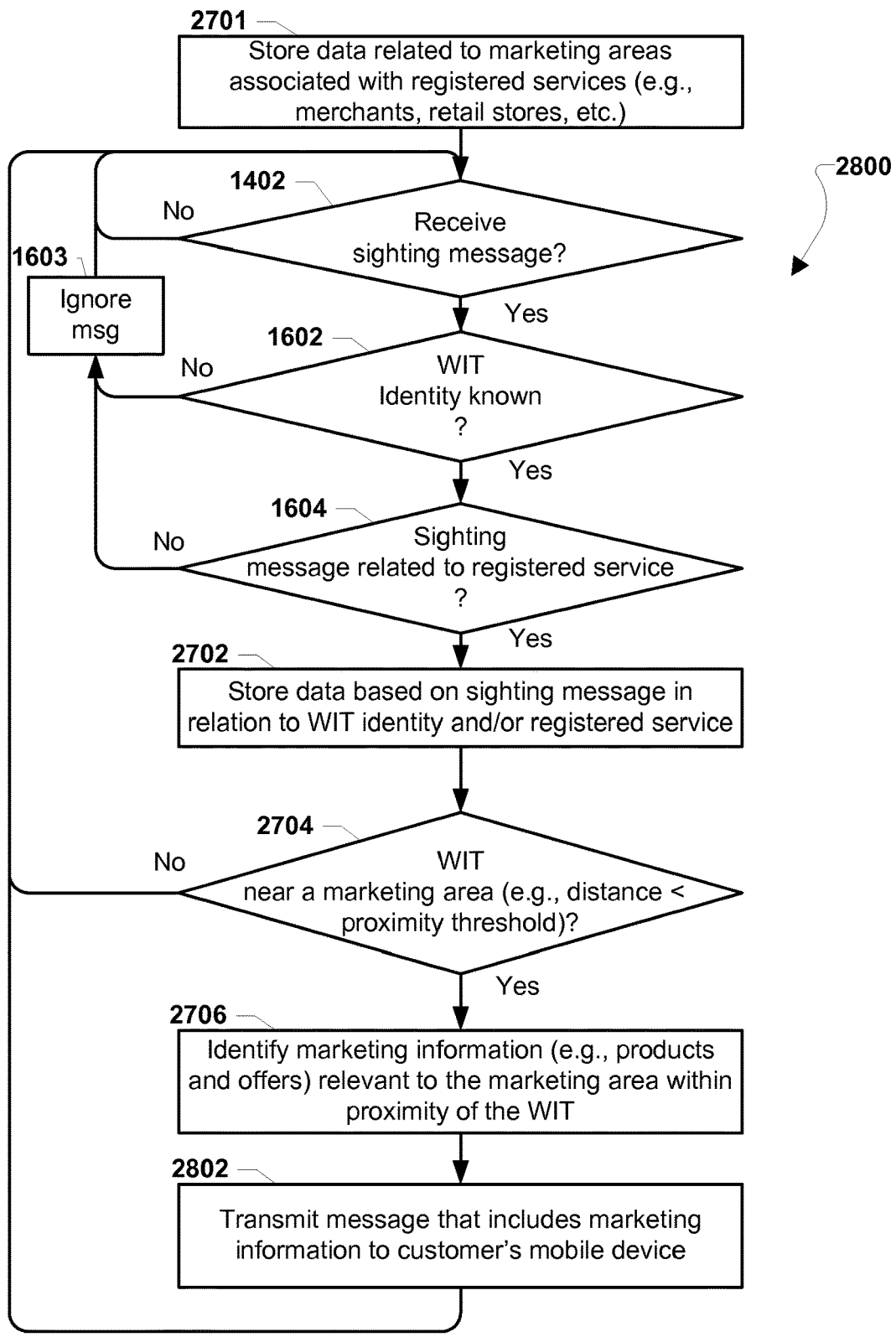
FIG. 28 is a process flow diagram of an embodiment method for a central server to transmit marketing information to a customer's mobile device in response to receiving sighting messages proximate to a marketing area.

FIGS. 27 and 28 describe methods for using wireless identity transmitters to improve marketing within a retail store by providing marketing information based on proximity of customers to predefined marketing areas. Additionally, the various methods may enable the retail store (or merchant associated with the retail store) to amass data based on broadcast messages that describes valuable foot traffic and other customer information. The following non-limiting descriptions describe various scenarios in which the retail store may be configured to receive broadcast messages from customers' wireless identity transmitters. For example, as a customer walks around carrying a wireless identity transmitter, the retail store's stationary proximity broadcast receivers may receive and relay the broadcast message for processing to a central server. However, in other embodiments, the retail store may be configured with stationary wireless identity transmitters that transmit broadcast messages received by mobile proximity broadcast receivers carried by customers within the retail store. In further embodiments, the retail store may employ both proximity broadcast receivers and wireless identity transmitters (or identity transceivers) to receive, relay, and process data from both customers carrying wireless identity transmitters and/or mobile proximity broadcast receivers. Regardless of the manner in which broadcast messages are transmitted, received, and relayed to the central server, the various embodiment methods may use broadcast messages and sighting messages to identify when customers and their associated devices are within the retail store and within proximity of marketing areas.

Additionally, in the descriptions below, the central server may be a remote central server dedicated to receiving and processing sighting messages from various proximity broadcast receivers and/or local computing devices. However, in other embodiments, the methods may be performed by a local computing device or central server. For example, a local server within a retail store may be configured to receive sighting messages from proximity broadcast receivers positioned within the retail store building.

FIG. 27 illustrates an embodiment method 2700 for a central server to transmit marketing information to devices within a retail store in response to receiving a sighting message associated with a broadcast message. In general, as customers walk around the retail store, they may pause to browse inventory, exit the retail store, and wait in particular areas of the retail store. For example, customers may wait in line to pay for merchandise, stand in a product aisle looking at a particular product, walk from one department to another, and exit the front door. As customers execute various activities and movements, their wireless identity transmitters may transmit broadcast messages received by proximity broadcast receivers throughout the retail store. The central server may receive sighting messages from these proximity broadcast receivers and, based on determined location information related to the sighting messages (e.g., the location of the associated proximity broadcast receiver), may determine whether a marketing area is located near the customers. If customers are near marketing areas, such as an end cap that includes a display of promotional products or a particular section within a product aisle, the central server may transmit relevant marketing information for use in the retail store. The marketing information may include messages to be rendered or otherwise presented to the customer, such as discounts (e.g., "$1 off of these chips, today only!"), buy on get one free offers, and/or enticing statements (e.g., "You buy a lot of chips, why not try these?").

In block 2701, the central server may store data related to various marketing areas associated with registered services. For example, the central server may store location information about marketing areas within retail stores or other places associated with registered merchants, retailers, and various third-parties (e.g., parties that have completed developer registration, registered to utilize services provided by the central server, etc.). Such stored information about marketing areas may include characteristics of marketing areas, such as data representing the types of products within marketing areas (e.g., soft drink, detergent, chips, toys, etc.), particular brands corresponding to a marketing area, and location or positioning information of marketing areas within retail stores. For example, a database may include an entry for a marketing area within a retail store that includes the GPS coordinates of the marketing area as well as the type of products placed within that marketing area. Additionally, the central server may store marketing information associated with the various marketing areas, such as valid coupons or promotional materials related to the products within particular marketing areas. In an embodiment, such stored data may include whether proximity broadcast receivers are nearby to the various marketing areas.

As described above, in determination block 1402, the central server may determine whether a sighting message is received, such as a sighting message transmitted by a proximity broadcast receiver located within the retail store. For example, as a customer carrying a wireless identity transmitter walks near a marketing area, a proximity broadcast receiver located within the marketing area may receive broadcast messages from the wireless identity transmitter, create sighting messages based on the received broadcast messages, and transmit the sighting messages to the central server.

In an embodiment, the sighting message may simply contain header information or metadata that indicates the location of the proximity broadcast receiver related to the sighting message. The sighting message may also contain indicators of marketing areas and/or products within proximity of the proximity broadcast receiver transmitting the sighting message. For example, a proximity broadcast receiver may be configured to indicate within sighting messages that it is stationed near a certain brand of tires, clothes, office supplies, or food. As another example, a sighting message may include indicators that the transmitting proximity broadcast receiver is near a particular marketing area (e.g., includes a code for "Sporting Goods Area #123"), end cap displays of products, a line of monitors configured to render advertising, or the entrance to the retail store.

If the central server does not receive a sighting message (i.e., determination block 1402="No"), the central server may continue with the operations in determination block 1402. However, if the central server does receive a sighting message (i.e., determination block 1402="Yes"), in determination block 1602 the central server may determine whether a wireless identity transmitter identity is known based on the received sighting message. The central server may detect identification information related to the broadcast message within the sighting message, such as by parsing the sighting message, decrypting encrypted identification information related to a wireless identity transmitter (i.e., a rolling identifier), and matching the identification information to a registered customer or registered wireless identity transmitter. For example, the central server may compare decrypted (or decoded) identification information from the sighting message to a list of all rolling identifiers related to registered wireless identity transmitters. If the wireless identity transmitter identity is not known by the central server (i.e., determination block 1602="No"), in block 1603 the central server may ignore the sighting message and continue with the operations in determination block 1402.

If the wireless identity transmitter identity is known by the central server (i.e., determination block 1602="Yes"), in determination block 1604 the central server may determine whether the sighting message is related to a registered service. If the sighting message is not related to a registered service (i.e., determination block 1604="No"), the central server may continue with the operations in block 1603. If the sighting message is related to a registered service (i.e., determination block 1604="Yes"), in block 2702 the central server may store data based on the sighting message in relation to the wireless identity transmitter identity and/or the registered service. For example, the central server may update a database entry related to the identified wireless identity transmitter (or its associated customer or user account), indicating the wireless identity transmitter was within proximity of the proximity broadcast receiver associated with the sighting message, as well as any other relevant information indicated in the sighting message (e.g., timestamps, etc.).

In various other embodiments, the central server may store data in relation to the registered service, such as a local coffee shop or retail store registered to receive customer data. For example, the central server may update a database entry for a merchant with proximity or location information determined based on the sighting message. In general, such stored data may be valuable to stores, merchants, and various services registered with the central server for generating profit equations, mapping foot traffic, calibrating building floor plans, and otherwise understanding customer trends (e.g., purchase convergence, number of visits to the retail store per customer per time period, etc.). Stored information may include indicators of behavioral information of customers, such as where customers are moving within a stores, how long customers stay in particular areas (e.g., how long a shopper was in front of an end cap), movement routes within evaluated areas (e.g., data showing a customer moves from the Toys department to the Automotive department, etc.). In an embodiment, behavioral information may include data describing a customer's usage of in-store WiFi provided in relation to a registered service. For example, the central server may store information that indicates a customer entered a retail store and accessed a free WiFi local area network to view a website of a competitor store.

The central server may also update and store statistical information based on the sighting message, such as modifying data that indicates the number of unique customers within the retail store, the amount of time (i.e., "dwell" time) the customer was within a particular area (e.g., aisle, department, cash register line, etc.), and the travel routes customers make within observed places, such as a retail store. The central server may store data that indicates an aggregated amount of time that all customers dwelled within a particular area of the retail store. In another embodiment, the central server may store information from individual sighting messages or alternatively may only store summary or average data based on a plurality of sighting messages. For example, each time the central server receives a new sighting message associated with a particular customer's wireless identity transmitter, the central server may store an updated average of the customer's dwell time within a particular department within the retail store.

In various embodiments, the data stored in relation to the registered service may vary based on relevant permissions settings associated with a customer's registered account or profile. For example, if the customer related to the sighting message and/or wireless identity transmitter registered to be a marketing participant, the central server may store behavioral information that identifies the customer in relation to his/her activities (e.g., customer A walked to a certain marketing area within a local coffee shop, customerX bought a coffee and sat in the lobby for an hour, etc.). However, the central server may act as a shield for the customer's identity by storing but not providing identifying information to merchants without permission or authorization from the customers. For example, this stored information may not be communicated, transmitted, or other made available to merchants, retailers, or the retail store, but may instead be used exclusively by the central server. The central server's use of stored permissions is further described below with reference to FIGS. 31-32.

Return to FIG. 27, in determination block 2704 the central server may determine whether the wireless identity transmitter is near a marketing area. As described above, the retail store may include various stationary proximity broadcast receivers that are placed throughout the retail store (e.g., around show floors, at the entrance, on shelves, etc.). The central server may store data that indicates the location of such stationary proximity broadcast receivers within the retail store and well as data that indicates the location of various known marketing areas within the retail store. For example, the central server may maintain a database that describes the GPS coordinates and/or relative location information of all stationary proximity broadcast receivers and marketing areas within the retail store. Since the wireless identity transmitter is within proximity of the proximity broadcast receiver associated with the received sighting message, the central server may compare a known location (e.g., GPS coordinates) of the proximity broadcast receiver to stored location data of marketing areas to determine whether the wireless identity transmitter is near a marketing area. When the distance between the location of the proximity broadcast receiver and the location of a marketing area is within a proximity threshold, the wireless identity transmitter may be considered near to (or within proximity of) the marketing area.

In an embodiment, if the distance is within a predefined proximity threshold, the proximity broadcast receiver (and thus the customer associated with the wireless identity transmitter) may be within proximity of a marketing area, and thus the customer may receive relevant marketing information (e.g., the customer is walking by a display of products, into the retail store, and/or out of a particular department). For example, the central server may determine whether the proximity broadcast receiver is within a few inches, feet, or meters of any advertising monitor within the retail store that is used for rendering advertising offers on a certain item. In an embodiment, if the proximity broadcast receiver (and thus the wireless identity transmitter) is determined to be within the proximity threshold of a plurality of marketing areas, the central server may determine the most likely marketing area based on the marketing area that has the shortest distance for to the proximity broadcast receiver.

In various embodiments, the central server may utilize additional information when determining whether the wireless identity transmitter is near a marketing area. In particular, the central server may estimate the position of the wireless identity transmitter as within a circular area of the proximity broadcast receiver that transmitted the sighting message. The circular area may have a radius equal to the wireless identity transmitter's average broadcast range. The central server may also evaluate signal strength information describing the broadcast message reported within the sighting message to determine more precise proximity information of the wireless identity transmitter. For example, based on known capabilities of the proximity broadcast receiver and the signal strength of the associated broadcast message, the central server may determine that the wireless identity transmitter was within a certain distance from the proximity broadcast receiver at the time of transmitting the broadcast message within the sighting message. In an embodiment, the central server may use received signal strength indication (or "RSSI") information from within the sighting message to determine approximate distance of the wireless identity transmitter to the proximity broadcast receiver. In an embodiment, the central server may also employ schematics or other floor plan or blueprint data of the retail store to determine more precise location information of the proximity broadcast receiver and thus the wireless identity transmitter. For example, the central server may determine that the wireless identity transmitter is located to the east or south side of the proximity broadcast receiver based on a floor plan that indicates the proximity broadcast receiver is surrounded by exterior walls to the north and west. In an embodiment, the central server may perform the operations of the methods 1820 and/or 1860 described above to determine more precise location information for the wireless identity transmitter. For example, the central server may compare information within concurrent sighting messages to define a precise location of a wireless identity transmitter within the retail store. In another embodiment, the central server may utilize dead reckoning and other estimation routines or algorithms to determine whether the customer (and the wireless identity transmitter) may be near a marketing area in the near future. For example, the central server may evaluate recent movement patterns of the customer to determine within a few seconds he/she may be in front of a product display.

If the wireless identity transmitter is not near a marketing area (i.e., determination block 2704="No"), the central server may continue with the operations in determination block 1402. For example, the customer may be located in the middle of an aisle away from an end cap, display, or point-of-sale device marketing area, so it may not be desirable to transmit marketing information related to the end cap yet. However, if the wireless identity transmitter is near a marketing area (i.e., determination block 2704="Yes"), in block 2706 the central server may identify marketing information relevant to the marketing area within proximity of the wireless identity transmitter. In other words, the central server may find products, offers, and other information that relates to the marketing area within proximity of the proximity broadcast receiver that transmitted the sighting message in response to receiving a broadcast message from the wireless identity transmitter. In particular, the central server may identify current offers, promotions, discounts, coupons, and/or advertising messages that are stored in relation to the marketing area. For example, within a database, the central server may look-up current promotional deals related to the marketing area within proximity of the customer.

In an embodiment, the relevant marketing information may be based on the marketing area as well as stored information regarding the customer associated with the wireless identity transmitter. In an embodiment, the central server may evaluate stored data describing the customer and the customer's recent activities (e.g., prior purchases, recent movement routes and/or locations within the retail store, how frequently the customer visits the store) when identifying relevant marketing information. For example, the central server may detect that the customer associated with the wireless identity transmitter has been located near the marketing area many times over a period of time. Based on the customer's data, the central server may modify offers or promotions that the retail store may have available to further entice the customer. For example, the central server may identify that there are no current promotions for a product within a nearby marketing area, but because the customer has walked by the marketing area several times within a time period, the central server may identify that a nominal discount offer may be transmitted to get the customer to purchase the product. As another example, the central server may identify trends in the customer's locations and may identify an advertisement message that may create interest within the nearby marketing area. For example, the central server may transmit marketing information that includes a message for the customer to stop and investigate the products of the marketing area. In another embodiment, the central server may store loyalty program information (or rewards program information) for the retail store and may use this information to identify marketing information for the customer. For example, the marketing information may include a certain discount for the customer only when stored loyalty program data associated with the customer indicates the customer has a certain standing (e.g., the customer has accrued a certain number of loyalty points, has visited the retail store with a certain frequency, has purchased a certain number of products within a time windows, etc.). The central server's use of stored, personal information of the customer to identify marketing information may be governed by permissions settings, as described below with reference to FIGS. 31-32.

In an embodiment, the central server may identify particular marketing information dependent upon whether the customer has a prior known relationship with the registered service. For example, the central server may identify a particular coupon based on stored information that indicates the customer associated with the wireless identity transmitter has a loyalty rewards account or other previous purchase history with the retail store. Based on prior interactions of activities between the customer and the registered service (e.g., merchant), the central server may identify more beneficial marketing information, such as promotional offers with higher benefits or deals than if no prior interactions existed between the parties. In another embodiment, if no prior relationship exists between the customer and registered service (i.e., the customer does not have a store account, has never purchased products related to the marketing area, etc.), the central server may identify anonymous, general marketing information. For example, such marketing information may include a coupon that is available to any and all customers within a retail store.

In another embodiment, the identified marketing information may be based on WiFi usage of the customer. In particular, when the customer is known to use a store's WiFi, such as within a coffee shop, the marketing information may address the customer's use of the WiFi in relation to his/her other activities. For example, after detecting that a customer has sat for over an hour in a local coffee shop using a free WiFi access point without continuing to purchase coffee products, the central server may identify advertising information that drives the customer to purchase more coffee while sitting in the shop.

Returning to FIG. 27, in block 2708, the central server may transmit a return message that includes the identified marketing information for use in the marketing area within proximity of the wireless identity transmitter. The included marketing information may be used to render advertisement messages, discounts, coupons, or other information that may be viewed by the customer near the marketing area. In an embodiment, the central server may transmit the return message to a proximity broadcast receiver connected to a display within the proximate marketing area, such as the proximity broadcast receiver that transmitted the received sighting message. The proximity broadcast receiver may receive the return message and may render marketing information, such as a video advertisement for a certain product, on an LCD screen connected to the proximity broadcast receiver. In an alternative embodiment, the return message may be transmitted to a local computing device associated with the retail store, such as a local server, which may in turn deliver the some or all of the return message to the proximity broadcast receiver associated with the sighting message. For example, the return message may be routed through the local computing device to the proximity broadcast receiver. In another embodiment, the return message may be additionally or exclusively transmitted to a mobile device associated with the customer, such as a smartphone and/or a mobile proximity broadcast receiver.

In an embodiment, the return message may include the identity and/or location of the customer associated with the sighting message (e.g., the customer walking near the marketing area). For example, based on privacy settings or permissions set up by the customer with the central server, the customer may agree to or forbid the divulgence of his/her personal information to the retail store by the central server. In an embodiment, based on such customer permissions, the central server may transmit a message that only indicates that an anonymous customer is near a particular marketing area of a store (e.g., "A customer is near the Chips aisle," "a customer entered your store," "a customer left the Toy department," "a customer is staying in Aisle 4," etc.).

In optional block 2710, the central server may transmit an instructions message to a local computing device within the retail store that includes instructions for store employees. The instructions message may include the marketing information as well as instructions for salesmen, customer service agents, the store manager, or other store agents. For example, the instructions message may include directions that a salesman should go to the marketing area and promote the products there. In an embodiment, the instructions message may be included within the return message transmitted with the operations in block 2708. Once the return message and optional instructions message are transmitted, the central server may continue with the operations in determination block 1402.

In various embodiments, the instructions message may include various data to assist in the retail store's agents (e.g., customer service representatives, cashiers, salesmen, etc.) in contacting the customer. Subject to stored permissions settings, the instructions message may include information that may enable the retail store's agents to address, identify, and/or approach the customer with confidence, such as location information (e.g., the customer is within proximity of a certain marketing area), photographic information of the customer (e.g., Facebook imagery, driver's license photo, previous security footage from store surveillance, etc.), signature samples from previous transactions, and audio samples of the customer's voice. For example, the local computing device may receive a photo of the customer and instructions for a salesman to go assist the customer ("Go find Mr. X at Aisle A").

In various embodiments, the local computing device may be configured to transmit the instructions message (or its contents) to devices used by store employees. For example, based on metadata, header information, or other data within the instructions message, the local computing device may transmit SMS texts, email messages, or phone calls to mobile devices associated with store employees.

FIG. 28 illustrates an embodiment method 2800 for a central server to transmit marketing information to a customer's mobile proximity broadcast receiver in response to receiving sighting messages. The method 2800 is similar to the method 2700, except that instead of the central server transmitting the messages to a retail store (e.g., proximity broadcast receivers within a marketing area, a local computing device, etc.), the central server may transmit a return message to the mobile device of the customer associated with the sighting message. In other words, when the customer is determined to be within proximity of a marketing area within the retail store, the central server may transmit a message to that customer providing marketing information relevant to the marketing area. The marketing information may be rendered by the customer's mobile device and may include coupons, offers, and other information useful to the customer.

In block 2701, the central server may store data related to various marketing areas associated with registered services. In determination block 1402, the central server may determine whether a sighting message is received, such as a sighting message transmitted by a proximity broadcast receiver located within the retail store. If the central server does not receive a sighting message (i.e., determination block 1402="No"), the central server may continue with the operations in determination block 1402. However, if the central server does receive a sighting message (i.e., determination block 1402="Yes"), in determination block 1602 the central server may determine whether a wireless identity transmitter identity is known based on the received sighting message. If the wireless identity transmitter identity is not known by the central server (i.e., determination block 1602="No"), in block 1603 the central server may ignore the sighting message and continue with the operations in determination block 1402. If the wireless identity transmitter identity is known by the central server (i.e., determination block 1602="Yes"), in determination block 1604 the central server may determine whether the sighting message is related to a registered service.

If the sighting message is not related to a registered service (i.e., determination block 1604="No"), the central server may continue with the operations in block 1603. If the sighting message is related to a registered service (i.e., determination block 1604="Yes"), in block 2702 the central server may store data based on the sighting message in relation to the wireless identity transmitter identity and/or the registered service. In determination block 2704 the central server may determine whether the wireless identity transmitter is near a marketing area. If the wireless identity transmitter is not near a marketing area (i.e., determination block 2704="No"), the central server may continue with the operations in determination block 1402. If the wireless identity transmitter is near a marketing area (i.e., determination block 2704="Yes"), in block 2706 the central server may identify marketing information relevant to the marketing area within proximity of the wireless identity transmitter.

In block 2802, the central server may transmit a message that includes the identified marketing information to the customer's mobile device. For example, when the customer enters the front doors of the retail store, the central server may transmit the message to the customer's mobile device to present the customer with a greeting (e.g., "Welcome back!") or suggestions ("Why don't you buy these chips?"). In an embodiment, the message may include instructions, codes, or other information for use by an application executing on the mobile device. For example, the message may include a command for software related to a retailer (e.g., a retailer app) instructing the software to display a picture, a coupon, a message, or other information for the customer's benefit or use. Illustrations of such an application are described below with reference to FIGS. 30A-30C. Once the message is transmitted, the central server may continue with the operations in determination block 1402. In an embodiment, messages may be sent to the customer's mobile device as well as to devices within the retail store. For example, the return message may be sent to a proximity broadcast receiver in the marketing area near the customer as well as to the customer's smartphone.

In another embodiment, the message may include information describing the location of various retail store assets, such as a list of all marketing areas within the retail store and/or store employees. For example, the message may include data that the customer's mobile device can use to render a map of the store that shows real-time locations of customer service representatives. In an embodiment, the central server may store data that indicates whether the customer is waiting for assistance (e.g., the customer is located near or within a customer service area of the retail store) and may transmit data giving up-to-date information regarding customer service availability. For example, the message may include information that indicates a customer service representative is en route to the customer's location, or alternatively, that the customer service agents will be busy for a period of time (e.g., "You may be assisted in another few minutes!" or "You are behind a certain number of other customers waiting for assistance. We will be with you in a few moments!").

In various embodiments, the message may be transmitted to the customer's mobile device whether or not the mobile device is configured to operate as a mobile proximity broadcast receiver. For example, the sighting message may be from a stationary proximity broadcast receiver within the retail store and not from the customer's mobile device. In other words, marketing information may be sent to the customer's mobile device in response to the central server receiving a sighting message from either the mobile device when configured to perform operations of a mobile proximity broadcast receiver or a stationary proximity broadcast receiver within the retail store. For illustration purposes, the customer may receive an SMS text message or email from the central server that includes a coupon for a product when the customer walks by a marketing area for the product.

Figure 29:
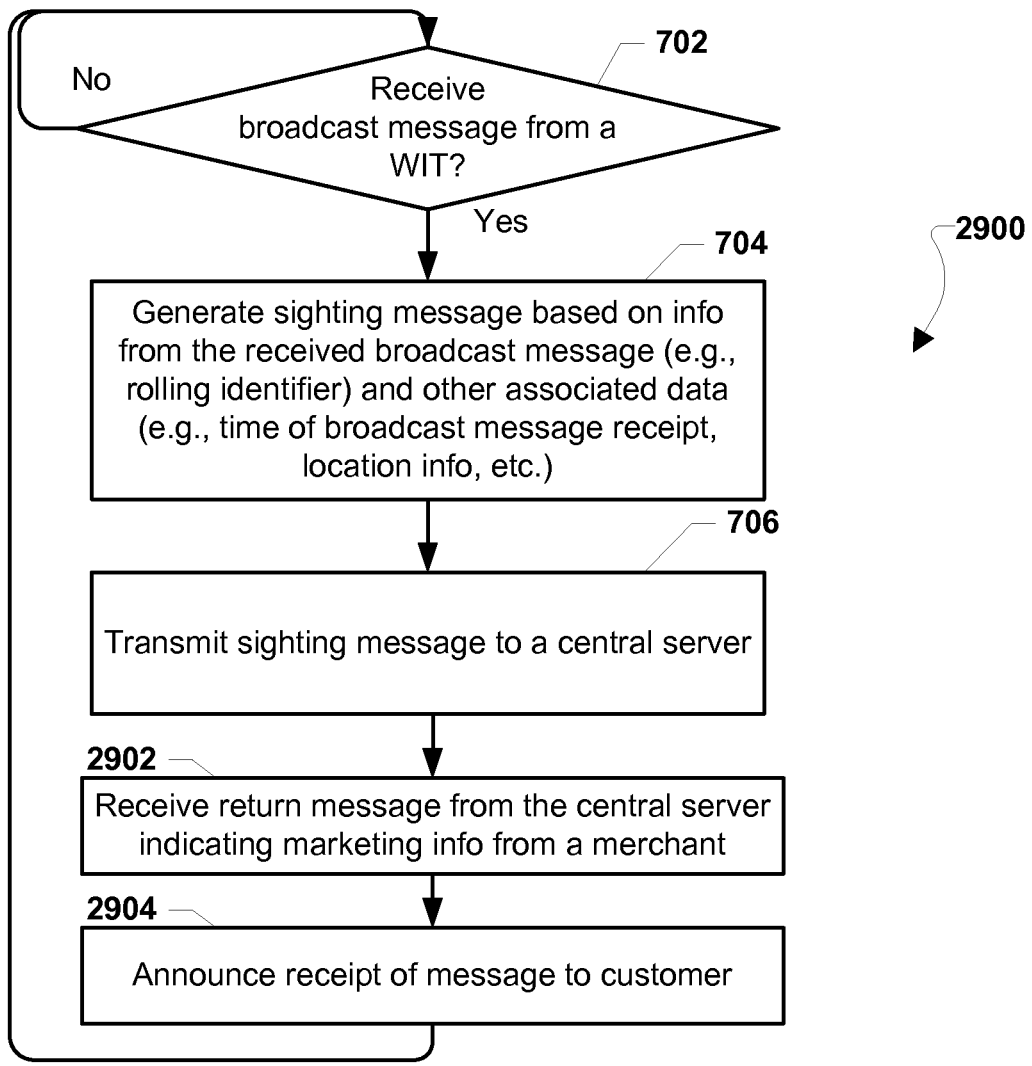
FIG. 29 is a process flow diagram of an embodiment method for a proximity broadcast receiver to receive a coupon from a merchant.

FIG. 29 illustrates an embodiment method 2900 that may be implemented on a proximity broadcast receiver, such as a mobile proximity broadcast receiver. As described above, such a mobile proximity broadcast receiver may be a mobile device carried by a customer. For example, a smartphone configured to execute an application associated with a retailer may be configured to transmit sighting messages to a central server in response to receiving broadcast messages from proximate wireless identity transmitters positioned within various places, such as office buildings, resorts, amusement parks, parking lots, ski lodges, forests, homes, and retail stores. The customer's proximity broadcast receiver may be configured to receive messages from the central server that include coupons, offers, benefit information, or other customer incentives related to a merchant. In an embodiment, marketing information within such return messages may be combined with or related to a loyalty program associated with the merchant. For example, a coupon may be generated based on a previous purchase history of the customer at the merchant's stores.

In an embodiment, the proximity broadcast receiver may be configured to receive broadcast messages from a merchant's wireless identity transmitters based on software installed concurrently with the installation of merchant software (or app) on the proximity broadcast receiver. In other words, when downloading and installing the merchant's app, the proximity broadcast receiver may install other broadcast message software embedded within the merchant app.

In determination block 702, the proximity broadcast receiver may determine whether a broadcast message is received. If the proximity broadcast receiver does not receive a broadcast message (i.e., determination block 702="No"), the proximity broadcast receiver may continue with the operations in determination block 702. If the proximity broadcast receiver receives a broadcast message (i.e., determination block 702="Yes"), in block 704 the proximity broadcast receiver may generate a sighting message based on information from the received broadcast message and other associated data. In block 706, the proximity broadcast receiver may transmit the sighting message to a central server, such as via a cellular (e.g., an LTE, 3G, or 4G network) or other network and the Internet.

In block 2902, the proximity broadcast receiver may receive a return message from the central server indicating marketing information (e.g., a coupon, offer, promotional materials, etc.) from a merchant. In an embodiment, the return message may also or alternatively include software instructions, URLs, or other information the proximity broadcast receiver may utilize to view or otherwise access the merchant's offer.

In another embodiment, instead of or in addition to a coupon, incentive, or other marketing information, the return message may include information enabling access to an exclusive wireless local area network. For example, the return message from the central server may include a service set identifier (or SSID) related to an unpublished or "hidden" wireless local area network accessible within a retail store. Alternatively, the return message to the customer's proximity broadcast receiver may include a password for an unhidden but secured wireless local area network. Such wireless local area networks may be configured to be free-of-charge and/or not require the customer to accept terms of use conditions, etc. in order to access the network, since access is controlled through registering of the customer's proximity broadcast receiver in advance. The wireless local area network access benefit may be provided to customers based on information collected via sighting messages received at the central server. For example, the central server may grant a particular customer access to the wireless local area network based on an evaluation of the customer's registration (or member) status with a merchant's services as indicated in the central server, whether the proximity broadcast receiver has downloaded the merchant's app, previous purchase behavior of the customer within the merchant's retail store, the number of times the customer (and proximity broadcast receiver) have been within the merchant store over a certain period, etc. In an embodiment, the return message may also include software instructions that the proximity broadcast receiver may execute to automatically access the wireless local area network or, alternatively, the network access availability may be announced to the customer.

In block 2904, the proximity broadcast receiver may announce receipt of the message to the customer. For example, the proximity broadcast receiver may display on an LCD screen a coupon, message, or enticing offer from a merchant. As another example, a smartphone proximity broadcast receiver may beep and/or flash a display of a digital coupon for use while within the merchant store. Other examples are described below with reference to FIGS. 30A-30C. The proximity broadcast receiver may continue with the operations in determination block 702.

Figure 30A:
FIGS. 30A-30C are diagrams of mobile devices displaying marketing information in accordance with various embodiments.
Figure 30B:
Figure 30C:

FIGS. 30A-30C show diagrams illustrating various marketing information that may be displayed by a mobile device 3001 of a customer. As described above, the mobile device 3001 may execute software or an application (or "app") that is configured to receive and present marketing information from a central server. Based on the customer's proximity to proximity broadcast receivers and/or wireless identity transmitters within a retail store, the central server may identify marketing information that is relevant to marketing areas within proximity of the customer. Further, the marketing information transmitted by the central server may be different based on the different marketing areas of which the customer is within proximity. In an embodiment, the mobile device 3001 may or may not be configured to operate as a mobile proximity broadcast receiver. For example, the customer may carry a wireless identity transmitter as well as a mobile device 3001 that may or may not be configured to receive broadcast messages from wireless identity transmitters positioned within the retail store.

FIG. 30A illustrates an example user interface display 3000 of marketing information displayed by an app executing on a customer's mobile device 3001. The marketing information may be displayed in response to the system determining that the customer is within proximity of a marketing area corresponding to an entrance to a retail store. In particular, the mobile device 3001 may receive a message from the central server and may render included marketing information that is relevant to the retail store's entrance marketing area, such as a welcome message 3002 as well as a graphical element 3004 for accessing mobile coupons. In an embodiment, when clicked or otherwise interfaced, the graphical element 3004 may direct the mobile device 3001 to access a website, to open an email stored on the mobile device 3001, or display coupons within the app.

FIG. 30B illustrates another example user interface display 3050 of marketing information displayed by an app executing on a customer's mobile device 3001. The marketing information may be displayed in response to the system determining that the customer is within proximity of a marketing area corresponding to an area within a retail store, such as a beginning section of an aisle, a middle section of an aisle, or an end cap. In particular, the mobile device 3001 may receive a message from the central server and may render included marketing information that is relevant to products associated with the marketing area, such as a promotional offer 3052 for the products. The mobile device 3001 may also render various graphical user interface buttons 3054 for manipulating the app. In an embodiment, the mobile device 3001 may receive the marketing information in response to the central server determining that the customer dwelled near the marketing area for a period of time. For example, the marketing information may be received after the customer stands in front of the products for a few minutes.

FIG. 30C illustrates another example user interface display 3075 of marketing information displayed by an app executing on a customer's mobile device 3001. The marketing information may be displayed in response to the system determining that the customer is within proximity of a marketing area corresponding to an exit to a retail store. In particular, the mobile device 3001 may receive a message from the central server and may render included marketing information that is relevant to the retail store's exit marketing area, such as a "thank you" message 3076 as well as additional coupons 3078 that may act as incentives for future visits.

Figure 31:
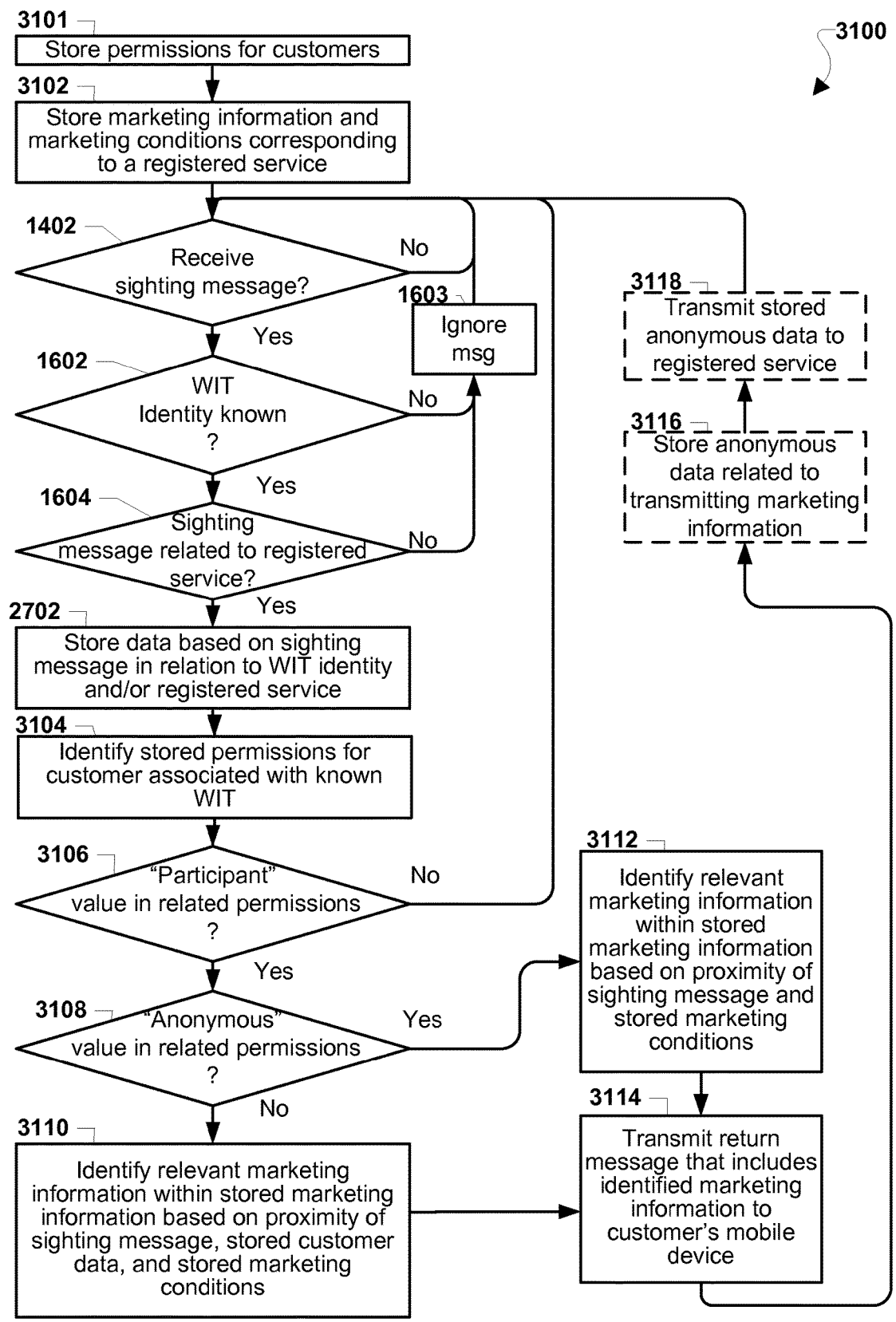
FIGS. 31-32 are process flow diagrams of embodiment methods for a central server to transmit marketing information to a customer's mobile device without identifying the customer to a third-party.
Figure 32:
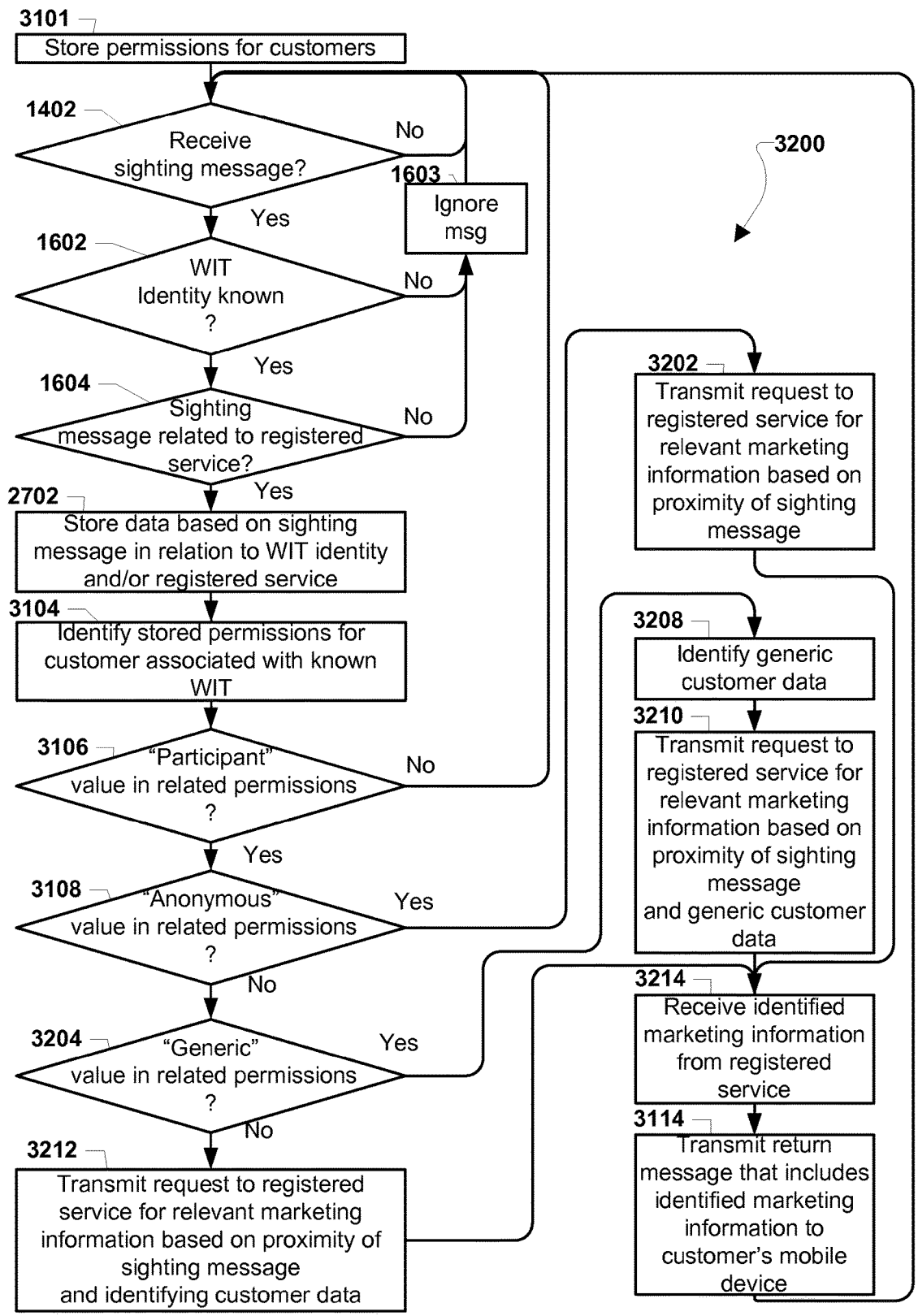

FIGS. 31 and 32 illustrate embodiment methods 3100, 3200 for a central server to transmit marketing information to a customer's wireless identity transmitter (or mobile device) without providing the customer's identity to third-parties, such as merchants associated with retail stores. In general, customers carrying wireless identity transmitters and/or mobile proximity broadcast receivers (e.g., smartphones configured to operate as proximity broadcast receivers) may pause to browse inventory, exit a door, and wait in particular areas of a retail store. For example, customers may enter through the front door, wait in line to pay for merchandise, stand in a product aisle looking at a particular product, walk from one department to another, and exit through the front door. Wireless identity transmitters and/or stationary proximity broadcast receivers within the retail store may relay sighting messages in response to the customers' devices broadcast messages near marketing areas, as described above.

The retail store (or the merchant associated with the retail store) may desire to use information within such sighting messages to present marketing information. For example, the retail store may desire to know when a particular customer enters the retail store so that a special advertisement can be transmitted directly to the customer's mobile device from the retail store (or a retail store central server). Additionally, the retail store may desire to use information within the sighting messages to generate data about individual customers, such as purchase preferences and other behaviors within the retail store (e.g., walking patterns between various departments, etc.), which may be subsequently used in marketing efforts that are directly related to the identity of the customers. However, customers may desire to shop, walk around, or otherwise visit the retail store anonymously. For example, a customer may not want to share his name, address, purchasing habits, email address, phone number, and other personal information with a merchant or retailer.

Thus, the various embodiment systems of this disclosure may provide registered users (or customers) with mechanisms for protecting their privacy such that personal information may only be provided to third-parties with consent and for valid purposes. For example, a customer may permit the photo of a missing child may be provided by a central server to mobile proximity broadcast receivers in order to expedite her rescue, but may disallow giving the customer's name to a merchant in order to receive a coupon. In other words, a central server may provide a layer of indirection that enables customers to remain anonymous but still provide and receive relevant information.

The central server may store privacy settings information (i.e., "permissions") that indicates whether customers authorize to have their identity (and other personal information) provided to third-parties and/or third-party applications executing on computing devices. For example, when a customer's permissions indicate a desire to remain anonymous, the central server may transmit a message for use by a mobile device app that only includes anonymous state information (e.g., an indicator that an unnamed customer is within a retail store, is staying within the store, or is leaving the store). Permissions may be set, provided, or otherwise indicated by customers when they register a wireless identity transmitter, mobile proximity broadcast receiver, or other device (e.g., a smartphone) with the central server. For example, the central server may collect privacy rules, settings, preferences, and other data from customers during registration procedures via a web portal.

Customers may be required to provide permissions that indicate whether the customers are willing to participate in receiving marketing information, and if so, whether the customers desire to be anonymous regarding receiving marketing information. In other words, customers may permit marketing information to be transmitted to them by the central server without permitting identification information to be provided to merchants associated with the marketing information. In an embodiment, the permissions may also indicate that generic data about the customers may be provided to merchants. For example, generic attributes, such as age or number of visits to the retail store, may be stored and provided to merchants without providing customer identities. In another embodiment, upon registration of a wireless identity transmitter and/or mobile proximity broadcast receiver, customers may be required to provide the central server with permission settings that indicate whether the customers are willing to have their identities provided to particular merchants (e.g., Store X) and/or categories of merchants or registered services associated with central server (e.g., department stores, restaurants, banks, bakeries, etc.).

For the purposes of this disclosure, permissions may have several values that indicate various privacy levels or authorizations regarding the disclosure of identification information. In various embodiments, the central server may store permissions for a customer that allow no identifying information to be shared with third-parties (i.e., "anonymous" permissions value), permissions that allow only generic, indirect identification information of customers to be shared (i.e., "generic" permissions value), and/or permissions that allow any information to be shared. For example, a customer unwilling to receive any marketing information from merchants or provide any identification, location history, or behavior information to any third-parties may have permissions set to "anonymous." In an embodiment, the "anonymous" permissions value and the "generic" permissions value may be mutually exclusive. In other words, a customer may authorize no information, only generic information, or any information to be provided to third-parties (e.g., merchants or apps on a mobile device). In an embodiment, generic information may include personal data that indicates demographic categories applicable to a particular customer, such as the customer's age, height, weight, race, marital status, and education.

Additionally, the central server may store different permissions values for various conditions and third-parties associated with a customer. For example, the central server may store a permissions value that indicates a particular merchant may not receive any personal data regarding a customer (i.e., anonymous permissions value). However, the central server may store a different permissions value (i.e., generic permissions value) for the same customer and a second merchant.

The following descriptions of the embodiment methods 3100 and 3200 address scenarios in which a central server may process sighting messages received from proximity broadcast receivers within a retail store. For example, a stationary proximity broadcast receiver within the retail store may receive broadcast messages from customers' wireless identity transmitters and transmit sighting messages in response. However, in other embodiments, the retail store may be configured with stationary wireless identity transmitters that transmit broadcast messages received by mobile proximity broadcast receivers carried by customers within the retail store. In further embodiments, the retail store may employ both proximity broadcast receivers and wireless identity transmitters. Regardless of the manner in which broadcast messages are broadcast, received, and transmitted to the central server, the central server may perform the operations of the embodiment methods 3100, 3200 to identify marketing information to transmit to customers without providing identities to merchants, retailers, retail stores, and other services registered with the central server.

FIG. 31 illustrates an embodiment method 3100 for a central server to transmit marketing information stored by the central server to a customer's wireless identity transmitter (or mobile device) without providing the customer's identity to a third-party associated with a retail store. To ensure anonymity, the central server may be configured to store marketing information from various merchants and transmit that marketing information to customers without the merchants having any contact with the customers. In other words, merchants may never receive information indicating that particular customers are within retail stores, but may employ the central server to act as a "middle man" and transmit relevant marketing information to those customers. Such merchants may periodically and/or continuously provide marketing information to the central server for storage and may also indicate predefined conditions in which the central server may transmit particular marketing information. For example, the central server may receive a certain coupon from a merchant that is to be transmitted to any customer determined to be within the merchant's retail store.

In block 3101, the central server may store permissions for customers. Such permissions may be stored within profiles associated with the customers. For example, when any customer activates and/or registers a wireless identity transmitter, the central server may store values for the customer's permissions, such as "participant," both "participant" and "anonymous," or "non-participant." In an embodiment, the central server may require all users of wireless identity transmitters and/or proximity broadcast receivers to indicate permissions when the devices are activated. For example, users (or customers) may have to log into a website associated with the central server to register wireless identity transmitters and/or mobile proximity broadcast receivers and provide permissions values before the devices are recognized or known by the central server. In an embodiment, the central server may modify stored permissions based on subsequent updates received from customers. For example, the central server may receive information via a website portal that indicates the customer no longer wants his name to be shared with any registered services (e.g., retail stores).

In block 3102, the central server may store marketing information and marketing conditions corresponding to registered services, such as merchants registered with the central server. Parties such as merchants or retail stores that are registered with the central server and/or that are otherwise associated with registered services administered by the central server may provide marketing information for the central server to transmit to registered customers. For example, a local retail store registered with the central server may regularly provide the central server with advertising, coupons, offers, deals, and other information that the central server may store and transmit. Such parties may also provide marketing conditions for storage by the central server. Marketing conditions may be rules, circumstances, events, triggers, or other information that the central server may use to identify relevant marketing information for a customer. In particular, marketing conditions may describe proximity information, such as a proximity threshold to a marketing area, and/or location information, such as geofence perimeters, GPS coordinates, and departments within a retail store, that coincide with particular marketing information. In other words, marketing conditions may indicate marketing areas throughout a retail store. For example, stored marketing conditions may correspond to proximity broadcast receivers within the retail store receiving broadcast messages near a check-out line, the entrance of the retail store, or within a certain product aisle.

Marketing conditions may also include times of day, dates, and other general circumstances. For example, stored marketing conditions may correspond to proximity broadcast receivers within the retail store receiving broadcast messages during a certain hour on a certain day, during the week before Christmas, and/or during an activated promotional period (e.g., during a special sale). In a further embodiment, marketing conditions may also correspond to customer behaviors or habits. For example, marketing conditions may correspond to the number of times a customer has visited the retail store within a certain period. In various embodiments, marketing conditions may include very specific triggers, such as whether a customer has walked by a particular aisle a certain number of times, or may include very broad circumstances, such as whether a broadcast message is received on a Friday as opposed to a Saturday. Additionally, marketing conditions may include thresholds, such as proximity thresholds, that provide ranges of values. For example, a marketing condition may indicate a proximity threshold for a particular marketing area with the retail store such that when the customer is within the proximity threshold (e.g., within a certain distance from the marketing area), the related marketing information may be transmitted to the customer.

In an embodiment, the central server may store the marketing information and marketing conditions in a database in which the marketing information and marketing conditions may be stored in relation to each other. The central server may perform a look-up in the database using a particular marketing area (or proximity broadcast receiver identity) marketing condition and identify the corresponding marketing information for that marketing area. For example, the central server may look-up what coupons and/or advertisements correspond to the electronics department of the retail store of which the customer is currently within proximity.

In determination block 1402, the central server may determine whether a sighting message is received. If no sighting message is received (i.e., determination block 1402="No"), the central server may continue with the operations in determination block 1402. If a sighting message is received (i.e., determination block 1402="Yes"), in determination block 1602 the central server may determine whether the wireless identity transmitter identity is known. In other words, the central server may perform operations to evaluate, decode, decrypt, and otherwise access the data within the received sighting message to determine whether it includes a wireless identity transmitter identity (or identifier) that is registered with the central server. For example, the central server may compare identifiers within the sighting message to a database of all registered wireless identity transmitters to determine whether the wireless identity transmitter corresponding to the received sighting message is known. If the wireless identity transmitter is not known (i.e., determination block 1602="No"), in block 1603 the central server may ignore the sighting message and continue to perform the operations in determination block 1402.

If the wireless identity transmitter is known (i.e., determination block 1602="Yes"), in determination block 1604 the central server may determine whether the sighting message is related to a registered service. For example, the central server may determine whether the sighting message was transmitted by a proximity broadcast receiver associated with a merchant registered with the central server based on metadata within the sighting message. If the sighting message is not related to a registered service (i.e., determination block 1604="No"), the central server may continue with the operations in block 1603. If the sighting message is related to a registered service (i.e., determination block 1604="Yes"), in block 2702 the central server may store data based on the sighting message in relation to the wireless identity transmitter identity and/or the registered service.

In block 3104, the central server may identify stored permissions for the customer associated with the known wireless identity transmitter. In other words, the central server may perform a look-up operation in a database using the wireless identity transmitter's identity (e.g., a code, machine address, or other unique identifier) to obtain stored permission settings for the customer associated with the wireless identity transmitter. For example, the central server may identify a link to permissions settings of a particular customer based on a decrypted or otherwise decoded rolling identifier indicated by the received sighting message. The stored permissions may be flags, bits, string values, or other indicators that describe how the customer prefers to protect or share his/her personal information with registered services (e.g., a particular merchant). The stored permissions may be permissions set by the customer for a particular registered service or for any/all registered services. In another embodiment, the customer may be associated with the proximity broadcast receiver that transmitted the received sighting message. For example, the wireless identity transmitter may be associated with a retail store and the sighting message may have been relayed to the central server by the customer's mobile proximity broadcast receiver. In an embodiment, the customer's permissions within a database may indicate whether the customer has authorized marketing information to be transmitted to the customer's mobile device or another computing device (e.g., a home laptop or desktop).

In determination block 3106, the central server may determine whether a "participant" value is in the related permissions, such as the identified permissions stored for the customer related to the received sighting message. For example, the central server may determine whether the customer had set his permissions settings to indicate he/she wishes to receive marketing information on his smartphone. In an embodiment, the central server may determine whether the customer authorizes scripts, software instructions, and/or other functional content to be delivered with marketing information. For example, when the customer agrees to be a participant and receive marketing information, the customer may also set a permission setting that permits the transmission of scripts to the customer's mobile device that block ads from certain merchants.

If the "participant" value is not in the customer's permissions (i.e., determination block 3106="No"), the central server may continue with the operations in determination block 1402. If the "participant" value is in the customer's permissions (i.e., determination block 3106="Yes"), in determination block 3108 the central server may determine whether an "anonymous" value is in the related permissions. In other words, the central server may determine whether the customer set permissions values that permit information to be shared with registered services, such as third-party merchants or third-party apps executing on the customer's mobile device.

If the "anonymous" value is in the customer's permissions (i.e., determination block 3108="Yes"), the central server may not transmit any information identifying the customer, as the customer has not authorized any personal data to be shared. Thus, in block 3112 the central server may identify relevant marketing information within the stored marketing information based on the proximity of the sighting message and stored marketing conditions. In other words, as the customer's wireless identity transmitter is within a circular area of the proximity broadcast receiver that has a radius equal to its short-range wireless broadcast range, the central server may identify stored marketing information that relates to areas near the proximity broadcast receiver. In particular, the central server may compare the location of the proximity broadcast receiver that transmitted the received sighting message to stored marketing conditions to find proximate marketing areas within the retail store and associated marketing information. For example, the central server may compare data in a database or metadata within the sighting message that describes the GPS coordinates and/or relative proximity information of all stationary proximity broadcast receivers to marketing area locations within the retail store. In various embodiments, the central server may identify relevant marketing information using only proximity information and stored marketing conditions when performing operations similar to those described above with reference to block 2706 in FIG. 27.

By using only the proximity information related to the received sighting message, the central server may identify marketing information that is relevant based only on spatial information that does not directly identify the customer. However, in another embodiment, the central server may utilize other non-identifying, circumstantial information from within the sighting message to identify relevant marketing information. For example, the central server may find marketing conditions that match timestamp information and/or proximity broadcast receiver identification information indicated within metadata of the sighting message as well as the related proximity information to identify marketing information relevant to the proximate areas of the retail store within a particular time of day. In an embodiment, when the registered party (e.g., merchant, retailer) associated with the retail store does not supply the central server with any marketing conditions, the central server may identify relevant marketing information as any or all marketing information stored for that registered party. For example, a merchant may provide only a single coupon for the retail store that may be transmitted to the customer regardless of where the customer is within proximity of the entrance of the store, the time of day, and/or the day of the week.

In an alternative embodiment, even with an anonymous permissions value, the central server may still transmit messages that indicate proximity of an anonymous wireless identity transmitter. For example, the central server may transmit a message to the customer's mobile device that may indicate to a third-party app that an unidentified wireless identity transmitter came within proximity of an associated proximity broadcast receiver. Such messages may provide circumstantial information, such as an approximate time at which the sighting message was received by the central server. In another embodiment, such messages with no customer information may be used by registered services to estimate foot traffic through particular areas, such as retail stores.

If the "anonymous" value is not in the customer's permissions (i.e., determination block 3108="No"), the central server may be authorized to transmit any information identifying the customer, and in block 3110 the central server may identify relevant marketing information within the stored marketing information based on proximity of the sighting message, stored customer data, and the stored marketing conditions. The central server may utilize stored information related to the customer to identify more specific or personal marketing information for the customer. Such data may be as described above with reference to block 2702, and may include data related to at least one of prior purchases by the customer, recent locations of the customer (e.g., places within a retail store, etc.), characteristics or personal data of the customer (e.g., age, sex, physical attributes, address, product preferences, family information, etc.), and loyalty program information associated with the individual. For example, the central server may detect that previous proximity information within the customer's profile shows the customer has been moving in a certain pattern in the retail store and may compare this pattern information to stored marketing conditions to find marketing information relevant to an area within the retail store that the customer is projected to go to next. Although the customer's identity may still not be provided or revealed to merchants, the marketing information identified using the customer's stored data, such as behaviors, may be more specific and therefore less anonymous. For example, coupon marketing information may be identified that indicates the customer has purchased the product many times previously. As another example, the marketing information may include a promotion that is available only to customers who have visited a particular set of retail stores throughout the country.

In an embodiment, the central server may identify relevant marketing information that may or may not include scripts, software instructions, or other functional information within the operations of blocks 3110 and 3112. For example, the central server may evaluate the customer's stored profile to determine whether permissions authorize or otherwise agree to receiving scripts, software instructions, or other functional information with relevant marketing information. When the permissions include information that indicates the customer has opted out of receiving such scripts within marketing information, the central server may identify marketing information that is relevant (i.e., contextual) but that does not contain such functional content. As an illustration, when the central server determines the permissions of the customer do not permit scripts to be delivered to the customer's smartphone, the central server may identify a low-value coupon, for example, and when the central server determines the permissions indicate the customer agrees to receive scripts, the central server may identify a high-value coupon along with a script for controlling some presentation of the coupon on the mobile device. For example, a script provided with a coupon may activate a special ringer notification on the customer's smartphone or control the presentation of the coupon, such as an animated coupon.

In block 3114, the central server may transmit a return message that includes the identified marketing information to the customer's mobile device. The central server may generate a return message, such as a text message, an email, message utilized by a particular application or software (e.g., a specially formatted payload used by a retail store application executing on the customer's smartphone, etc.) or other communication, that includes the marketing information (e.g., coupons, promotional messages, etc.) and may transmit the return message to contact information associated with the customer that is stored within the central server. For example, the central server may transmit a text to the smartphone number stored when the customer first registered with the central server.

In optional block 3116, the central server may store anonymous data related to transmitting the marketing information. In other words, the central server may store non-identifying statistical information that may be valuable to merchants, such as a number of transmitted messages that contained particular marketing information and a number of transmitted messages over a certain period. For example, the stored anonymous data may include the number of transmitted emails that contained a particular coupon, and/or the number of SMS text messages sent to an unidentified customer over a certain period. In optional block 3118, the central server may transmit this stored anonymous data to a registered service, such as the merchant associated with the retail store. This data may provide third-parties with valuable information indicating the amount of marketing that is accomplished through the central server. The central server may then continue with the operations in determination block 1402. In an embodiment, if the customer's permissions indicate the customer does not wish to be anonymous, the central server may include identifying information within data transmitted to the registered service in optional block 3118. For example, when the customer authorizes identifying information to be provided to merchants, the central server may provide data to a merchant that indicates that a coupon was sent to a certain email address associated with the customer.

FIG. 32 illustrates an embodiment method 3200 for a central server to transmit marketing information to a customer's mobile device without providing the customer's identity to a merchant when precluded by stored permissions. The method 3200 is similar to the method 3100 described above, except that instead of storing marketing information for merchants, the central server may transmit requests to merchants for marketing information relevant to various customers. Based on the stored permissions of a customer, the central server may transmit requests that include no identifying information related to customers (i.e., "anonymous" permissions value), requests that include information that provides only generic, indirect identification information of customers (i.e., "generic" permissions value), or requests that provide any information, such as identifying customer information. However, requests may include the identity of the proximity broadcast receiver and/or wireless identity transmitter associated with the retail store (e.g., stationary proximity broadcast receivers placed within a department, etc.) so that merchants may use related proximity information to determine nearby marketing areas. In an embodiment, the "anonymous" value and the "generic" value may be mutually exclusive. In other words, a customer may authorize no information, only generic information, or any information to be provided to merchants to identify relevant marketing information. The method 3200 may be valuable to the central server in that it may not be required to store, receive updates, and evaluate data from merchants (e.g., marketing information and marketing conditions) to identify relevant marketing information.

In block 3101, the central server may store permissions for customers. In determination block 1402, the central server may determine whether a sighting message is received. If no sighting message is received (i.e., determination block 1402="No"), the central server may continue with the operations in determination block 1402. If a sighting message is received (i.e., determination block 1402="Yes"), in determination block 1602 the central server may determine whether the wireless identity transmitter identity is known. If the wireless identity transmitter is not known (i.e., determination block 1602="No"), in block 1603 the central server may ignore the sighting message and continue to perform the operations in determination block 1402. If the wireless identity transmitter is known (i.e., determination block 1602="Yes"), in determination block 1604 the central server may determine whether the sighting message is related to a registered service. If the sighting message is not related to a registered service (i.e., determination block 1604="No"), the central server may continue with the operations in block 1603. If the sighting message is related to a registered service (i.e., determination block 1604="Yes"), in block 2702 the central server may store data based on the sighting message in relation to the wireless identity transmitter identity and/or the registered service.

In block 3104, the central server may identify stored permissions for the customer associated with the known wireless identity transmitter. In determination block 3106, the central server may determine whether a "participant" value is in the related permissions, such as the identified permissions stored for the customer related to the received sighting message. If the "participant" value is not in the customer's permissions (i.e., determination block 3106="No"), the central server may continue with the operations in determination block 1402. If the "participant" value is in the customer's permissions (i.e., determination block 3106="Yes"), in determination block 3108 the central server may determine whether an "anonymous" value is in the related permissions.

If the "anonymous" value is in the customer's permissions (i.e., determination block 3108="Yes"), the central server may not transmit any information identifying the customer to the registered service related to the received sighting message (e.g., a merchant), as the customer has not authorized any personal data to be shared. Thus, in block 3202 the central server may transmit a request to the registered service for relevant marketing information based on the proximity of the sighting message. In other words, the central server may request marketing information based on the information within the received sighting message, such as the identity of the proximity broadcast receiver that transmitted the sighting message. For example, the request may be transmitted to a server associated with the merchant registered with the central server and associated with the retail store in which the customer is located. Although the request may include only the information of the sighting message, the registered service (e.g., merchant) may determine circumstantial information based on the request transmission, such as an approximate time at which the sighting message was received by the central server. For example, a merchant server receiving the request from the central server may be able to use the time of request receipt to determine marketing information relevant to that time as well as the proximity indicated in the request. The sighting message may include a proximity broadcast receiver device ID that a merchant's computing device may relate to GPS coordinates and proximate marketing areas within the retail store. In an embodiment, a computing device associated with the registered service may perform similar operations as the central server as described above with reference to FIG. 31. For example, a remote merchant server receiving the transmitted request for relevant marketing information may identify the approximate location of the proximity broadcast receiver that transmitted the sighting message, determine proximate marketing areas, and identify related coupons for the proximate marketing areas. In an embodiment, the request may include precise proximity information, such as based on signal strength metadata indicated within the sighting message. In another embodiment, if the "anonymous" value is in the customer's permissions, the central server may not transmit any proximity information within a request. For example, the central server may only request marketing information relevant to the time of the request.

If the "anonymous" value is not in the customer's permissions (i.e., determination block 3108="No"), in determination block 3204 the central server may determine whether a "generic" value is in the related permissions of the customer. As described above, the "generic" value may indicate that the customer does not desire to be identified directly, but may authorize the central server to provide registered services (e.g., merchants, marketing services, retailers, etc.) with general information about the customer to identify relevant marketing information. If the "generic" value is in the customer's permissions (i.e., determination block 3204="Yes"), in block 3208 the central server may identify generic customer data. In particular, generic customer data may include the customer's age, height, weight, race, marital status, education, and other general attributes that do not directly indicate the customer's identity. In an embodiment, generic data may include any data stored by the central server that does not directly indicate the customer's name, unique identifier, profile identifiers, financial account information (e.g., credit card numbers, etc.), and/or specific affiliations. For example, generic data may not include the customer's employer or checking account bank. In various embodiments, generic customer data may include behaviors within the retail store, such as number of visits recorded by the central server, travel paths throughout departments, dwell time, and purchase convergence information. In an embodiment, the generic customer data may include data stored with the operations in block 2702, such as sensor data. In block 3210, the central server may transmit a request to the registered service for relevant marketing information based on the proximity of the sighting message and the generic customer data. In an embodiment, the request may include the proximity broadcast receiver's identity.

If the "generic" value is not in the customer's permissions (i.e., determination block 3204="No"), then the customer may have authorized the central server to provide identifying information to registered services, such as merchants and/or retailer applications. For example, the customer may desire to have marketing information, such as coupons, that directly address the customer and the concern the customer's prior purchases. In block 3212, the central server may transmit a request to the registered service for relevant marketing information based on proximity of the sighting message and identifying customer data. For example, the request may include the customer's name, financial information, employer name, mailing address, email address, phone number, and any other data that the central server may store. In an embodiment, the request may include the proximity broadcast receiver's identity. In an embodiment, the identifying customer data may also include any generic customer data as described above. With such a request, a computing device associated with the registered service (e.g., a retail store server, etc.) may identify the customer and may identify marketing information that is based on the customer's previous purchases. For example, the marketing information may include recommendations for purchases based on what the customer has purchased in the retail store within a previous period. Additionally, the merchant may be enabled to contact the customer directly based on the customer's permissions. For example, with identifying customer data, the merchant may record and use the customer's email address to send marketing information.

As an illustration, identifying information within a request may include various personal data, such as current diet information of the customer. A merchant server receiving the request with the identifying information may identify that the associated customer is currently on a diet and may accordingly generate marketing information that includes a coupon for diet food near the customer's current proximity in the retail store. Alternatively, the merchant may generate marketing information that entices the customer to break his diet with junk food in a nearby aisle. In another embodiment, such personal data may be used by merchants to augment pricing and deals within relevant marketing information. For example, based on personal data indicating the customer is on a diet, the merchant may generate marketing information that includes a discount on junk food.

In block 3214, the central server may receive identified marketing information from the registered service. For example, the central server may receive a response transmission from a merchant's server via Internet protocol communications. In another embodiment, the response transmission may be from another computing device, module, or component (e.g., a server blade) that is associated with the central server. In other words, the central server may have transmitted the request to another function set or partition. The identified marketing information may be based on the various information provided by the central server and thus may include different information dependent upon the customer's permissions. For example, the identified marketing information may include a coupon when the customer is anonymous. As another example, when the customer permits generic customer data to be provided to the merchant, the identified marketing information may include an advertisement for products suitable for the customer's age. In block 3114, the central server may transmit a return message that includes the identified marketing information to the customer's mobile device, and may then continue with the operations in determination block 1402.

As described throughout this disclosure, advertisers (e.g., merchants, retailers, manufacturers, and other parties) may use the various embodiments in order to present contextually relevant marketing information to customers within proximity of certain marketing areas or places indicated by a wireless identity transmitter or a broadcast receiver device. For example, a television manufacturer may desire to provide coupons to a customer walking by a television display within electronics stores who agree to participate in the marketing effort (e.g., placing a wireless identity transmitter and honoring electronic coupons). Further, advertisers may also desire to present marketing information to customers that is customized or generated consistent with the context of the customer's location (as indicated by proximity to the marketing area) and personal information (e.g., previous behaviors, preferences regarding products, demographics, age, weight, previous location information, etc.). For example, a canned food manufacturer may desire to transmit a marketing message related to low-sodium canned foods to a customer known to have high blood pressure as the customer walks through a canned food aisle in a participating grocery store.

To enable the detection of customer proximity to particular marketing areas, advertisers and participating merchants may utilize the framework of various proximity broadcast receivers, wireless identity transmitters, and the central server, as described above. For example, retail stores registered with the central server (i.e., registered services, etc.) may deploy proximity broadcast receivers (and/or wireless identity transmitters) to detect wireless identity transmitters (and/or proximity broadcast receivers) carried by customers registered with the central server. The central server may associate stored customer profiles with received sighting messages to generate relevant (or contextual) marketing information for the customers. For example, the central server may evaluate a stored profile of a customer identified by locating the profile in a database based on the identifier of the customer's wireless identity transmitter (or reporting mobile device configured with an app to function as a proximity broadcast receiver) to obtain that customer's preferences. The central server may then transmit marketing information to the customer's mobile device (and/or a display in the marketing area) that corresponds to both the location (i.e., proximity) of the customer determined from a received sighting message and the customer's preferred type of cola product.

Organizations and establishments that deploy proximity broadcast receivers (and/or wireless identity transmitters), such as museums, retail stores, schools, libraries, bars, office buildings, may demand incentives in exchange for participating in such a marketing chain. Thus, a retail store that deploys proximity broadcast receivers to relay customers' proximity information to the central server may want to be compensated by advertisers for enabling such marketing information to be delivered to customers within their premises. The central server may also be entitled to an origination fee for registering customers and providing the services infrastructure for enabling the contextual marketing chain from the advertisers to the customers. For example, in exchange for placing proximity broadcast receivers within a library for use in distributing advertisements for Store Z, the library may require Store Z to pay a posting fee to the library. Further, parties deploying proximity broadcast receivers and the central server may desire to be awarded a portion of any transactions that occur in exchange for delivering marketing information to customers based on relayed proximity information from devices. FIGS. 33A-34B described various methods for both generating contextual marketing information and compensating parties for participating in marketing information transmissions.

In the following descriptions, a wireless identity transmitter is described as associated with a registered user (i.e., a customer), and sighting messages are described as being transmitted by a proximity broadcast receiver associated with a registered service (e.g., within a retail store) in response to receiving broadcast messages from the wireless identity transmitter. However, the same or similar processes may be accomplished and the same or similar services may be provided when registered users (e.g., customers) carry proximity broadcast receivers that transmit sighting messages in response to receiving broadcast messages from wireless identity transmitters associated with registered services (e.g., within retail stores). In either implementation, the central server may perform operations to determine the parties associated with received sighting messages (i.e., the party transmitting an identifier and the party sending the sighting messages) in order to identify the customer that has entered the marketing area as well as the merchant or organization that is hosting the marketing area.

For ease of describing the following figures, the term "host" refers to a merchant or organization that deploys proximity broadcast receivers and/or wireless identity transmitters to designate a marketing area, and "advertiser" refers to the company or organization that desires to distribute customer-relevant marketing information to customers based on proximity to the marketing area. For example, a school may be a host that deploys PBRs and an advertiser may be a canned food manufacturer that pays the school when the food manufacturer's advertisements are transmitted to customers based on sighting messages from the school's PBRs. However, those skilled in the art should appreciate that such an advertiser may be a host as well. For example, a product manufacturer third-party (e.g., a manufacturer of sporting equipment, etc.) may own and register proximity broadcast receivers that are deployed within moose lodges in order to distribute coupons from the manufacturer. In other words, third-parties that desire to distribute marketing information related to their products/services may register PBRs or WITs and pay fees to schools, stores, bars, libraries, and other installation sites for the opportunity to deploy the devices in the installation sites. For illustration, a library may not be a host, but may receive a fee from an advertiser Store X in return for permitting proximity broadcast receivers from Store X to be deployed within the school. In an embodiment, the stores, buildings, libraries, and other installation sites may be known only to an advertising server that distributes fees to such installation sites in exchange for installing proximity broadcast receivers.

Figure 33A:
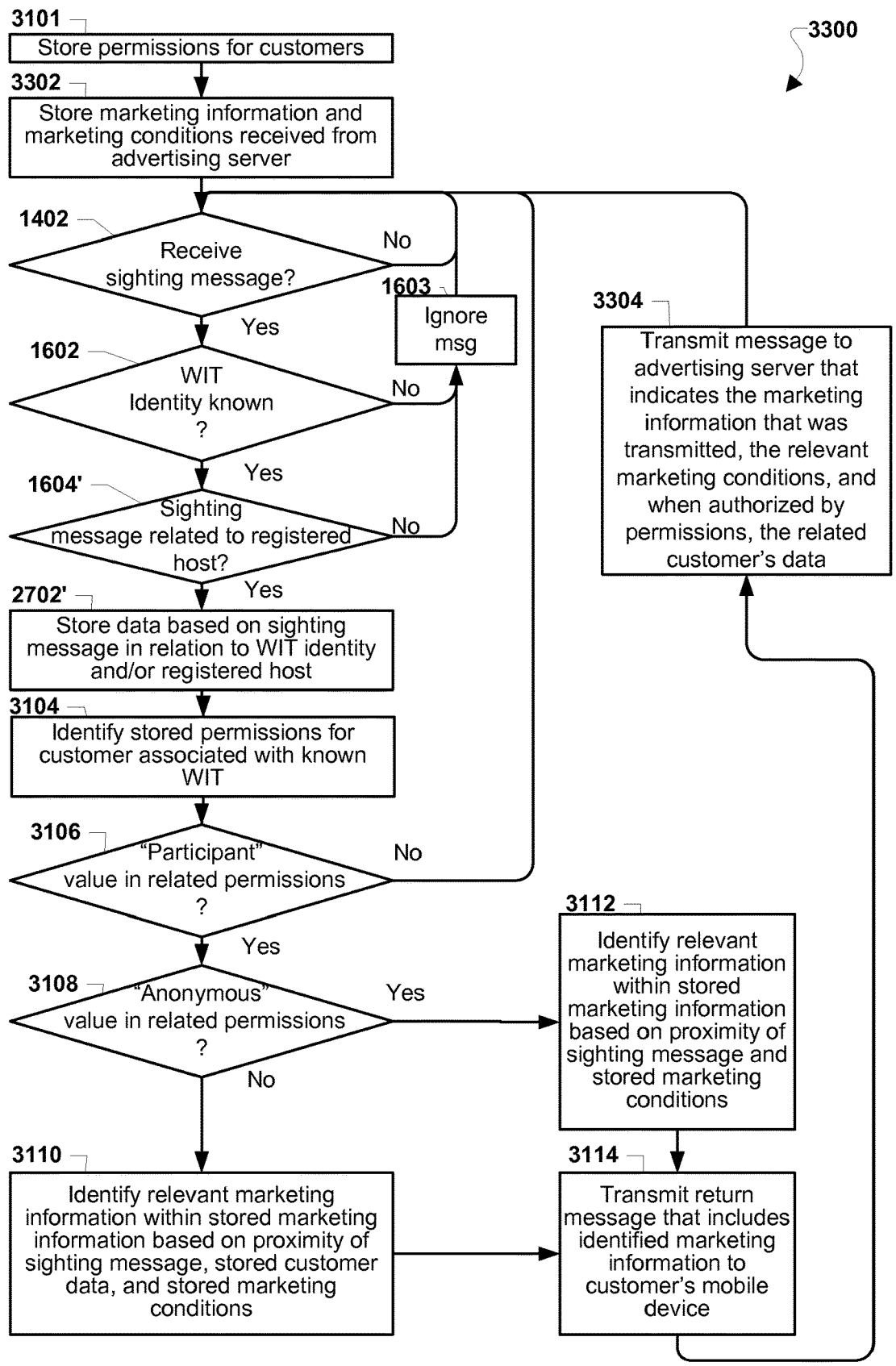
FIGS. 33A and 34A are process flow diagrams of embodiment methods for a central server to transmit marketing information to a customer's mobile device.

FIG. 33A illustrates an embodiment method 3300 for a central server to transmit marketing information to a customer's mobile device. The method 3300 is similar to the method 3100 described above with reference to FIG. 31, except the method 3300 includes operations for receiving marketing information and marketing conditions from an advertising server, as well as for transmitting messages back to the advertising server in response to transmitting return messages that include marketing information received from the advertising server. The communications with the advertising server may report the activities of the central server in distributing marketing information and thus indicate to the advertising server to whom and when compensation should be paid or credited for participating. For example, based on a message to the advertising server that indicates a manufacturer's coupon was transmitted to a smartphone of a customer within proximity of a certain retail store's product display, the central server may report the essential information to the advertising server that may result in an origination fee award for the central server and a fee award for the retail store.

In block 3101, the central server may store permissions for customers. For example, at registration, the central server may receive permissions settings that indicate privacy preferences (e.g., "I want to receive all ads," "do not provide my personal data to anyone," "provide my personal data to Store X," "I do not authorize the delivery of scripts within advertisements," etc.) from all registered users of wireless identity transmitters, proximity broadcast receivers, or identity transceivers. In block 3302, the central server may store marketing information and marketing conditions received from an advertising server. For example, periodically the central server may receive data downloads from the advertising server that include advertisements, coupons, and informational materials related to a certain product manufacturer, as well as the times and location such marketing information is relevant to customers. In other words, the central server may store rules sets for distributing the various marketing information that the advertising server transmits. The marketing information and marketing conditions received from the advertising server may be similar to as described above with reference to block 3102 in FIG. 31.

As described above, the stored marketing information may also include executable scripts, software instructions, action lists, and/or various commands that may be configured to adjust the operations of a customer's mobile device. For example, marketing information may include a script for rendering an animated coupon, sounding a unique ring tone, and/or disabling a mobile device's Internet browser application from being able to access certain websites (e.g., competitor websites). Such scripts may include, for example, special types of coupons, special notifications (e.g., ring tones), temporary changes to browser functionality (e.g., blocking access to competitor websites), and temporary changes to device settings (e.g., silencing ringers), all in response to the mobile device being in proximity of a wireless identity transmitter. Further, such scripts may only be transmitted to a customer's mobile device when the customer explicitly agrees to receive such functional content. For example, during registration of a wireless identity transmitter, a customer may indicate that he accepts an agreement that permits executable scripts to be downloaded on the customer's smartphone in exchange for receiving higher value coupons from a manufacturer.

In various embodiments, the marketing conditions received from the advertising server may include conditions that relate to GPS coordinates or other location information that corresponds to proximity broadcast receivers and/or wireless identity transmitters deployed within marketing areas associated with hosts (e.g., retail stores, merchant buildings, etc.). For example, the marketing conditions may indicate that a particular promotional advertisement is relevant to the area around a retail store's deployed wireless identity transmitter (e.g., the middle of a product aisle). Alternatively, the marketing conditions may indicate that a certain coupon is relevant to another marketing area near the retail store's deployed proximity broadcast receiver (e.g., a product display at an end cap). As described above, the marketing conditions may indicate when the central server may transmit marketing information to a registered customer based on the customer's proximity to certain wireless identity transmitters and/or proximity broadcast receivers within a host's building, store, or other installation site.

Returning to FIG. 33A, in determination block 1402, the central server may await reception of a sighting message. When a sighting message is received (i.e., determination block 1402="Yes"), in determination block 1602 the central server may determine whether the wireless identity transmitter identity is known. In this operation, the central server may evaluate, decode, decrypt, and otherwise access the data within the received sighting message to determine whether it includes a wireless identity transmitter identity (or identifier) that is registered with the central server. For example, the central server may compare identifiers within the sighting message to a database of all registered wireless identity transmitters to determine whether there is a match, in which case the wireless identity transmitter corresponding to the received sighting message is related to a registered user (e.g., a customer). If the wireless identity transmitter is not known (i.e., determination block 1602="No"), in block 1603 the central server may ignore the sighting message and continue to await reception of a sighting message in determination block 1402.

If the wireless identity transmitter is known (i.e., determination block 1602="Yes"), in determination block 1604' the central server may determine whether the sighting message is related to a registered host of a marketing area. For example, the central server may determine whether the sighting message was transmitted by a proximity broadcast receiver associated with a host (e.g., a retail store or merchant) registered with the central server based on metadata within the sighting message. If the sighting message is not related to a host (i.e., determination block 1604'="No"), the central server may continue with the operations in block 1603. If the sighting message is related to a registered host (i.e., determination block 1604'="Yes"), in block 2702' the central server may store data based on the sighting message in relation to the wireless identity transmitter identity and/or the host. For example, the central server may store the timestamp and location information (e.g., GPS coordinates) reported by the received sighting message as the current time and location of the registered user associated with the wireless identity transmitter.

As described above, in block 3104, the central server may identify stored permissions for the customer associated with the known wireless identity transmitter. For example, by matching the rolling identifier indicated in the received sighting messages to a stored list of all registered parties, the central server may identify the customer's stored profile and the privacy settings or permissions stored within the profile. In determination block 3106, the central server may determine whether a "participant" value is in the related permissions, such as the identified permissions stored for the customer related to the received sighting message. For example, the central server may determine whether the customer's profile includes permissions settings that indicate whether the customer wishes to receive marketing information on his smartphone. If the "participant" value is not in the customer's permissions (i.e., determination block 3106="No"), the central server may continue with the operations in determination block 1402. If the "participant" value is in the customer's permissions (i.e., determination block 3106="Yes"), in determination block 3108 the central server may determine whether an "anonymous" value is in the related permissions. In other words, the central server may determine whether the customer has set permissions values that permit information to be shared with hosts, the advertising server, and/or other third-parties.

If the "anonymous" value is in the customer's permissions (i.e., determination block 3108="Yes"), the central server may not transmit any information identifying the customer to either the host or the advertiser, as the customer has not authorized any personal data to be shared. As described above, in block 3112 the central server may identify relevant marketing information within the stored marketing information based on the proximity of the sighting message and stored marketing conditions. For example, the central server may identify a particular cereal coupon to transmit based on the sighting message indicating that the customer is nearby a cereal product display.

If the "anonymous" value is not in the customer's permissions (i.e., determination block 3108="No"), the central server may be authorized to transmit information identifying the customer, and in block 3110 the central server may identify relevant marketing information within the stored marketing information based on proximity of the sighting message, stored customer data, and the stored marketing conditions. In other words, when the "anonymous" value is not in the customer's permissions settings, the central server may identify marketing information that is contextual to the customer's personal data, as well as any conditions related to the received sighting message.

As an illustration of identifying contextual marketing information, the central server may determine that the sighting message indicates that the customer is nearby a proximity broadcast receiver located at an end cap display for Brand X sugary cereal. Based on the stored marketing conditions (e.g., location information of the end cap display), the central server identifies marketing messages that may be transmitted to the customer, such as a first message that is worded to appeal to children (e.g., "Hey, check out this RADICAL new cereal with marshmallows!!!!") and a second message that is worded to appeal to adults (e.g., "Moms, this new cereal has a taste kids love, but also includes many nutritional vitamins."). Based on the customer's profile including permissions settings that authorize personal data to be used to transmit marketing information, the central server identifies personal data within the customer's stored profile that indicates the customer is a mom of a young child. Thus, the central server may select for transmission the second marketing message that appeals to adults and that corresponds to the end cap display.

Returning to FIG. 33A, in block 3114, the central server may transmit a return message that includes the identified marketing information to the customer's mobile device. For example, the central server may generate a return message, such as a text message, an email, a message utilized by a particular application or software (e.g., a specially formatted payload used by a retail store application executing on the customer's smartphone, etc.) or other communication, that includes the marketing information (e.g., coupons, promotional messages, etc.), and transmit the return message to the customer's mobile device based on contact information associated with the customer that is stored within the customer's profile.

In block 3304, the central server may transmit a message to the advertising server that indicates the marketing information that was transmitted, the relevant marketing conditions, and when authorized by the permissions, related customer's data. In other words, the central server may report to the advertising server that a coupon, advertisement, promotional material, or other marketing content was distributed to a customer in response to the customer being proximate to the host's proximity broadcast receiver. Based on this message, and as described below with reference to FIG. 33B, the advertising server may award participation credits or a portion of related revenues (e.g., subsequent sales transactions) to the host and/or the central server. The message may include an identifier, code, or other indicator of the marketing information that was transmitted. For example, the message may include the serial number of a coupon. Alternatively, the message may include a filing number or account number that is known by the advertising server. The relevant marketing conditions within the message may include the marketing conditions that were satisfied by the proximity information and data associated by the received sighting message. For example, the message may include the marketing area or location (e.g., within a museum, a library, a school, a retail store, etc.) and time of day that the central server used to identify the coupon that was transmitted to the customer. As another example, when the customer permissions are not "anonymous," the message may include some or all of the customer attributes (e.g., age and product preference) the central server used to identify the promotional offer that was transmitted to the customer's mobile device.

The message may include identifying information about the host, such as a retail store's name or identifier. In an embodiment, the message may include the host's identifier or account number provided to the host by the advertising server. For example, the host may register with the advertising server as well as the central server, and thus may have different (or similar) identifiers with the central server and the advertising server. In a similar manner, the message may also include an account number or identifier for the central server that is known by the advertising server.

In an embodiment, when the customer's profile authorizes the sharing of personal data (i.e., permissions settings indicate the customer does not desire to remain anonymous), the message may include various customer data (e.g., contact information, customer's characteristics, product preferences, previous behaviors, location history, etc.). The central server may continue with the operations in determination block 1402.

Figure 33B:
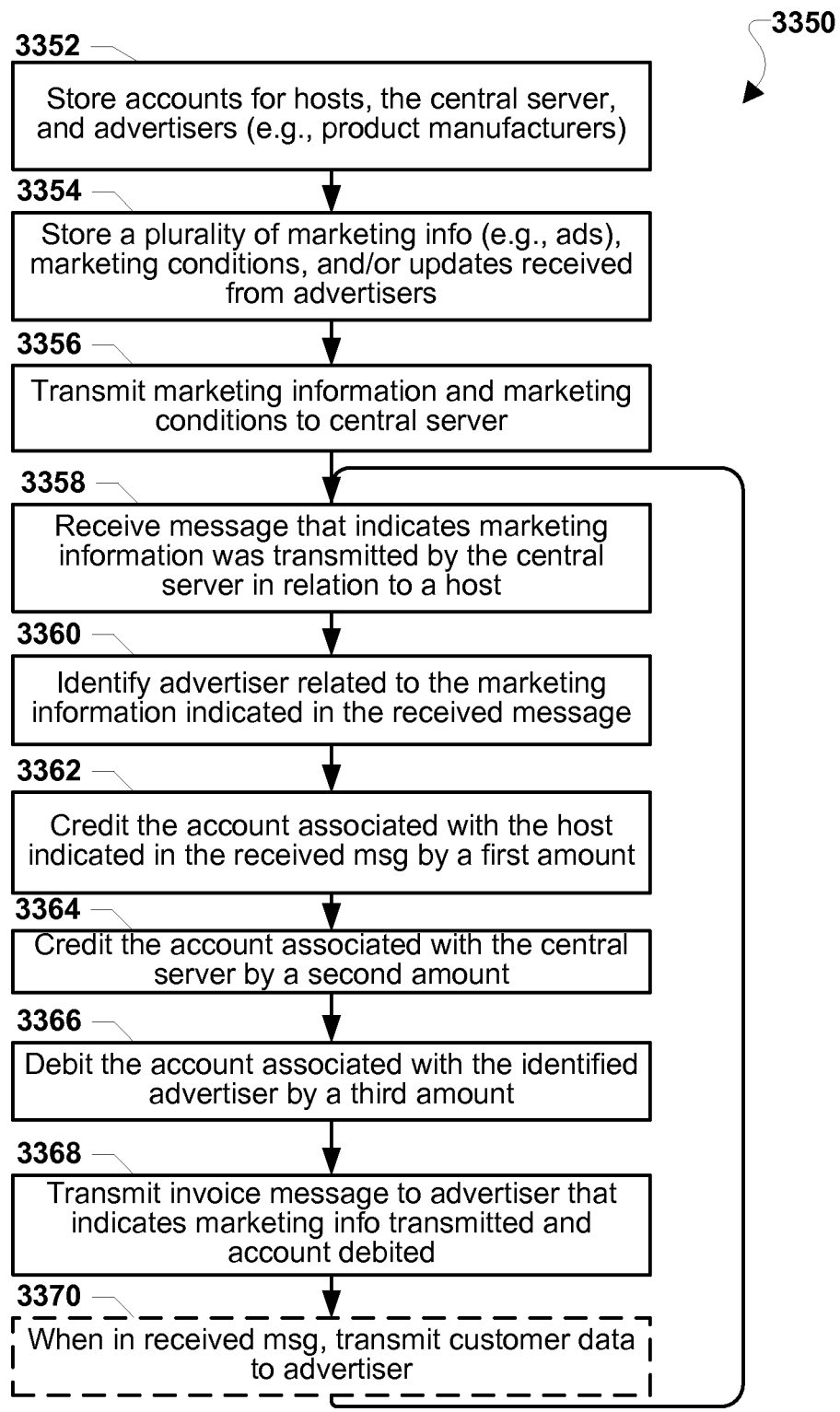
FIGS. 33B, 33C, and 34B are process flow diagrams of embodiment methods for an advertising server to process account related to the transmission of marketing information.

FIG. 33B illustrates an embodiment method 3350 for an advertising server to process accounts related to the transmission of marketing information. The advertising server may be configured to not only store and distribute marketing information of third-parties (i.e., advertisers), but also determine when monies, ad revenues, and other credits may be awarded to the central server and/or hosts. In other words, the advertising server may act as a hub of marketing information provided by advertisers as well as a mechanism for compensating participation in marketing. For example, fees may be awarded to hosts and/or the central server when participating in a marketing chain or scheme by transmitting or processing sighting messages that lead to the transmission of marketing information to customers. Such a scheme may be similar in concept to a business receiving ad revenues for displaying advertisements on a website (e.g., Google Ads). In an embodiment, an advertiser product manufacturer may share with a host a portion of revenues received in return for transmitting marketing information to customers. For example, for every sale confirmed to be related to delivered marketing information, the advertising server may award the central server and/or host a percentage of the sale revenue.

In block 3352, the advertising server may store accounts for hosts, the central server, and advertisers. In general, the advertising server may create and maintain accounts for each advertiser that provides marketing information (and marketing conditions) maintained by the advertising server, the central server, and for each host (i.e., a library, retail store, or other party registered with the central server) that may earn fees and/or share in revenues generated by transmitting the marketing information. These accounts may include contact information for the various parties, as well as billing and/or banking information that the advertising server may use to wire or transfer funds related to ad revenues.

In an embodiment, the accounts may include data used for distributing revenue apportionments related to marketing information. In particular, accounts may include the percentage, flat fee, or other equations for either crediting or debiting the party associated with the account. For example, an account for a host may include data that indicates the host is to receive a few cents for every transmitted advertisement related to a particular advertiser. In an embodiment, the accounts may also include conditions for awarding credits, such as the number of coupons that must be transmitted in order for a host to become eligible to receive any credits.

In block 3354, the advertising server may store a plurality of marketing information, marketing conditions, and/or updates received from advertisers. Advertisers, such as product manufacturers, merchants, or other entities with marketing materials, may provide the advertising server with coupons, promotional materials, and other information the advertisers desire to be distributed to customers. Additionally, the advertisers may provide to the advertising server marketing conditions, as described above, that indicate the triggers, rule sets, and various conditions when the marketing information may be transmitted to customers. For example, marketing conditions may include GPS coordinates of product displays within a retail store that are associated with a particular cola coupon. In various embodiments, the marketing conditions may include particular times (e.g., time of day, week, month, year, etc.), as well as other conditions of the advertiser (e.g., progress towards a sales goal, amount of inventory, etc.). As described above, marketing information may also include executable scripts, instructions, or commands developed by advertisers for changing the behaviors of customers' mobile devices (e.g., change the ring tone, disable the browser functionality, etc.).

In block 3356, the advertising server may transmit the marketing information and marketing conditions to the central server. In an embodiment, the advertising server may transmit this information periodically such that updated information from advertisers is distributed to the central server on a timely and/or regular basis. In an embodiment, the marketing information may come from businesses that utilize sponsor servers that transmit marketing information and marketing conditions to the advertising server, such as through a network connection or via the Internet.

By allowing for new and updated marketing information, an advertiser may adjust its marketing information messages to customers in real-time. For example, a restaurant may continually update its advertisements with the number of open tables. Coupons may be spontaneously generated based on actual conditions in the restaurant, such as the number of open tables available, rather than requiring promotions to be carefully planned in advance. Such dynamic coupons may be made available or valid only for a short period. For example, a bar with an unexpectedly slow night may post marketing information such as coupons for drink specials for the next 20 customers or for the next hour. Because the marketing information may be based on a geographic region, the advertiser may tailor these limited deals to people already in the right area, since only they will see the displayed advertisements.

In block 3358, the advertising server may receive a message that indicates marketing information was transmitted by the central server in relation to a host. For example, the received message may include data, metadata, header information, or other indicators that indicate that a particular coupon related to an advertiser was transmitted by the central server in response to receiving a sighting message transmitted by a proximity broadcast receiver located within the host retail store. The received message may include code or other identifiers for the central server and the host, such as account numbers or other unique identifiers that are known by the advertising server.

In block 3360, the advertising server may identify the advertiser related to the marketing information indicated in the received message. For example, the advertising server may cross-reference a coupon serial code indicated in the received message with a list of all coupon serial codes stored with the operations in block 3354 to determine the advertiser that is associated with the coupon. In an embodiment, the received message may simply include an identifier of the advertiser associated with the transmitted marketing information. In block 3362, the advertising server may credit the account associated with the host indicated in the received message by a first amount. As described above, the first amount may be defined within data of the host's account. For example, the account may indicate that the host may be credited a cent for each coupon associated with the advertiser that is transmitted by the central server. In an embodiment, the credit to the host may be a posting fee. In block 3364, the advertising server may credit the account associated with the central server by a second amount. The second amount may be an origination fee or another flat fee or another amount proportional to the marketing information. For example, the central server may receive an amount that equals a set percentage of the face value of the coupon transmitted to a customer. Credits or payments may be made to the central server and/or the host at appropriate intervals, such as monthly. In block 3366, the advertising server may debit the account associated with the identified advertiser by a third amount. For example, the advertising server may debit the advertiser's account by an amount equal to the amounts credited to the host account and the central server account. In an embodiment, charges against the advertiser's account may include charges for services provided by the advertising server as well as fees paid to the host and/or the central server. In an embodiment, the advertising server may also pay and charge a premium based upon the number of or amount of customer data reported by the central server since that information may provide a measure of how widely the advertisement was viewed. Various debiting, valuation, crediting, fee, licensing, and ad revenue schemes may be applied in the operations of blocks 3362-3366.

In an embodiment, the advertiser may also agree to award additional or different credits to the central server and/or the host based on an exclusivity agreement. In particular, the advertiser, central server, and/or the host associated with proximity broadcast receivers (and/or wireless identity transmitters) may agree that the advertiser may compensate the host and/or the central server for only distributing marketing information related to the advertiser when customers are within proximity of marketing areas related to the host. For example, the advertiser may offer a higher rate of ad revenues or a higher flat fee to a retail store host in exchange for the host and/or the central server preventing other advertisers (e.g., product manufacturers) from using proximity information related to marketing areas within the retail store to distribute coupons to proximate customers' mobile devices. In this way, the advertiser may effectively block customers from receiving competing ads from other merchants, manufacturers, and parties when the customers are near to certain marketing areas.

In block 3368, the advertising server may transmit an invoice message to the advertiser that indicates the marketing information was transmitted and that the account was debited. In other words, the advertising server may include invoicing to inform the advertiser of the various credits, debits, and other payments and/or revenues that have occurred in response to marketing information being transmitted. In an embodiment, the advertising server may also transmit invoices, statements, or similar information to the central server and/or the host. In optional block 3370, when in the received message, the advertising server may transmit customer data to the advertiser. As described above, the received message may include customer data when permissions stored within the central server authorize the sharing of such personal or identifying data with the advertiser. For example, the received message may contain a customer's email address when the customer indicated within his profile stored in the central server that he/she waives his right to privacy in exchange for receiving great promotional offers, coupons, exclusive content, and other marketing information from the advertiser. When the advertising server identifies customer data within the received message, it may simply relay that customer data to an advertiser device (e.g., an in-house server or computing device). The advertising server may then continue with the operations in block 3358.

Figure 33C:
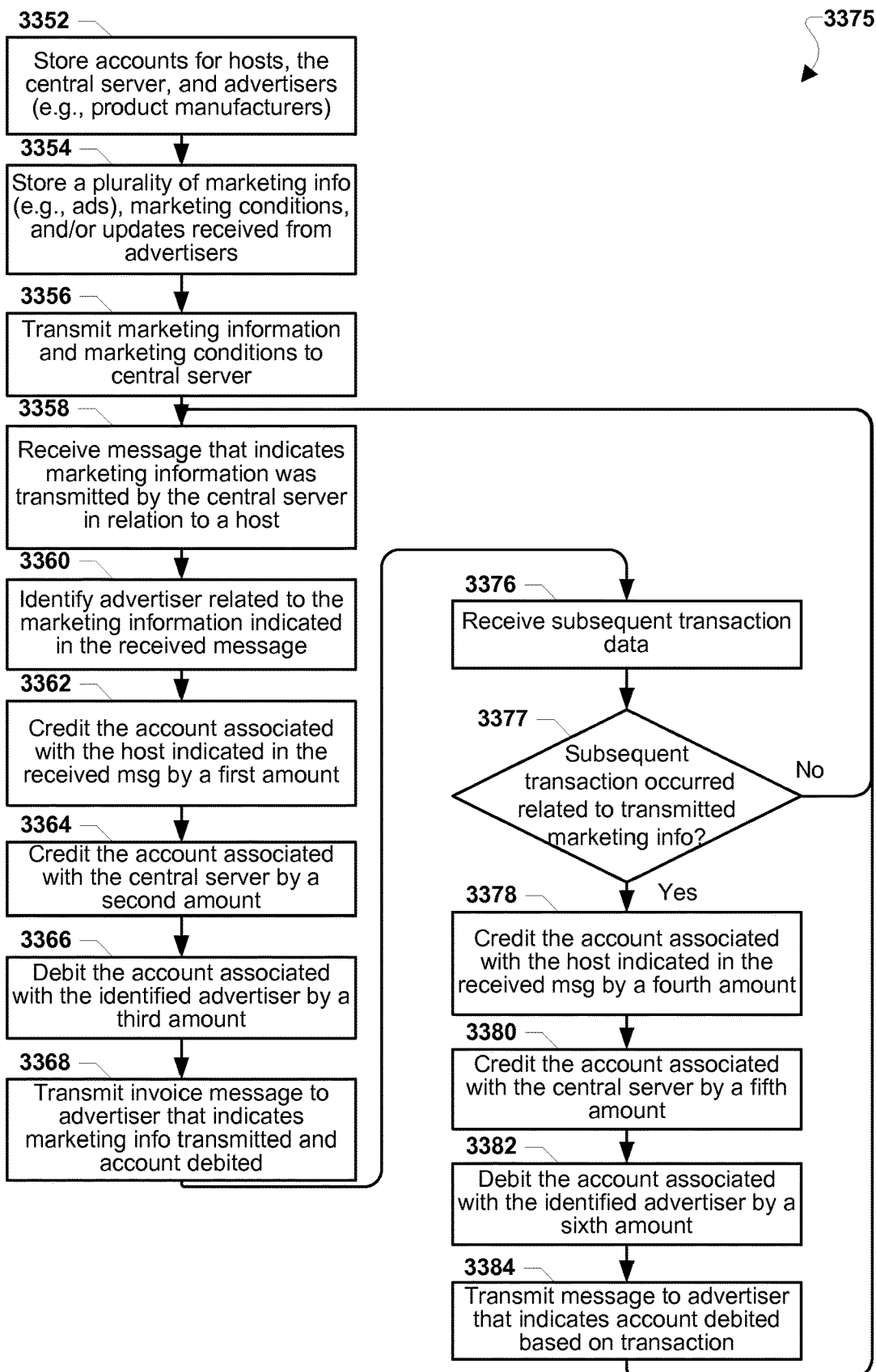

FIG. 33C illustrates an embodiment method 3375 for an advertising server to process accounts related to the transmission of marketing information. The method 3375 is similar to the method 3350 described above, except that the method 3375 includes operations for providing credits to a central server and/or host based on subsequent transactions related to the distribution of marketing information. Based on various incentive schemes, advertisers may reward the participation of hosts (e.g., retail stores deploying PBRs) and/or the central server by providing flat fees and/or proportionate rewards for transactions, sales, or other revenues that are related to transmitted marketing information. In other words, once a host and the central server help an advertiser by detecting when a customer is within proximity of an area relevant to the advertiser's marketing information, that marketing information is transmitted to the customer, and subsequent sales or other successes are achieved, the advertiser may share the success with the other parties of the marketing chain.

In block 3352, the advertising server may store accounts for hosts, the central server, and advertisers. In block 3354, the advertising server may store a plurality of marketing information, marketing conditions, and/or updates received from advertisers. In block 3356, the advertising server may transmit the marketing information and marketing conditions to the central server. In block 3358, the advertising server may receive a message that indicates marketing information was transmitted by the central server in relation to a host. In block 3360, the advertising server may identity of the advertiser related to the marketing information indicated in the received message. In block 3362, the advertising server may credit the account associated with the host indicated in the received message by a first amount. In block 3364, the advertising server may credit the account associated with the central server by a second amount. In block 3366, the advertising server may debit the account associated with the identified advertiser by a third amount. In block 3368, the advertising server may transmit an invoice message to the advertiser that indicates the marketing information was transmitted and that the account was debited.

In block 3376, the advertising server may receive subsequent transaction data, such as sales reports from the advertiser, a billing service, a customer confirmation, the central server, or any other device associated with the marketing information and/or the advertiser. Various forms of subsequent transaction data may include coupon redemption records, mobile device location data, and mobile device connections with local wireless networks within a retail store associated with the host, etc. For example, transaction data (or transaction confirmations) may come directly from a retail store or customers themselves. Subsequent transaction data may also be generated automatically. For example, subsequent transaction data may automatically be generated by a business computer connected with a sponsor server during redemption of a coupon distributed to mobile devices by the central server (or the advertising server directly). Confirmation that customers visited stores associated with the advertiser may also be inferred from location data provided by the central server when authorized by customer permissions, as described above.

In determination block 3377, the advertising server may determine whether a subsequent transaction occurred related to the transmitted marketing information. In other words, the advertising server may determine whether the transmitted marketing information was acted upon by customers and whether additional compensation may be distributed to the central server and/or host that participated in the transmission of the marketing information. In an embodiment, the advertising server may make this determination based on comparing identifiers of marketing information transmitted (e.g., serial codes of coupons transmitted to customer's smartphones) to identifiers of marketing information indicated in the received subsequent transaction data (e.g., serial codes of claimed coupons). If subsequent transactions occurred related to the transmitted marketing information (i.e., determination block 3377="No"), the advertising server may continue with the operations in block 3358.

However, if subsequent transactions occurred related to the transmitted marketing information (i.e., determination block 3377="Yes"), in block 3378 the advertising server may credit the account associated with the host indicated in the received message by a fourth amount. The fourth amount may be based on the subsequent transaction (e.g., a percentage of a sale resulting from the transmitted marketing information) or a flat amount (e.g., a predefined reward for each subsequent sale, etc.). In block 3380, the advertising server may credit the account associated with the central server by a fifth amount. This fifth amount may also be a flat or proportionate amount based on the subsequent transactions. In block 3382, the advertising server may debit the account associated with the identified advertiser by a sixth amount, such as the combined amounts of the fourth and fifth amounts credited to the host and central server respectively. In block 3384, the advertising server may transmit a message to the advertiser that indicates the account was debited based on the transaction. For example, the advertising server may transmit an invoice, statement, or other indication that the central server and host received rewards that came from the advertiser's account. The advertising server may continue with the operations in block 3358.

Figure 34A:
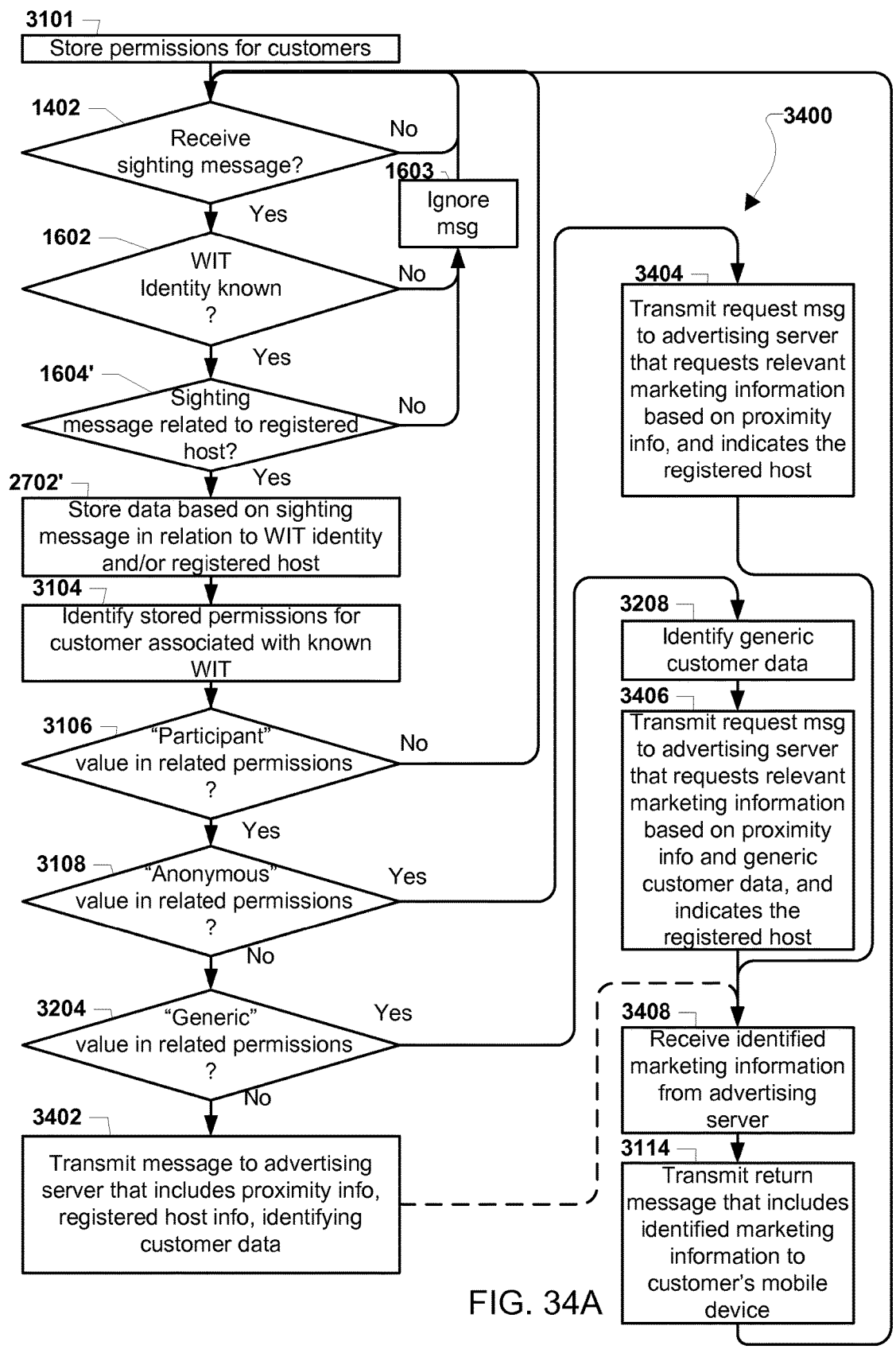

FIG. 34A illustrates an embodiment method 3400 for a central server to transmit marketing information to a customer's mobile device without providing the customer's identity to an advertising server when precluded by stored customer profile permissions. The method 3400 is similar to the method 3300 described above, except that instead of storing marketing information from the advertising server, the central server may transmit requests to the advertising server for marketing information relevant to customers. Based on the stored permissions of a customer, the central server may transmit requests that include no identifying information related to customers (i.e., "anonymous" permissions value), requests that include information that provides only generic, indirect identification information of customers (i.e., "generic" permissions value), or requests that provide any information, such as identifying customer information. When the customer permissions authorize the sharing of customer data, whether it be generic data (e.g., a man was within proximity of marketing area C) or identifying data (e.g., Mr. J with a preference for diet cola was within proximity of marketing area C), the advertising server may determine contextual marketing information based on the proximity information and the customer within proximity. In an embodiment, when the permissions prevent the central server from sharing customer data with the advertising server (e.g., smartphone contact information, etc.), the central server may transmit received marketing information relevant to the proximity of the customer to the customer, thus maintaining privacy.

In block 3101, the central server may store permissions for customers. In determination block 1402, the central server may determine whether a sighting message is received. If no sighting message is received (i.e., determination block 1402="No"), the central server may continue with the operations in determination block 1402. If a sighting message is received (i.e., determination block 1402="Yes"), in determination block 1602 the central server may determine whether the wireless identity transmitter identity is known. If the wireless identity transmitter is not known (i.e., determination block 1602="No"), in block 1603 the central server may ignore the sighting message and continue to perform the operations in determination block 1402. If the wireless identity transmitter is known (i.e., determination block 1602="Yes"), in determination block 1604' the central server may determine whether the sighting message is related to a host, such as a retail store that has deployed a proximity broadcast receiver. If the sighting message is not related to a host (i.e., determination block 1604'="No"), the central server may continue with the operations in block 1603. If the sighting message is related to a host (i.e., determination block 1604'="Yes"), in block 2702' the central server may store data based on the sighting message in relation to the wireless identity transmitter identity and/or the host.

In block 3104, the central server may identify stored permissions for the customer associated with the known wireless identity transmitter. In determination block 3106, the central server may determine whether a "participant" value is in the related permissions, such as the identified permissions stored for the customer related to the received sighting message. If the "participant" value is not in the customer's permissions (i.e., determination block 3106="No"), the central server may continue with the operations in determination block 1402. If the "participant" value is in the customer's permissions (i.e., determination block 3106="Yes"), in determination block 3108 the central server may determine whether an "anonymous" value is in the related permissions.

If the "anonymous" value is in the customer's permissions (i.e., determination block 3108="Yes"), the central server may not transmit any information identifying the customer to the host related to the received sighting message (e.g., a merchant), as the customer has not authorized any personal data to be shared, and in block 3404 the central server may transmit a request message to the advertising server that requests relevant marketing information based on the proximity information, and that indicates the host. In other words, the central server may request marketing information based on the information within the received sighting message, such as the identity and/or location of the proximity broadcast receiver that transmitted the sighting message. In an embodiment, the advertising server may perform similar operations as the central server as described above with reference to FIG. 31. For example, the advertising server receiving the transmitted request for relevant marketing information may identify the approximate location of the proximity broadcast receiver that transmitted the sighting message, determine proximate marketing areas, and identify related coupons for the proximate marketing areas. In an embodiment, the request message may include precise proximity information, such as based on signal strength metadata indicated within the sighting message. In another embodiment, if the "anonymous" value is in the customer's permissions, the central server may not transmit any proximity information within a request. For example, the central server may only request marketing information relevant to the time of the request.

If the "anonymous" value is not in the customer's permissions (i.e., determination block 3108="No"), in determination block 3204 the central server may determine whether a "generic" value is in the related permissions of the customer. As described above, the "generic" value may indicate that the customer does not desire to be identified directly, but may authorize the central server to provide the advertising server with general information about the customer to identify relevant marketing information. If the "generic" value is in the customer's permissions (i.e., determination block 3204="Yes"), in block 3208 the central server may identify generic customer data. As described above, generic customer data may include the customer's age, height, weight, race, marital status, education, and other general attributes that do not directly indicate the customer's identity. In block 3406, the central server may transmit a request message to the advertising server that requests relevant marketing information based on the proximity information and the generic customer data and indicates the host (e.g., the proximity broadcast receiver's identity).

If the "generic" value is not in the customer's permissions (i.e., determination block 3204="No"), then the customer may have authorized the central server to provide identifying information to the advertising server, hosts, or other parties. In other words, the customer may have waived his privacy in exchange for receiving contextual, relevant marketing information (e.g., customized deals, coupons, promotions, special information, etc.). Thus, in block 3402 the central server may transmit a message to the advertising server that includes proximity information, host information, identifying customer data. For example, the central server may transmit customer contact information to the advertising server enabling the advertising server to transmit coupons directly to the customer's smartphone and/or provide the customer contact information to an advertiser for other uses (e.g., generating marketing data, such as traffic data and customer demographic reports, etc.). In an optional embodiment, the central server may continue with the operations in block 3214 after transmitting the message that includes the customer data in order to enable the central server to store and possibly transmit any marketing information the advertising server identifies with the various information provided in the message.

In block 3408, the central server may receive identified marketing information from the advertising server. As described below, the identified marketing information may have varying degrees of contextual relevance to the customer based on the data the central server is authorized to share with the advertising server. For example, when only proximity information and no customer data is transmitted to the advertising server, the central server may only receive marketing information that is relevant to the marketing area the customer is near, as opposed to information that is relevant to both the marketing area and the customer's product preferences, age, previous locations within a retail store, etc. In block 3114, the central server may transmit a return message that includes the identified marketing information to the customer's mobile device, and may then continue with the operations in determination block 1402.

Figure 34B:
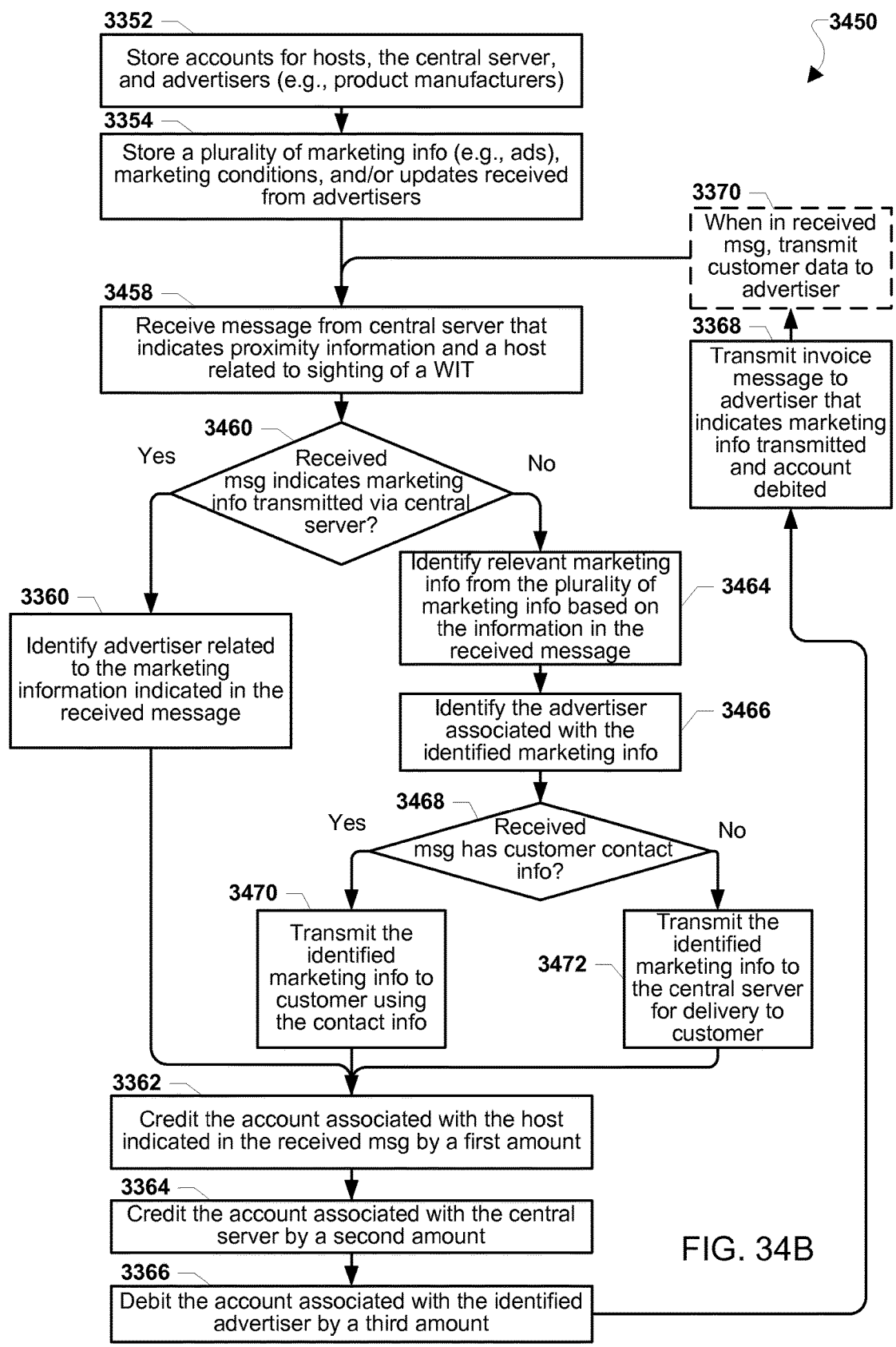

FIG. 34B illustrates an embodiment method 3450 for an advertising server to process accounts related to the transmission of marketing information. The method 3450 is similar to the method 3350 described above, except the method 3450 includes operations for identifying marketing information that is relevant to request messages received from the central server. In other words, instead of simply maintaining accounts based on marketing information transmitted by the central server, the advertising server may also be configured to identify and possibly transmit marketing information to customers within proximity of proximity broadcast receivers. As described above, when customers registered with the trusted central server authorize identifying data, such as contact information and personal information (e.g., smartphone number, home address, name, historical personal information, etc.), the advertising server may perform operations to generate contextual marketing information.

As described above, in block 3352, the advertising server may store accounts for hosts, the central server, and advertisers. In block 3354, the advertising server may store a plurality of marketing information, marketing conditions, and/or updates received from advertisers, such as product manufacturers.

In block 3458, the advertising server may receive a message from the central server that indicates proximity information and a host related to a sighting of a wireless identity transmitter, such as a WIT carried by a customer registered with the central server. As described above with reference to FIGS. 33A and 34A, such a message may be a request message from the central server that solicits relevant marketing information from the advertising server, a message that indicates marketing information was transmitted by the central server, and/or a message from the central server that reports data that enables the advertising server to directly transmit information to a customer. In determination block 3460, the advertising server may determine whether the received message indicates that marketing information was transmitted via the central server. For example, the advertising server may evaluate the received message to determine whether a code, confirmation indicator, or other information is included that indicates the central server has already transmitted marketing information. If the received message indicates that marketing information was already transmitted (i.e., determination block 3460="Yes"), in block 3360 the advertising server may identify the advertiser related to the marketing information indicated in the received message. For example, the advertising server may associate an already transmitted coupon with the manufacturer related to the coupon.

If the received message indicates that marketing information was not already transmitted (i.e., determination block 3460="No"), in block 3464 the advertising server may identify relevant marketing information from the plurality of marketing information based on the information in the received message. In other words, the advertising server may use the stored marketing conditions in combination with proximity information, timestamp information, customer data, and any other circumstantial information indicated within the received message to identify relevant marketing information to be delivered to a customer. As described above, the received message may include temporal information related to a sighting message (e.g., timestamp information, proximity information related to a marketing area within a retail store, etc.). The advertising server may use such information to identify marketing information that is relevant to the time and location or proximity of such a sighting message. For example, the advertising server may identify coupons that are associated with the GPS coordinates of a product display within a retail store.

Additionally, the received message may include generic and/or identifying customer data. The advertising server may use such customer data (e.g., customer characteristics, preferences, previous behaviors, etc.) to identify marketing information that is relevant to the proximity information as well as relevant to the customer within proximity (i.e., contextual marketing information). In other words, the advertising server may identify promotional offers, advertisements, coupons, benefits, and other information that are both related to a marketing area indicated in the received message and relevant to the characteristics and/or experiences of the customer within proximity of the marketing area. For example, the advertising server may generate a very attractive coupon that is related to a chips display because the customer within proximity of the display is known to be on a diet. In an embodiment, the advertising server may identify the relevant marketing information using a relational database of all stored marketing information and marketing conditions. In an embodiment, the advertising server may identify relevant marketing information by performing operations similar to the central server operations described above with reference to blocks 3110 and 3112.

In an embodiment, the received message may also indicate whether the customer has authorized or otherwise agreed to receive scripts, software instructions, or other functional information with relevant marketing information. For example, the received message may include a code or token that indicates the customer has opted in or opted out of receiving scripts that block ads from competitor merchants. When the received message includes information that indicates the customer related to the received message has opted out of receiving such scripts within marketing information, the advertising server may identify marketing information that is contextual but that does not contain such functional content. As an illustration, when the advertising server determines the received message indicates the customer does not agree to receive scripts, the advertising server may identify a low-value coupon, however when the advertising server determines the received message indicates the customer does agree to receive scripts, the advertising server may identify a high-value coupon along with a script for controlling a ringer notification on the customer's smartphone.

In block 3466, the advertising server may identify the advertiser associated with the identified marketing information. For example, after identifying the relevant, contextual marketing information based on the information within the received message, the advertising server may identify the advertiser as the party linked to the identified marketing information within a relational database. In determination block 3468, the advertising server may determine whether the received message has customer contact information. For example, the advertising server may determine whether the received message includes a cell phone number, an email address, a home address, or any other identifying customer information that may enable the advertising server and/or the identified advertiser to directly communicate with the customer. If the received message has customer contact information (i.e., determination block 3468="Yes"), in block 3470 the advertising server may transmit the identified marketing information to the customer using the customer contact information. For example, the advertising server may transmit a coupon to the customer's smartphone as an email or a specially-formatted application message using Internet protocols. If the received message does not have customer contact information (i.e., determination block 3468="No"), in block 3472 the advertising server may transmit the identified marketing information to the central server for delivery to the customer. In other words, the advertising server may not be authorized to communicate with or know the identity of the customer related to the received message, and thus the central server may be the only trusted source for directly contacting the customer.

As described above, in block 3362, the advertising server may credit the account associated with the host indicated in the received message by a first amount. In block 3364, the advertising server may credit the account associated with the central server by a second amount. In block 3366, the advertising server may debit the account associated with the identified advertiser by a third amount. In block 3368, the advertising server may transmit an invoice message to the advertiser that indicates the marketing information was transmitted and that the account was debited. In optional block 3370, when in the received message, the advertising server may transmit customer data to the advertiser, and may then continue with the operations in block 3458.

Figure 35A:
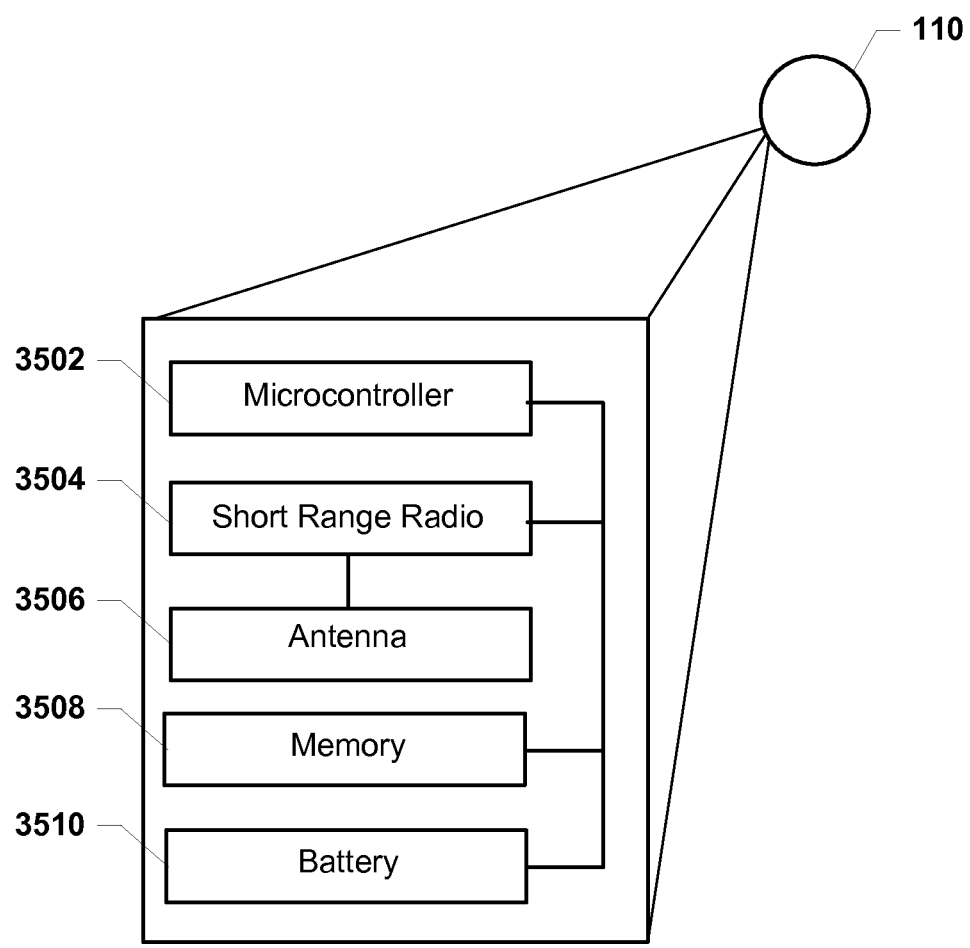
FIGS. 35A-35B are component block diagrams of wireless identity transmitters in accordance with various embodiments.

FIG. 35A illustrates components of an exemplary wireless identity transmitter 110. The wireless identity transmitter 110 may include a microcontroller 3502, a short-range radio 3504 (e.g., a Bluetooth® radio or transceiver) coupled to an antenna 3506, a memory 3508, and a battery 3510. Although these components are shown linked by a common connection, they may be interconnected and configured in various ways. For example, a wireless identity transmitter 110 may be configured such that the microcontroller 3502 may determine when to transmit a message based on the contents of the memory 3508. In an embodiment, the microcontroller 3502 may be a Bluetooth® system-on-chip unit. The memory 3508 may also include one or more messages or message portions to be transmitted by the short-range radio 3504 via the antenna 3506 based on commands from the microcontroller 3502. The battery 3510 may supply power as needed by the other components. Also, in some implementations the microcontroller 3502, the short-range radio 3504 and/or the memory 3508 may be integrated together as a single integrated circuit. Since these components may be microchips of standard or off-the-shelf configuration, they are represented in FIG. 35A as blocks consistent with the structure of an example embodiment.

The wireless identity transmitter 110 may be coupled with or built into various objects, such as a bracelet. For example, an exemplary wireless identity transmitter 110 may be in a form easily attached to a strap, such as a watchband or dog collar. Alternate embodiments may incorporate a wireless identity transmitter 110 into any other mobile objects that may need tracking.

The wireless identity transmitter 110 may conserve power by periodically entering a power saving mode or going to sleep, such as regularly alternating between sleeping and broadcasting of the packet with the wireless identity transmitter 110's identification code. Various embodiments may include different cycles of broadcasting and sleeping, such as some embodiments broadcasting more or less frequently, such as waking and broadcasting every few seconds or minutes between periods of sleep.

In an embodiment, the battery 3510 may be a replaceable coin cell battery. In another embodiment, the wireless identity transmitter 110 may utilize the antenna 3506 to receive update software, instructions, or other data for storage and use in configuration operations, such as configuring transmission intervals and/or transmissions power. The wireless identity transmitter 110 may also store and execute software, algorithms, instructions, code, or other routines for generating rolling codes or identifiers, as described above. In an embodiment, the wireless identity transmitter may not maintain time (e.g., UTC) information, but may instead use a 30 ppm 16 kHz crystal as a clock. Such use of a crystal as a clock may create a timing drift of approximately 40 seconds per year.

Figure 35B:
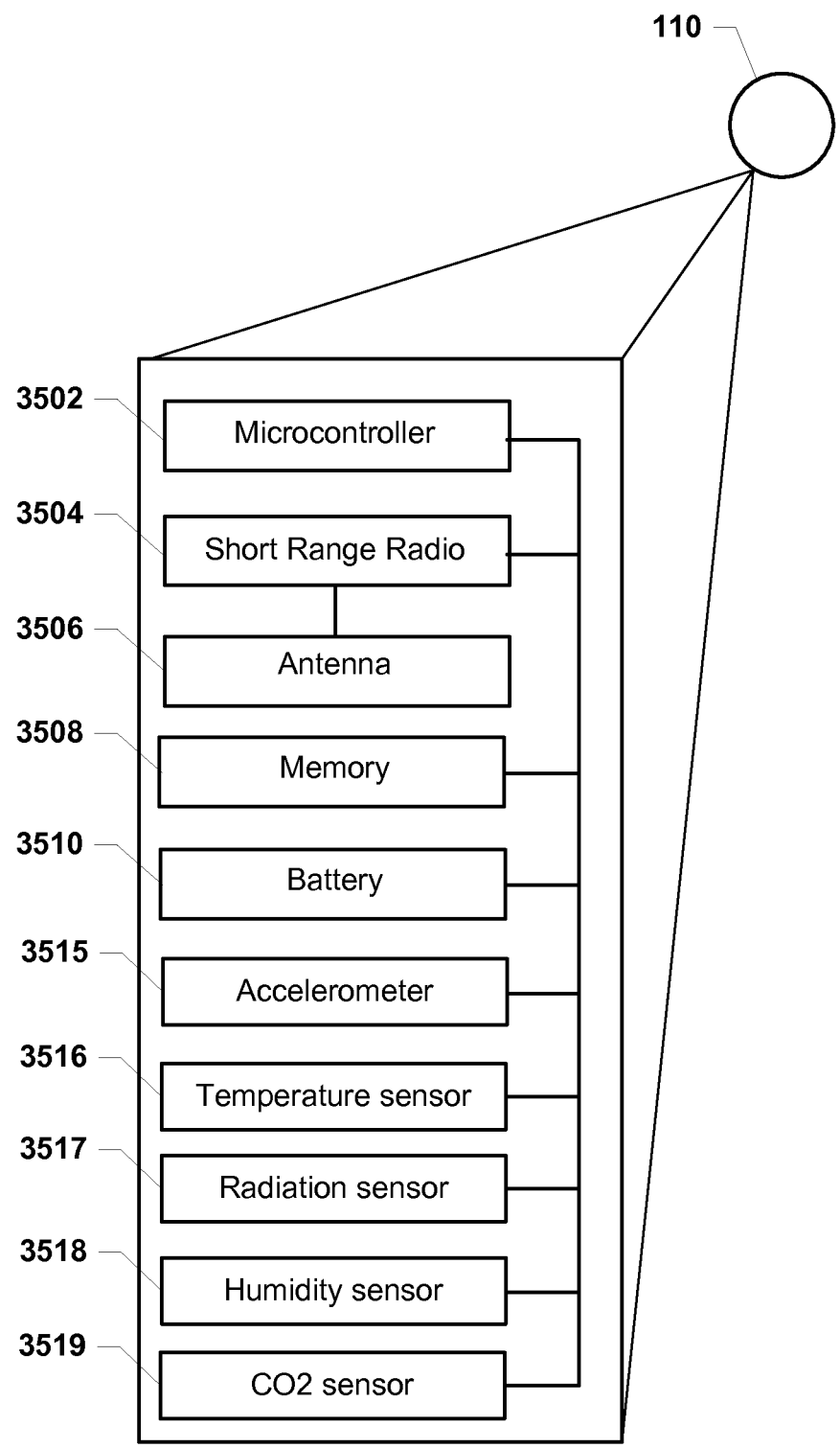

FIG. 35B illustrates components of an embodiment wireless identity transmitter 110. Similar to the embodiment described above with reference to FIG. 35A, the wireless identity transmitter 110 may include a microcontroller 3502, a short-range radio 3504 (e.g., Bluetooth®, BTLE, Zigbee®, Peanut®, etc.) connected to an antenna 3506 and coupled to the microcontroller 3502, memory 3508, and a battery unit 3510. Alternatively the memory 3508 may be contained within the microcontroller 3502, which may also include a separate processing unit. The short-range radio 3504 may be a transmitter capable of broadcasting messages or signals including a device ID or, alternatively, a transceiver configured to transmit and receive RF signals, enabling communications with other devices utilizing a communication protocol. For example, the wireless identity transmitter 110 may be configured to communicate with other short-range radio enabled devices, such as smartphones. In an embodiment, the short-range radio 3504 may be configured to communicate via various low-energy, wireless communication protocols, such as LTE-D, peer-to-peer LTE-D, and WiFi-Direct.

In an embodiment, the wireless identity transmitter 110 may include a speaker (not shown) configured to emit a sound capable of being received by a proximity broadcast receiver and/or being heard by a heard by a user. For example, the wireless identity transmitter 110 may emit audible communications that may indicate its presence to listening proximity broadcast receivers. In another embodiment, the wireless identity transmitter 110 may be configured to transmit signals at varying signal strengths, thereby varying the range at which broadcasts from the wireless identity transmitter 110 may be received by proximity broadcast receivers.

Additionally, the wireless identity transmitter 110 may include one or more sensors for measuring various conditions and variables. In an embodiment, the wireless identity transmitter 110 may include an accelerometer 3515 (or any other motion sensor such as a gyroscope or gravitometer), which may collect data indicative of motion of an asset associated with the wireless identity transmitter 110. For example, the accelerometer 3515 may generate motion data describing the movements of a child carrying the wireless identity transmitter 110. Other sensors that may be included within the wireless identity transmitter 110 include a temperature sensor 3516 (such as a thermistor), a radiation sensor 3517, a humidity sensor 3518, and a carbon dioxide ($CO_2$) sensor 3519. In the various embodiments, the wireless identity transmitter 110 may include any combination of these and other sensors. These potential sensors are only examples of the types of sensors that may be integrated into wireless identity transmitters 110 and other types of sensors may be included. For example, the wireless identity transmitter 110 may also include sensors not shown in the various diagrams, such as a microphone, a camera, a heat sensor, a pressure sensor, and a light sensor.

Figure 36A:
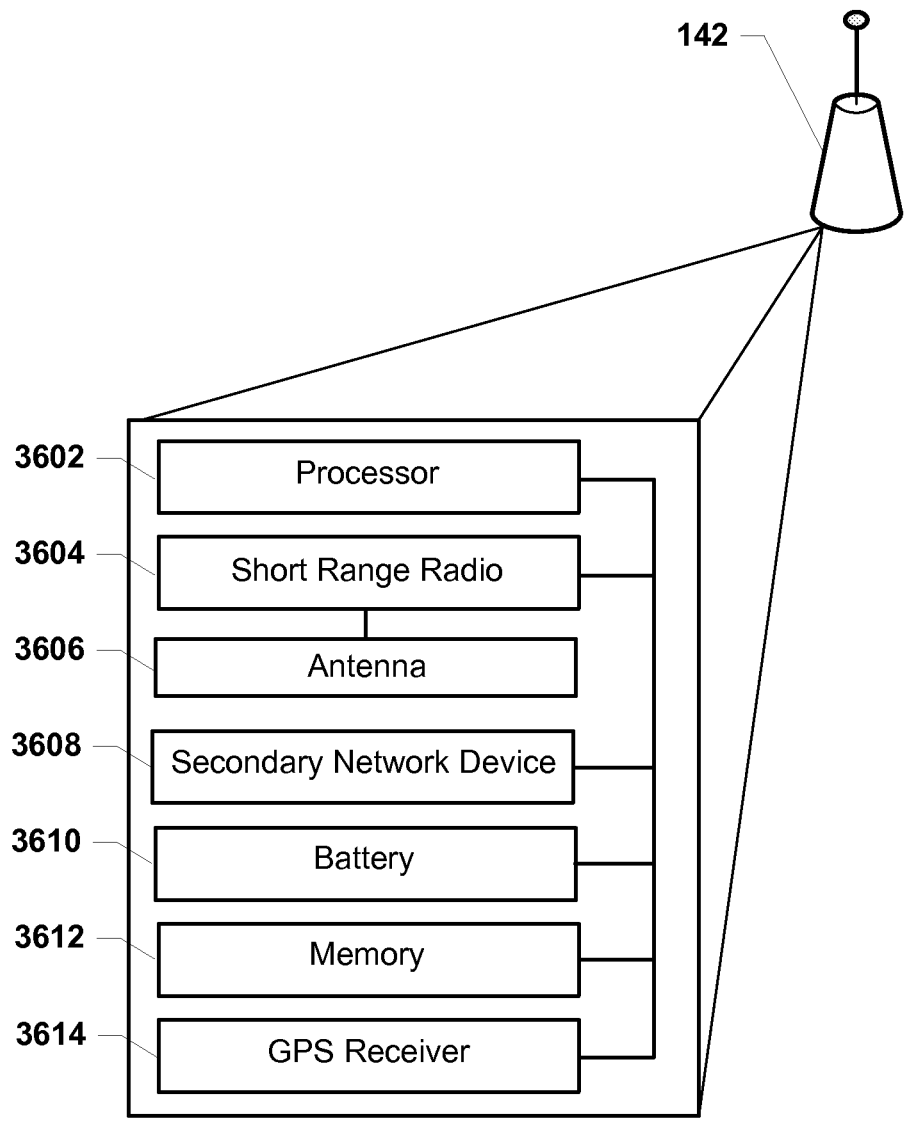
FIGS. 36A-36B are component block diagrams of proximity broadcast receivers in accordance with various embodiments.

FIG. 36A illustrates primary components of an exemplary proximity broadcast receiver embodiment. The proximity broadcast receiver 142 may include a short-range radio 3604 (e.g., a Bluetooth radio or transceiver) capable of communicating with a short-range wireless radio (e.g., a Bluetooth® radio in the wireless identity transmitter) coupled to an antenna 3606, and a secondary network device 3608 capable of communicating directly or indirectly back to a central server via a network, such as the Internet. In some embodiments, the secondary network device 3608 may be a cellular or wireless radio or a modem or other wired network device. The proximity broadcast receiver 142 may also include a processor 3602, a memory 3612, and a battery 3610 either as the primary power supply or as a backup power supply in the case of proximity broadcast receiver 142 coupled to utility power. The proximity broadcast receiver 142 may include a GPS receiver 3614 or other type of location determining mechanism for determining a current location to associate with any message received from a wireless identity transmitter. If the proximity broadcast receiver is not mobile, it may not include a GPS receiver 3614 in some embodiments since the location may be known and constant. Although these components are shown linked by a common connection, they may interconnected and configured in various ways. Since these components may be microchips of standard or off-the-shelf configuration, they are represented in FIG. 36A as blocks consistent with the structure of an example embodiment.

Figure 36B:
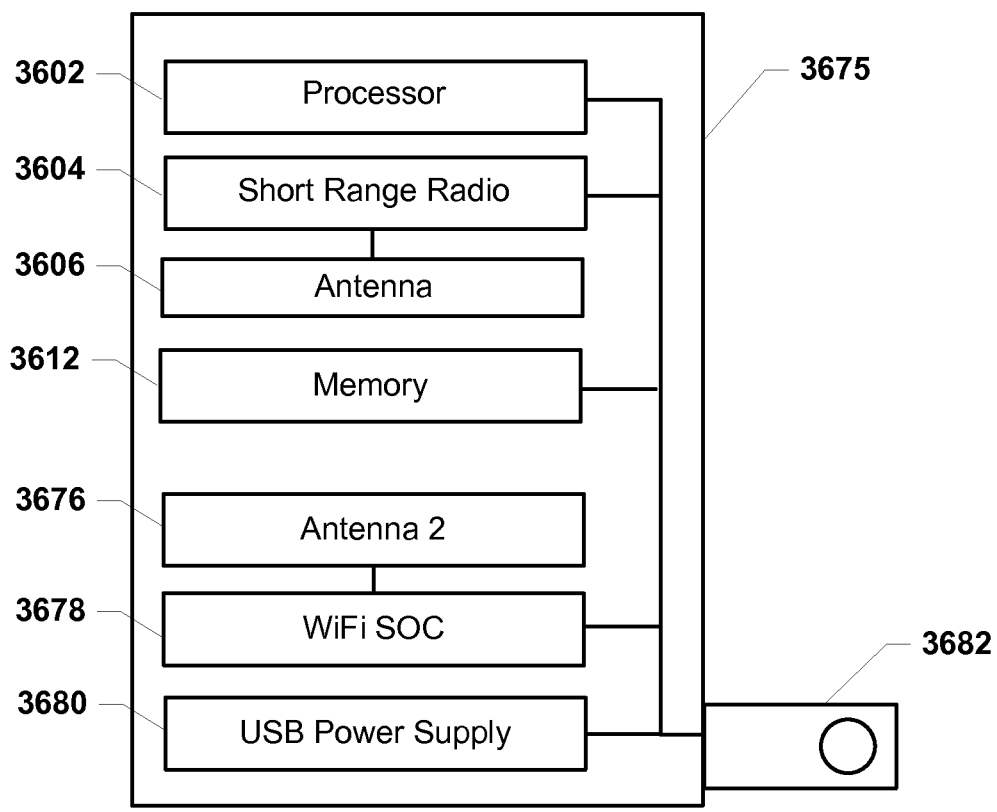

FIG. 36B illustrates an embodiment proximity broadcast receiver 3675 that can be plugged into a power outlet. Similar to the embodiment described above with reference to FIG. 36A, the proximity broadcast receiver 3675 may include a processor 3602, a memory unit 3612, and a short-range radio 3604 (e.g., Bluetooth®, Bluetooth® LE, LTE-D, peer-to-peer LTE-D, Zigbee®, Peanut®, etc.) connected to an antenna 3606. The proximity broadcast receiver 3675 may also include a WiFi system-on-chip 3678 (referred to as "SOC" in FIG. 36B) coupled to a second antenna 3676. In another embodiment, the system-on-chip 3678 may be a Bluetooth® Low Energy system-on-chip. The proximity broadcast receiver 3675 may utilize the system-on-chip 3678 to exchange data over a wireless local area network, such as by communicating with a WiFi router. Additionally, the proximity broadcast receiver 3675 may include a plug 3682 for interfacing with a power supply or otherwise receiving power, such as alternating current power (or "AC"). In various embodiments, the plug 3682 may be configured to connect with different power outlets standards (e.g., British Standards, National Electrical Manufacturers Association, etc.), and may include a grounding element (not shown). The plug 3682 may be coupled to a USB Power supply 3680 that provides power to the various components of the proximity broadcast receiver 3675, such as the processor 3602. In an alternative embodiment, the proximity broadcast receiver 3675 may recharge an internal battery (not shown) using power received from the plug 3682 and/or USB power supply 3680.

In an embodiment, the proximity broadcast receiver 3675 may store software instructions, such as within the memory 3612 or other circuitry that may be utilized by the processor 3602 and/or the system-on-chip 3678 to perform operations to transmit and/or receive short-range and long-range signals, respectively. In an embodiment, the proximity broadcast receiver 3675 may utilize the antennas 3606, 3676 to receive update software, instructions, or other data for storage and use in updating firmware, modifying operating parameters, and other configuration modifications.

Figure 37:
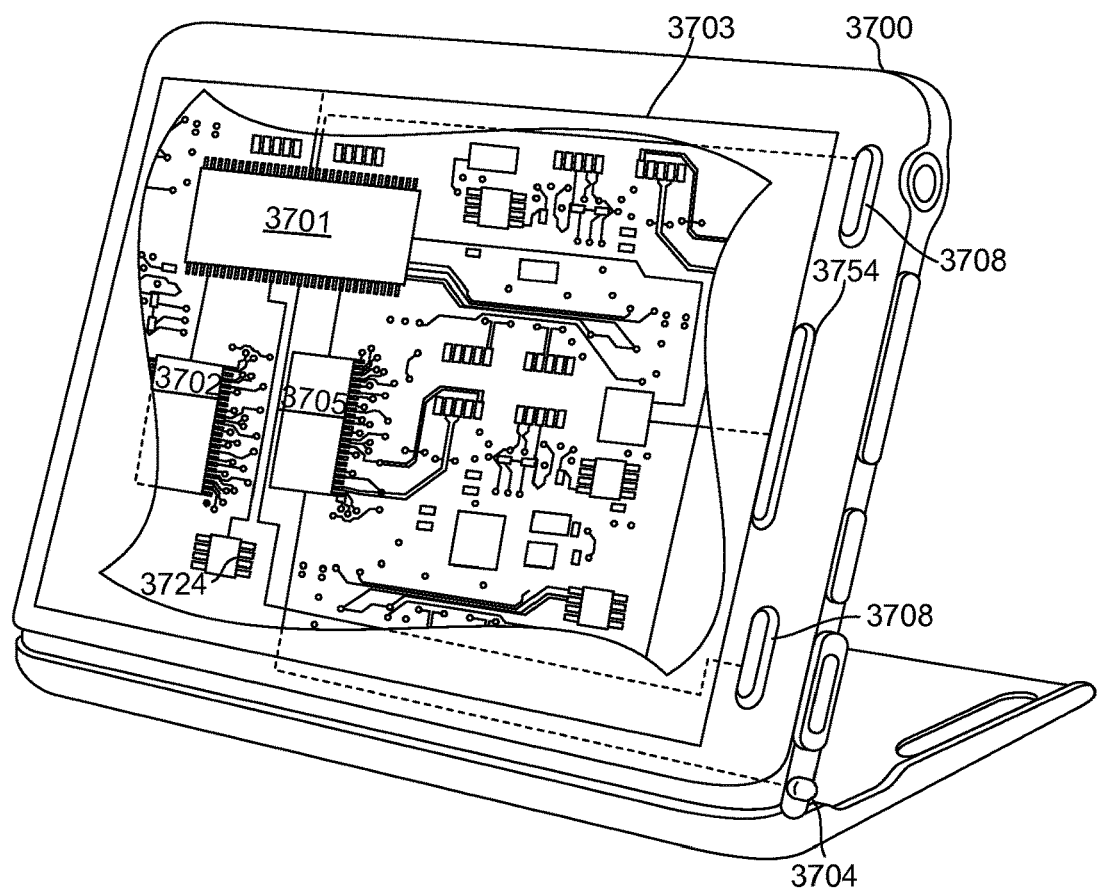
FIG. 37 is a component block diagram of a mobile device suitable for use in various embodiments.

FIG. 37 is a system block diagram of a smartphone type mobile device suitable for use with various embodiments. A smartphone 3700 may include a processor 3701 coupled to internal memory 3702, a display 3703, and to a speaker 3754. Additionally, the smartphone 3700 may include an antenna 3704 for sending and receiving electromagnetic radiation that may be connected to a wireless data link and/or cell telephone transceiver 3705 coupled to the processor 3701 and capable of communicating over a wide area wireless communication network. Smartphones may include a separate short-range radio transceiver 3724 capable of communicating or pairing with wireless identity transmitters. Smartphones 3700 typically may also include menu selection buttons or rocker switches 3708 for receiving user inputs.

Figure 38:
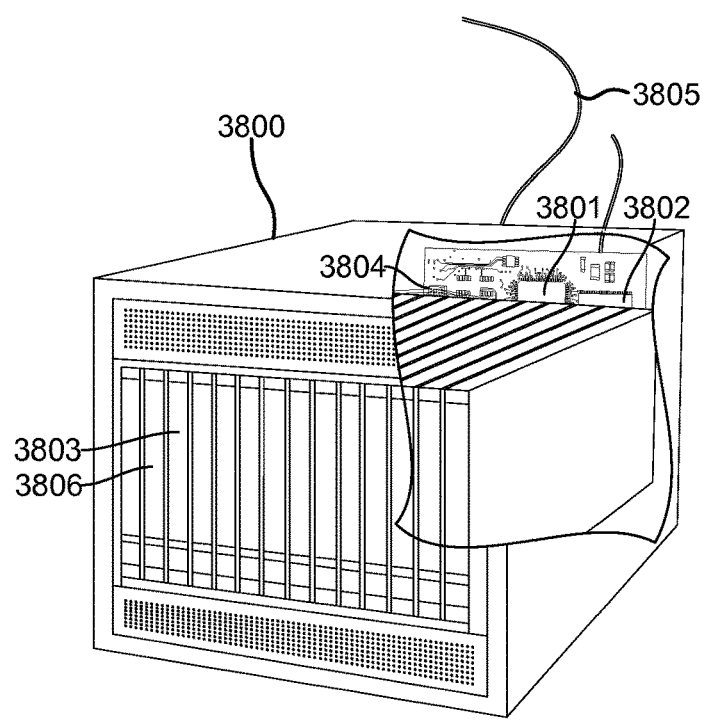
FIG. 38 is a component block diagram of a server device suitable for use in various embodiments.

FIG. 38 is a system block diagram of a server 3800 suitable for implementing the various embodiments of this disclosure. The server 3800 may be a commercially available server device. Such a server 3800 typically includes a processor 3801 coupled to volatile memory 3802 and a large capacity nonvolatile memory, such as a disk drive 3803. The server 3800 may also include a floppy disc drive, compact disc (CD) or DVD disc drive 3806 coupled to the processor 3801. The server 3800 may also include network access ports 3804 coupled to the processor 3801 for establishing data connections with a network 3805, such as a local area network coupled to other broadcast system computers and servers.

The processors 3701, 3801 may be any programmable microprocessor, microcomputer or multiple processor chip or chips that can be configured by software instructions (applications) to perform a variety of functions, including the functions of the various embodiments described below. In some mobile proximity broadcast receivers, multiple processors 3701 may be provided, such as one processor dedicated to wireless communication functions and one processor dedicated to running other applications. Typically, software applications may be stored in the internal memory 3702, 3802 before they are accessed and loaded into the processor 3701, 3801. The processor 3701, 3801 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of delivering marketing information to customers based on their proximity to a marketing location, comprising:
    receiving in a server a sighting message that includes:
        a rolling identifier of a wireless identity transmitter associated with an individual, wherein the rolling identifier is periodically generated by the wireless identity transmitter at a predetermined interval;
        an encoded counter value generated based at least in part on a counter value used to generate the rolling identifier;
        identification information corresponding to a proximity broadcast receiver that transmitted the sighting message; and
        authentication information of the proximity broadcast receiver that transmitted the sighting message;
    determining, in the server, whether the wireless identity transmitter is known based at least in part on the rolling identifier and the encoded counter value;
    determining, in the server, whether the sighting message is related to a host based at least in part on the identification information;
    determining, in the server, whether the authentication information included in the sighting message matches authentication information stored in the server;
    identifying, in response to determining that the authentication information included in the sighting message matches the authentication information stored in the server, marketing information relevant to the wireless identity transmitter and a proximate marketing area when the wireless identity transmitter is known based at least in part on the rolling identifier and the encoded counter value and the sighting message is related to the host based at least in part on the identification information, wherein the identification comprises a look-up operation in a database relating the marketing information, the proximate marketing area, and stored data related to the individual, and wherein the marketing information is one of a current offer, a promotional offer, a greeting message, information about deals in the proximate marketing area, an advertisement, and an executable script; and
    transmitting a first message to a computing device that includes the marketing information relevant to the wireless identity transmitter and the proximate marketing area.

2. The method of claim 1, further comprising storing data based on the sighting message when the wireless identity transmitter is determined to be known and the sighting message is determined to be related to the host, and
    wherein the data based on the sighting message includes information indicating at least one of locations of the wireless identity transmitter over a period, a number of unique customers that entered a store, an aggregated amount of time a plurality of individuals dwelled within a particular area of the store, and a dwell time within an area of the store within a proximity to the wireless identity transmitter.

3. The method of claim 1, wherein the stored data related to the individual includes data related to at least one of recent locations of the individual, characteristics of the individual, personal data of the individual, and loyalty program information associated with the individual.

4. The method of claim 1, further comprising:
    storing permissions information in the server that indicates whether the individual has authorized the stored data related to the individual to be provided to an advertiser.

5. The method of claim 4, further comprising:
    transmitting a request message for relevant marketing information that includes the stored data related to the individual and information related to the marketing area when the permissions information indicates that the individual has authorized the stored data related to the individual to be used to identify the marketing information relevant to the wireless identity transmitter and the proximate marketing area; and
    transmitting a request message for relevant marketing information that only includes information related to the marketing area when the permissions information indicates that the individual has not authorized the stored data related to the individual to be used to identify the marketing information relevant to the wireless identity transmitter and the proximate marketing area.

6. The method of claim 4, further comprising transmitting to the advertiser a second message that indicates:
    that the marketing information relevant to the wireless identity transmitter and the proximate marketing area was transmitted to the computing device;
    one or more relevant marketing conditions; and
    when authorized by the permissions information, the stored data related to the individual.

7. The method of claim 4, further comprising storing marketing information and marketing conditions,
    wherein:

the look-up operation is based on the marketing conditions, the stored data related to the individual, and a proximity to the marketing area when the permissions information indicates that the individual has authorized the stored data related to the individual to be used to identify the marketing information relevant to the wireless identity transmitter and the proximate marketing area; and the look-up operation is based on the marketing conditions and the proximity to the marketing area when the permissions information indicates that the individual has not authorized the stored data related to the individual to be used to identify the marketing information relevant to the wireless identity transmitter and the proximate marketing area.

8. The method of claim 7, wherein the stored data related to the individual includes data related to at least one of recent locations of the individual, characteristics of the individual, personal data of the individual, and loyalty program information associated with the individual.

9. The method of claim 7, wherein the marketing information and the marketing conditions are received from an advertising server.

10. The method of claim 1, wherein the marketing information is the executable script.

11. The method of claim 10, wherein when executed by the computing device, the executable script changes one of a setting of the computing device or a functionality of the computing device.

12. The method of claim 11, wherein the functionality of the computing device is access to websites of competitors.

13. The method of claim 1, wherein the host is one of a merchant, retailer, service, store, and third-party registered with the server.

14. The method of claim 1, wherein the rolling identifier is generated via an algorithm that uses a unique device identifier of the wireless identity transmitter, a secret key shared with the server, and the counter value.

15. The method of claim 1, wherein the computing device is a mobile device associated with the individual.

16. A server configured for delivering marketing information to customers based on their proximity to a marketing location, comprising:
a server processor configured with server-executable instructions to perform operations comprising:
receiving in the server a sighting message that includes:
a rolling identifier of a wireless identity transmitter associated with an individual, wherein the rolling identifier is periodically generated by the wireless identity transmitter at a predetermined interval;
an encoded counter value generated based at least in part on a counter value used to generate the rolling identifier;
identification information corresponding to a proximity broadcast receiver that transmitted the sighting message; and
authentication information of the proximity broadcast receiver that transmitted the sighting message;
determining whether the wireless identity transmitter is known based at least in part on the rolling identifier and the encoded counter value;
determining whether the sighting message is related to a host based at least in part on the identification information;
determining whether the authentication information included in the sighting message matches authentication information stored in the server;
identifying, in response to determining that the authentication information included in the sighting message matches the authentication information stored in the server, marketing information relevant to the wireless identity transmitter and a proximate marketing area when the wireless identity transmitter is known based at least in part on the rolling identifier and the encoded counter value and the sighting message is related to the host based at least in part on the identification information, wherein the identification comprises a look-up operation in a database relating the marketing information, the proximate marketing area, and stored data related to the individual, and wherein the marketing information is one of a current offer, a promotional offer, a greeting message, information about deals in the proximate marketing area, an advertisement, and an executable script; and
transmitting a first message to a computing device that includes the marketing information relevant to the wireless identity transmitter and the proximate marketing area.

17. The server of claim 16, wherein the server processor is configured with server executable instructions to perform operations further comprising storing data based on the sighting message when the wireless identity transmitter is determined to be known and the sighting message is determined to be related to the host, and
wherein the data based on the sighting message includes information indicating at least one of locations of the wireless identity transmitter over a period, a number of unique customers that entered a store, an aggregated amount of time a plurality of individuals dwelled within a particular area of the store, and a dwell time within an area of the store within a proximity to the wireless identity transmitter.

18. The server of claim 16, wherein the server processor is configured with server executable instructions to perform operations such that the stored data related to the individual includes data related to at least one of recent locations of the individual, characteristics of the individual, personal data of the individual, and loyalty program information associated with the individual.

19. The server of claim 16, wherein the server processor is configured with server executable instructions to perform operations further comprising:
storing permissions information in the server that indicates whether the individual has authorized the stored data related to the individual to be provided to an advertiser.

20. The server of claim 19, wherein the server processor is configured with server executable instructions to perform operations further comprising:
transmitting a request message for relevant marketing information that includes the stored data related to the individual and information related to the marketing area when the permissions information indicates that the individual has authorized the stored data related to the individual to be used to identify the marketing information relevant to the wireless identity transmitter and the proximate marketing area; and
transmitting a request message for relevant marketing information that only includes information related to the marketing area when the permissions information indicates that the individual has not authorized the stored data related to the individual to be used to identify the marketing information relevant to the wireless identity transmitter and the proximate marketing area.

21. The server of claim 19, wherein the server processor is configured with server executable instructions to perform operations further comprising transmitting to the advertiser a second message that indicates:
that the marketing information relevant to the wireless identity transmitter and the proximate marketing area was transmitted to the computing device;
one or more relevant marketing conditions; and
when authorized by the permissions information, the stored data related to the individual.

22. The server of claim 19, wherein the server processor is configured with server executable instructions to perform operations further comprising storing marketing information and marketing conditions, and
wherein the server processor is configured with server executable instructions to perform operations such that:
the look-up operation is based on the marketing conditions, the stored data related to the individual, and a proximity to the marketing area when the permissions information indicates that the individual has authorized the stored data related to the individual to be used to identify the marketing information relevant to the wireless identity transmitter and the proximate marketing area; and
the look-up operation is based on the marketing conditions and the proximity to the marketing area when the permissions information indicates that the individual has not authorized the stored data related to the individual to be used to identify the marketing information relevant to the wireless identity transmitter and the proximate marketing area.

23. The server of claim 22, wherein the stored data related to the individual includes data related to at least one of recent locations of the individual, characteristics of the individual, personal data of the individual, and loyalty program information associated with the individual.

24. The server of claim 22, wherein the stored marketing information and the marketing conditions are received from an advertising server.

25. The server of claim 16, wherein the marketing information is the executable script.

26. The server of claim 25, wherein when executed by the computing device, the executable script changes one of a setting of the computing device or a functionality of the computing device.

27. The server of claim 26, wherein the functionality of the computing device is access to websites of competitors.

28. The server of claim 16, wherein the host is one of a merchant, retailer, service, store, and third-party registered with the server.

29. The server of claim 16, wherein the rolling identifier is generated via an algorithm that uses a unique device identifier of the wireless identity transmitter, a secret key shared with the server, and the counter value.

30. The server of claim 16, wherein the computing device is a mobile device associated with the individual.

31. A server configured for delivering marketing information to customers based on their proximity to a marketing location, comprising:
means for receiving in the server a sighting message that includes:
a rolling identifier of a wireless identity transmitter associated with an individual wherein the rolling identifier is periodically generated by the wireless identity transmitter at a predetermined interval;
an encoded counter value generated based at least in part on a counter value used to generate the rolling identifier;
identification information corresponding to a proximity broadcast receiver that transmitted the sighting message; and
authentication information of the proximity broadcast receiver that transmitted the sighting message;
means for determining whether the wireless identity transmitter is known based at least in part on the rolling identifier and the encoded counter value;
means for determining whether the sighting message is related to a host based at least in part on the identification information;
means for determining whether the authentication information included in the sighting message matches authentication information stored in the server;
means for identifying, in response to determining that the authentication information included in the sighting message matches the authentication information stored in the server, marketing information relevant to the wireless identity transmitter and a proximate marketing area when the wireless identity transmitter is known based at least in part on the rolling identifier and the encoded counter value and the sighting message is related to the host based at least in part on the identification information, wherein the identification comprises a look-up operation in a database relating the marketing information, the proximate marketing area, and stored data related to the individual, and wherein the marketing information is one of a current offer, a promotional offer, a greeting message, information about deals in the proximate marketing area, an advertisement, and an executable script; and
means for transmitting a first message to a computing device that includes the marketing information relevant to the wireless identity transmitter and the proximate marketing area.

32. The server of claim 31, further comprising means for storing data based on the sighting message when the wireless identity transmitter is determined to be known and the sighting message is determined to be related to the host,
wherein the data based on the sighting message includes information indicating at least one of locations of the wireless identity transmitter over a period, a number of unique customers that entered a store, an aggregated amount of time a plurality of individuals dwelled within a particular area of the store, and a dwell time within an area of the store within a proximity to the wireless identity transmitter.

33. The server of claim 31, wherein the stored data related to the individual includes data related to at least one of recent locations of the individual, characteristics of the individual, personal data of the individual, and loyalty program information associated with the individual.

34. The server of claim 31, further comprising:
means for storing permissions information in the server that indicates whether the individual has authorized the stored data related to the individual to be provided to an advertiser.

35. The server of claim 34, further comprising:
means for transmitting a request message for relevant marketing information that includes the stored data related to the individual and information related to the marketing area when the permissions information indicates that the individual has authorized the stored data related to the individual to be used to identify the marketing information relevant to the wireless identity transmitter and the proximate marketing area; and means for transmitting a request message for relevant marketing information that only includes information related to the marketing area when the permissions information indicates that the individual has not authorized the stored data related to the individual to be used to identify the marketing information relevant to the wireless identity transmitter and the proximate marketing area.

36. The server of claim 34, further comprising means for transmitting to the advertiser a second message that indicates:

that the marketing information relevant to the wireless identity transmitter and the proximate marketing area was transmitted to the computing device;

one or more relevant marketing conditions; and when authorized by the permissions information, the stored data related to the individual.

37. The server of claim 34, further comprising means for storing marketing information and marketing conditions, wherein:

the look-up operation is based on the marketing conditions, the stored data related to the individual, and a proximity to the marketing area when the permissions information indicates that the individual has authorized the stored data related to the individual to be used to identify the marketing information relevant to the wireless identity transmitter and the proximate marketing area; and the look-up operation is based on the marketing conditions and the proximity to the marketing area when the permissions information indicates that the individual has not authorized the stored data related to the individual to be used to identify the marketing information relevant to the wireless identity transmitter and the proximate marketing area.

38. The server of claim 37, wherein the stored data related to the individual includes data related to at least one of recent locations of the individual, characteristics of the individual, personal data of the individual, and loyalty program information associated with the individual.

39. The server of claim 37, wherein the marketing information and the marketing conditions are received from an advertising server.

40. The server of claim 31, wherein the marketing information is the executable script.

41. The server of claim 40, wherein when executed by the computing device, the executable script changes one of a setting of the computing device or a functionality of the computing device.

42. The server of claim 41, wherein the functionality of the computing device is access to websites of competitors.

43. The server of claim 31, wherein the host is one of a merchant, retailer, service, store, and third-party registered with the server.

44. The server of claim 31, wherein the rolling identifier is generated via an algorithm that uses a unique device identifier of the wireless identity transmitter, a secret key shared with the server, and the counter value.

45. The server of claim 31, wherein the computing device is a mobile device associated with the individual.

46. A non-transitory server-readable storage medium having stored thereon server-executable instructions configured to cause a server to perform operations for delivering marketing information to customers based on their proximity to a marketing location, the operations comprising:

receiving in the server a sighting message that includes:

a rolling identifier of a wireless identity transmitter associated with an individual, wherein the rolling identifier is periodically generated by the wireless identity transmitter at a predetermined interval;

an encoded counter value generated based at least in part on a counter value used to generate the rolling identifier;

identification information corresponding to a proximity broadcast receiver that transmitted the sighting message; and authentication information of the proximity broadcast receiver that transmitted the sighting message;

determining whether the wireless identity transmitter is known based at least in part on the rolling identifier and the encoded counter value;

determining whether the sighting message is related to a host based at least in part on the identification information;

determining whether the authentication information included in the sighting message matches authentication information stored in the server;

identifying, in response to determining that the authentication information included in the sighting message matches the authentication information stored in the server, marketing information relevant to the wireless identity transmitter and a proximate marketing area when the wireless identity transmitter is known based at least in part on the rolling identifier and the encoded counter value and the sighting message is related to the host based at least in part on the identification information, wherein the identification comprises a look-up operation in a database relating the marketing information, the proximate marketing area, and stored data related to the individual, and wherein the marketing information is one of a current offer, a promotional offer, a greeting message, information about deals in the proximate marketing area, an advertisement, and an executable script; and transmitting a first message to a computing device that includes the marketing information relevant to the wireless identity transmitter and the proximate marketing area.

47. The non-transitory server-readable storage medium of claim 46, wherein the stored server-executable instructions are configured to cause the server to perform operations further comprising storing data based on the sighting message when the wireless identity transmitter is determined to be known and the sighting message is determined to be related to the host, wherein the data based on the sighting message includes information indicating at least one of locations of the wireless identity transmitter over a period, a number of unique customers that entered a store, an aggregated amount of time a plurality of individuals dwelled within a particular area of the store, and a dwell time within an area of the store within a proximity to the wireless identity transmitter.

48. The non-transitory server-readable storage medium of claim 46, wherein the stored server-executable instructions are configured to cause the server to perform operations such that the stored data related to the individual includes data related to at least one of recent locations of the individual, characteristics of the individual, personal data of the individual, and loyalty program information associated with the individual.

49. The non-transitory server-readable storage medium of claim 46, wherein the stored server-executable instructions are configured to cause the server to perform operations further comprising:
storing permissions information in the server that indicates whether the individual has authorized the stored data related to the individual to be provided to an advertiser.

50. The non-transitory server-readable storage medium of claim 49, wherein the stored server-executable instructions are configured to cause the server to perform operations further comprising:
transmitting a request message for relevant marketing information that includes the stored data that related to the individual and information related to the marketing area when the permissions information indicates that the individual has authorized the stored data related to the individual to be used to identify the marketing information relevant to the wireless identity transmitter and the proximate marketing area; and
transmitting a request message for relevant marketing information that only includes information related to the marketing area when the permissions information indicates that the individual has not authorized the stored data related to the individual to be used to identify the marketing information relevant to the wireless identity transmitter and the proximate marketing area.

51. The non-transitory server-readable storage medium of claim 49, wherein the stored server-executable instructions are configured to cause the server to perform operations further comprising transmitting to the advertiser a second message that indicates:
that the marketing information relevant to the wireless identity transmitter and the proximate marketing area was transmitted to the computing device;
one or more relevant marketing conditions; and
when authorized by the permissions information, the stored data related to the individual.

52. The non-transitory server-readable storage medium of claim 49, wherein the stored server-executable instructions are configured to cause the server to perform operations further comprising storing marketing information and marketing conditions, and
wherein the stored server-executable instructions are configured to cause the server to perform operations such that:
the look-up operation is based on the marketing conditions, the stored data related to the individual, and a proximity to the marketing area when the permissions information indicates that the individual has authorized the stored data related to the individual to be used to identify the marketing information relevant to the wireless identity transmitter; and
the look-up operation is based on the marketing conditions and the proximity to the marketing area when the permissions information indicates that the individual has not authorized the stored data related to the individual to be used to identify the marketing information relevant to the wireless identity transmitter.

53. The non-transitory server-readable storage medium of claim 52, wherein the stored data related to the individual includes data related to at least one of recent locations of the individual, characteristics of the individual, personal data of the individual, and loyalty program information associated with the individual.

54. The non-transitory server-readable storage medium of claim 52, wherein the marketing information and the marketing conditions are received from an advertising server.

55. The non-transitory server-readable storage medium of claim 46, wherein the marketing information is the executable script.

56. The non-transitory server-readable storage medium of claim 55, wherein when executed by the computing device, the executable script changes one of a setting of the computing device or a functionality of the computing device.

57. The non-transitory server-readable storage medium of claim 56, wherein the functionality of the computing device is access to websites of competitors.

58. The non-transitory server-readable storage medium of claim 46, wherein the host is one of a merchant, retailer, service, store, and third-party registered with the server.

59. The non-transitory server-readable storage medium of claim 46, wherein the rolling identifier is generated via an algorithm that uses a unique device identifier of the wireless identity transmitter, a secret key shared with the server, and the counter value.

60. The non-transitory server-readable storage medium of claim 46, wherein the computing device is a mobile device associated with the individual.

61. A system, comprising:
a central server;
a wireless identity transmitter; and
a proximity broadcast receiver;
wherein the wireless identity transmitter comprises:
a first memory;
a first transceiver configured to broadcast short-range wireless signals capable of being received by the proximity broadcast receiver; and
a first processor coupled to the first memory and the first transceiver, and configured with processor-executable instructions to perform operations comprising:
generating a rolling identifier periodically at a predetermined interval via an algorithm that uses a unique device identifier of the wireless identity transmitter and a counter value, wherein the unique device identifier of the wireless identity transmitter is associated with an individual;
generating an encoded value based at least in part on the counter value used to generate the rolling identifier;
and
periodically broadcasting, via the first transceiver, a short-range wireless signal including the rolling identifier and the encoded counter value;
wherein the proximity broadcast receiver comprises:
a second memory;
a second transceiver configured to receive the short-range wireless signal;
a network transceiver configured to communicate, via a long-range network, with the central server;
a second processor coupled to the second memory, the second transceiver, and the network transceiver and configured with processor-executable instructions to perform operations comprising:
receiving, via the second transceiver, the short-range wireless signal;

generating a sighting message in response to the short-range wireless signal, wherein the sighting message includes the rolling identifier, the encoded counter value, identification information corresponding to the proximity broadcast receiver, and authentication information of the proximity broadcast receiver; and transmitting, via the long-range network using the network transceiver, the sighting message;

wherein the central server is configured with server-executable instructions to perform operations comprising:

receiving the sighting message;

determining whether the wireless identity transmitter is known based at least in part on the rolling identifier and the encoded counter value;

determining whether the sighting message is related to a host based at least in part on the identification information;

determining whether the authentication information included in the sighting message matches authentication information stored in the server;

identifying, in response to determining that the authentication information included in the sighting message matches the authentication information stored in the server, marketing information relevant to the wireless identity transmitter and a proximate marketing area when the wireless identity transmitter is known based at least in part on the rolling identifier and the encoded counter value and the sighting message is related to the host based at least in part on the identification information, wherein the identification comprises a look-up operation in a database relating the marketing information, the proximate marketing area, and stored data related to the individual, and wherein the marketing information is one of a current offer, a promotional offer, a greeting message, information about deals in the proximate marketing area, an advertisement, and an executable script; and transmitting a first message to a computing device that includes the marketing information relevant to the wireless identity transmitter and the proximate marketing area.

62. The system of claim 61, wherein the central server is configured with server-executable instructions to perform operations further comprising storing data based on the sighting message when the wireless identity transmitter is determined to be known and the sighting message is determined to be related to the host, and wherein the data based on the sighting message includes information indicating at least one of locations of the wireless identity transmitter over a period, a number of unique customers that entered a store, an aggregated amount of time a plurality of individuals dwelled within a particular area of the store, and a dwell time within an area of the store within a proximity to the wireless identity transmitter.

63. The system of claim 61, wherein the central server is configured with server-executable instructions to perform operations such that the stored data related to the individual includes data related to at least one of recent locations of the individual, characteristics of the individual, personal data of the individual, and loyalty program information associated with the individual.

64. The system of claim 61, wherein the central server is configured with server-executable instructions to perform operations further comprising:

storing permissions information in the central server that indicates whether the individual has authorized the stored data related to the individual to be provided to an advertiser.

65. The system of claim 64, wherein the central server is configured with server-executable instructions to perform operations further comprising:

transmitting a request message for relevant marketing information that includes the stored data related to the individual and information related to the marketing area when the permissions information indicates that the individual has authorized the stored data related to the individual to be used to identify the marketing information relevant to the wireless identity transmitter and the proximate marketing area; and transmitting a request message for relevant marketing information that only includes information related to the marketing area when the permissions information indicates that the individual has not authorized the stored data related to the individual to be used to identify the marketing information relevant to the wireless identity transmitter and the proximate marketing area.

66. The system of claim 64, wherein the central server is configured with server-executable instructions to perform operations further comprising transmitting to the advertiser a second message that indicates:

that the marketing information relevant to the wireless identity transmitter and the proximate marketing area was transmitted to the computing device;

one or more relevant marketing conditions; and when authorized by the permissions information, the stored data related to the individual.

67. The system of claim 64, wherein the central server is configured with server-executable instructions to perform operations further comprising storing marketing information and marketing conditions, and wherein the central server is configured with server-executable instructions to perform operations such that:

the look-up operation is based on the stored marketing conditions, the stored data related to the individual, and a proximity to the marketing area when the permissions information indicates that the individual has authorized the stored data related to the individual to be used to identify the marketing information relevant to the wireless identity transmitter and the proximate marketing area; and the look-up operation is based on the stored marketing conditions and the proximity to the marketing area when the permissions information indicates that the individual has not authorized the stored data related to the individual to be used to identify the marketing information relevant to the wireless identity transmitter and the proximate marketing area.

68. The system of claim 67, wherein the stored data related to the individual includes data related to at least one of recent locations of the individual, characteristics of the individual, personal data of the individual, and loyalty program information associated with the individual.

69. The system of claim 61, wherein the marketing information is the executable script.

70. The system of claim 69, wherein when executed by the computing device, the executable script changes one of a setting of the computing device or a functionality of the computing device.

71. The system of claim 70, wherein the functionality of the computing device is access to websites of competitors.

72. The system of claim 61, wherein the host is one of a merchant, retailer, service, store, and third-party registered with the central server.

73. The system of claim 61, wherein the first processor is configured with processor-executable instructions to perform operations such that the rolling identifier is generated via an algorithm that uses a unique device identifier of the wireless identity transmitter, a secret key shared with the central server, and the counter value.

74. The system of claim 61, wherein the computing device is a mobile device associated with the individual.

* * * * *